US011720171B2

(12) United States Patent
Pastrana Vicente et al.

(10) Patent No.: US 11,720,171 B2
(45) Date of Patent: Aug. 8, 2023

(54) METHODS FOR NAVIGATING USER INTERFACES

(71) Applicant: Apple Inc., Cupertino, CA (US)

(72) Inventors: Israel Pastrana Vicente, San Jose, CA (US); Jay Moon, San Francisco, CA (US); Jesse Chand, San Francisco, CA (US); Jonathan R. Dascola, San Francisco, CA (US); Jeffrey M. Faulkner, San Francisco, CA (US); Pol Pla I Conesa, San Francisco, CA (US); Dorian D. Dargan, Danville, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/479,791

(22) Filed: Sep. 20, 2021

(65) Prior Publication Data

US 2022/0100270 A1 Mar. 31, 2022

Related U.S. Application Data

(60) Provisional application No. 63/083,804, filed on Sep. 25, 2020.

(51) Int. Cl.
*G06F 3/01* (2006.01)
*G06F 3/0481* (2022.01)
*G06F 3/04842* (2022.01)

(52) U.S. Cl.
CPC .............. *G06F 3/013* (2013.01); *G06F 3/017* (2013.01); *G06F 3/0481* (2013.01); *G06F 3/04842* (2013.01)

(58) Field of Classification Search
CPC ........ G06F 3/013; G06F 3/017; G06F 3/0481; G06F 3/04842
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |

(Continued)

FOREIGN PATENT DOCUMENTS

| EP | 0816983 A2 | 1/1998 |
| EP | 1530115 A2 | 5/2005 |

(Continued)

OTHER PUBLICATIONS

Final Office Action received for U.S. Appl. No. 14/531,874, dated Nov. 4, 2016, 10 pages.

(Continued)

*Primary Examiner* — Cao H Nguyen
(74) *Attorney, Agent, or Firm* — Kubota & Basol LLP

(57) ABSTRACT

In some embodiments, an electronic device navigates between user interfaces based at least on detecting a gaze of the user. In some embodiments, an electronic device enhances interactions with control elements of user interfaces. In some embodiments, an electronic device scrolls representations of categories and subcategories in a coordinated manner. In some embodiments, an electronic device navigates back from user interfaces having different levels of immersion in different ways.

39 Claims, 61 Drawing Sheets

(56) References Cited

U.S. PATENT DOCUMENTS

| | | | |
|---|---|---|---|
| 6,078,310 A | 6/2000 | Tognazzini | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 7,015,894 B2 | 3/2006 | Morohoshi | |
| 7,134,130 B1 | 11/2006 | Thomas | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,706,579 B2 | 4/2010 | Oijer | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,341,541 B2 | 12/2012 | Holecek et al. | |
| 8,381,135 B2 | 2/2013 | Hotelling et al. | |
| 8,479,122 B2 | 7/2013 | Hotelling et al. | |
| 8,593,558 B2 | 11/2013 | Gardiner et al. | |
| 8,724,856 B1 | 5/2014 | King | |
| 8,896,632 B2 | 11/2014 | Macdougall et al. | |
| 9,189,611 B2 | 11/2015 | Wssingbo | |
| 9,348,458 B2 | 5/2016 | Hotelling et al. | |
| 9,619,519 B1 | 4/2017 | Dorner | |
| 9,829,708 B1 | 11/2017 | Asada | |
| 9,933,937 B2 | 4/2018 | Lemay et al. | |
| 10,565,448 B2 | 2/2020 | Bell et al. | |
| 10,678,403 B2 | 6/2020 | Duarte et al. | |
| 10,732,721 B1 | 8/2020 | Clements | |
| 2002/0015024 A1 | 2/2002 | Westerman et al. | |
| 2002/0065778 A1 | 5/2002 | Bouet et al. | |
| 2003/0038754 A1 | 2/2003 | Goldstein et al. | |
| 2004/0104806 A1 | 6/2004 | Yui et al. | |
| 2005/0044510 A1 | 2/2005 | Yi | |
| 2005/0175218 A1 | 8/2005 | Vertegaal et al. | |
| 2005/0190059 A1 | 9/2005 | Wehrenberg | |
| 2006/0017692 A1 | 1/2006 | Wehrenberg et al. | |
| 2006/0028400 A1 | 2/2006 | Lapstun et al. | |
| 2006/0033724 A1 | 2/2006 | Chaudhri et al. | |
| 2006/0197753 A1 | 9/2006 | Hotelling | |
| 2006/0256083 A1 | 11/2006 | Rosenberg | |
| 2007/0259716 A1 | 11/2007 | Mattice et al. | |
| 2008/0181502 A1 | 7/2008 | Yang | |
| 2009/0146779 A1 | 6/2009 | Kumar et al. | |
| 2010/0177049 A1 | 7/2010 | Levy et al. | |
| 2011/0098029 A1 | 4/2011 | Rhoads et al. | |
| 2011/0156879 A1 | 6/2011 | Matsushita et al. | |
| 2011/0175932 A1 | 7/2011 | Yu et al. | |
| 2012/0075496 A1 | 3/2012 | Akifusa et al. | |
| 2012/0124525 A1 | 5/2012 | Kang | |
| 2012/0131631 A1 | 5/2012 | Bhogal et al. | |
| 2012/0184372 A1 | 7/2012 | Laarakkers et al. | |
| 2013/0027860 A1 | 1/2013 | Masaki et al. | |
| 2013/0190044 A1 | 7/2013 | Kulas | |
| 2013/0293456 A1 | 11/2013 | Son et al. | |
| 2013/0300648 A1 | 11/2013 | Kim et al. | |
| 2013/0300654 A1 | 11/2013 | Seki | |
| 2014/0049462 A1 | 2/2014 | Weinberger et al. | |
| 2014/0068692 A1 | 3/2014 | Archibong et al. | |
| 2014/0126782 A1 | 5/2014 | Takai et al. | |
| 2014/0139426 A1 | 5/2014 | Kryze et al. | |
| 2014/0168453 A1 | 6/2014 | Shoemake et al. | |
| 2014/0247210 A1 | 9/2014 | Henderek et al. | |
| 2014/0304612 A1 | 10/2014 | Collin | |
| 2015/0082180 A1 | 3/2015 | Ames et al. | |
| 2015/0128075 A1 | 5/2015 | Kempinski | |
| 2015/0212576 A1 | 7/2015 | Ambrus et al. | |
| 2015/0331240 A1 | 11/2015 | Poulos et al. | |
| 2015/0370323 A1 | 12/2015 | Cieplinski et al. | |
| 2016/0026243 A1 | 1/2016 | Bertram et al. | |
| 2016/0357266 A1 | 12/2016 | Patel et al. | |
| 2017/0236332 A1* | 8/2017 | Kipman | G06F 3/041 |
| | | | 345/633 |
| 2017/0308163 A1 | 10/2017 | Cieplinski et al. | |
| 2018/0157332 A1 | 6/2018 | Nie | |
| 2019/0018498 A1* | 1/2019 | West | G06F 3/012 |
| 2019/0279407 A1* | 9/2019 | McHugh | G06T 11/60 |
| 2019/0332244 A1 | 10/2019 | Beszteri et al. | |
| 2019/0362557 A1 | 11/2019 | Lacey et al. | |
| 2020/0026349 A1* | 1/2020 | Fontanel | G06V 40/19 |
| 2020/0225746 A1 | 7/2020 | Bar-zeev et al. | |
| 2020/0285314 A1 | 9/2020 | Cieplinski et al. | |
| 2020/0371673 A1* | 11/2020 | Faulkner | G06F 3/017 |
| 2021/0103333 A1 | 4/2021 | Cieplinski et al. | |
| 2021/0303107 A1 | 9/2021 | Pla I Conesa et al. | |
| 2022/0365595 A1 | 11/2022 | Cieplinski et al. | |

FOREIGN PATENT DOCUMENTS

| | | |
|---|---|---|
| EP | 2551763 A1 | 1/2013 |
| EP | 3249497 A1 | 11/2017 |
| JP | 2000-163031 A | 6/2000 |
| JP | 2002-342033 A | 11/2002 |
| WO | 2011/008638 A1 | 1/2011 |
| WO | 2013/169849 A2 | 11/2013 |
| WO | 2014/105276 A1 | 7/2014 |
| WO | 2015/195216 A1 | 12/2015 |

OTHER PUBLICATIONS

Final Office Action received for U.S. Appl. No. 15/644,639, dated Sep. 19, 2019, 12 pages.
International Search Report received for PCT Patent Application No. PCT/US2015/029727, dated Nov. 2, 2015, 6 pages.
International Search Report received for PCT Patent Application No. PCT/US2021/022413, dated Aug. 13, 2021, 7 pages.
Letter Restarting Period for Response received for U.S. Appl. No. 15/644,639, dated Sep. 28, 2018, 8 pages.
Non-Final Office Action received for U.S. Appl. No. 14/531,874, dated May 18, 2016, 11 pages.
Non-Final Office Action received for U.S. Appl. No. 15/644,639, dated Apr. 12, 2019, 11 pages.
Non-Final Office Action received for U.S. Appl. No. 15/644,639, dated Sep. 10, 2018, 9 pages.
Non-Final Office Action received for U.S. Appl. No. 16/881,599, dated Apr. 28, 2021, 8 pages.
Non-Final Office Action received for U.S. Appl. No. 17/123,000, dated Nov. 12, 2021, 8 pages.
Non-Final Office Action received for U.S. Appl. No. 17/202,034, dated Jul. 20, 2022, 38 Pages.
Non-Final Office Action received for U.S. Appl. No. 17/816,314, dated Sep. 23, 2022, 10 Pages.
Notice of Allowance received for U.S. Appl. No. 14/531,874, dated Mar. 28, 2017, 9 pages.
Notice of Allowance received for U.S. Appl. No. 15/644,639, dated Jan. 16, 2020, 16 pages.
Notice of Allowance received for U.S. Appl. No. 16/881,599, dated Dec. 17, 2021, 7 pages.
Notice of Allowance received for U.S. Appl. No. 17/123,000, dated May 27, 2022, 8 Pages.
Notice of Allowance received for U.S. Appl. No. 17/123,000, dated Sep. 19, 2022, 7 pages.
Supplemental Notice of Allowance received for U.S. Appl. No. 14/531,874, dated Jul. 26, 2017, 5 pages.
Bohn, Dieter, "Rebooting WebOS: How LG Rethought the Smart TV", The Verge, Available online at: <http://www.theverge.com/2014/1/6/5279220/rebooting-webos-how-lg-rethought-the-smart-tv>, Jan. 6, 2014, 5 pages.
Fatima et al., "Eye Movement Based Human Computer Interaction", 3rd International Conference on Recent Advances in Information Technology (RAIT), Mar. 3, 2016, pp. 489-494.
Grey, Melissa, "Comcast's NewX2 Platform Moves your DVR Recordings from the Box to the Cloud", Engadget, Available online at: <http://www.engadget.com/2013/06/11/comcast-x2-platform/>, Jun. 11, 2013, 15 pages.

(56) References Cited

OTHER PUBLICATIONS

Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
International Search Report received for PCT Patent Application No. PCT/US2021/071518, dated Feb. 25, 2022, 7 pages.
Final Office Action received for U.S. Appl. No. 17/816,314, dated Jan. 20, 2023, 11 pages.

\* cited by examiner

METHODS FOR NAVIGATING USER INTERFACES

CROSS-REFERENCE TO RELATED APPLICATIONS

This application claims the benefit of U.S. Provisional Application No. 63/083,804, filed Sep. 25, 2020, the content of which is incorporated herein by reference in its entirety for all purposes.

TECHNICAL FIELD

This relates generally to computer systems with a display generation component and one or more input devices that present graphical user interfaces, including but not limited to electronic devices that present three-dimensional environments, via the display generation component, that include virtual objects.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for navigating and interacting with user interfaces. Such methods and interfaces may complement or replace conventional methods for interacting with user interfaces in a three-dimensional environment. Such methods and interfaces reduce the number, extent, and/or the nature of the inputs from a user and produce a more efficient human-machine interface.

In some embodiments, an electronic device navigates between user interfaces based at least on detecting a gaze of the user. In some embodiments, an electronic device enhances interactions with control elements of user interfaces. In some embodiments, an electronic device scrolls representations of categories and subcategories in a coordinated manner. In some embodiments, the electronic device navigates back from user interfaces having different levels of immersion in different ways.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
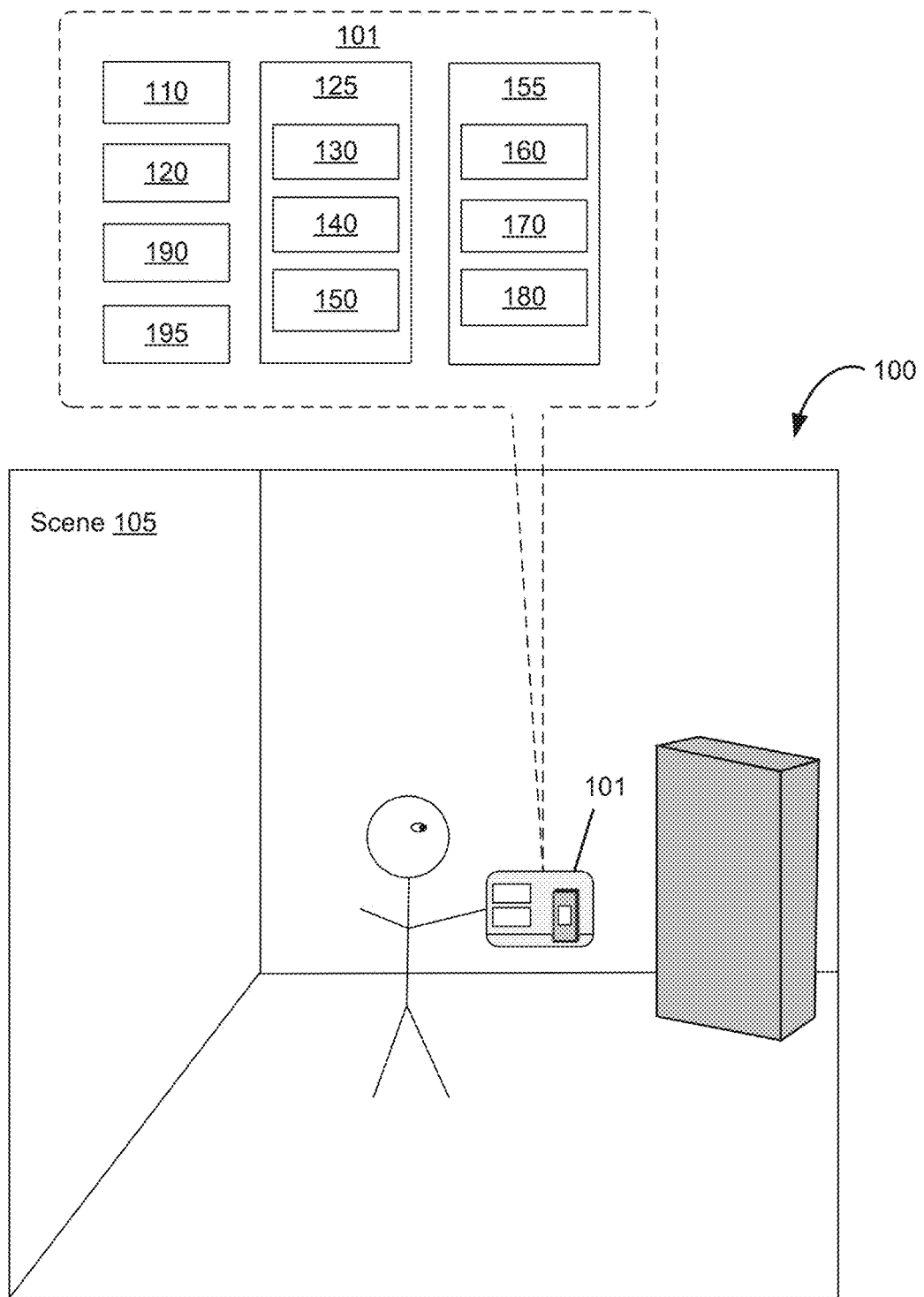
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein provide improved ways for an electronic device to interact with and manipulate objects in a three-dimensional environment. The three-dimensional environment optionally includes one or more virtual objects, one or more representations of real objects (e.g., displayed as photorealistic (e.g., "pass-through") representations of the real objects or visible to the user through a transparent portion of the display generation component) that are in the physical environment of the electronic device, and/or representations of users in the three-dimensional environment.

In some embodiments, an electronic device navigates between user interfaces based at least on detecting a gaze of the user. In some embodiments, the electronic device navigates to a user interface associated with a respective user interface element in response to detecting a gaze of the user directed to the respective user interface element for a predetermined time threshold (e.g., 0.1, 0.2, 0.3, 0.4, 0.5, 1, etc. seconds). In some embodiments, in response to detecting the user perform a gesture with their hand (e.g., touching a thumb to another finger (e.g., index, middle, ring, little finger) on the same hand as the thumb) while their gaze is directed to the respective user interface element, the electronic device navigates to the user interface in less time than the predetermined time threshold. Navigating to the user interface either in response to gaze only or navigating the user interface more quickly in response to the user's gaze and hand gesture provide efficient ways of navigating to the user interface with either fewer inputs or in less time.

In some embodiments, an electronic device enhances interactions with control elements of user interfaces. In some embodiments, control elements include selectable options that, when selected, cause the electronic device to perform an operation in the user interface including the control element. For example, a control element includes a navigation bar that includes selectable options to navigate to different pages of a user interface. In some embodiments, in response to detecting the user's gaze on the control element, the electronic device updates the appearance of the control element (e.g., enlarges, expands, adds detail to the control element). Updating the appearance of the control element in this way provides an efficient way of interacting with the control element and a way of interacting with the user interface with reduced visual clutter when not interacting with the control element.

In some embodiments, an electronic device scrolls representations of categories and subcategories in a coordinated manner. In some embodiments, the electronic device concurrently displays representations of categories (e.g., of content, files, user interfaces, applications, etc.) and representations of subcategories within one or more of the categories. In some embodiments, in response to an input to scroll the representations of categories, the electronic device scrolls the representations of categories and the representations of subcategories. In some embodiments, in response to an input to scroll the representations of subcategories, the electronic device scrolls the representations of subcategories (e.g., with or without scrolling the representations of categories). Scrolling the representations of categories and subcategories in a coordinated manner provides an efficient way of browsing the categories and subcategories concurrently.

In some embodiments, the electronic device navigates back from user interfaces having different levels of immersion in different ways. In some embodiments, the level of immersion of a user interface corresponds to the number of objects (e.g., virtual objects, representations of real objects) and the degree of visibility of objects other than the user interface displayed concurrently with the user interface. In some embodiments, the electronic device navigates away from a user interface with a first level of immersion in response to a respective input (e.g., detecting the user's gaze on a representation of a previous user interface for a threshold amount of time). In some embodiments, the electronic device forgoes navigating away from a user interface with a second, higher level of immersion in response to the respective input. Navigating away from user interfaces with the first level of immersion in response to a respective input and forgoing navigating away from user interfaces with the second, higher level of immersion in response to the respective input provides convenience in user interfaces with the first level of immersion and reduces distraction in user interfaces with the second, higher level of immersion, enabling the user to use the electronic device quickly and efficiently.

FIGS. 1-6 provide a description of example computer systems for providing CGR experiences to users (such as described below with respect to methods 800, 1000, 1200, and 1400). In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
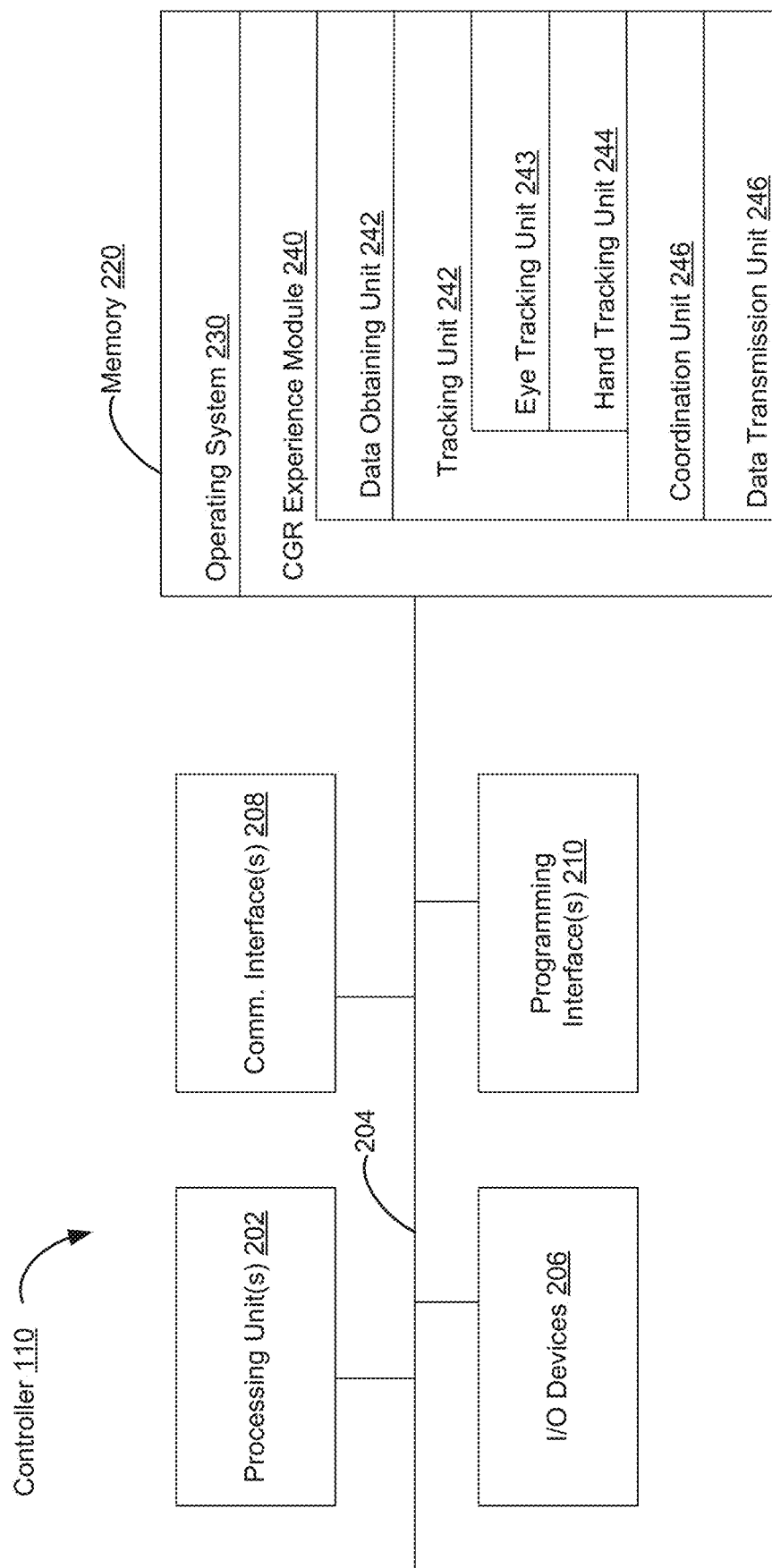
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
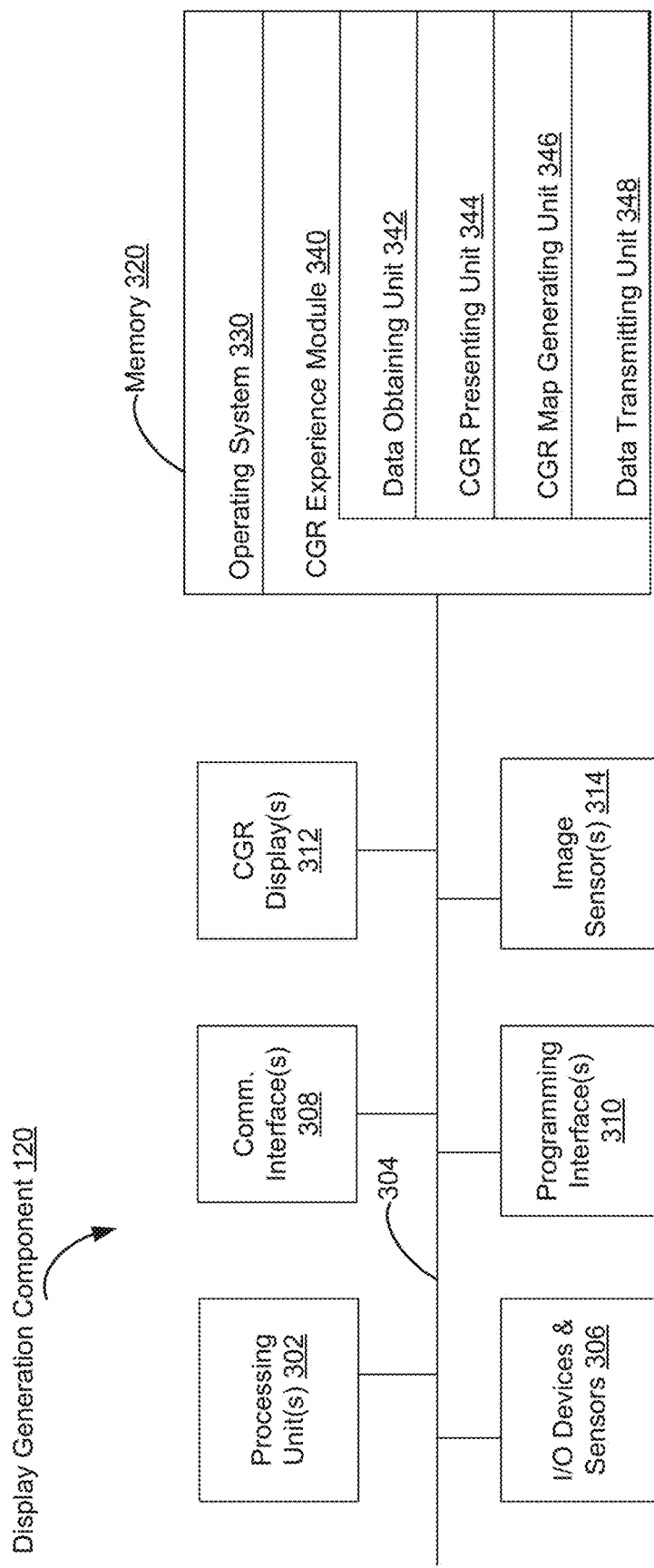
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
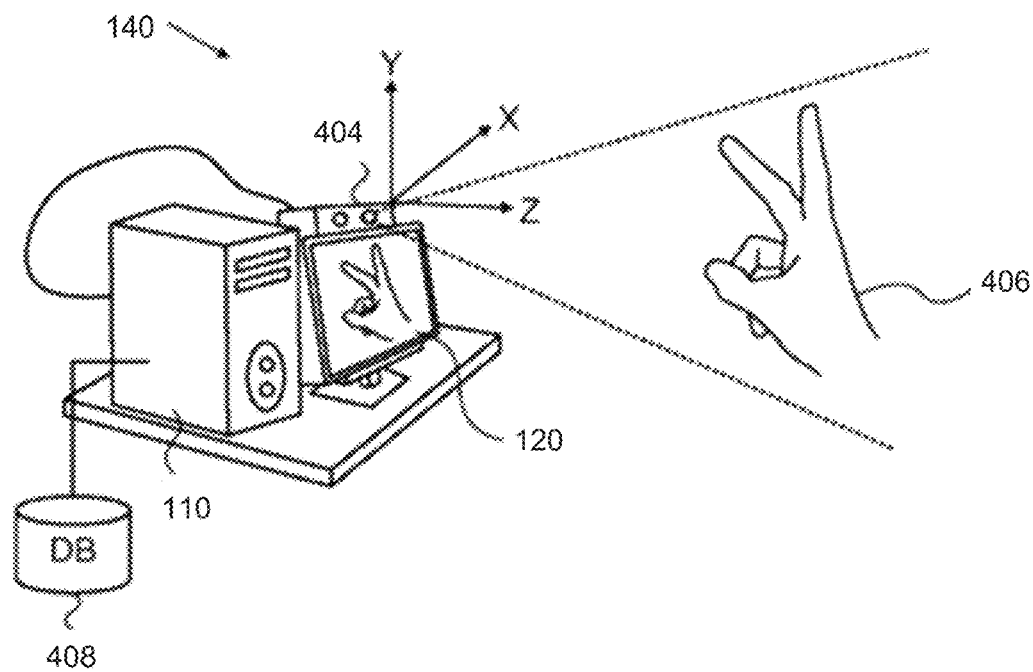
FIG. 4 is a block diagram illustrating a hand tracking unit of a computer system that is configured to capture gesture inputs of the user in accordance with some embodiments.
Figure 4:
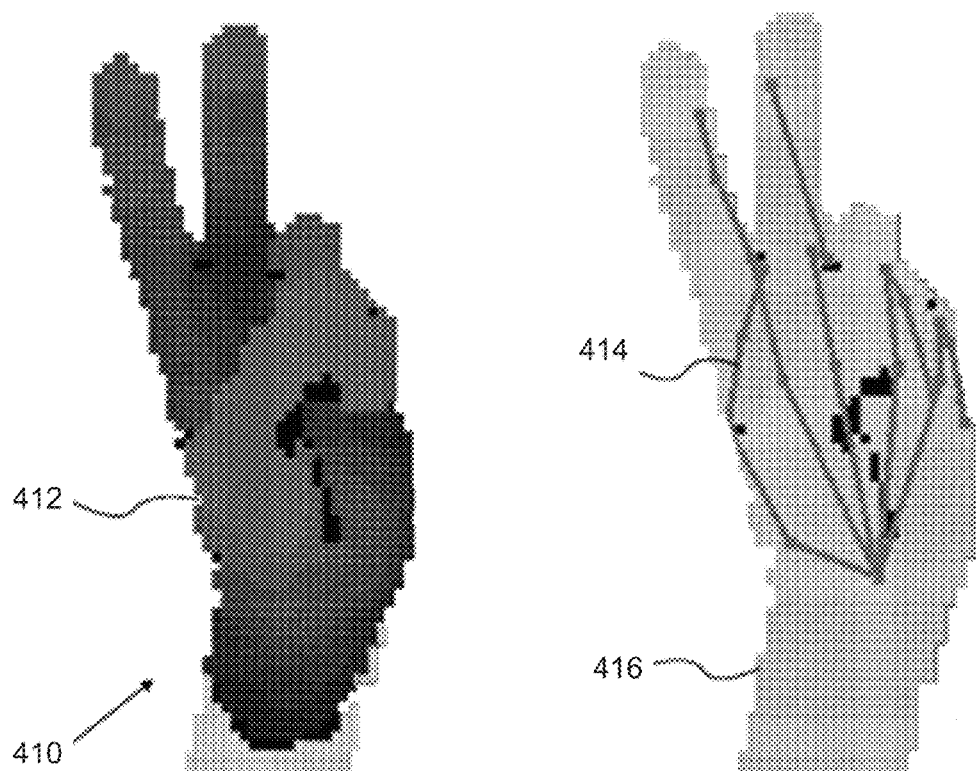

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semicustom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
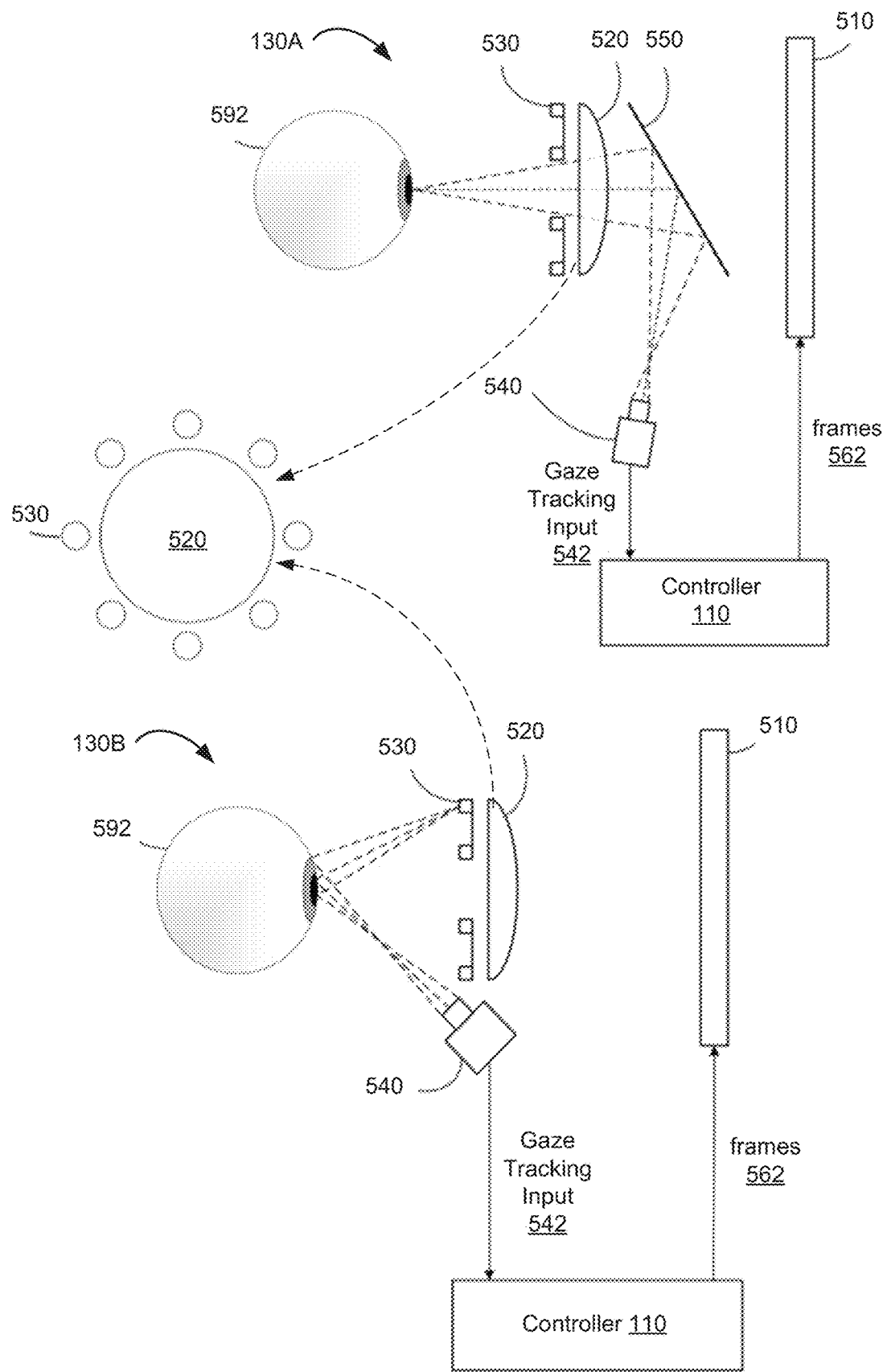
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
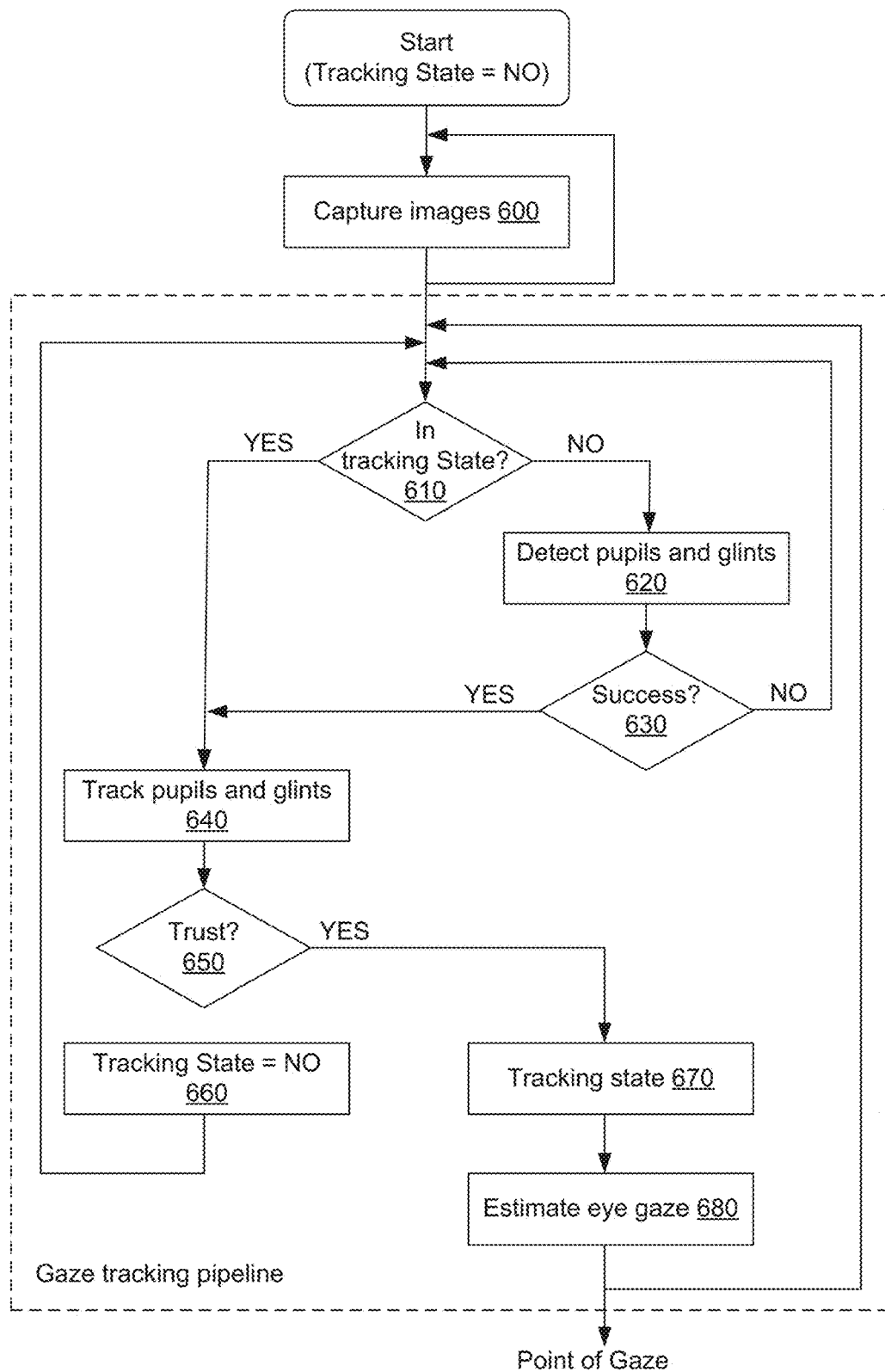
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

Thus, the description herein describes some embodiments of three-dimensional environments (e.g., CGR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an electronic device, or passively via a transparent or translucent display of the electronic device). As described previously, the three-dimensional environment is optionally a mixed reality system in which the three-dimensional environment is based on the physical environment that is captured by one or more sensors of the device and displayed via a display generation component. As a mixed reality system, the device is optionally able to selectively display portions and/or objects of the physical environment such that the respective portions and/or objects of the physical environment appear as if they exist in the three-dimensional environment displayed by the electronic device. Similarly, the device is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the device optionally displays a vase such that it appears as if a real vase is placed on top of a table in the physical environment. In some embodiments, each location in the three-dimensional environment has a corresponding location in the physical environment. Thus, when the device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as though the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as though they were objects in the three-dimensional environment that are able to interact with the virtual objects in the three-dimensional environment as though they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to and/or where and at what a physical stylus held by a user is pointed. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object. Similarly, the device is optionally able to determine, based on the orientation of a physical stylus, to where in the physical world the stylus is pointing. In some embodiments, based on this determination, the device determines the corresponding virtual position in the three-dimensional environment that corresponds to the location in the physical world to which the stylus is pointing, and optionally determines that the stylus is pointing at the corresponding virtual position in the three-dimensional environment.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

Figure 7A:
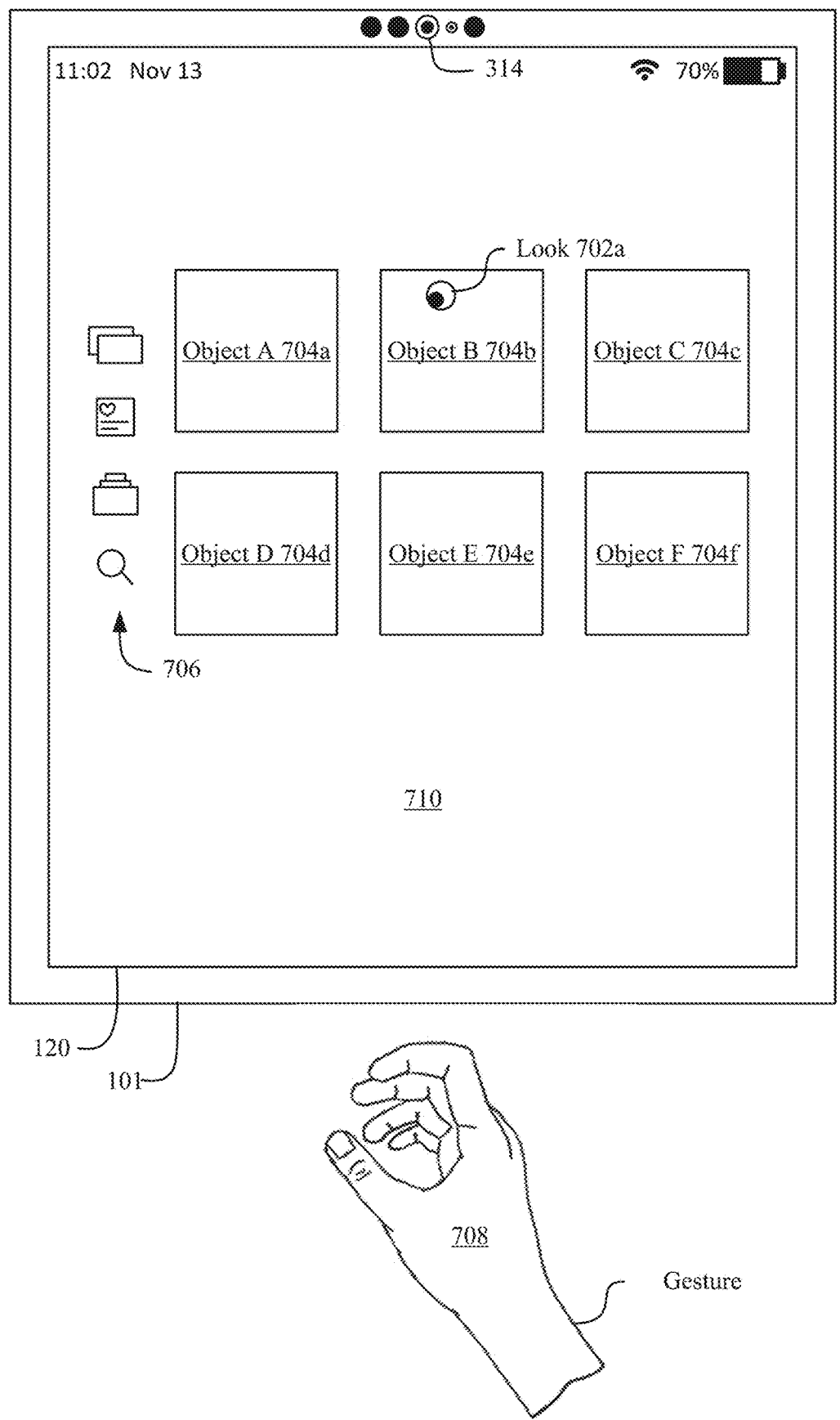
FIGS. 7A-7C illustrate examples of how an electronic device navigates between user interfaces based at least on detecting a gaze of the user in accordance with some embodiments.
Figure 7B:
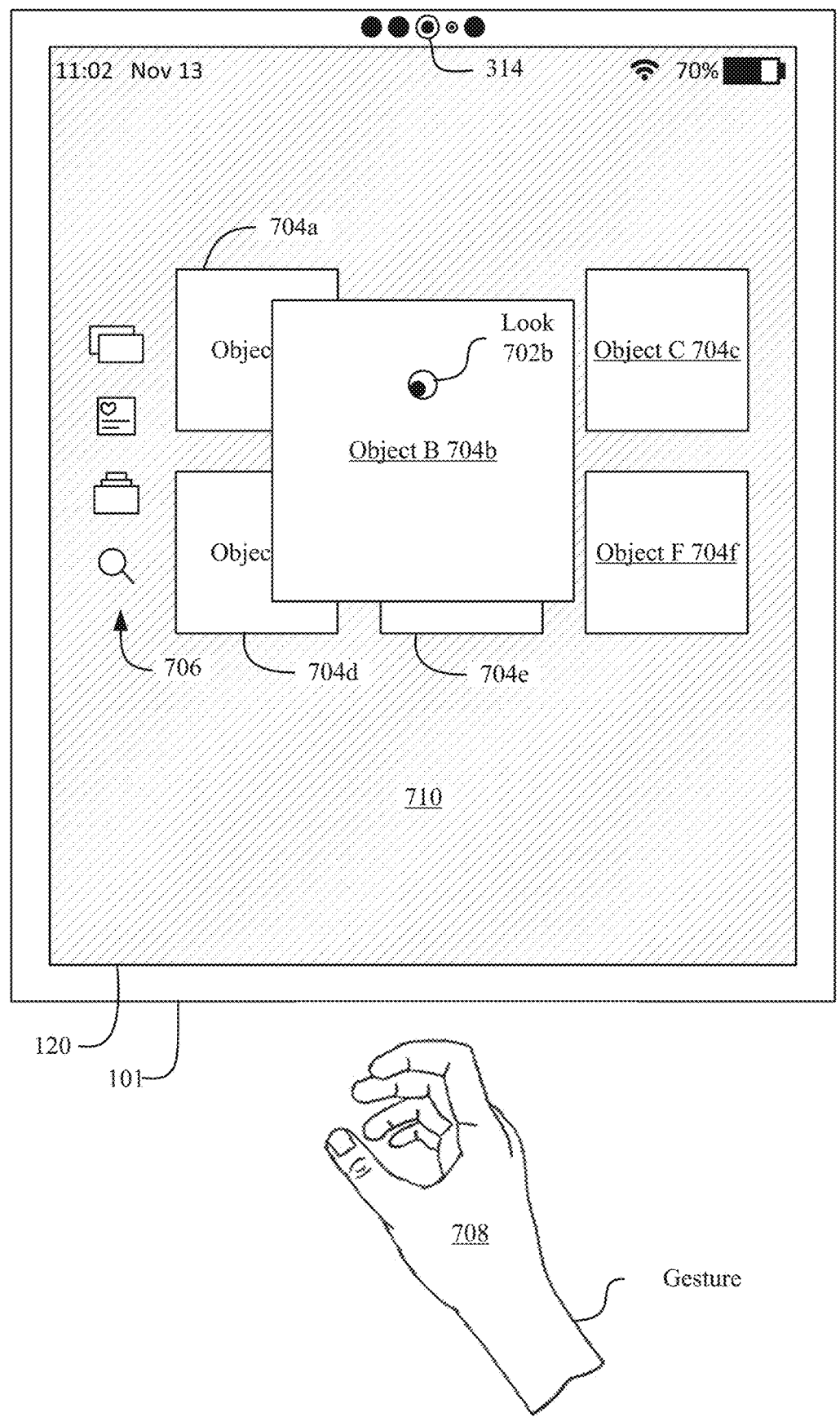
Figure 7C:
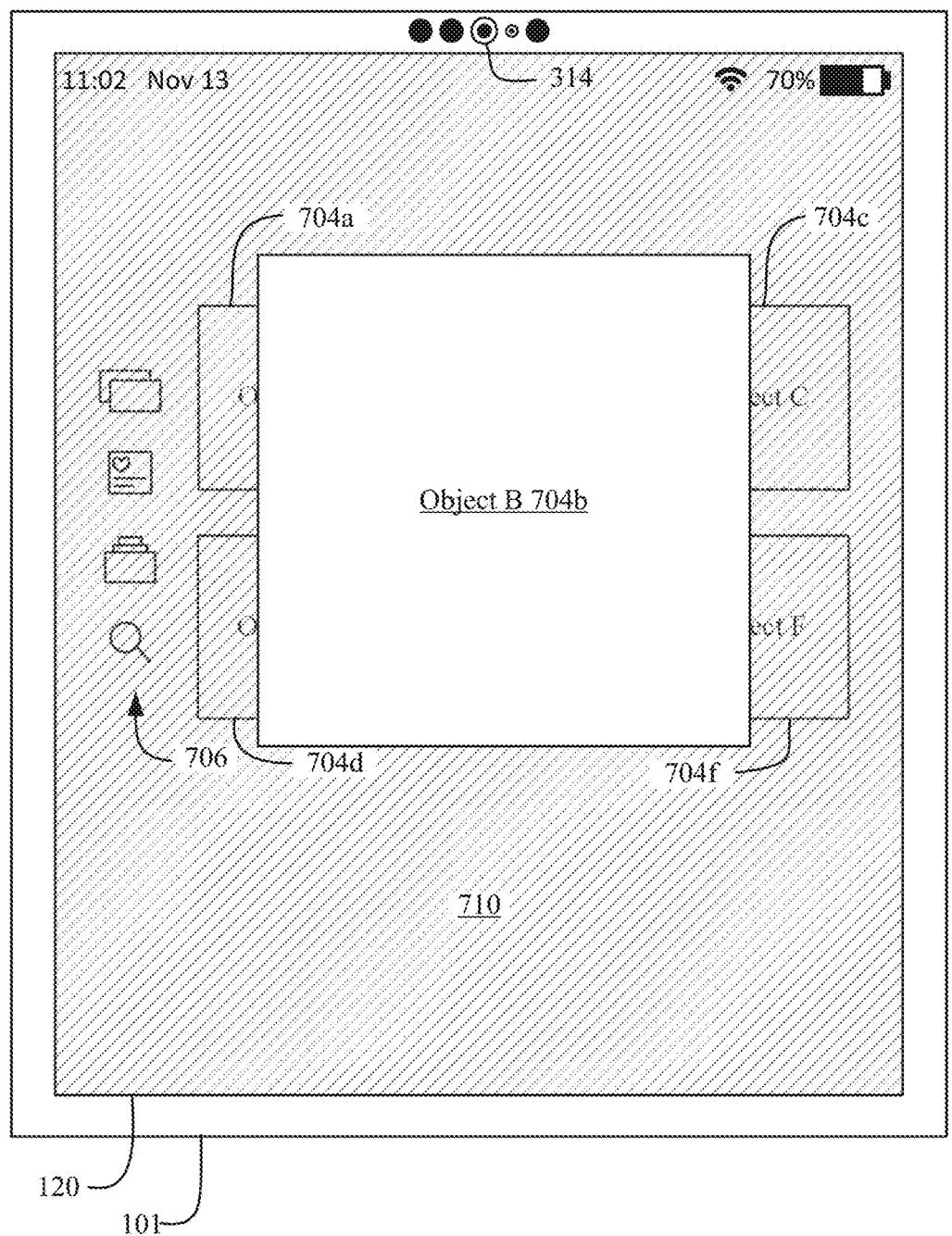
Figure 8A:
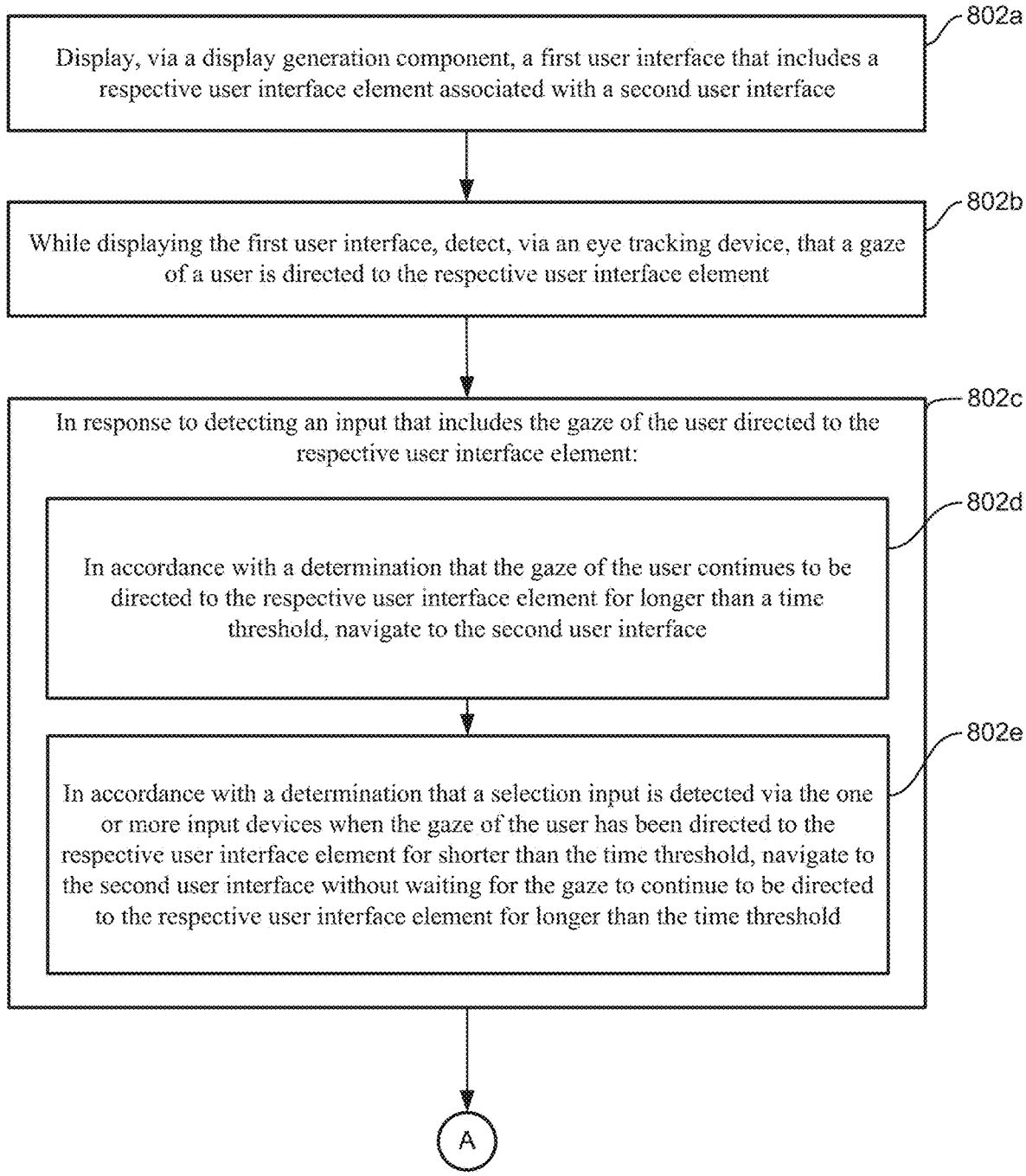
FIGS. 8A-8F is a flowchart illustrating a method of navigating between user interfaces based at least on detecting a gaze of the user in accordance with some embodiments.
Figure 8B:
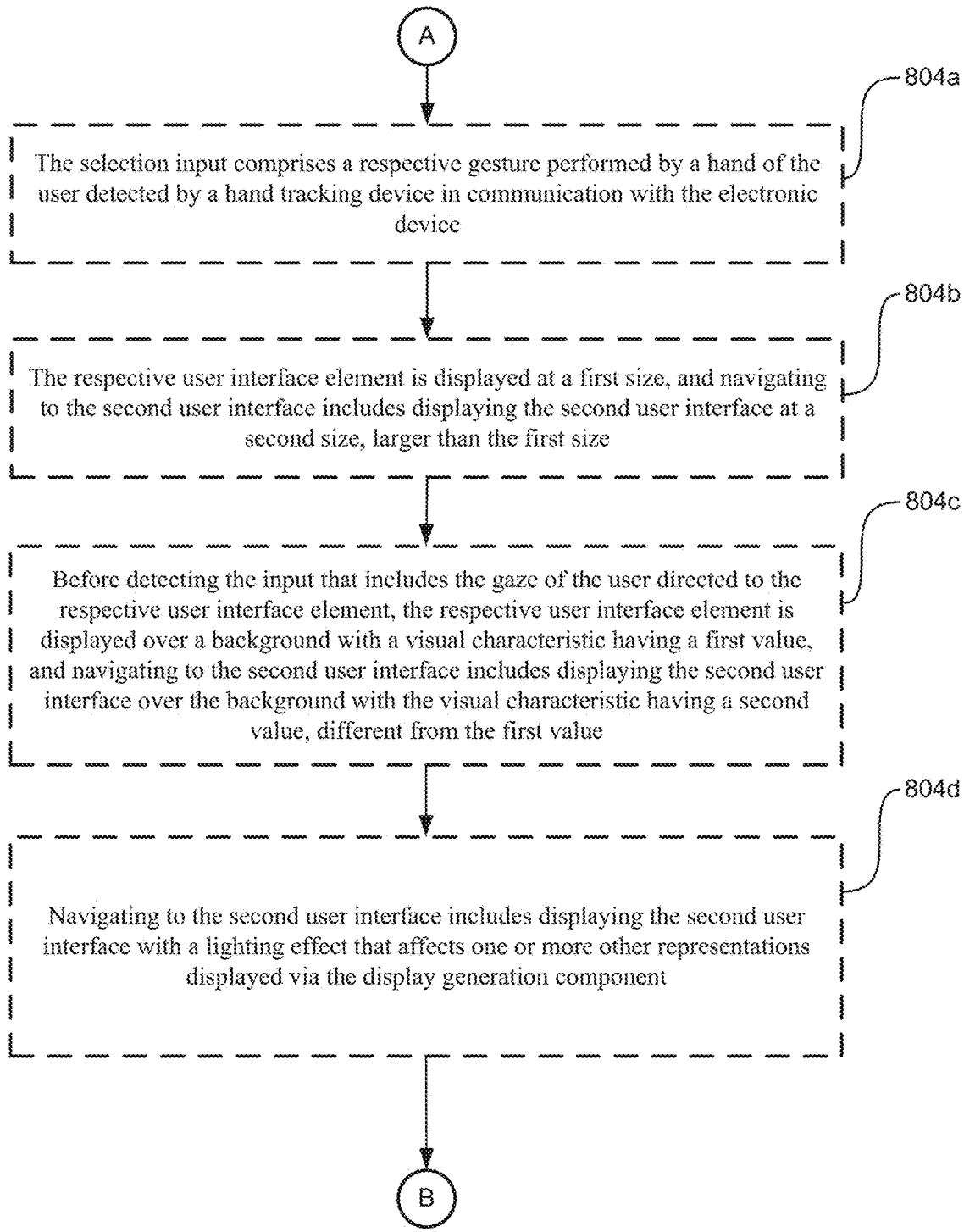
Figure 8C:
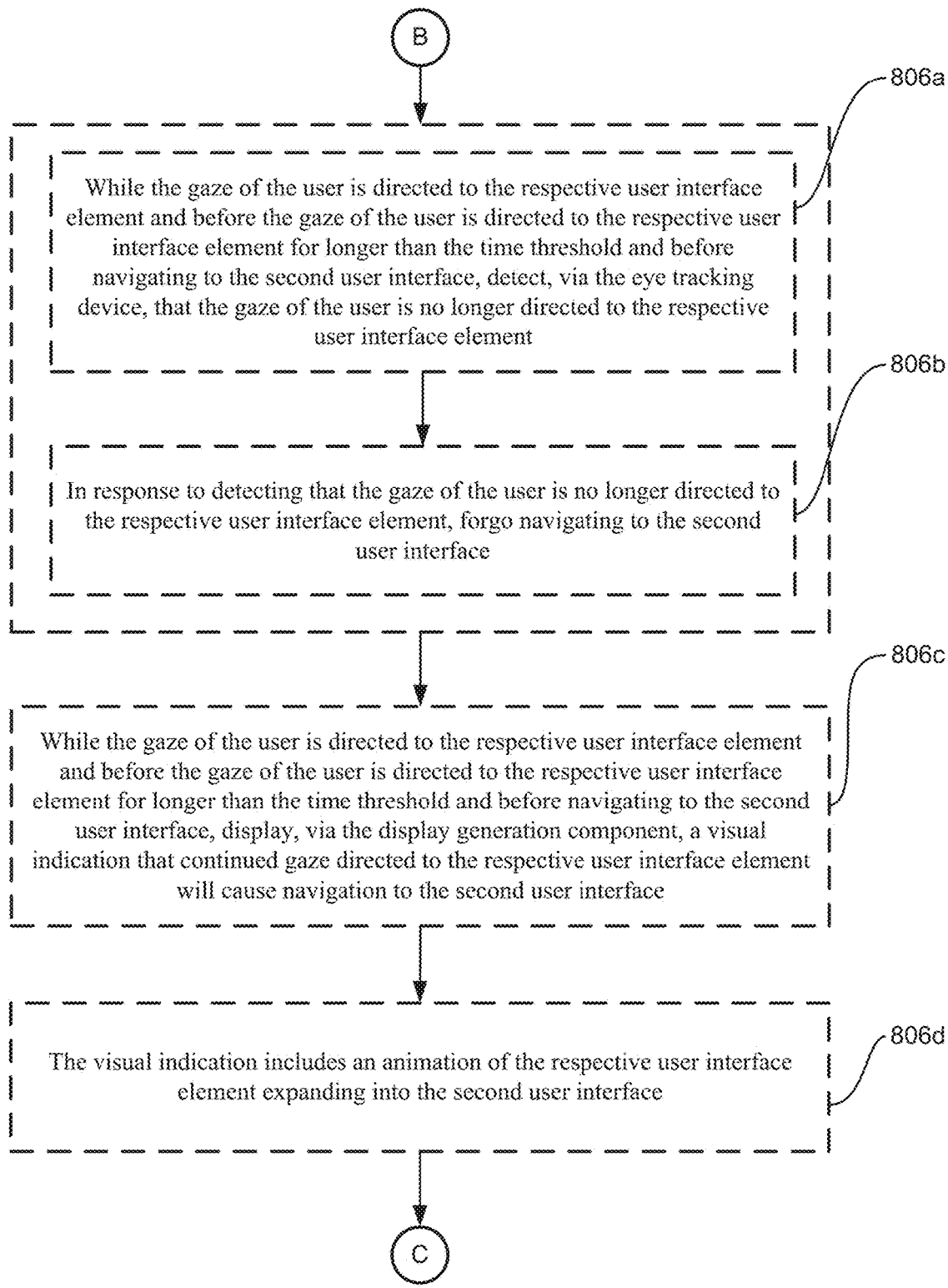
Figure 8D:
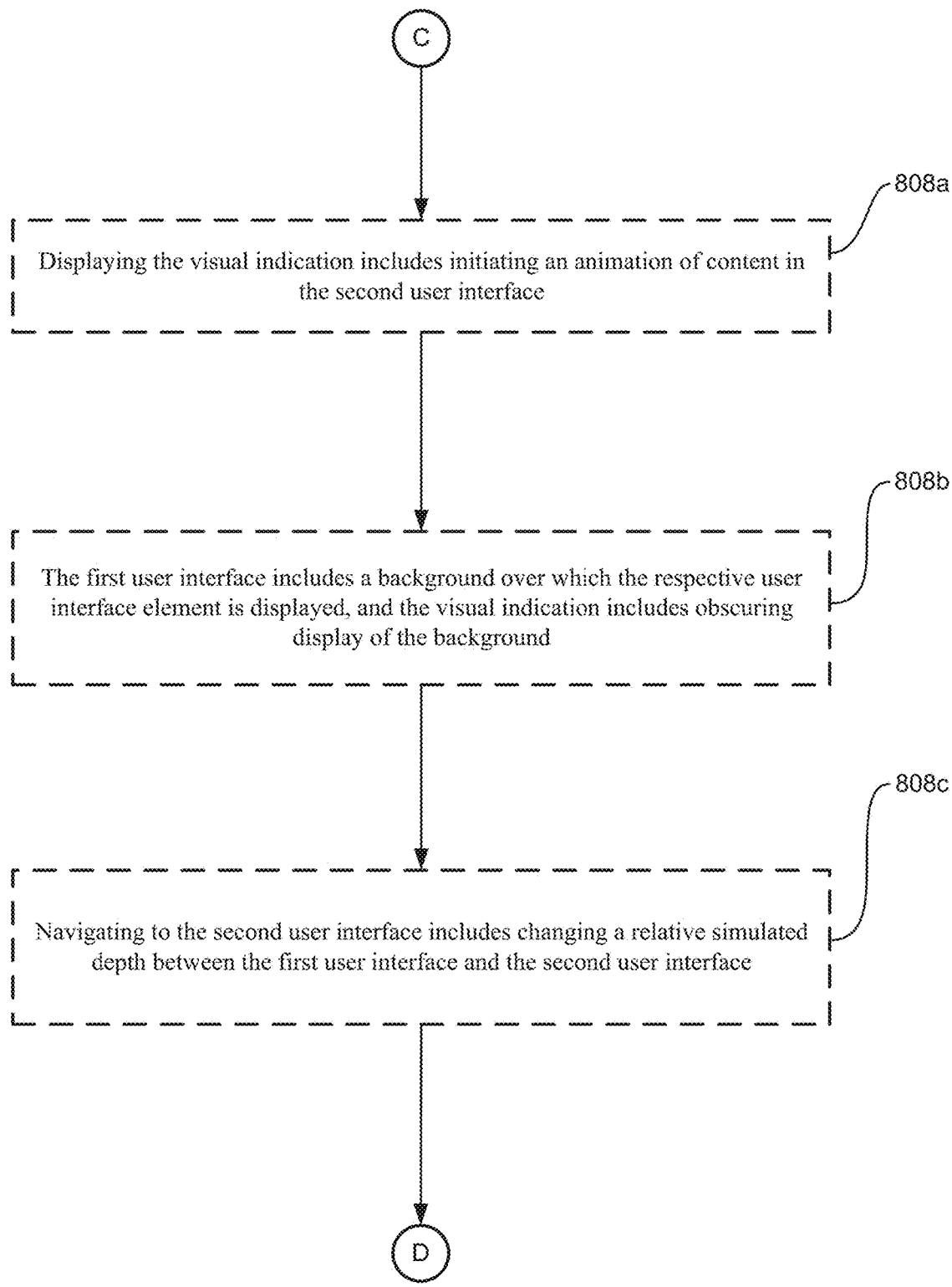
Figure 8E:
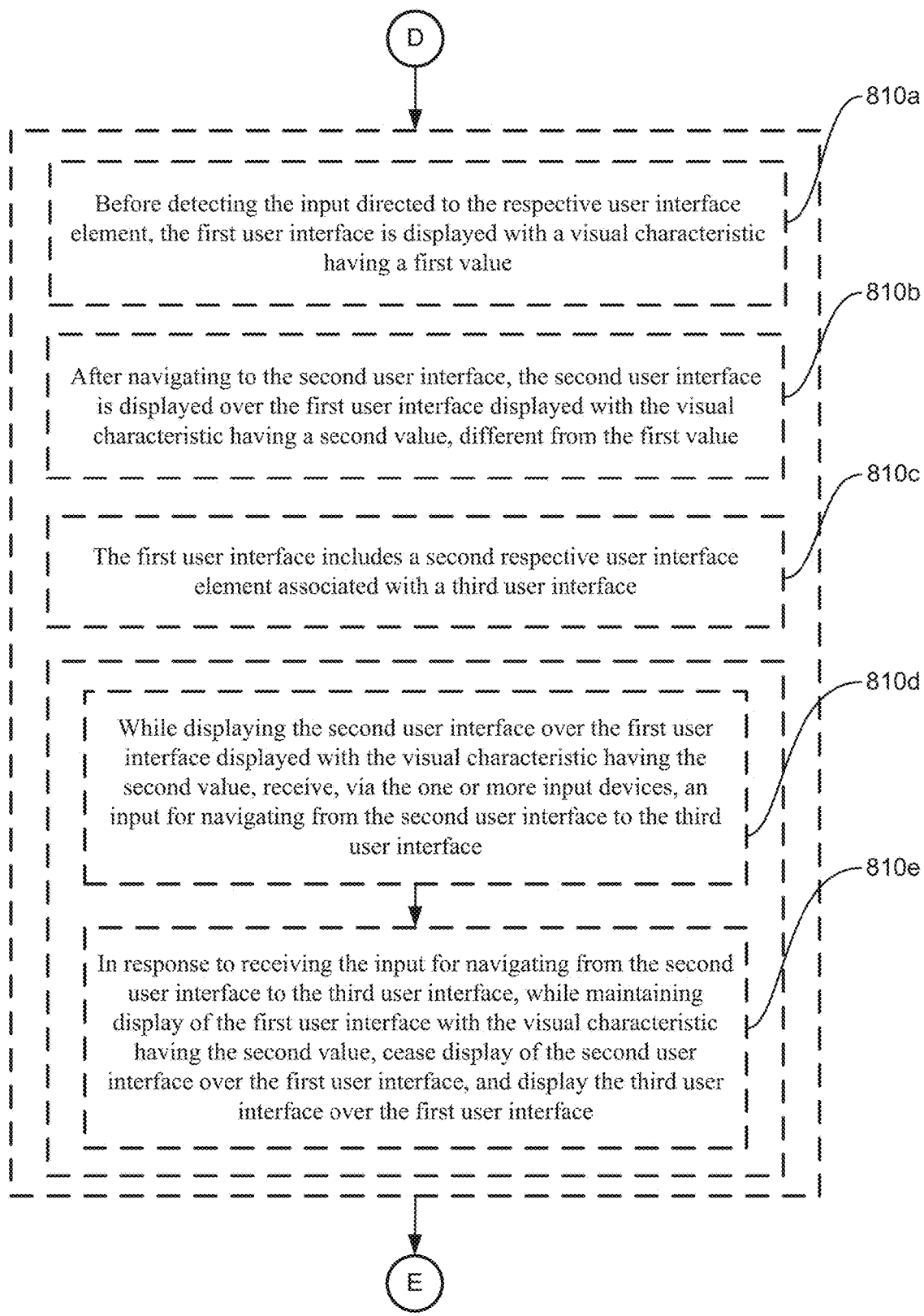
Figure 8F:
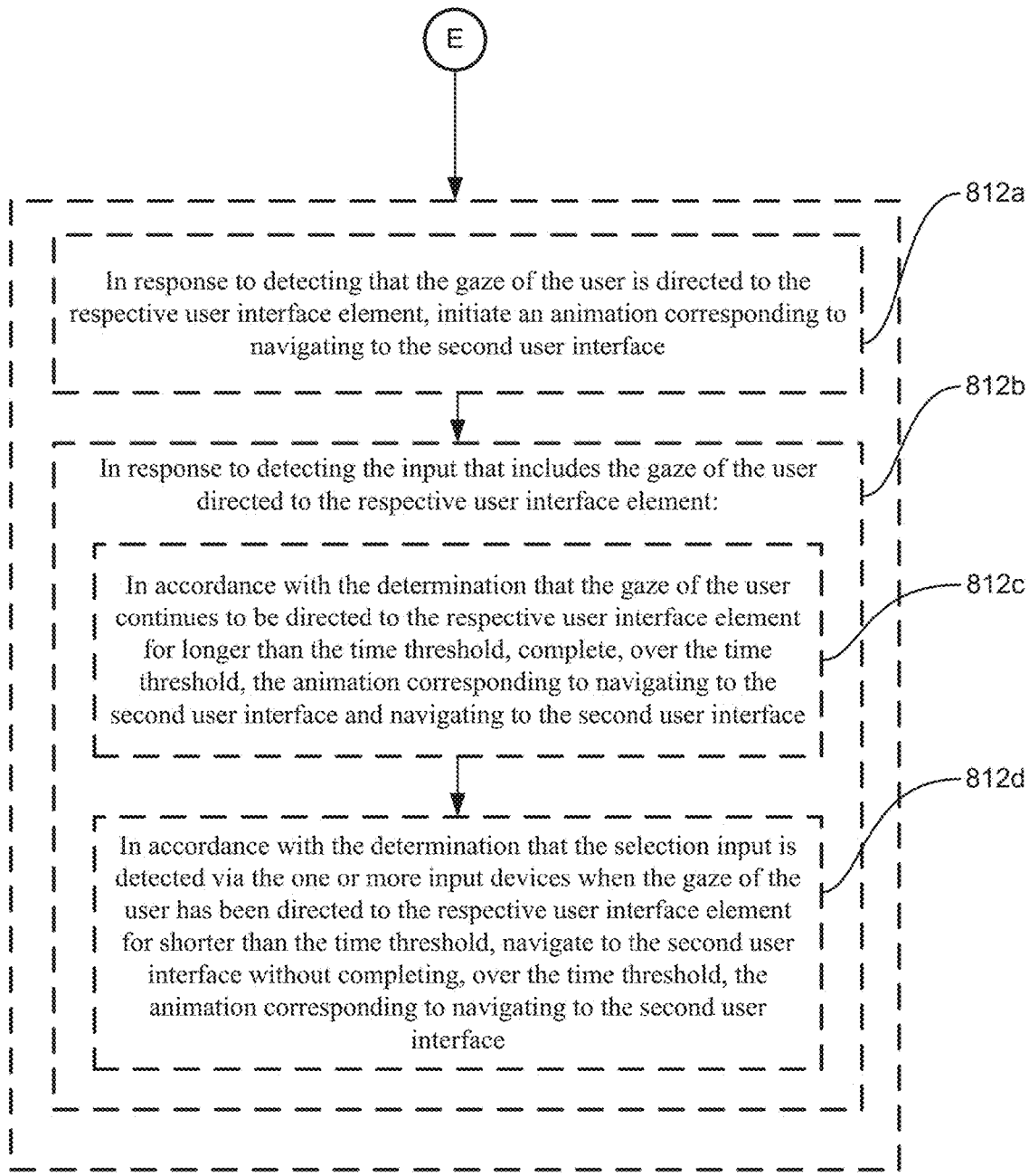

FIGS. 7A-7C illustrate examples of how an electronic device navigates between user interfaces based at least on detecting a gaze of the user in accordance with some embodiments.

FIG. 7A illustrates an electronic device 101 displaying, via a display generation component 120, a three-dimensional environment 710 on a user interface. It should be appreciated, however, that implementing one or more of the techniques disclosed herein with reference to FIGS. 7A-7C in a user interface other than a three-dimensional environment is possible and does not depart from the scope of the disclosure. As described above with reference to FIGS. 1-6, the electronic device 101 optionally includes a display generation component 120 (e.g., a touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

In FIG. 7A, electronic device 101 displays a user interface in three-dimensional environment 710 that includes a plurality of objects 704a-704f and a navigation bar 706. In some embodiments, navigation bar 706 behaves similarly to the control elements described below with reference to FIGS. 9A-10K.

In some embodiments, the user interface illustrated in FIG. 7A is a user interface for browsing content and objects 704a-704f are representations of items of content that, when selected, cause the electronic device 101 to present a respective item of content in three-dimensional environment 710. For example, the user interface is a photo browsing application and representations 704a-704f are thumbnails of photos that, when selected, cause the electronic device 101 to present a larger version of the selected thumbnail in the three-dimensional environment 710. As another example, the user interface is a video content application and representations 704a-704f are thumbnails of video content that, when selected, cause the electronic device 101 to present video content corresponding to the selected object. In some embodiments, the user interface is any user interface that includes objects 704a-f that, when selected, causes the electronic device 101 to display a different user interface.

In some embodiments, the electronic device 101 transitions from the user interface illustrated in FIG. 7A to a user interface associated with a selected one of objects 704a-704f (e.g., a user interface including an item of content associated with the selected object) in response to a user input that includes detecting the gaze of the user. In some embodiments, the input includes gaze only. In some embodiments, the input includes detecting the user perform a gesture with their hand 708 while detecting the gaze of the user.

For example, as shown in FIG. 7A, the electronic device 101 detects the gaze 702a of the user directed towards object B 704b. In response to detecting the gaze 702a of the user without detecting an additional input, such as the gesture being performed with the hand 708 of the user, the electronic device 101 presents an animation to transition to a user interface corresponding to object B 704b. In some embodiments, the animation includes displaying an animation of object B 704b gradually expanding as the user's gaze 702a remains directed towards object B 704b. The animation optionally progresses for a threshold amount of time (e.g., 0.5, 1, etc. seconds) while gaze 702a remains directed towards object B 704b until object B 704b finishes expanding into the user interface corresponding to object B 704B, such as an item of content corresponding to object B 704b (e.g., a larger version of object B 704b). FIG. 7B illustrates an intermediate frame of the animation of the animated transition from the user interface illustrated in FIG. 7A to the user interface illustrated in FIG. 7C (e.g., the user interface associated with object B 704b).

As shown in FIG. 7B, while the animation is progressing, the electronic device 101 displays Object B 704b at a larger size than the size at which object B 704b had been displayed in FIG. 7A. In some embodiments, the electronic device 101 continues to gradually increase the size of object B 704b as the animation progresses in response to continuing to detect the gaze 702b of the user on object B 704b. In some embodiments, gradually increasing the size of object B 704b includes scaling up image(s) included in object B 704b. For example, if object B 704b is an image, the electronic device 101 increases the size of the image on display generation component 120. As another example, if object B 704b is an image of the user interface illustrated in FIG. 7C, the electronic device 101 scales up the image of the user interface to the full size of the user interface illustrated in FIG. 7C. For example, if the user interface in FIG. 7C were to include multiple user interface elements, the size and separation of the user interface elements increases as the electronic device 101 displays the animation.

In some embodiments, the animation includes modifying portions of the three-dimensional environment 710 other than objects 704a-f and navigation bar 706. For example, FIG. 7B also shows the electronic device 101 darkening portions of the three-dimensional environment 710 that do not correspond to object B 704b as the animation progresses (e.g., darkening the background of the user interface). In some embodiments, the electronic device also blurs and/or darkens objects 704a and 704c-f and navigation bar 706. In some embodiments, the electronic device 101 continues to gradually darken portions of the three-dimensional environment 710 that do not correspond to object B 704b as the animation progresses in response to continuing to detect the gaze 702b of the user on object B 704b. In some embodiments, the animation illustrated in FIG. 7B includes further modifying portions of the three-dimensional environment 710 not corresponding to object B 704b. In some embodiments, the electronic device 101 blurs portions of the three-dimensional environment 710 not included in object B 704b. For example, if an additional virtual object were displayed in the three-dimensional environment 710 illustrated in FIGS. 7A-7B, the object would gradually blur as the animation progresses. In some embodiments, the animation further includes gradually displaying an atmospheric lighting effect in the three-dimensional environment 710. In some embodiments, atmospheric lighting effects include modifying the brightness, color balance, contrast, etc. of the virtual objects in the three-dimensional environment 710 to create a virtual lighting effect. In some embodiments, the lighting effect in FIG. 7A is a bright, neutral colored lighting effect and, as the animation progresses, the lighting effect transitions to a spotlight lighting effect that includes darkening portions of the user interface other than object B 714B.

In some embodiments, while the animation illustrated in FIG. 7B progresses, the electronic device 101 initiates playback of video content associated with object B 704*b*. For example, if object B 704*b* is a representation of video content, the video content begins to play when the animation begins (e.g., instead of waiting until display of the user interface in FIG. 7C to play the video content). In some embodiments, object B 704*b* is a representation of an image that is included in a video sequence and the video sequence begins to play when the animation begins (e.g., instead of waiting until display of the user interface illustrated in FIG. 7C).

In some embodiments, displaying the animation illustrated in FIG. 7B includes increasing the distance and/or separation between object B 704*b* and the rest of the user interface (e.g., navigation bar 706 and objects 704*a* and 704*c-f*). For example, the animation includes animating object B 704*b* moving closer to the viewpoint of the user in the three-dimensional environment 710. As another example, the animation includes the rest of the user interface (e.g., navigation bar 706 and objects 704*a* and 704*c-f*) moving away from the viewpoint of the user in the three-dimensional environment 710. In some embodiments, the viewpoint of the user in the three-dimensional environment is a location and orientation associated with the user of electronic device 101 in the three-dimensional environment 710. The electronic device 101 optionally displays the three-dimensional environment 710 from of the viewpoint of the user.

In some embodiments, while the animation is being presented and before the animation is complete, in response to detecting the gaze 702*b* of the user move away from object B 704*b* (e.g., directed to a portion of the three-dimensional environment 710 outside of object B 704*b*), the electronic device 101 ceases displaying the animation and displays the user interface illustrated in FIG. 7A. In some embodiments, the electronic device 101 displays the animation illustrated in FIG. 7B in reverse to return to the user interface illustrated in FIG. 7A. In some embodiments, in response to continuing to detect the gaze 702*b* of the user directed to object B 714B, the electronic device 101 continues to progress the animation until completing the animation (e.g., at the threshold amount of time (e.g., 0.5, 1, 5, 10, etc. seconds)) and displaying the user interface illustrated in FIG. 7C.

Thus, as described above with reference to FIGS. 7A-7B, the electronic device 101 displays a user interface corresponding to object B 714B illustrated in FIG. 7C in response to detecting the user's gaze 702*a*-702*b* directed to object B 714B for a threshold amount of time (e.g., 0.5, 1, 5, 10, etc. seconds). In some embodiments, the electronic device 101 displays an animation of the transition between the user interface illustrated in FIG. 7A and the user interface illustrated in FIG. 7C for the duration of the threshold period of time while the gaze is being detected.

In some embodiments, the electronic device 101 navigates to the user interface illustrated in FIG. 7C in less than the threshold amount of time in response to detecting the user performing a predetermined gesture with their hand 708 (e.g., using one or more cameras or sensors of device 101) while the gaze of the user is directed to Object B 704*b*. In some embodiments, the predetermined gesture includes the user touching a thumb to another finger (e.g., index, middle, ring, little finger) on the same hand as the thumb. Returning to FIG. 7A, in response to detecting the gaze 702*a* of the user on object B 704*b* while detecting the user performing the gesture with their hand 708, the electronic device 101 transitions to FIG. 7C without displaying the entire animation over the course of the predetermined time threshold. In some embodiments, the electronic device 101 displays the animation at a faster rate in less time or forgoes displaying the animation.

In some embodiments, the electronic device 101 begins displaying the animation before the gesture is detected. FIG. 7B illustrates the electronic device 101 detecting the user performing the gesture with their hand 708 while the animation is being displayed. In response to detecting the user performing the gesture with their hand 708 while the gaze 702*b* of the user is directed to object B 704*b* in FIG. 7B, the electronic device 101 transitions to the user interface illustrated in FIG. 7C in less than the threshold amount of time (e.g., the time it takes to display the animation of the gesture is not detected). In some embodiments, the electronic device 101 either increases the speed of the animation in response to the gesture or ceases displaying the animation to display the user interface illustrated in FIG. 7C in response to the gesture.

FIG. 7C illustrates the user interface associated with object B 704*b*. As described above with reference to FIGS. 7A-7B, the electronic device 101 displays the user interface illustrated in FIG. 7C in response to detecting the gaze of the user on object B 704*b* with or without detecting the user performing the predetermined gesture with their hand. As shown in FIG. 7C, the user interface includes a scaled-up version of object B 704*b*. In some embodiments, object B 704*b* is an image (e.g., a photo). In some embodiments, object B 704*b* includes video content and the electronic device 101 plays the video content in response to the inputs detected in FIG. 7A without detecting an additional input from the user while displaying the user interface illustrated in FIG. 7C. In some embodiments, the electronic device 101 begins playing the video content while displaying the animation illustrated in FIG. 7B. In some embodiments, object B 704*b* is a user interface that includes a plurality of user interface elements that are displayed at a larger size and with increased separation in FIG. 7C than in FIGS. 7A and 7B.

As shown in FIG. 7C, displaying the user interface includes modifying display of the other objects in the three-dimensional environment 710, including objects 704*a*, 704*c*, 704*d*, 704*f* and navigation bar 706. In some embodiments, the electronic device 101 blurs objects 704*a*, 704*c*, 704*d*, 704*f* and navigation bar 706 and any other content displayed in three-dimensional environment 710 other than object B 704*b*. In some embodiments, the user interface illustrated in FIG. 7C includes atmospheric lighting effects, such as a spotlight on object B 704*b*. In some embodiments, the atmospheric lighting effect includes displaying the three-dimensional environment 710 to appear as though object B 704*b* is emitting light that reflects off of the blurred and/or darkened versions of the other objects in the three-dimensional environment 710. In some embodiments, the amount of separation between object B 704*b* and objects 704*a*, 704*c*, 704*d*, and 704*f* and navigation bar 706 is greater in FIG. 7C than in FIGS. 7A and 7B. For example, the electronic device 101 moves object B 704*b* towards the viewpoint of the user in three-dimensional environment 710 or moves objects 704*a*, 704*c*, 704*d*, and 704*f* and navigation bar 706 away from the user in three-dimensional environment 710.

In some embodiments, the electronic device 101 navigates from the user interface illustrated in FIG. 7C to a user interface associated with a different one of objects 704*a* or 704*c-f*. For example, objects 704*a-f* are images or photos and the electronic device 101 transitions from displaying the photo represented in FIG. 7C by object B 704*b* to displaying another photo in a similar manner. In some embodiments, the electronic device 101 transitions to displaying a user interface associated with a different one of objects 704*a* or 704*c-f* in response to detecting the user performing the predetermined gesture described above and moving their hand to the left or right while maintaining that hand gesture and/or looking at object B 704*b*. For example, the electronic device 101 transitions to displaying a photo represented by object A 704*a* without displaying the user interface illustrated in FIG. 7A in response to detecting the input including hand movement in a first direction (e.g., to the right) or transitions to displaying a photo represented by object C 704*c* without displaying the user interface illustrated in FIG. 7A in response to detecting the input including hand movement in a second direction (e.g., to the left). In some embodiments, while transitioning between the user interfaces corresponding to objects 704*a-f*, the electronic device 101 maintains the visual effects of the rest of the three-dimensional environment 710 (e.g., blurring, darkening, increased separation, atmospheric lighting). In some embodiments, the electronic device 101 transitions from displaying the user interface illustrated in FIG. 7C to the user interface illustrated in FIG. 7A in response to detecting the gaze of the user on a region of the user interface other than object B 704*b* for a predetermined time threshold (e.g., 0.2, 0.5, 1, 2, etc. seconds) and/or while detecting the user performing a predetermined gesture (e.g., the pinch gesture) with their hand.

Thus, FIGS. 7A-7C illustrate ways an electronic device navigates between user interfaces based at least on detecting a gaze of the user. In response to detecting an input that includes gaze only, the electronic device 101 displays an animated transition between user interfaces for a predetermined duration of time. In response to detecting an input in addition to gaze (e.g., a hand gesture), the electronic device 101 transitions between user interfaces faster than the predetermined duration of time, such as by either skipping the animation or displaying the animation at a faster speed. Although FIGS. 7A-7C illustrate the electronic device 101 displaying a user interface corresponding to object B 704*b*, it should be appreciated that the electronic device 101 behaves similarly if input were directed to one of the other objects 704*a* or 704*b-f* instead.

FIGS. 8A-8F is a flowchart illustrating a method of navigating between user interfaces based at least on detecting a gaze of the user in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, such as in FIG. 7A, method 800 is performed at an electronic device in communication with a display generation component and one or more input devices including an eye tracking device (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc.

In some embodiments, such as in FIG. 7A, the electronic device (e.g., 101) displays (802*a*), via the display generation component, a first user interface that includes a respective user interface element (e.g., 704*b*) associated with a second user interface. In some embodiments, the first user interface is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc. In some embodiments, in response to detecting selection of the respective user interface element, the electronic device presents the second user interface. For example, the first user interface is a photo browsing user interface including a plurality of thumbnails of photos that, when selected, cause the electronic device to display a user interface with a larger version of the photo that corresponds to the selected thumbnail.

In some embodiments, such as in FIG. 7A, while displaying the first user interface, the electronic device (e.g., 101) detects (802*b*), via the eye tracking device, that a gaze (e.g., 702*a*) of a user is directed to the respective user interface element (e.g., 704*b*).

In some embodiments, in response to detecting an input that includes the gaze (e.g., 702*b*) of the user directed to the respective user interface element (e.g., 704*b*) (802*c*), such as in FIG. 7B, in accordance with a determination that the gaze (e.g., 702*b*) of the user continues to be directed to the respective user interface element (e.g., 704*b*) for longer than a time threshold (e.g., 0.1, 0.2, 0.3, 0.4, 0.5, 0.75, 0.1 second; 0.5, 1, 2, 3 seconds, etc.), the electronic device (e.g., 101) navigates (802*d*) to the second user interface (e.g., 704*b*), such as in FIG. 7C. In some embodiments, the electronic device displays an animation of navigating to the second user interface while the gaze of the user continues to be directed to the respective user interface element for the time threshold. In some embodiments, the animation has a duration equal to the time threshold. In some embodiments, displaying the second user interface includes ceasing to display the first user interface. In some embodiments, the electronic device displays the second user interface overlaid on the first user interface (e.g., the first user interface is displayed as a background behind the second user interface)

and continues to display at least a portion of the first user interface that that is not overlaid by the second user interface does not overlap. For example, in response to detecting, via the eye tracking device, that the gaze of the user is directed to a thumbnail in a photos user interface for the predetermined time threshold, the electronic device displays a larger version of the photo corresponding to the thumbnail in place of or overlaid on the photos user interface with the plurality of thumbnails.

In some embodiments, in response to detecting an input that includes the gaze (e.g., 702*b*) of the user directed to the respective user interface element (e.g., 704*b*) (802*c*), such as in FIG. 7B, in accordance with a determination that a selection input is detected via the one or more input devices when the gaze of the user has been directed to the respective user interface element for shorter than the time threshold, the electronic device (e.g., 101) navigates (802*e*) to the second user interface (e.g., 704*b*) without waiting for the gaze to continue to be directed to the respective user interface element for longer than the time threshold, such as in FIG. 7C. In some embodiments, detecting the selection input includes detecting, via a hand tracking device, performance of a predetermined gesture (e.g., tapping a finger (e.g., index finger, middle finger, ring finger, little finger) to the thumb; extending one finger towards a location corresponding to the location of the respective user interface element). In some embodiments, detecting the selection input includes detecting an input via a touch-sensitive surface (e.g., touch screen, trackpad, etc.), keyboard, or mouse. In some embodiments, the electronic device navigates to the second user interface in response to detecting the selection input while detecting the gaze of the user on the respective user interface element for a time threshold (e.g., 0.1, 0.2, 0.3, 0.4, 0.5, 0.75 seconds, etc.) that is less than the time threshold at which the electronic device navigates to the second user interface without detecting the selection input (e.g., only based on gaze). In some embodiments, the electronic device navigates to the second user interface in response to detecting the gaze of the user directed to the respective user interface element concurrently with detecting the selection input irrespective of the period of time for which the user's gaze is directed to the respective user interface element. For example, in response to detecting, via the hand tracking device, that the user taps their thumb and index finger together while detecting, via the eye tracking device, that the user's gaze is directed to a thumbnail in a photos user interface including a plurality of photos, the electronic device displays a larger version of the photo corresponding to the thumbnail in place of or overlaid on the photos user interface with the plurality of thumbnails. In some embodiments, in response to detecting the gaze of the user on the respective user interface element for the threshold period of time or in response to simultaneously detecting the gaze of the user on the respective user interface for less than the threshold time and selection of the respective user interface element, the electronic device navigates to the second user interface associated with the respective user interface element. In some embodiments, in accordance with a determination that the user's gaze moves away from the respective user interface element before the time threshold has passed without detecting the selection input, the electronic device forgoes navigating to the second user interface and continues to display the first user interface.

The above-described manner of navigating to the second user interface in response to either detecting the gaze of the user directed to the respective user interface element for the threshold period of time or detecting selection of the respective user interface element while detecting the gaze of the user directed to the respective user interface element for a period of time less than the threshold period of time provides an efficient way of navigating to the second user interface either in less time or with fewer inputs, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 7B, the selection input comprises a respective gesture performed by a hand (e.g., 708) of the user detected by a hand tracking device in communication with the electronic device (804*a*). In some embodiments, the hand tracking device includes one or more cameras, depth sensors, proximity sensors, and/or touch sensors (e.g., incorporated into a touch screen). Detecting the gesture optionally includes detecting the user touching their thumb to one of the other fingers (e.g., index finger, middle finger, ring finger, little finger) on the same hand as the thumb.

The above-described manner of detecting a hand gesture as the selection input provides an efficient mechanism by which the user is able to make selections in the user interface, which additionally reduces power usage and improves battery life of the electronic device by enabling the user to use the electronic device more quickly and efficiently (e.g., reducing time needed to use tactile input devices, such as buttons, keys, etc.), while reducing errors in usage.

In some embodiments, such as in FIG. 7A, the respective user interface element (e.g., 704*b*) is displayed at a first size, and navigating to the second user interface (e.g., 704*b*) includes displaying the second user interface at a second size, larger than the first size (804*b*), such as in FIG. 7C. In some embodiments, the second user interface includes the content of the respective user interface element at a size larger than the size of the respective user interface element. For example, the respective user interface element is a thumbnail of an image and the second user interface is or includes a version of the image that is larger than the thumbnail. In some embodiments, the respective user interface element is a cropped version of the second user interface. In some embodiments, the respective user interface element is a cropped and scaled down version of the second user interface (e.g., the respective user interface element is a portion of an image included in the second user interface and the second user interface includes the portion of the image at a larger size than the size of the respective user interface element). In some embodiments, the second user interface does not include the content of the respective user interface element. For example, the respective user interface element is a representation of a collection of images (e.g., a photo album) and the second user interface includes a plurality of images included in the collection of images. In some embodiments, each image of the plurality of images is larger than the respective representation. In some embodiments, each image of the plurality of images is the same size or smaller than the respective representation.

The above-described manner of displaying the second user interface at a larger size than the respective user interface element provides an efficient way of viewing a larger, optionally more legible, version of the respective user interface element, which additionally reduces power usage and improves battery life of the electronic device by enabling the user to use the electronic device more quickly and efficiently, while reducing errors in usage.

In some embodiments, such as in FIG. 7A, before detecting the input that includes the gaze (e.g., 702a) of the user directed to the respective user interface element (e.g., 704b), the respective user interface element is displayed over a background with a visual characteristic (e.g., color, brightness, contrast, translucency) having a first value, and navigating to the second user interface (e.g., 704b) includes displaying the second user interface (e.g., 704b) over the background with the visual characteristic (e.g., color, brightness, contrast, translucency) having a second value, different from the first value (804c), such as in FIG. 7C. In some embodiments, the background of the second user interface is darker and/or more blurred than the background of the first user interface. In some embodiments, the background is part of the first user interface. In some embodiments, the first user interface is displayed over the background. In some embodiments, the visual characteristic of the first user interface also changes like the visual characteristic of the background.

The above-described manner of updating the visual characteristic of the background when navigating to the second user interface provides a view of the second user interface with reduced visual clutter, which additionally reduces power usage and improves battery life of the electronic device by enabling the user to use the electronic device more quickly and efficiently (e.g., by making it easier for the user to focus on the second user interface and reducing cognitive burden), while reducing errors in usage.

In some embodiments, navigating to the second user interface (e.g., 704b) includes displaying the second user interface (e.g., 704b) with a lighting effect that affects one or more other representations (e.g., 704c-f) displayed via the display generation component (804d), such as in FIG. 7C. In some embodiments, the electronic device displays the first and second user interfaces in a three-dimensional environment that includes objects such as representations of applications, other user interfaces, files, content, virtual objects, and/or real objects (e.g., pass-through video including photorealistic representations of physical objects in the physical environment of the electronic device, displaying the three-dimensional environment in a manner that enables the user to see the real objects through a transparent portion of the display generation component). In some embodiments, the lighting effects modify the colors and/or shadows of the objects in the three-dimensional environment. In some embodiments, the electronic device displays the three-dimensional environment with a different lighting effect while displaying the first user interface than the lighting effect with which the three-dimensional environment is displayed while displaying the second user interface. In some embodiments, the electronic device simulates a "glow" from the second user interface and displays the other objects in the three-dimensional environment with lighting effects that simulate the glow from the second user interface. For example, the electronic device displays portions of the first user interface that are visible from behind the second user interface with reflections of the glow from the second user interface. The above-described manner of displaying the second user interface with the lighting effect provides an efficient way of reducing visual clutter of the one or more other representations while displaying the second user interface, which additionally reduces power usage and improves battery life of the electronic device by enabling the user to use the electronic device more quickly and efficiently (e.g., making it easier for the user to focus on the second user interface and reducing the cognitive burden on the user), while reducing errors in usage.

In some embodiments, while the gaze (e.g., 702b) of the user is directed to the respective user interface element (e.g., 704b) and before the gaze (e.g., 702b) of the user is directed to the respective user interface element (e.g., 704b) for longer than the time threshold and before navigating to the second user interface (e.g., 704b), such as in FIG. 7B, the electronic device (e.g., 101) detects (806a), via the eye tracking device, that the gaze of the user is no longer directed to the respective user interface element (e.g., 704b). In some embodiments, the gaze of the user is directed to the respective user interface for a time period that is less than the time threshold. In some embodiments, the gaze of the user is directed towards a different user interface element, a different user interface or object in a three-dimensional environment displayed by the electronic device, or the gaze of the user is directed away from the display generation component. In some embodiments, the gaze is directed back to the first user interface and/or an element that is displayed in the first user interface (e.g., that is in the process of being overlaid and/or replaced by the second user interface. In some embodiments, in response to detecting that the gaze (e.g., 702a) of the user is no longer directed to the respective user interface element (e.g., 704b), the electronic device (e.g., 101) forgoes (806b) navigating to the second user interface, such as in FIG. 7A. In some embodiments, the electronic device displays an animation of navigating to the second user interface while the gaze of the user is directed to the respective user interface element. In some embodiments, in response to detecting the gaze of the user away from the respective user interface element before the time threshold has been reached, the electronic device ceases displaying the animation and displays the first user interface in the same manner in which the first user interface was displayed prior to initiating display of the animation. In some embodiments, the electronic device transitions from displaying the animation to displaying the first user interface by presenting the animation in reverse (e.g., with the same speed, a greater speed, or a slower speed than the speed with which the animation was presented).

The above-described manner of forgoing navigating to the second user interface in response to detecting the gaze of the user away from the respective user interface element provides an efficient way of reverting display of the first user interface (e.g., if the user changes their mind about navigating to the second user interface) which additionally reduces power usage and improves battery life of the electronic device by enabling the user to use the electronic device more quickly and efficiently (e.g., by reducing the inputs needed to display the first user interface after the process to navigate to the second user interface is initiated but before the process to navigate to the second user interface is completed), while reducing errors in usage.

In some embodiments, such as in FIG. 7B, while the gaze (e.g., 702b) of the user is directed to the respective user interface element (e.g., 704b) and before the gaze (e.g., 702b) of the user is directed to the respective user interface element (e.g., 704b) for longer than the time threshold and before navigating to the second user interface (e.g., 704b), the electronic device (e.g., 101) displays (806c), via the display generation component, a visual indication that continued gaze directed to the respective user interface element (e.g., 704b) will cause navigation to the second user interface. In some embodiments, the respective representation gradually increases in size as the gaze of the user is held on the respective user interface element (e.g., until navigation to the second user interface is completed). In some embodiments, the visual indication is a visual indication that includes content not included in the respective user interface element. For example, the electronic device displays an animation of the respective user interface element growing larger and expanding to become the second user interface and the second user interface includes content not included in the respective user interface element.

The above-described manner of displaying the visual indication that continued gaze directed to the respective user interface element will cause navigation to the second user interface provides an efficient way of indicating to the user how to navigate to the second user interface, which additionally reduces power usage and improves battery life of the electronic device by enabling the user to use the electronic device more quickly and efficiently, while reducing errors in usage.

In some embodiments, such as in FIG. 7B, the visual indication includes an animation of the respective user interface element (e.g., 704*b*) expanding into the second user interface (806*d*). In some embodiments, the respective user interface element increases in size as the gaze of the user is held on the respective user interface element (e.g., until navigation to the second user interface is completed). In some embodiments, the respective user interface element includes representations of user interface elements of the second user interface and the user interface elements increase in size and/or increase in distance from each other as the gaze of the user is held on the respective user interface element. For example, the respective user interface element represents a collection (e.g., album) of images and the second user interface includes a plurality of images included in the collection. In this example, the respective user interface element expands in size and changes into the second user interface in response to the gaze of the user being held on the respective user interface element/the second user interface. In some embodiments, the respective user interface element includes an image that is initially displayed in the second user interface. In some embodiments, the respective user interface element includes one or more images not initially displayed in the second user interface.

The above-described manner of expanding the respective user interface element into the second user interface provides an efficient way of providing a preview of the second user interface while displaying the first user interface, which additionally reduces power usage and improves battery life of the electronic device by enabling the user to use the electronic device more quickly and efficiently (e.g., by enabling the user to determine whether to continue navigating to the second user interface), while reducing errors in usage.

In some embodiments, such as in FIG. 7B, displaying the visual indication includes initiating an animation of content in the second user interface (e.g., 704*b*) (808*a*). In some embodiments, the respective user interface element and/or the second user interface include animated and/or video content. In some embodiments, prior to detecting the user's gaze on the respective user interface element, the electronic device forgoes displaying the animated and/or video content. For example, the electronic device displays a still image from the animation and/or video content in the respective user interface element prior to detecting the user's gaze on the respective user interface element. In some embodiments, in response to detecting the user's gaze on the respective user interface element and while transitioning from displaying the first user interface to displaying the second user interface, the electronic device initiates playback of the animation and/or video content (e.g., in the second user interface and/or in the expanding respective user interface element). In some embodiments, the electronic device presents the animated and/or video content while expanding the respective user interface element into the second user interface.

The above-described manner of initiating the animation of the content in the second user interface as an indication that the electronic device is navigating to the second user interface provides an efficient way of confirming the user's input to navigate to the second user interface without obstructing the second user interface, which additionally reduces power usage and improves battery life of the electronic device by enabling the user to use the electronic device more quickly and efficiently, while reducing errors in usage.

In some embodiments, such as in FIG. 7B, the first user interface includes a background over which the respective user interface element (e.g., 704*b*) is displayed, and the visual indication includes obscuring display of the background (808*b*). In some embodiments, the first user interface is displayed in a three-dimensional environment that includes virtual scenery, other virtual objects, such as representations of applications, items of content, files, and other virtual objects, and real objects, such as photorealistic "pass-through" video of real objects in the physical environment of the electronic device and/or real objects in the physical environment of the electronic device that are visible through a transparent portion of the display generation component. In some embodiments, the second user interface is displayed without displaying the three-dimensional environment or while displaying a modified version of the three-dimensional environment (e.g., a blurred, darkened, translucent, and/or low-contrast version of the three-dimensional environment).

The above-described manner of obscuring the background while displaying the second user interface provides a way of reducing the cognitive burden on the user while viewing the second user interface by obscuring display of the other objects, which additionally reduces power usage and improves battery life of the electronic device by enabling the user to use the electronic device more quickly and efficiently, while reducing errors in usage.

In some embodiments, such as in FIG. 7C, navigating to the second user interface (e.g., 704*b*) includes changing a relative simulated depth between the first user interface (e.g., 704*b*) and the second user interface (808*c*) (e.g., moving the first user interface toward a viewpoint of the user and/or moving the second user interface away from the viewpoint of the user). In some embodiments, the first and second user interfaces are displayed in a three-dimensional environment from the viewpoint of the user in the three-dimensional environment. In some embodiments, the second user interface is displayed at a position closer to the viewpoint of the user in the three-dimensional environment than the position at which the first user interface is displayed. In some embodiments, the first user interface is displayed a first depth relative to the viewpoint of the user in the three-dimensional environment and the second user interface is displayed at a second depth that is closer to the viewpoint of the user in the three-dimensional environment than the first depth. In some embodiments, the second user interface is displayed overlaid on a blurred and/or darkened version of the first user interface. In some embodiments, in response to the input to navigate to the second user interface, the electronic device displays the blurred and/or darkened version of the first user interface at a further depth than the depth at which the first user interface was displayed prior to detecting the input to navigate to the second user interface. In some embodiments, the second user interface is displayed at the depth at which the first user interface was displayed prior to detecting the input to navigate to the second user interface.

The above-described manner of displaying the second user interface at the non-zero depth relative to the first user interface provides an efficient way of reducing the cognitive burden on the user while viewing the second user interface by helping the user focus on the second user interface without focusing on the first user interface, which additionally reduces power usage and improves battery life of the electronic device by enabling the user to use the electronic device more quickly and efficiently, while reducing errors in usage.

In some embodiments, such as in FIG. 7A, before detecting the input directed to the respective user interface element (e.g., 704*b*), the first user interface is displayed with a visual characteristic (e.g., translucency, clarity, transparency, color, contrast, brightness) having a first value (810*a*). In some embodiments, such as in FIG. 7C, after navigating to the second user interface (e.g., 704*b*), the second user interface is displayed over the first user interface displayed with the visual characteristic (e.g., translucency, clarity, transparency, color, contrast, brightness) having a second value, different from the first value (810*b*). In some embodiments, the second user interface is displayed overlaid on a blurred and/or darkened version of the first user interface. In some embodiments, the first user interface includes a second respective user interface element (e.g., 704*a*) associated with a third user interface (810*c*), such as in FIG. 7A. In some embodiments, the first user interface is an image browsing user interface and the respective user interface element and the second respective user interface elements are thumbnails of images and the second user interface and the third user interface are scaled-up versions of the respective user interface element and the second respective user interface element, respectively. In some embodiments, such as in FIG. 7C, while displaying the second user interface (e.g., 704*b*) over the first user interface displayed with the visual characteristic having the second value, the electronic device (e.g., 101) receives (810*d*), via the one or more input devices, an input for navigating from the second user interface to the third user interface (e.g., without navigating back to the first user interface). In some embodiments, the input for navigating from the second user interface to the third user interface includes a horizontal directional input (e.g., a horizontal swipe of the user's hand or finger detected by a hand tracking device (e.g., one or more cameras, range sensors, depth sensors, proximity sensors, touch sensors (e.g., a touch screen or trackpad)), pressing a horizontal arrow key, etc.). In some embodiments, detecting the input for navigating from the second user interface to the third user interface includes detecting, via the eye tracking device, that the user is looking at the second user interface and detecting, via a hand tracking device, that the user performs a gesture and/or movement with their hand. In some embodiments, detecting the gesture and/or movement includes detecting the user touching their thumb to another finger on the same hand as the thumb (e.g., index finger, middle finger, ring finger, little finger), moving their hand horizontally while touching the thumb to the finger, and ceasing to touch the finger and the thumb. In some embodiments, while displaying the second or third user interface, in response to detecting the user touching the thumb and finger, moving the hand down, and ceasing to touch the thumb and finger together, the electronic device displays the first user interface and ceases display of the second or third user interface. In some embodiments, in response to receiving the input for navigating from the second user interface (e.g., 704*b*) in FIG. 7C to the third user interface, while maintaining display of the first user interface with the visual characteristic having the second value, the electronic device (e.g., 101) ceases (810*d*) display of the second user interface (e.g., 704*b*) over the first user interface, and the electronic device (e.g., 101) displays (810*e*) the third user interface over the first user interface. In some embodiments, the third user interface is displayed at a position in the three-dimensional environment displayed by the electronic device that is the same as the position at which the electronic device previously displayed the second user interface. In some embodiments, the third user interface is accessible from the first user interface. For example, in response to detecting the user's gaze on a second respective user interface element for the predetermined time threshold (e.g., 0.1, 0.2, 0.3, 0.4, 0.5, 1, etc. seconds) or in response to detecting the user's gaze on the second user interface element while detecting a non-gaze input, the electronic device presents the third user interface without presenting the second user interface.

The above-described manner of navigating from the second user interface to the third user interface while maintaining display of the first user interface provides an efficient way for the user to navigate back to the first user interface from either the first or second user interface (e.g., by selecting the first user interface), which additionally reduces power usage and improves battery life of the electronic device by enabling the user to use the electronic device more quickly and efficiently, while reducing errors in usage.

In some embodiments, such as in FIG. 7A, in response to detecting that the gaze (e.g., 702*a*) of the user is directed to the respective user interface element (e.g., 704*b*), the electronic device (e.g., 101) initiates (812*a*) an animation corresponding to navigating to the second user interface. In some embodiments, the animation includes expanding the respective user interface element to become the second user interface. In some embodiments, in response to detecting the input that includes the gaze (e.g., 702*a*) of the user directed to the respective user interface element (e.g., 704*b*) (812*b*), such as in FIG. 7A, in accordance with the determination that the gaze (e.g., 702*a*) of the user continues to be directed to the respective user interface element (e.g., 704*b*) for longer than the time threshold, the electronic device (e.g., 101) completes (812*c*), over the time threshold, the animation corresponding to navigating to the second user interface (e.g., 704*b*) and navigates to the second user interface (e.g., 704*b*), as shown in FIG. 7C. In some embodiments, in response to detecting the gaze of the user on the respective user interface element for the time threshold without detecting the selection input, the animation proceeds at a predetermined speed and lasts for the predetermined time threshold until the second user interface is navigated-to and/or displayed. In some embodiments, in response to detecting the input that includes the gaze (e.g., 702*a*) of the user directed to the respective user interface element (e.g., 704*b*) (812*b*), such as in FIG. 7A, in accordance with the determination that the selection input is detected via the one or more input devices when the gaze (e.g., 702*a*) of the user has been directed to the respective user interface element (e.g., 704*b*) for shorter than the time threshold, the electronic device (e.g., 101) navigates (812*d*) to the second user interface (e.g., 704*b*), such as in FIG. 7C, without completing, over the time threshold, the animation corresponding to navigating to the second user interface (e.g., 704*b*). In some embodiments, the electronic device plays the entire animation at a second speed that is faster than the first speed at which the electronic device displays the animation if the selection input is not received. In some embodiments, until the selection input is detected and while the user's gaze on the respective user interface element is detected, the electronic device presents the animation at the first speed. In some embodiments, in response to detecting the selection input while the user's gaze is directed to the respective user interface element and the electronic device is presenting the animation at the first speed, the electronic device continues the animation at the second speed. In some embodiments, the electronic device ceases presenting the animation when the selection input is detected, and immediately displays the second user interface.

The above-described manner of displaying the animation over the time threshold in response to detecting the gaze of the user on the respective user interface element for the time threshold without detecting the selection input or navigating to the second user interface without completing the animation over the predetermined period of time in response to detecting the selection input provides efficient ways of navigating to the second user interface with either less time or fewer inputs, which additionally reduces power usage and improves battery life of the electronic device by enabling the user to use the electronic device more quickly and efficiently, while reducing errors in usage.

FIGS. 9A-9D illustrate examples of how an electronic device enhances interactions with control elements of user interfaces in accordance with some embodiments. Examples of control elements include navigation bars (e.g., navigation bar 906 illustrated in FIGS. 9A-9B) and selectable options (e.g., option A 920a illustrated in FIGS. 9C-9D).

Figure 9A:
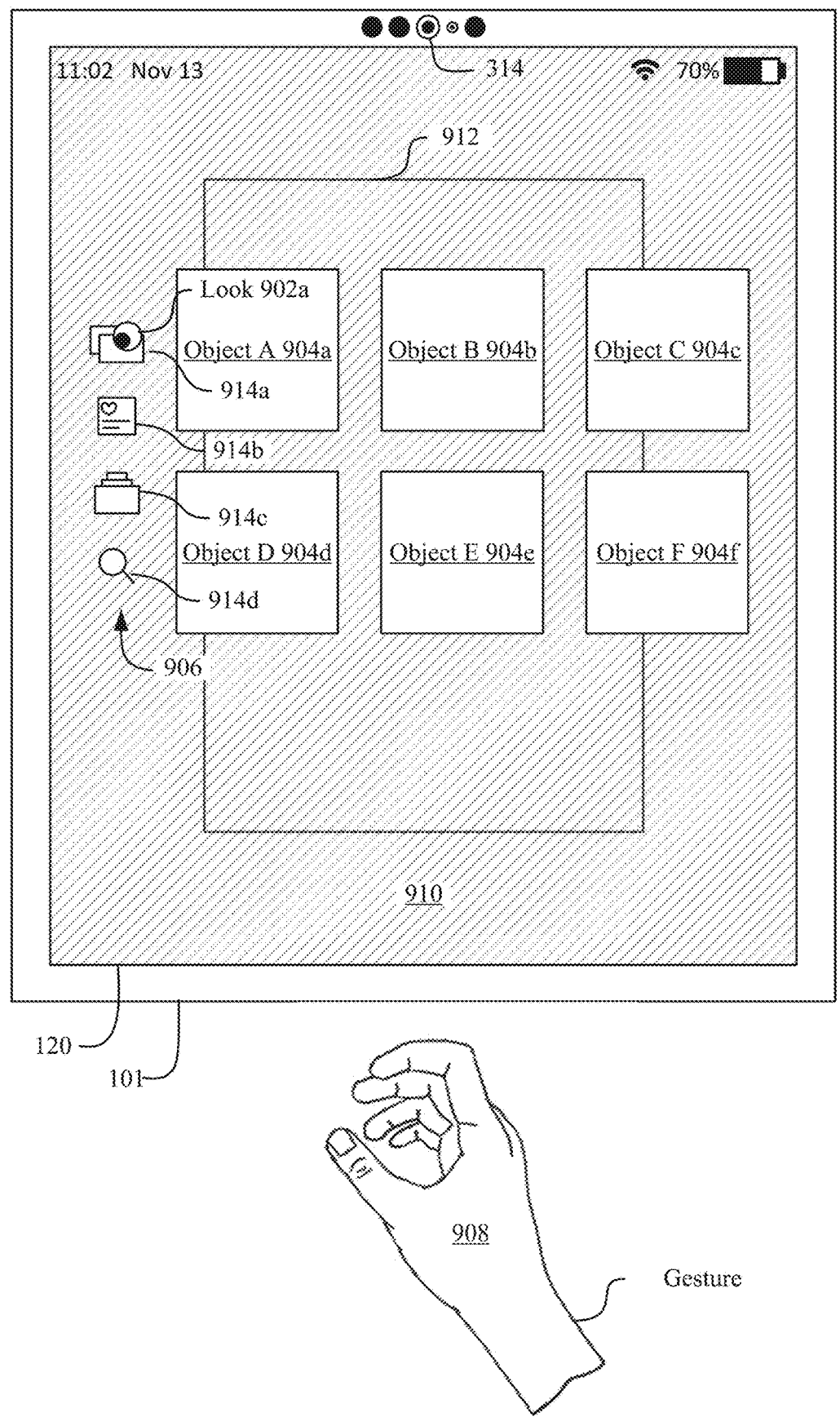
FIGS. 9A-9D illustrate examples of how an electronic device enhances interactions with control elements of user interfaces in accordance with some embodiments.

FIG. 9A illustrates electronic device 101 displaying, via display generation component 120, a three-dimensional environment 910 on a user interface. It should be appreciated, however, that implementing one or more of the techniques disclosed herein with reference to FIGS. 9A-9D in a user interface other than a three-dimensional environment is possible and does not depart from the scope of the disclosure. As described above with reference to FIGS. 1-6, the electronic device 101 optionally includes a display generation component 120 (e.g., a touch screen) and a plurality of image sensors 314. The image sensors 314 optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on head-mounted displays that include display generation components that display the user interfaces to the users and sensors to detect the physical environments and/or movements of the users' hands (e.g., external sensors facing outwards from the users), and/or gazes of the users (e.g., internal sensors facing inwards towards the faces of the users).

In FIG. 9A, electronic device 101 displays a user interface in three-dimensional environment 910 that includes a plurality of objects 904a-904f and a navigation bar 906. The user interface is displayed in a three-dimensional environment 910 including another user interface 912. In some embodiments, user interface 912 is a user interface from which the electronic device 101 navigated to the user interface including the plurality of objects 904a-904f and the navigation bar 906, and user interface 912 is displayed behind (e.g., in a background behind) the current user interface. In some embodiments, objects in the three-dimensional environment 910 other than the user interface including the plurality of objects 904a-904f and the navigation bar 906 are blurred and/or darkened. In some embodiments, the electronic device 101 navigates back to user interface 912 in one of the manners described below with reference to FIGS. 13A-14M.

In some embodiments, the user interface illustrated in FIG. 9A is a user interface for browsing content, and objects 904a-904f are representations of items of content. For example, the user interface is a photo browsing application and representations 904a-904f are thumbnails of photos. As another example, the user interface is a video content application and representations 904a-904f are thumbnails of video content. Other user interfaces are possible. In some embodiments, the user interface illustrated in FIG. 9A is any user interface that implements the techniques disclosed herein with reference to FIGS. 9A-10K. In some embodiments, objects 904a-904f behave similarly to object B 704b described above with reference to FIGS. 7A-8F.

The user interface illustrated in FIG. 9A further includes navigation bar 906. Navigation bar 906 includes a plurality of selectable options 914a-d. In some embodiments, selectable options 914a-d are associated with different pages in the user interface and the electronic device 101 navigates between pages in response to selection of one of the selectable options 914a-d.

Figure 9B:
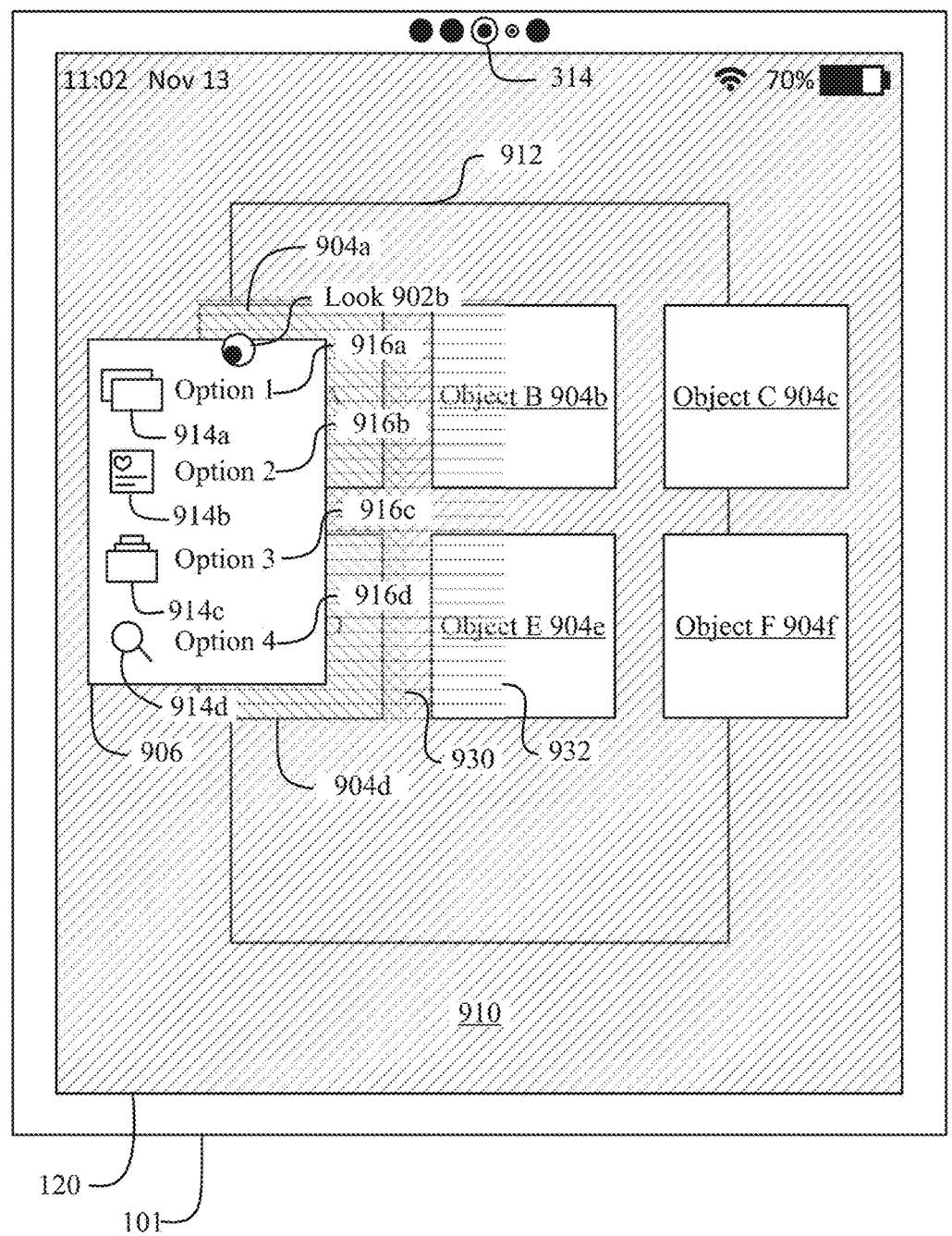

As shown in FIG. 9A, the electronic device 101 detects the gaze 902a of the user directed to one of the options 914a included in navigation bar 906. In some embodiments, in response to detecting the gaze 902a of the user directed to the option 914a for a predetermined time threshold (e.g., 0.1, 0.3, 0.5, 1, etc. seconds), the electronic device 101 updates display of the three-dimensional environment 910 as shown in FIG. 9B. In some embodiments, while detecting the gaze 902a of the user directed to one of the options 914a included in navigation bar 906, the electronic device 101 detects the user performing a predetermined gesture (e.g., touching a thumb to another finger (e.g., index, middle, ring, little finger) on the same hand as the thumb) with their hand 908. In some embodiments, in response to detecting the gaze 902a of the user directed to the option 914a while detecting the gesture performed with the user's hand 908, the electronic device 101 updates display of the three-dimensional environment 910 as shown in FIG. 9B irrespective of the duration of time for which the gaze 902a is detected (e.g., even if the gaze 902a is detected for less than the threshold time). In some embodiments, in response to detecting the gesture while detecting the gaze 902a of the user on option 914a, the electronic device 101 navigates the user interface according to option 914a instead of presenting the user interface illustrated in FIG. 9B. In some embodiments, the electronic device 101 displays the user interface illustrated in FIG. 9B in response to detecting the gaze of the user directed to a region of the navigation bar 906 that does not correspond to one of the options 914a-d (e.g., an area of the navigation bar 906 between two of options 914a-d).

FIG. 9B illustrates the electronic device 101 displaying the three-dimensional environment 910 in response to one of the inputs described above with reference to FIG. 9A. As shown in FIG. 9B, the navigation bar 906 is expanded to include text descriptions 916a-916d of selectable options 914a-914d overlaid on objects 904a and 904d. It should be understood that, in some embodiments, if the size of the expanded navigation bar 906 were different (e.g., wider, less wide) or if the layout of the rest of the user interface were different, the expanded navigation bar 906 could overlap different portions of objects 904a and 904d or overlap additional or different objects in the user interface. For example, if the width of the expanded navigation bar 906 reaches objects 904b and 904e, the expanded navigation bar 906 would be displayed overlaid on objects 904a, 904b, 904d, and 904e.

As shown in FIG. 9B, the electronic device 101 blurs portions 932 and 930 of the user interface including at least parts of objects 904a, 904b, 904d, and 904e. In some embodiments, the electronic device 101 blurs a first portion 930 of the user interface that is within a first threshold (e.g., 1, 5, 10, 15, etc. centimeters) of the boundary of the expanded navigation bar 906 with a relatively high amount of blur. In some embodiments, the electronic device 101 blurs a second portion 932 of the user interface that is between the first threshold and a second threshold (e.g., 2, 5, 10, 15, 20, 30, etc. centimeters) of the boundary of expanded navigation bar 906 with a relatively low amount of blur. In some embodiments, rather than blurring two regions 930 and 932 with two discrete levels of blur, the electronic device 101 continuously varies the level of blur as a function of distance from the boundary of the expanded navigation bar to the second threshold distance from the boundary of the expanded navigation bar (e.g., the boundary of region 932 illustrated in FIG. 9B). In some embodiments, regions closer to the boundary of the expanded navigation bar 906 are more blurred than regions further from the boundary of expanded navigation bar 906 and feathered transitions are used between levels of blur. As shown in FIG. 9B, in some embodiments, the electronic device 101 does not blur a portion of the user interface beyond portion 932 (e.g., the portion of the user interface more than the second threshold from the boundary of expanded navigation bar 906, such as object C 904c and object F 904f). In some embodiments, the entire user interface is blurred except for expanded navigation bar 906 in a manner similar to the manner described below with reference to FIG. 9D.

In some embodiments, the electronic device 101 further visually distinguishes expanded navigation bar 906 from the rest of the user interface by separating the expanded navigation bar 906 from the rest of the user interface in the z-direction (e.g., towards the viewpoint displayed via display generation component 120). In some embodiments, while displaying the user interface illustrated in FIG. 9B, the electronic device 101 updates the user interface to display one or more of objects 704a-f at distances further from the viewpoint of the user in the three-dimensional environment 910 than the distances at which objects 904a-f were displayed in FIG. 9A. In some embodiments, while displaying the user interface illustrated in FIG. 9B, the electronic device 101 displays the expanded navigation bar 906 at a distance closer to the viewpoint of the user in the three-dimensional environment 904 than the distance at which navigation bar 906 was displayed in FIG. 9A. In some embodiments, the viewpoint of the user in the three-dimensional environment is a location and orientation associated with the user of electronic device 101 in the three-dimensional environment 910. The electronic device 101 optionally displays the three-dimensional environment 910 from of the viewpoint of the user.

Figure 9C:
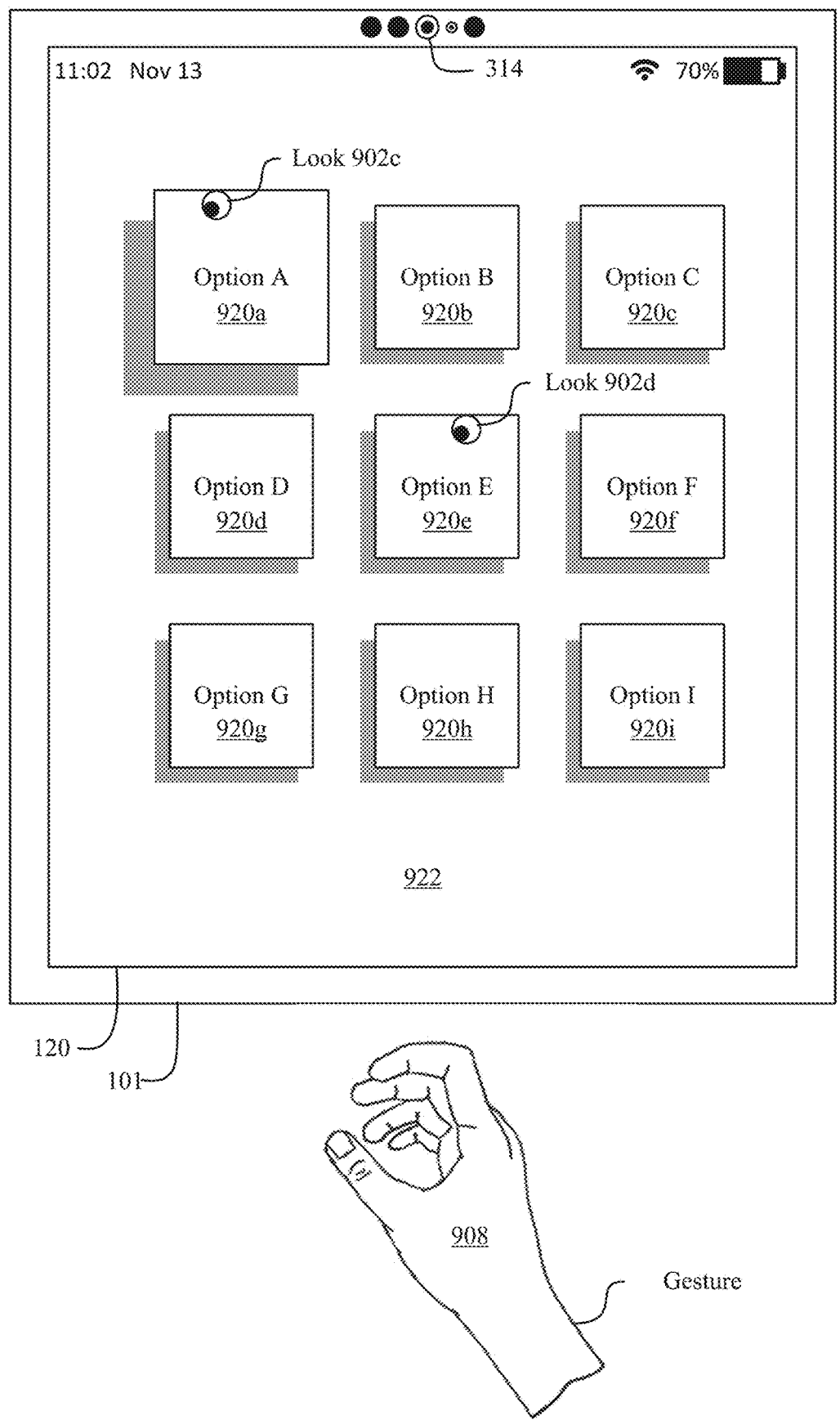

FIG. 9C illustrates electronic device 101 displaying, via display generation component 120, a three-dimensional environment 922 on a user interface. It should be appreciated, however, that implementing one or more of the techniques disclosed herein with reference to FIGS. 9A-9D in a user interface other than a three-dimensional environment is possible and does not depart from the scope of the disclosure.

FIG. 9C illustrates another user interface that includes a plurality of selectable options 920a-920i. For example, the user interface illustrated in FIG. 9C is a settings user interface and each option 920a-920i corresponds to one of a plurality of settings menus for controlling settings associated with device 101. In this example, at least some of the settings menus include a plurality of options for adjusting a setting in the category corresponding to one of options 920a-920i (e.g., display settings, privacy settings, power settings, user account settings, accessibility options, network settings, settings associated with one or more applications accessible to electronic device 101, etc.). As will be described in more detail below and in FIG. 9D, the electronic device 101 optionally updates the settings user interface in response to detecting selection of, for example, option A 920A. It should be appreciated that the electronic device 101 optionally updates the user interface similarly in response to detecting selection of one of the other options 920b-920i. In some embodiments, the ways in which the electronic device 101 updates the user interface in FIGS. 9C-9D are similar to the ways in which the electronic device 101 updates user interfaces as described above with reference to FIGS. 7A-8F.

As will be described in more detail below, FIG. 9C illustrates display of the user interface with option A 920a enlarged and/or displayed at a z height closer to the viewpoint of the user in three-dimensional environment 722 relative to options 920b-i in response to detecting the gaze 902c of the user directed to option A 920a. In some embodiments, prior to detecting the gaze 902c of the user on option A 920a, the electronic device 101 displays option A 920a at the same size and/or z height of the other options 920b-i in the user interface.

As shown in FIG. 9C, the electronic device 101 detects the gaze 902c of the user directed towards option A 920a. In some embodiments, in response to detecting the gaze 902c of the user directed to option A 920a without detecting an additional input, the electronic device 101 gradually increases the size of option A 920a and/or increases the z separation between option A 920a and the other options 920b-920i in the user interface while the gaze 902c of the user is held on option A 920a. In some embodiments, increasing z separation between option A 920a and the other options 920b-920i includes one or more of updating option A 920a to be displayed closer to the viewpoint of the user in three-dimensional environment 922 and/or updating the other options 920b-920i to be displayed further from the viewpoint of the user in the three-dimensional environment 922. In some embodiments, the electronic device 101 continues to gradually increase the size of option A 920a or increase z separation between option A 920a and options 920b-920i while the gaze 920a of the user is held on option A 920a without detecting an additional input until a threshold time (e.g., 0.1, 0.2, 0.5, 1, 5, 10, etc. seconds) is reached. Once the threshold time is reached while the user's gaze is held on option A 920a, the electronic device 101 optionally displays the user interface illustrated in FIG. 9D.

Figure 9D:
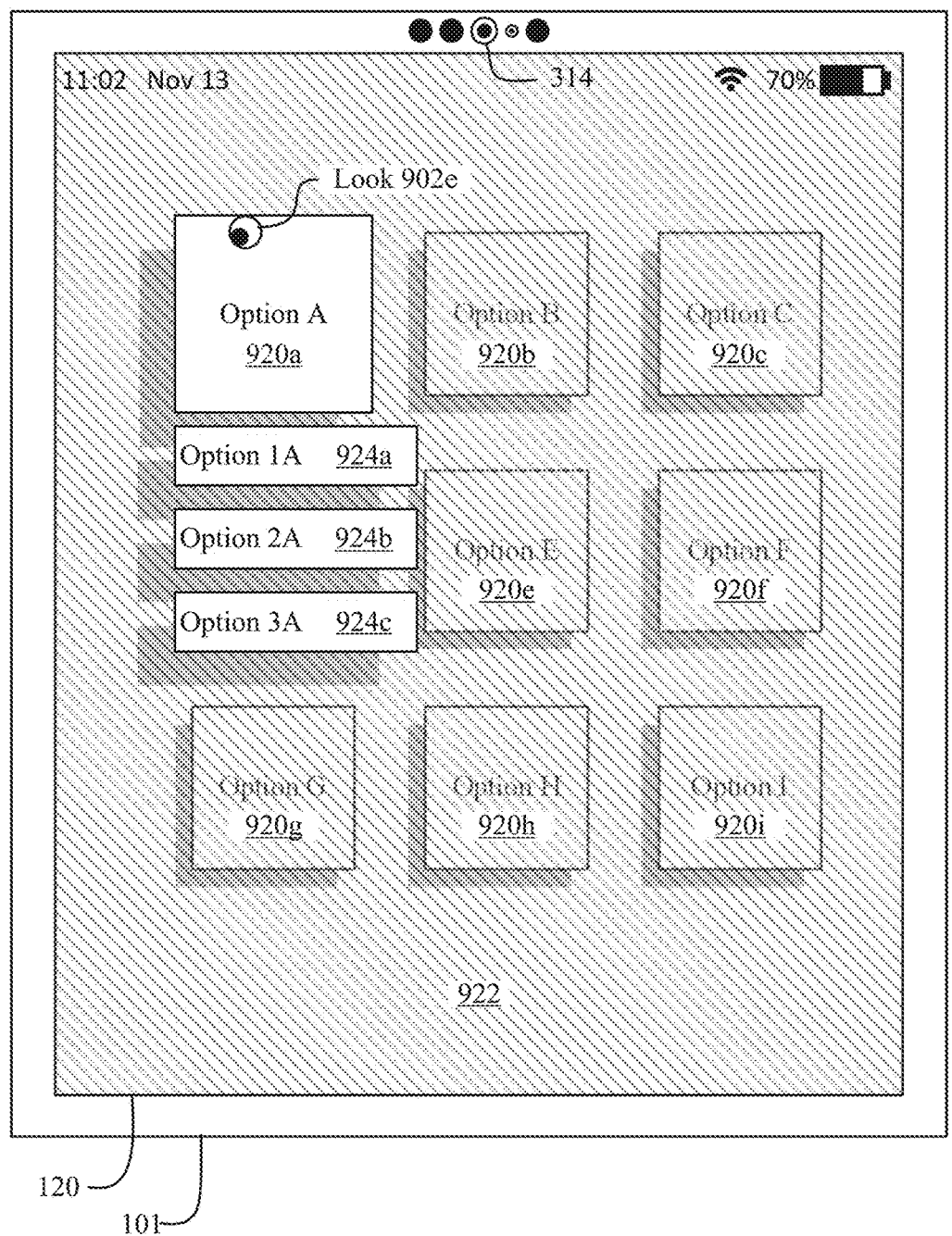
Figure 10A:
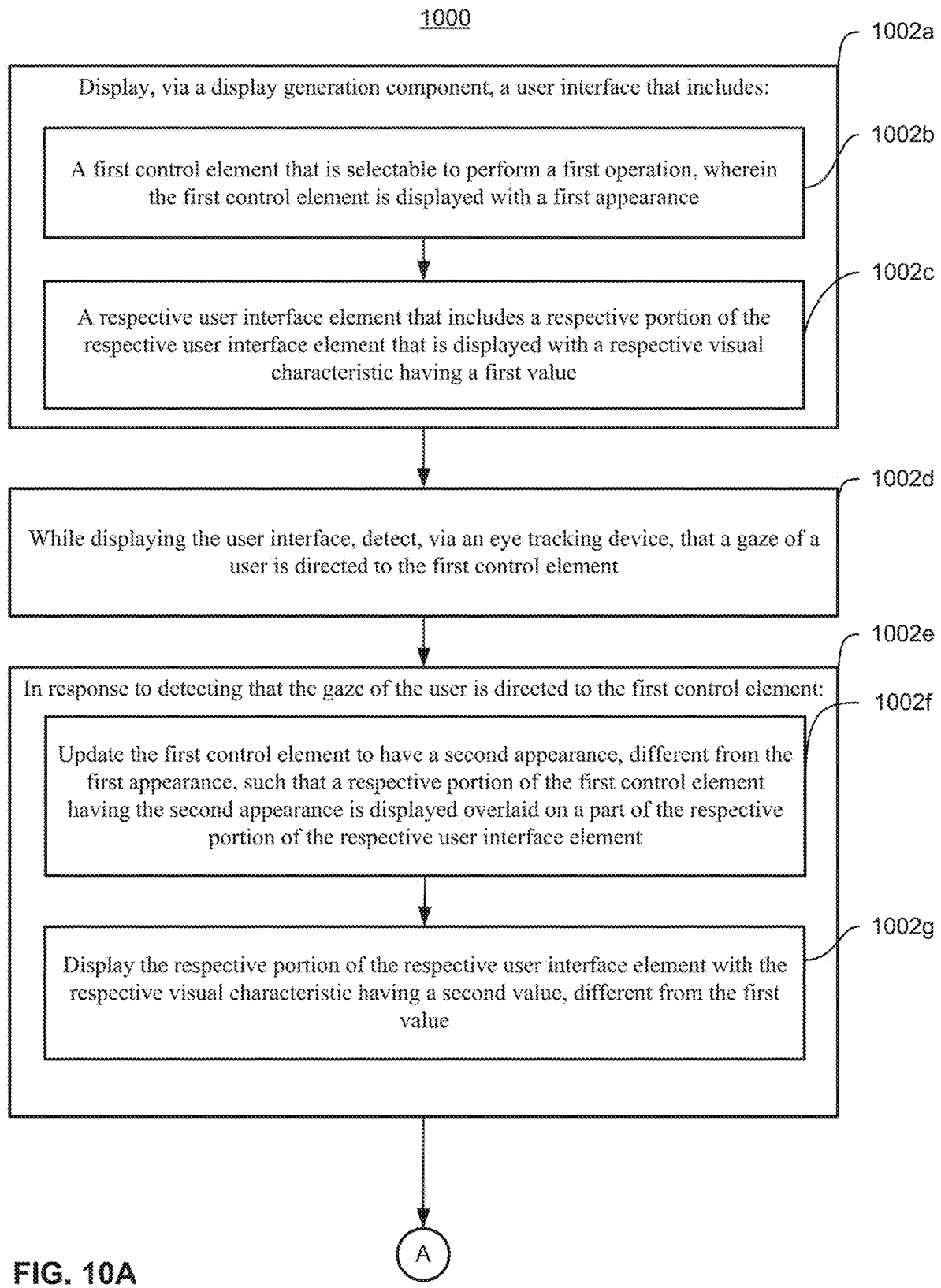
FIGS. 10A-10K is a flowchart illustrating a method of enhancing interactions with control elements of user interfaces in accordance with some embodiments.
Figure 10B:
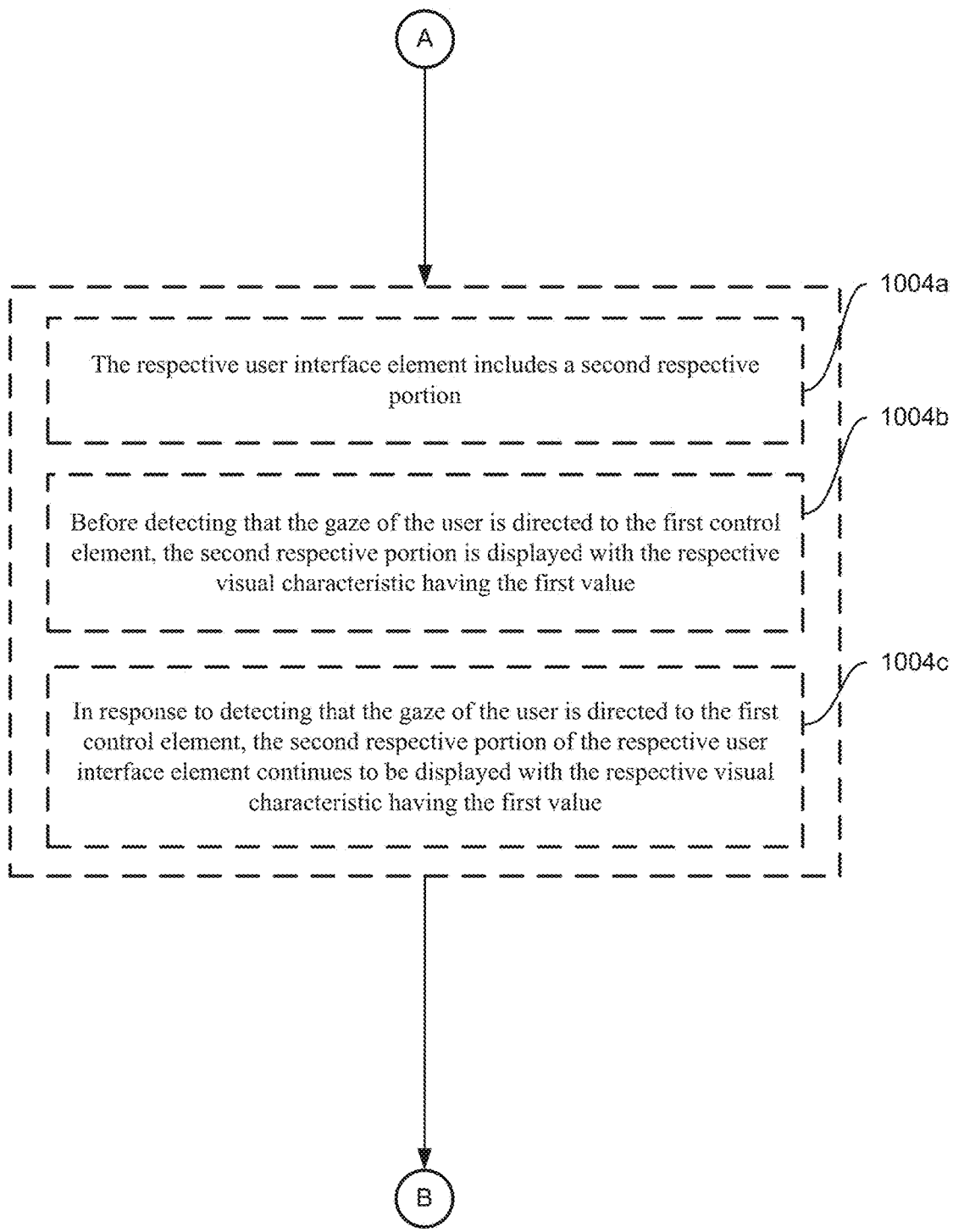
Figure 10C:
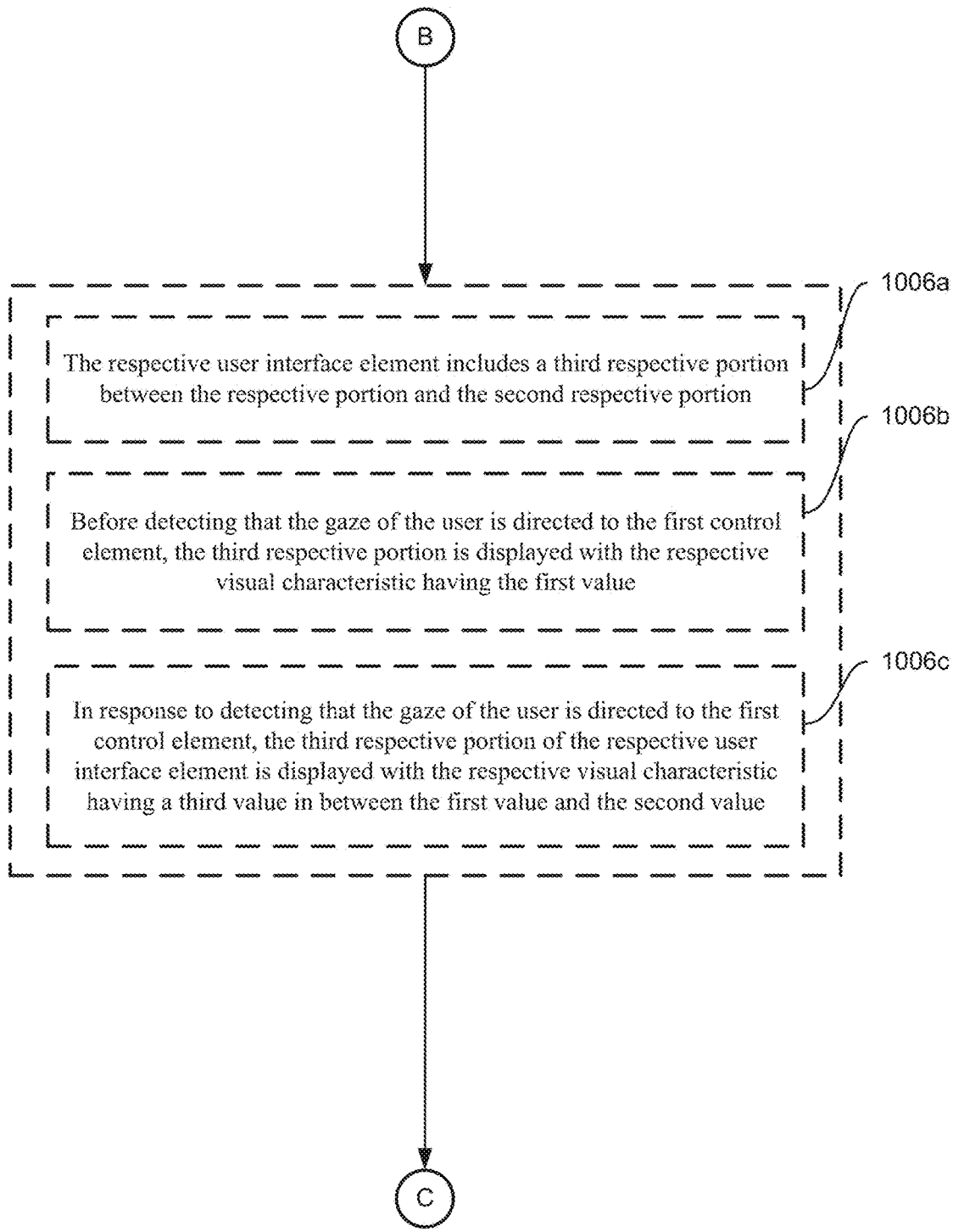
Figure 10D:
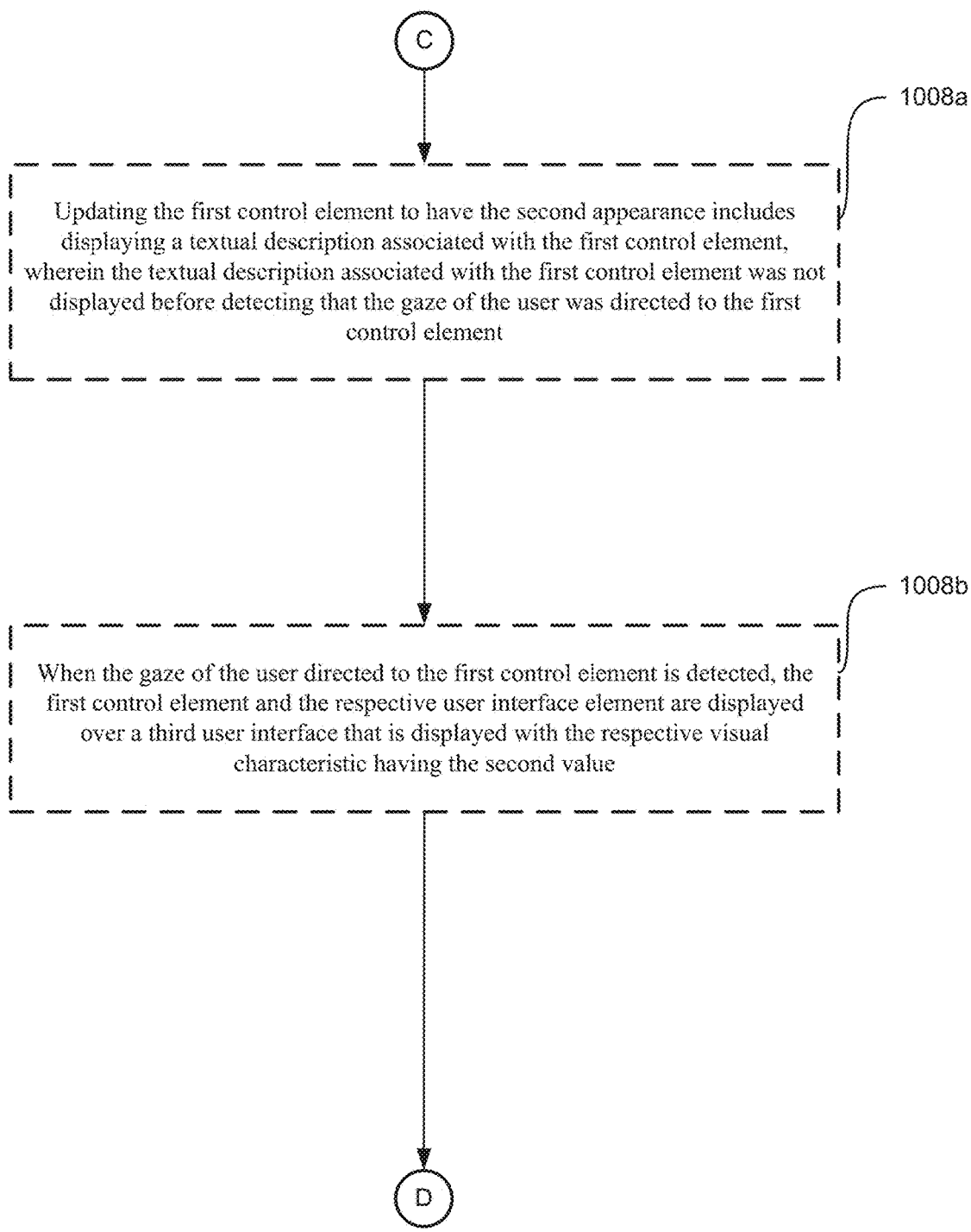
Figure 10E:
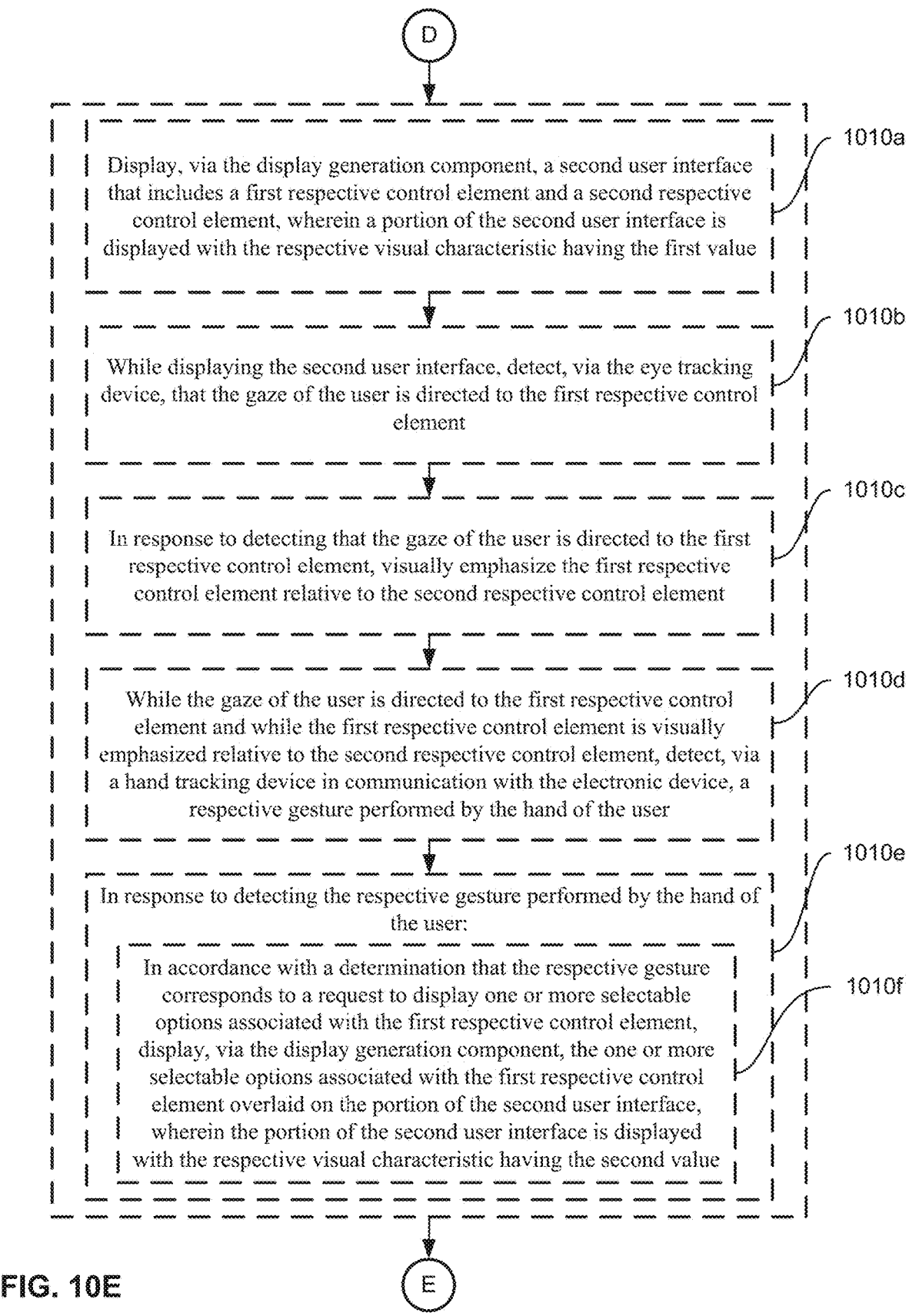
Figure 10F:
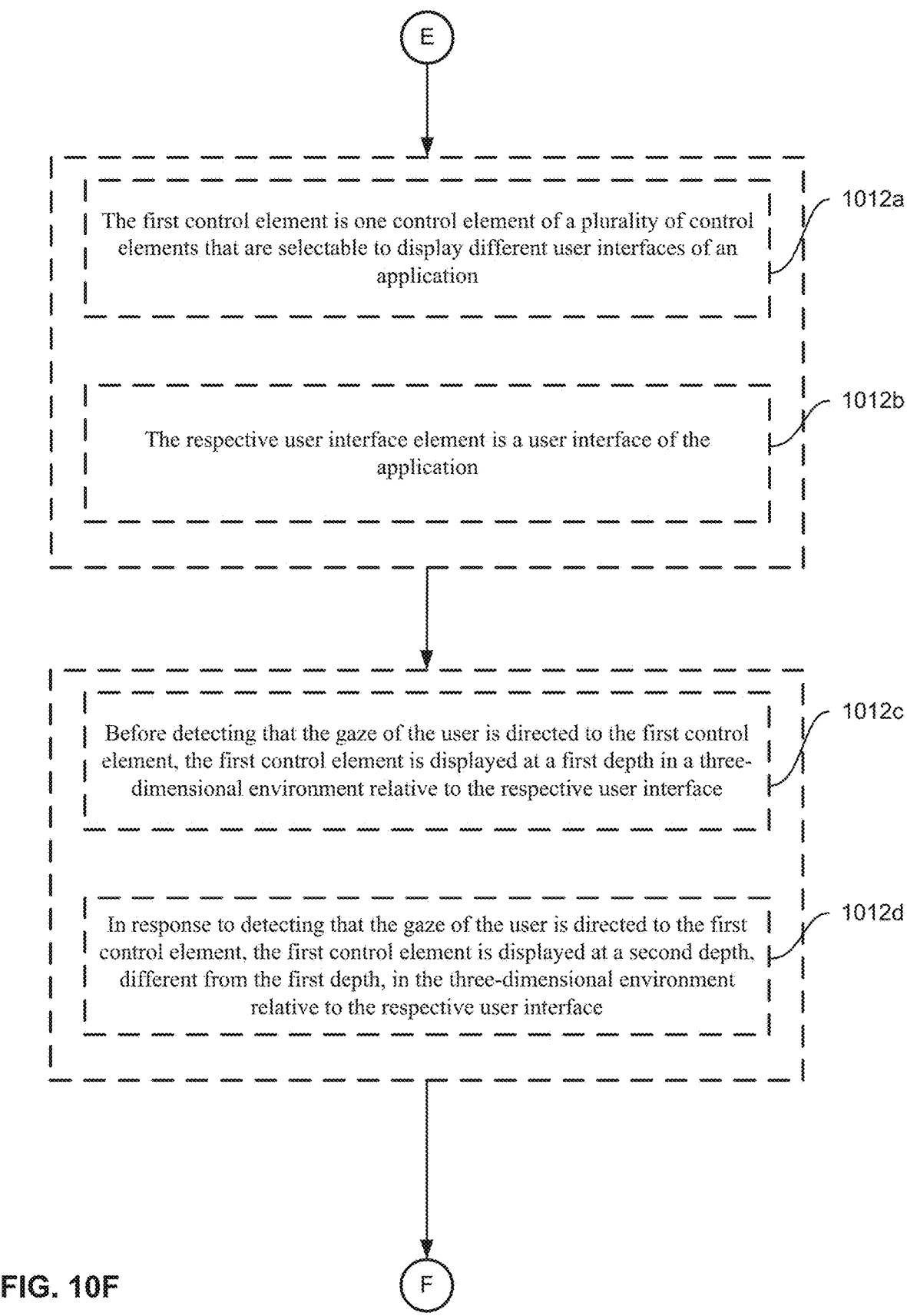
Figure 10G:
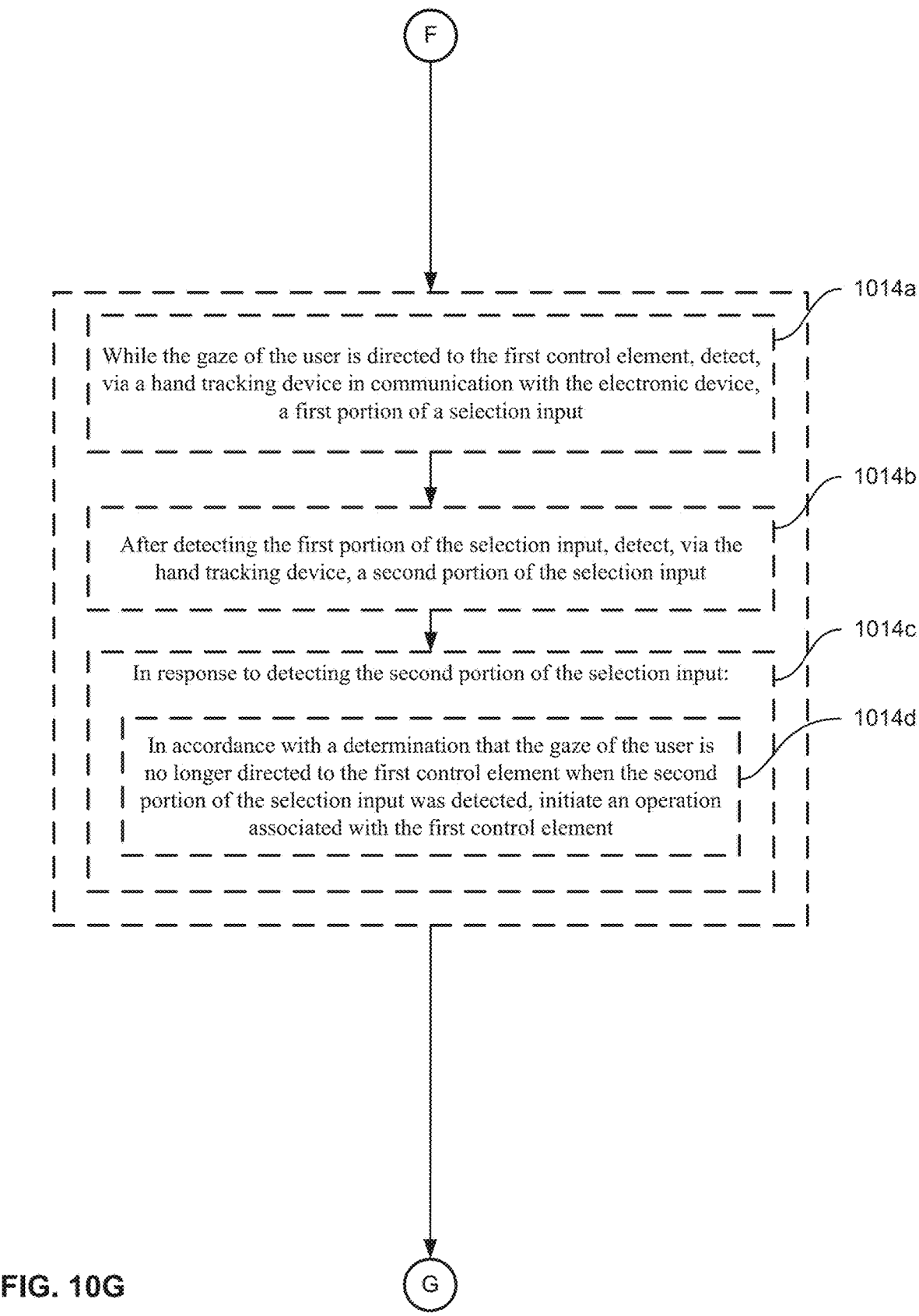
Figure 10H:
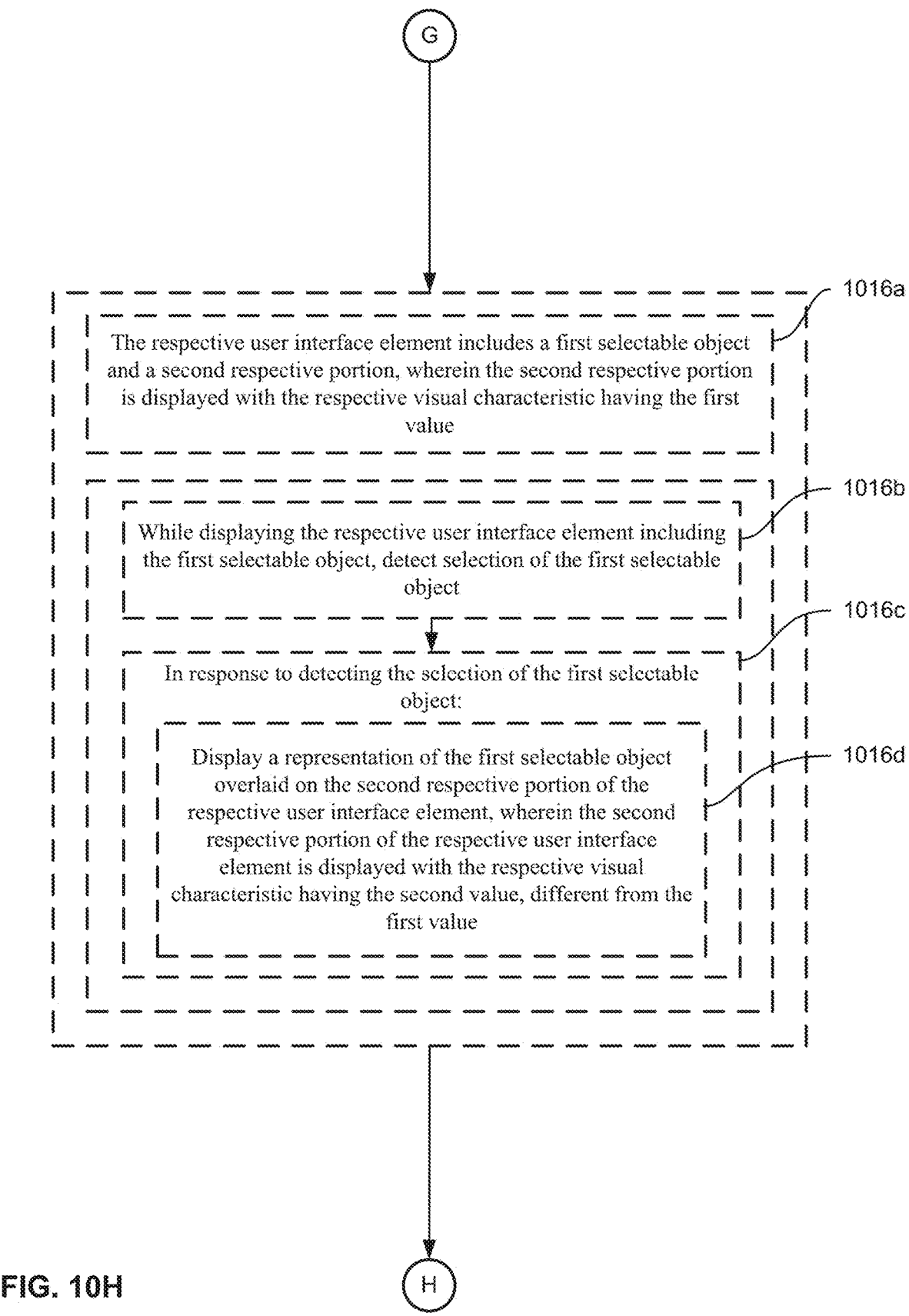
Figure 10I:
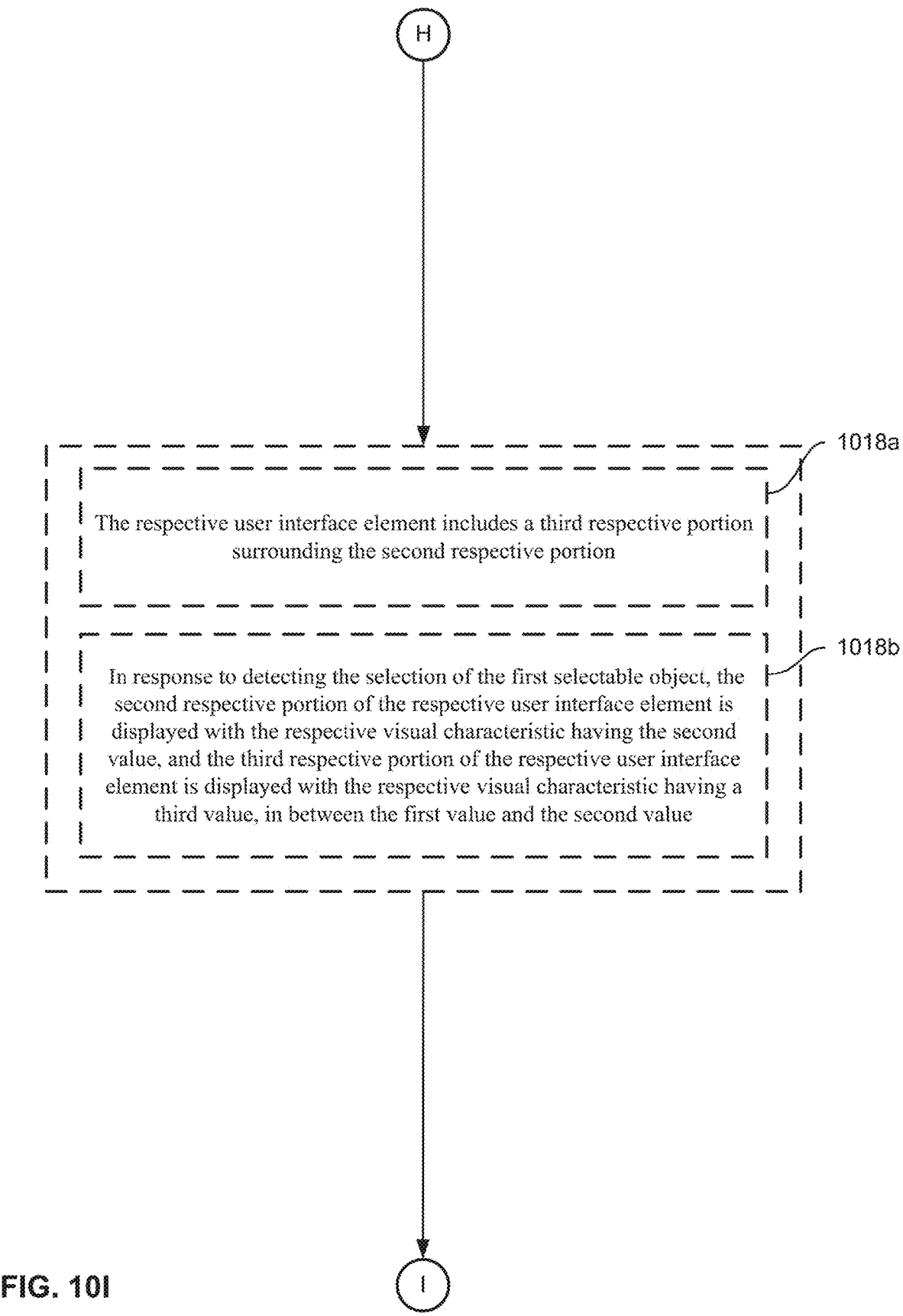
Figure 10J:
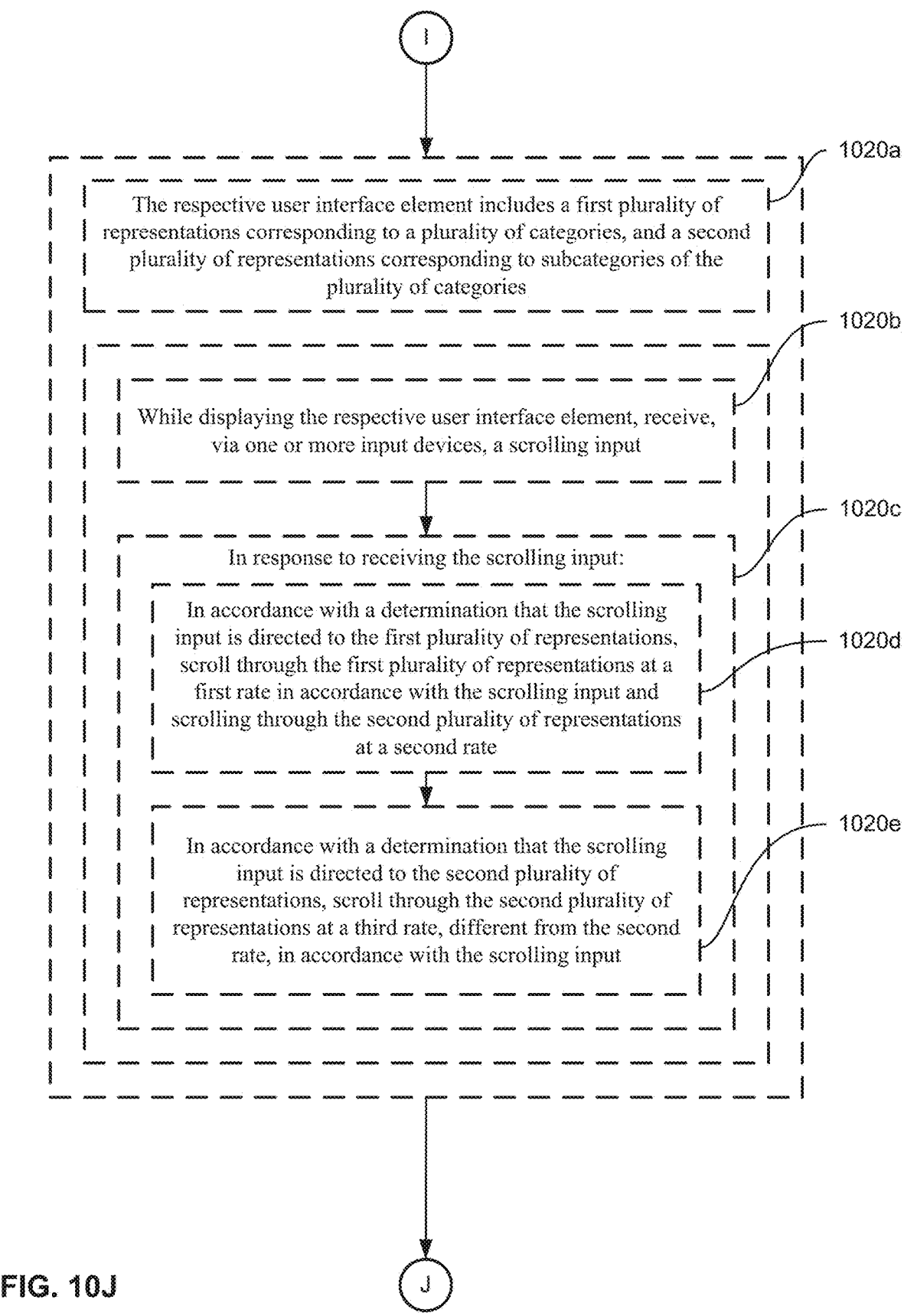
Figure 10K:
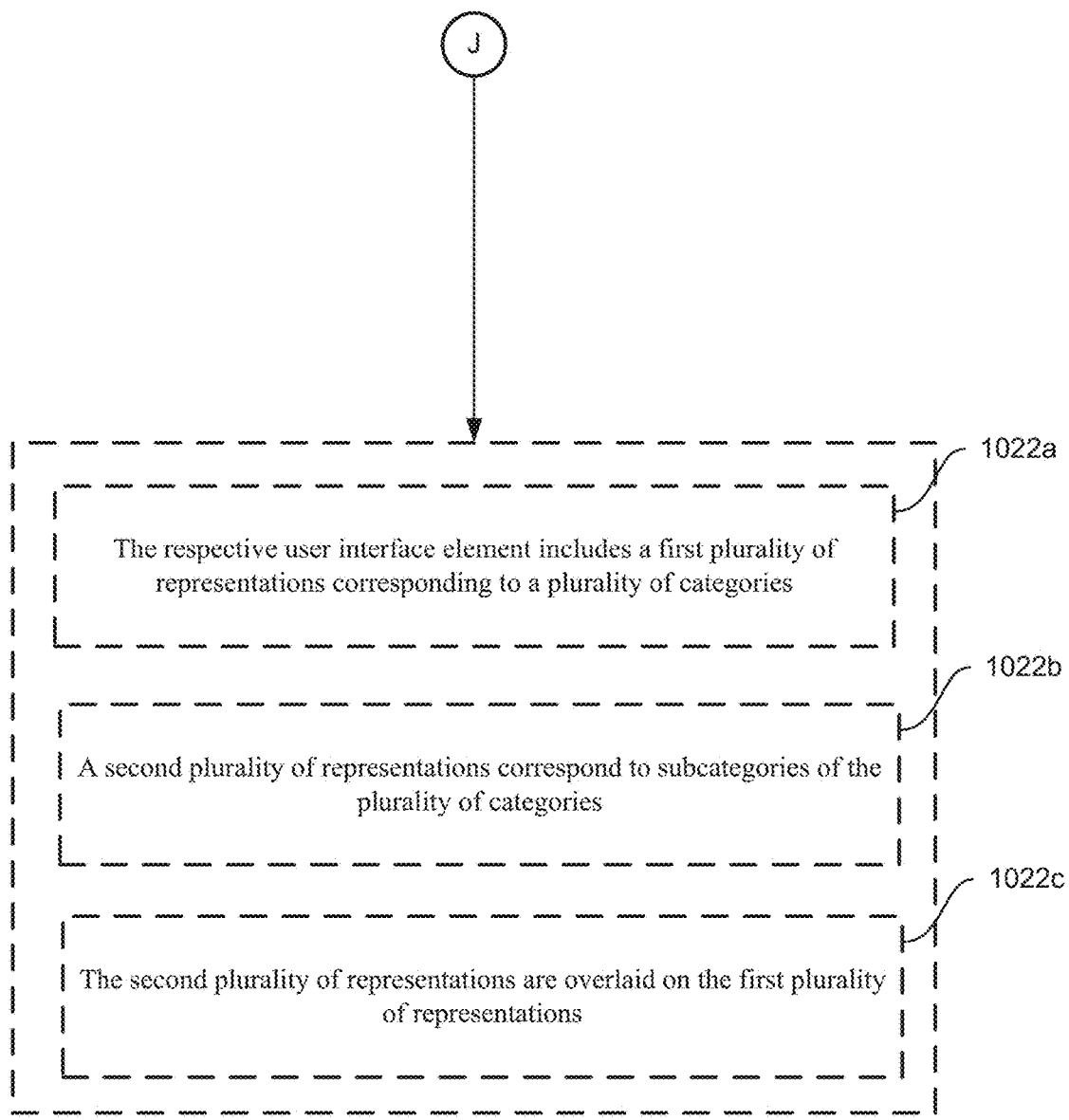

In some embodiments, a hand gesture in combination with gaze can be used to cause device 101 to display the user interface illustrated in FIG. 9D. For example, as shown in FIG. 9C, the electronic device 101 detects the user performing a gesture with their hand 908. In some embodiments, the gesture includes touching a thumb to another finger (e.g., index, middle, ring, little finger) on the same hand as the thumb (e.g., a pinch gesture). In some embodiments, in response to detecting the pinch gesture while detecting the gaze 902c of the user directed to option A 920a, the electronic device 101 displays the user interface illustrated in FIG. 9D irrespective of the duration of time for which the gaze 902c of the user is held on option A 920a. Thus, in some embodiments, the electronic device 101 is able to navigate to the user interface illustrated in FIG. 9D in less than the threshold amount of time in response to detecting the pinch gesture while the gaze 902a of the user is held on option A 920a. In some embodiments, the electronic device 101 presents the animation of option A 920a separating from options 920b-920i and/or option A 920a increasing in size while the gaze 902c is detected on option A 920a and either skips the rest of the animation or increases the speed of the animation in response to the pinch gesture. In some embodiments, if, after touching the thumb to the other finger and while holding the thumb to the other finger while looking at option A 920a, the user directs their gaze away from option A 920a, such as directing their gaze 902d to option E 920e, in response to detecting the thumb and the finger moving apart from each other, the electronic device 101 navigates to the user interface illustrated in FIG. 9D, which is associated with option 920a, instead of navigating to a similar user interface associated with option E 920e.

In some embodiments, if the gaze of the user is directed away from option A 920a before the threshold time has elapsed and without the electronic device 101 detecting the pinch gesture, the electronic device 101 forgoes navigating to the user interface illustrated in FIG. 9D. For example, the user directs their gaze 902c to option E 920e before the threshold time has passed without performing the pinch gesture with their hand 908. In some embodiments, the electronic device 101 decreases the size of option A 920a and/or the z separation of option A 920a from the other options 920b-920i, and displays option A 920a at the same size and same z height as the other options 920b-920i in a manner similar to the way the electronic device 101 displays the user interface before detecting the gaze 902c of the user on option A 920a.

FIG. 9D illustrates the user interface displayed by device 101 in response to one of the inputs described with reference to FIG. 9C. As shown in FIG. 9D, the electronic device 101 blurs and/or darkens display of options 920b-i in the user interface and displays a plurality of options 924a-c associated with option A 920a (e.g., in addition to option A 920a itself) overlaid or in front of options 920b-i. For example, option A 920a is an option to view battery settings of the electronic device and option 1A 924a is selectable to enter a low power mode of the electronic device 101, option 2B 924b is an option to view the status of the health of the battery of the electronic device 101, and option 924c is an option to view battery charging and usage statistics. In some embodiments, instead of blurring and/or darkening the entire rest of the user interface other than option A 920a and options 924a-924c, the electronic device 101 blurs a portion of the user interface (e.g., the portion of the user interface within a threshold distance of the collection of option A 920a and options 924a-c) similar to the manner described above with reference to FIG. 9B. In some embodiments, one or more or each of options 924a-c are selectable to initiate a process to change a setting of the electronic device 101 associated with option A 920a or to perform some other action. In some embodiments, the electronic device 101 detects selection of one of the options 924a-c in response to detecting the gaze of the user directed to a respective option 924a-c while detecting the user performing a predetermined gesture (e.g., the pinch gesture) with their hand. In some embodiments, option A 920a and options 924a-c are displayed at a z height closer to the viewpoint of the user in the three-dimensional environment 922 than the rest of the user interface, as described above with reference to FIG. 9B.

In some embodiments, the electronic device 101 continues to display the user interface illustrated in FIG. 9D in response to detecting the gaze 902e of the user directed to option A 920a (or one of options 924a-c). In some embodiments, in response to detecting the gaze of the user on another location in the user interface (e.g., one of options 920b-c or 920e-i) for a predetermined time threshold (e.g., 0.2, 0.5, 1, 2, etc. seconds) and/or while detecting the user performing a predetermined gesture (e.g., the pinch gesture), the electronic device 101 navigates back to the user interface illustrated in FIG. 9C. In some embodiments, navigating back to the user interface in FIG. 9C includes updating the user interface to display all of the options 920a-i without being blurred or darkened (e.g., as shown in FIG. 9C), optionally with all options 920a-i displayed at the same size and z height, unlike in FIG. 9C and ceasing to display options 924a-c.

In some embodiments, an electronic device 101 combines the features described above with reference to FIG. 9A-9D with other features disclosed herein. For example, one or more of the user interfaces illustrated in FIGS. 9A-9D includes scrollable representations of categories (e.g., of content, settings, user interfaces, etc.) and scrollable representations of subcategories of the categories similar to the user interfaces described below with reference to FIGS. 11A-12J. For example, with reference to FIG. 9C, options 920a-i are optionally categories, and options 924a-c (and similar options corresponding to others of options 920a-i) are optionally subcategories corresponding to the categories of options 920a-i. The electronic device 101 optionally displays the representations of subcategories at least partially overlaid on the representation of the categories, such as in FIG. 11A. In some embodiments, while scrolling the representations of categories, the electronic device 101 scrolls the representations of subcategories at a different rate of scrolling than the rate at which the categories are scrolled, as described below with reference to FIGS. 11A-12J. In some embodiments, while scrolling the representations of subcategories, the electronic device forgoes scrolling the representations of categories or scrolls the categories at a different rate than the subcategories, as also described below with reference to FIGS. 11A-12J. It should be understood that an electronic device is also able to combine embodiments described with reference to FIGS. 9A-10K with embodiments described with reference to FIGS. 7A-8F and 13A-14M.

FIGS. 10A-10K is a flowchart illustrating a method of enhancing interactions with control elements of user interfaces in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, such as in FIG. 9A, method 1000 is performed at an electronic device (e.g., 101) in communication with a display generation component and an eye tracking device (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc.

In some embodiments, such as in FIG. 9A, the electronic device (e.g., 101) displays, via the display generation component, a user interface that includes (1002*a*) a first control element (e.g., 906) that is selectable to perform a first operation, wherein the first control element (e.g., 906) is displayed with a first appearance (1002*b*). In some embodiments, the electronic device (e.g., 101) displays, via the display generation component, a user interface that includes (1002*a*) a respective user interface element (e.g., 904*a*) (e.g., app content) that includes a respective portion of the respective user interface element (e.g., 906) that is displayed with a respective visual characteristic having a first value (1002*c*), such as in FIG. 9A. In some embodiments, the user interface is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.). In some embodiments, in response to detecting selection of the first control element, the electronic device performs the first operation. In some embodiments, displaying the first control element with the first appearance includes displaying the first control element with a first color, size, and/or translucency and/or displaying the first control element at a first location in the user interface, including displaying the first control element in a first virtual layer of the user interface and/or displaying the first control element at a first location within a respective layer of the user interface. For example, the respective control element is optionally a navigation element including of a plurality of options that, when selected, causes the electronic device to display a user interface of a respective application corresponding to the selected option. In some embodiments, the respective visual characteristic is a virtual layer of the user interface in which the respective portion of the respective user interface element is displayed, a position of the respective user interface element relative to other virtual layers of the user interface, a color, size, and/or translucency, etc. In some embodiments, a second portion of the entire respective user interface element (e.g., the entire respective user interface element) is displayed with the respective visual characteristic having the first value. In some embodiments, such as in FIG. 9A, while displaying the user interface, the electronic device (e.g., 101) detects (1002*d*), via the eye tracking device, that a gaze (e.g., 902*a*) of a user is directed to the first control element (e.g., 906). In some embodiments, in response to detecting that the gaze (e.g., 902*a*) of the user is directed to the first control element (e.g., 906) (1002*e*), such as in FIG. 9A, the electronic device (e.g., 101) updates (1002*f*) the first control element (e.g., 906) to have a second appearance, different from the first appearance, such that a respective portion of the first control element (e.g., 906) having the second appearance is displayed overlaid on a part of the respective portion (e.g., 930) of the respective user interface element (e.g., 904*a*), such as in FIG. 9B. In some embodiments, updating the first control element to have the second appearance includes changing the size, color, translucency, etc. with which the first control element is displayed, the virtual layer in which the first control element is displayed (e.g., moving the first control element forward, towards a top layer of the user interface), and/or the location within a virtual layer at in which the first control element is displayed. In some embodiments, as a result of updating the first control element, a portion of the first control element overlays a portion of the respective user interface element. In some embodiments, in response to detecting that the gaze (e.g., 902*a*) of the user is directed to the first control element (e.g., 906) (1002*e*), such as in FIG. 9A, the electronic device (e.g., 101) displays (1002*g*) the respective portion (e.g., 930) of the respective user interface element (e.g., 904*a*) with the respective visual characteristic having a second value, different from the first value, such as in FIG. 9B. In some embodiments, displaying the respective portion of the respective user interface element with the respective visual characteristic having the second value includes changing the color, size, translucency, amount of blur, etc. with which the respective portion of the respective user interface element is displayed, changing the virtual layer in which the respective portion of the respective user interface element is displayed, and/or changing the location within a virtual layer at which the respective portion of the respective user interface element is displayed. In some embodiments, the electronic device updates the first control element and displays the respective portion of the respective user interface element with the respective visual characteristic having the second value in response to detecting, via the eye tracking device, that the gaze of the user is directed to the control element for a predetermined period of time (e.g., 0.1, 0.2, 0.3, 0.4, 0.5, 0.75, 1 second, etc.). In some embodiments, the electronic device updates the first control element and displays the respective portion of the respective user interface element with the respective visual characteristic having the second value in response to detecting, via the eye tracking device, that the gaze of the user is directed to the control element without comparing the duration of the gaze to a threshold. For example, in response to detecting the user's gaze being directed towards a navigation bar displayed with a user interface of an application, the electronic device updates the navigation bar to be displayed overlaid on a the user interface of the application and blurs a portion of the user interface adjacent to (e.g., overlaid by) the navigation bar, and does not blur a remainder of the user interface.

The above-described manner of updating the first control element to have a second appearance and to be overlaid on part of the respective user interface element and displaying the respective portion of the respective user interface element with the respective visual characteristic having the second value in response to detecting the gaze of the user on the first control element provides an efficient way of enabling the user to make a selection within the control element use of display space for the control element (e.g., by not expanding the control element until gaze directed to the control element is detected), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9A, the respective user interface element (e.g., 904*b*) includes a second respective portion (1004*a*). In some embodiments, the second respective portion of the respective user interface element is a threshold distance (e.g., 1, 2, 3, 4, 5, 7, 10, 15, 20, 30, 40, etc. centimeters) away from a boundary of the first control element. In some embodiments, such as in FIG. 9A, before detecting that the gaze (e.g., 902*a*) of the user is directed to the first control element (e.g., 906), the second respective portion is displayed with the respective visual characteristic having the first value (1004*b*). In some embodiments, the respective visual characteristic is a virtual layer of the user interface in which the respective portion of the respective user interface element is displayed, a position of the respective user interface element relative to other virtual layers of the user interface, a color, size, and/or translucency, etc. In some embodiments, such as in FIG. 9B, in response to detecting that the gaze (e.g., 902*b*) of the user is directed to the first control element (e.g., 906), the second respective portion of the respective user interface element (e.g., 904*b*) continues to be displayed with the respective visual characteristic having the first value (1004*c*). In some embodiments, the electronic device does not modify the appearance of the second portion of the respective user interface element in response to detecting the gaze of the user directed to the first control element. In some embodiments, in response to the user's gaze on the first control element, the electronic device blurs a portion of the respective user interface element that is closest to the first control element and does not blur one or more additional portions of the respective user interface element beyond a threshold distance from the boundary of the first control element.

The above-described manner of forgoing modifying the visual characteristic of the second respective portion of the respective user interface element provides an efficient way of enabling the user to continue to view the second respective portion of the respective user interface element while viewing the updated first control element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9B, the respective user interface element (e.g., 904*b*) includes a third respective portion (e.g., 932) between the respective portion (e.g., 930) and the second respective portion (1006*a*). In some embodiments, the boundary between the first respective portion and third respective portion is a first threshold distance (e.g., 0.5, 1, 2, 3, 4, 5, 7, 10, 15, 20, 30, 40, etc. centimeters) from the boundary of the first control element and the boundary between the third respective portion and the second respective portion is a second threshold distance (e.g., 1, 2, 3, 4, 5, 7, 10, 15, 20, 30, 40, 50 etc. centimeters) from the boundary of the first control element. In some embodiments, such as in FIG. 9A, before detecting that the gaze (e.g., 902*a*) of the user is directed to the first control element (e.g., 906), the third respective portion (e.g., 932) (in FIG. 9B) is displayed with the respective visual characteristic having the first value (1006*b*). In some embodiments, the respective visual characteristic is a virtual layer of the user interface in which the respective portion of the respective user interface element is displayed, a position of the respective user interface element relative to other virtual layers of the user interface, a color, size, and/or translucency, etc. In some embodiments, such as in FIG. 9B, in response to detecting that the gaze (e.g., 902*b*) of the user is directed to the first control element (e.g., 906), the third respective portion (e.g., 932) of the respective user interface element is displayed with the respective visual characteristic having a third value in between the first value and the second value (1006*c*). For example, if the respective characteristic is translucency, in response to detecting the gaze of the user directed to the first control element, the electronic device displays the first portion of the respective user interface element with more translucency than the third portion of the respective user interface element and displays the second portion of the respective user interface element with the same level of translucency with which the second portion of the respective user interface element was displayed prior to detecting the gaze of the user directed to the first control element. In some embodiments, the degree to which the electronic device increases the translucency and/or blur of a respective portion of the respective user interface element depends on the distance of the respective portion from the boundary of the first control element. In some embodiments, the closer a respective portion of the respective user interface element is to the boundary of the first control element, the more blurred the electronic device displays that respective portion.

The above-described manner of displaying the third respective portion of the respective user interface element with the visual characteristic having the third value between the first and second values provides an efficient way of enabling the user to continue to view the second respective portion of the respective user interface element while viewing the updated first control element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9B, updating the first control element (e.g., 906) to have the second appearance includes displaying a textual description (e.g., 916*a*)-*d* associated with the first control element, wherein the textual description (e.g., 916*a*)-*d* associated with the first control element (e.g., 906) was not displayed before detecting that the gaze (e.g., 902*b*) of the user was directed to the first control element (e.g., 906) (1008*a*). In some embodiments, prior to detecting the gaze of the user directed to the first control element, the first control element includes one or more images and does not include respective text associated with each image. In some embodiments, in response to detecting the gaze of the user directed to the first control element, the electronic device displays the respective text associated with the one or more images. In some embodiments, the respective text is displayed at a location of the three-dimensional environment at which one or more portions of the respective user interface element were displayed prior to detecting the gaze of the user on the first control element. In some embodiments, the respective text is displayed overlaid on one or more portions of the respective user interface element displayed prior to detecting the gaze of the user on the first control element.

The above-described manner of displaying text of the first control element in response to the gaze of the user being directed towards the first control element provides an efficient way of preserving display area (e.g., with which to display the respective user interface element) prior to detecting the gaze of the user on the first control element and an efficient way of communicating to the user the actions caused by interacting with various regions of the first control element in response to detecting the gaze of the user on the first control element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9A, when the gaze (e.g., 902a) of the user directed to the first control element (e.g., 906) is detected, the first control element (e.g., 906) and the respective user interface element (e.g., 904a) are displayed over a third user interface (e.g., 912) that is displayed with the respective visual characteristic having the second value (1008b). In some embodiments, the electronic device displays the first control element and respective user interface element over the third user interface displayed with the respective visual characteristic having the first value before detecting the gaze of the user directed towards the first control element. For example, the first control element and the respective user interface element are displayed overlaid on a blurred version of the third user interface. In some embodiments, the third user interface is the user interface from which the electronic device navigated to the respective user interface element. In some embodiments, the third user interface, the respective user interface element, and the first control element are associated with the same respective application. In some embodiments, two of the third user interface, the respective user interface element, and the first control element are associated with a first application and one of the third user interface, the respective user interface element, and the first control element are associated with a second application. For example, the third user interface is associated with a first application and the respective user interface element and the first control element are associated with a second application. In some embodiments, the third user interface, the respective user interface element, and the first control element are each associated with different application. In some embodiments, the electronic device displays the first control element concurrently with the third user interface with the visual characteristic having the first value (e.g., before displaying the respective user interface element, in response to an input to navigate back to the third user interface, etc.).

The above-described manner of displaying the first control element and the respective user interface element over the third user interface that is displayed with the respective visual characteristic having the second value provides an efficient way of continuing to display the third user interface while reducing visual clutter and reducing cognitive burden on the user while viewing the respective user interface element which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9C, the electronic device (e.g., 101) displays (1010a), via the display generation component, a second user interface that includes a first respective control element (e.g., 920a) and a second respective control element (e.g., 920b), wherein a portion of the second user interface is displayed with the respective visual characteristic having the first value. In some embodiments, the first respective control element is associated with one or more first selectable options and the second respective control element is associated with one or more second selectable options. For example, the first and second respective control elements are displayed in a settings user interface that includes a plurality of respective control elements associated with a plurality of device settings in a respective category. In this example, in response to detecting the gaze of the user on one of the respective control elements, the electronic device displays the plurality of respective selectable options associated with the respective control element. In some embodiments, such as in FIG. 9C, while displaying the second user interface, the electronic device (e.g., 101) detects (1010b), via the eye tracking device, that the gaze (e.g., 902c) of the user is directed to the first respective control element (e.g., 920a). In some embodiments, in response to detecting that the gaze (e.g., 920a) of the user is directed to the first respective control element (e.g., 920a), the electronic device (e.g., 101) visually emphasizes (1010c) the first respective control element (e.g., 920) relative to the second respective control element (e.g., 920b), such as in FIG. 9C (e.g., increasing the size of the first respective control element, displaying the first respective control element in a virtual layer of the three-dimensional environment that is between the user's viewpoint in the three-dimensional environment and the virtual layer in which the second respective control element is displayed (e.g., by moving the first respective control element towards the viewpoint of the user in the three-dimensional environment and/or moving the second respective control element away from the viewpoint of the user in the three-dimensional environment), modifying a color, translucency, or other visual characteristic of the first and/or second respective control elements, etc.). In some embodiments, the gaze of the user is detected on the first respective control element for a threshold amount of time (e.g., 0.1, 0.2, 0.3, 0.5, etc. seconds) before the electronic device visually emphasizes the first respective control element relative to the second respective control element. In some embodiments, the electronic device visually emphasizes the first respective control element relative to the second respective control element immediately in response to detecting the gaze of the user on the first respective control element. In some embodiments, such as in FIG. 9C, while the gaze (e.g., 902c) of the user is directed to the first respective control element (e.g., 920a) and while the first respective control element (e.g., 920a) is visually emphasized relative to the second respective control element (e.g., 920b), the electronic device (e.g., 101) detects (1010d), via a hand tracking device (e.g., one or more cameras, depth sensors, proximity sensors, and/or touch sensors (e.g., a touch screen or other touch-sensitive surface)) in communication with the electronic device, a respective gesture performed by the hand (e.g., 908) of the user. In some embodiments, detecting the gesture includes detecting, via the hand tracking device, the user touching their thumb to a finger (e.g., index finger, middle finger, ring finger, little finger) on the same hand as the thumb. In some embodiments, in response to detecting the respective gesture performed by the hand (e.g., 908) of the user (1010e) such as in FIG. 9C, in accordance with a determination that the respective gesture corresponds to a request to display one or more selectable options associated with the first respective control element (e.g., 920a) (e.g., the gesture is detected while the user's gaze is on the first respective control element and/or one or more additional criteria are satisfied), the electronic device (e.g., 101) displays (1010f), via the display generation component, the one or more selectable options (e.g., 924a-c) associated with the first respective control element (e.g., 920a) overlaid on the portion of the second user interface, wherein the portion of the second user interface is displayed with the respective visual characteristic having the second value, such as in FIG. 9D. In some embodiments, the portion of the second user interface is a portion of the second user interface within a threshold distance (e.g., 0.5, 1, 2, 3, 4, 5, 7, 10, 15, 20, 30, 40, etc. centimeters) of the first respective control element and the second respective user interface includes a second portion (outside of the threshold distance) that is displayed with the visual characteristic having the first value while the portion of the second user interface is displayed with the visual characteristic having the second value. In some embodiments, while displaying the one or more selectable options associated with the first respective control element overlaid on the portion of the user interface, the electronic device displays the remainder (e.g., all) of the second user interface with the visual characteristic having the second value. In some embodiments, in accordance with a determination that the respective gesture does not correspond to the request to display one or more selectable options associated with the first respective control element, the electronic device forgoes displaying the one or more selectable options overlaid on the portion of the second user interface and displaying the second user interface with the respective visual characteristic having the second value. In some embodiments, in accordance with a determination that the gesture corresponds to a request to perform a respective action other than displaying the one or more selectable options associated with the first respective control element, the electronic device performs the respective action in response to the respective gesture.

The above-described manner of displaying the portion of the second user interface with the visual characteristic having the second value while displaying the one or more selectable options associated with the first control element provides an efficient way of displaying the one or more selectable options associated with the first control element with reduced visual clutter, which reduces the cognitive burden on the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9A, the first control element (e.g., 914a-d) is one control element of a plurality of control elements (e.g., 914a-d) that are selectable to display different user interfaces of an application (1012a). In some embodiments, the first control element is selectable to display a first user interface of a respective application and the electronic device displays a second control element in the plurality of control elements that is selectable to display a second user interface of the respective application. In some embodiments, the first control element is included in a navigation bar of the application. In some embodiments, such as in FIG. 9A, the respective user interface element is a user interface of the application (1012b). In some embodiments, the respective user interface is associated with one of the plurality of control elements. In some embodiments, prior to detecting the gaze of the user on the first control element, the electronic device displays the plurality of control elements with the first appearance (e.g., as images without text, with no separation from the respective user interface element, at a first size, etc.). In some embodiments, in response to detecting the gaze of the user on the first control element, the electronic device displays the first control element with the second appearance (e.g., with text, with increased separation from the respective user interface element, at a second size, etc.). In some embodiments, in response to detecting the gaze of the user on the first control element, the electronic device displays (all or some of) the plurality of control elements with the second appearance.

The above-described manner of displaying a plurality of control elements that are selectable to display different user interfaces of an application provides an efficient way of navigating between user interfaces of an application, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9A, before detecting that the gaze (e.g., 902a) of the user is directed to the first control element (e.g., 906), the first control element (e.g., 906) is displayed at a first depth in a three-dimensional environment relative to the respective user interface (1012c). In some embodiments, the first depth is a respective distance from a viewpoint of the user in the three-dimensional environment in which the first control element and respective user interface are displayed. In some embodiments, the first depth corresponds to the first control element and the respective user interface being displayed at the same depth relative to the viewpoint of the user in the three-dimensional environment. In some embodiments, such as in FIG. 9B, in response to detecting that the gaze (e.g., 902b) of the user is directed to the first control element (e.g., 906), the first control element (e.g., 906) is displayed at a second depth, different from the first depth, in the three-dimensional environment relative to the respective user interface (1012d). In some embodiments, the second depth corresponds to the first control element and the respective user interface being displayed with different depths relative to the viewpoint of the user in the three-dimensional environment. In some embodiments, the respective user interface is updated to be displayed with increased depth from the viewpoint of the user in the three-dimensional environment in response to detecting that the gaze of the user is directed to the first control element. In some embodiments, the first control element is updated to be displayed with decreased depth from the viewpoint of the user in the three-dimensional environment in response to detecting that the gaze of the user is directed to the first control element.

The above-described manner of changing the depth of the first control element relative to the respective user interface in response to the gaze of the user being directed to the first control element provides an efficient way of reducing visual clutter while viewing the first control element and reduces cognitive burden on the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9A, while the gaze (e.g., 902a) of the user is directed to the first control element (e.g., 906), the electronic device (e.g., 101) detects (1014a), via a hand tracking device (e.g., a depth sensor, one or more cameras, a touch sensor (e.g., a touch screen, a trackpad), etc.) in communication with the electronic device, a first portion of a selection input (e.g., touchdown of a contact on a touch-sensitive surface (e.g., a trackpad, touch screen etc.), a click of a mouse without a release of the mouse button or other physical button, a first portion of a hand gesture, such as the user tapping their thumb to one of the other fingers (e.g., index finger, middle finger, ring finger, little finger) on the hand of the thumb without releasing the finger from the thumb). In some embodiments, such as in FIG. 9A, after detecting the first portion of the selection input, the electronic device (e.g., 101) detects (1014b), via the hand tracking device, a second portion of the selection input (e.g., liftoff of the contact on the touch-sensitive surface, release of a click of a mouse button or other physical button, a second portion of a gesture, such as the user moving their thumb away from a finger that the thumb was touching). In some embodiments, in response to detecting the second portion of the selection input (1014c), in accordance with a determination that the gaze of the user is no longer directed to the first control element (e.g., 906) when the second portion of the selection input was detected (e.g., directed to a second control element when the second portion was detected), the electronic device (e.g., 101) initiates (1014d) an operation associated with the first control element (e.g., and not initiating an operation associated with the second control element). In some embodiments, in accordance with a determination that the gaze of the user is directed to the first control element while detecting the second portion of the selection input, the electronic device initiates the operation associated with the first control element. In some embodiments, in response to detecting the gaze of the user on the first control element while the first portion of the selection input is detected followed by detecting the second portion of the selection input, the electronic device performs the operation associated with the first control element irrespective of whether or not the user's gaze is directed towards the first control element while the second portion of the selection input is detected.

The above-described manner of initiating the operation associated with the first control element if the gaze of the user is on the first control element while the first portion of the selection input is detected and the gaze of the user is somewhere other than the first control element while the second portion of the section input is received provides an efficient way of enabling the user to look away from the first control element while providing the selection input without affecting the selection input, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective user interface element includes a first selectable object (e.g., 904a) in FIG. 9A and a second respective portion, wherein the second respective portion is displayed with the respective visual characteristic having the first value (1016a) (e.g., before detecting selection of the first selectable object). In some embodiments, in response to detecting selection of the first selectable object, the electronic device performs an operation associated with the first selectable object. In some embodiments, while displaying the respective user interface element including the first selectable object (e.g., 904a) in FIG. 9A, the electronic device (e.g., 101) detects (1016b) selection of the first selectable object (e.g., 904a). In some embodiments, detecting selection of the first selectable object includes detecting, via an eye tracking device, that the gaze of the user is directed to the first selectable object and detecting, via a hand tracking device, that the user performs a respective gesture with their hand. In some embodiments, in response to detecting the selection of the first selectable object (e.g., 904a) (1016c), the electronic device (e.g., 101) displays (1016d) a representation of the first selectable object (e.g., 904a) (e.g., an object, user interface, content, etc. associated with the first selectable object) overlaid on the second respective portion of the respective user interface element, wherein the second respective portion of the respective user interface element is displayed with the respective visual characteristic having the second value, different from the first value. In some embodiments, in response to detecting selection of the first selectable object, the electronic device displays the representation of the first selectable object (e.g., an object, user interface, content, etc. associated with the first selectable object) without displaying the respective user interface element. In some embodiments, the electronic device displays the representation of the first selectable object (e.g., an object, user interface, content, etc. associated with the first selectable object) without displaying any other objects or user interfaces in the three-dimensional environment presented by the display generation component. For example, the electronic device displays the representation in a full-screen or immersive mode. In some embodiments, the user interface is a user interface for browsing images (e.g., a photos application) and the first selectable object is a representation of one of the images in the user interface. In some embodiments, in response to detecting selection of the representation of the image, the electronic device displays the image at a larger size and blurs at least a portion of the rest of the user interface for browsing images.

The above-described manner of displaying the representation of the first selectable object overlaid on the second respective portion of the respective user interface element with the visual characteristic having the second value provides an efficient way of reducing visual clutter while displaying the representation of the first selectable object, which reduces cognitive burden on the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective user interface element (e.g., 904a) includes a third respective portion surrounding the second respective portion (1018a). In some embodiments, the third respective portion is between the second respective portion and the first respective portion of the respective user interface element. In some embodiments, in response to detecting the selection of the first selectable object (e.g., 904*a*), the second respective portion of the respective user interface element (e.g., 904*a*) is displayed with the respective visual characteristic having the second value, and the third respective portion of the respective user interface element is displayed with the respective visual characteristic having a third value, in between the first value and the second value (1018*b*). In some embodiments, in response to detecting selection of the first selectable option, the electronic device displays the first portion of the respective user interface element with the respective visual characteristic having the first value. For example, in some embodiments, the electronic device applies a blur effect to the respective user interface element with increased blur applied to portions closest to the representation of the first selectable object (e.g., an object, user interface, content, etc. associated with the first selectable object) displayed in response to the selection of the first selectable object. In this example, the closer a portion of the respective user interface element is to the representation of the first selectable object (e.g., an object, user interface, content, etc. associated with the first selectable object), the more blurred that portion is. In this example, the electronic device optionally displays the first portion of the respective user interface element without the blur. In some embodiments, the user interface is a user interface for browsing images (e.g., a photos application) and the first selectable object is a representation of one of the images in the user interface. In some embodiments, in response to detecting selection of the representation of the image, the electronic device displays the image at a larger size and blurs at least a portion of the rest of the user interface for browsing images, with increased blur applied to portions of the user interface closest to the boundary of the image.

The above-described manner of displaying the second respective portion of the respective user interface element with the respective visual characteristic having the second value and the third respective portion of the respective user interface element with the third value provides an efficient way of reducing visual clutter near the representation of the first selectable option while maintaining legibility of one or more portions of the respective user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

Figure 11A:
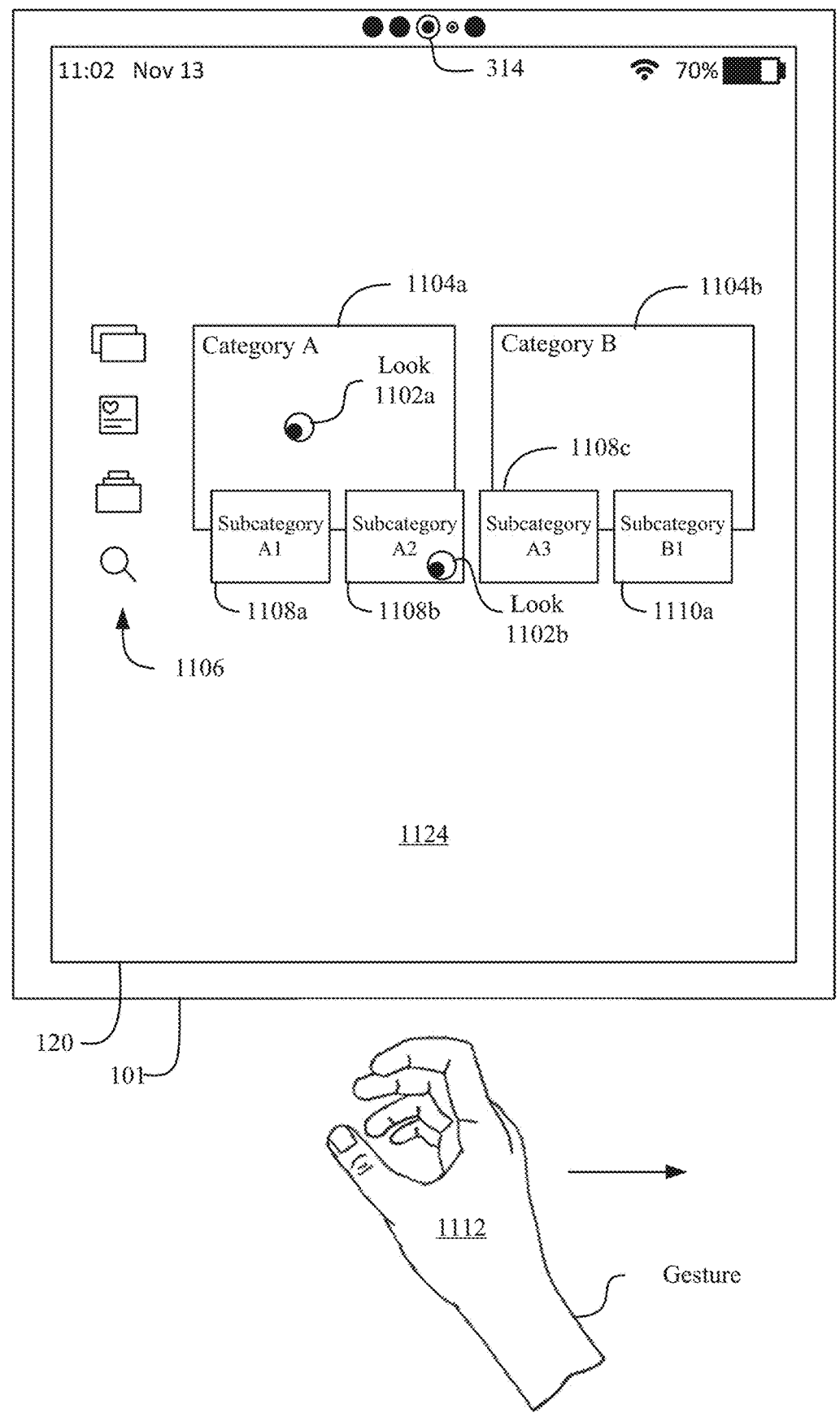
FIGS. 11A-11D illustrate examples of how an electronic device scrolls representations of categories and subcategories in a coordinated manner in accordance with some embodiments.

In some embodiments, such as in FIG. 11A, the respective user interface element includes a first plurality of representations (e.g., 1104*a*) corresponding to a plurality of categories (e.g., of objects, of content, of information, of user interfaces, etc.), and a second plurality of representations (e.g., 1108*a*-*c*) and (e.g., 1110*a*) corresponding to subcategories (e.g., of objects, of content, of information, of user interfaces, etc.) of the plurality of categories (1020*a*). In some embodiments, in response to detecting selection of a representation of a respective category, the electronic device presents content, objects, user interfaces, information, etc. and/or representations of subcategories associated with the respective category. In some embodiments, in response to detecting selection of a representation of a respective subcategory, the electronic device presents content, objects, user interfaces, information, etc. associated with the respective subcategory. For example, a photo browsing application includes representations of albums overlaid on representations of years. In some embodiments, in response to detecting selection of a representation of a year, the electronic device displays photos and/or albums created in the respective year. In some embodiments, in response to detecting selection of a representation of an album, the electronic device displays photos included in the album. In some embodiments, such as in FIG. 11A, while displaying the respective user interface element, the electronic device (e.g., 101) receives (1020*b*), via one or more input devices, a scrolling input. In some embodiments, in response to receiving the scrolling input (1020*c*), in accordance with a determination that the scrolling input is directed to the first plurality of representations (e.g., 1104*a*) (e.g., detecting, via the eye tracking device, that the gaze of the user is directed to the first plurality of representations), the electronic device (e.g., 101) scrolls through the first plurality of representations (e.g., 1104*a*) at a first rate in accordance with the scrolling input and scrolling through the second plurality of representations (e.g., 1108*a*-*c*) and (e.g., 1110*a*) at a second rate. In some embodiments, the first plurality of representations scrolls at a rate in proportion to a characteristic of the scrolling input (e.g., a speed of the scrolling input, a magnitude of movement of the scrolling input) and the second plurality of representations scroll in accordance with the rate at which the first representations scroll. For example, in response to scrolling the first representations to move by a first amount, the electronic device scrolls the second representations at a first speed to reveal a first set of second representations associated with a respective one of the first representations and in response to scrolling the first representations to move by a second amount, the electronic device scrolls the second representations at a second rate to reveal a second set of the second representations associated with the respective one of the first representations. For example, in a photo browsing application that includes representations of albums (e.g., subcategories) and years (e.g., categories), the electronic device detects an input to scroll the representations of years and, in response to the input, scrolls the representations of the years in accordance with the scrolling input and scrolls the representations of albums in accordance with the rate at which the years scroll. For example, if the electronic device scrolls to a first year, the electronic device scrolls the albums to reveal albums from the first year and if the electronic device scrolls to a second year, the electronic device scrolls the albums to reveal albums from the second year. In some embodiments, in response to receiving the scrolling input (1020*c*), in accordance with a determination that the scrolling input is directed to the second plurality of representations (e.g., 1108*a*-*c*) and (e.g., 1110*a*), such as in FIG. 11A (e.g., detecting, via the eye tracking device, that the gaze of the user is directed to the first plurality of representations), the electronic device (e.g., 101) scrolls (1020*e*) through the second plurality of representations (e.g., 1108*a*-*c*) and (e.g., 1110*a*) at a third rate, different from the second rate, in accordance with the scrolling input. In some embodiments, in response to detecting an input to scroll the second plurality of representations, the electronic device scrolls the second plurality of representations at a rate in proportion to a characteristic of the scrolling input (e.g., a speed of the scrolling input, a magnitude of movement of the scrolling input). In some embodiments, the first plurality of representations scrolls at a rate related to the rate at which the second representations are scrolled. In some embodiments, the electronic device does not scroll the first representations in response to the input to scroll the second representations. For example, in a photo browsing application that includes representations of albums (e.g., subcategories) and years (e.g., categories), the electronic device detects an input to scroll the representations of albums and, in response to the input, scrolls the representations of the albums in accordance with the scrolling input and scrolls the representations of years in accordance with the rate at which the albums scroll. For example, if the electronic device scrolls to one or more albums associated with a first year, the electronic device scrolls the years to reveal a representation of the first year and if the electronic device scrolls to one or more albums associated with a second year, the electronic device scrolls the years to reveal a representation of the second year.

The above-described manner of scrolling the second representations at different rates depending on whether the scrolling input is directed to the first representations or the second representations provides an efficient way of presenting subcategories corresponding to the categories that are visible while scrolling the categories and a way of scrolling the subcategories independent from the categories, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11A, the respective user interface element includes a first plurality of representations (e.g., 1104a) corresponding to a plurality of categories (1022a) (e.g., of content, objects, user interfaces, etc.). In some embodiments, in response to detecting selection of a representation of a respective category, the electronic device presents content, objects, user interfaces, information, etc. and/or representations of subcategories associated with the respective category. For example, in a photo browsing application, the categories are years that each include photos and albums from a respective year and the subcategories are albums (e.g., each album is associated with a respective year). As another example, in a video content browsing application, the categories are collections of content items (e.g., including a plurality of series of episodic content) and the subcategories are series of episodic content. In some embodiments, such as in FIG. 11A, the respective user interface element includes a second plurality of representations (e.g., 1108a-c) and (e.g., 1110a) that correspond to subcategories of the plurality of categories (1022b). In some embodiments, in response to detecting selection of a representation of a respective subcategory, the electronic device presents content, objects, user interfaces, information, etc. associated with the respective subcategory. For example, in a photo browsing application, the categories are years that each include photos and albums from a respective year and the subcategories are albums (e.g., each album is associated with a respective year). As another example, in a video content browsing application, the categories are collections of content items (e.g., including a plurality of series of episodic content) and the subcategories are series of episodic content. In some embodiments, the second plurality of representations (e.g., 1108a-c) and (e.g., 1110a) are overlaid on the first plurality of representations (e.g., 1104a-b) (1022c). In some embodiments, a portion of the representations of categories are visible while the electronic device displays the representations of subcategories overlaid on the representations of categories. In some embodiments, the representations of subcategories are overlaid on a respective portion of each of the representations of the categories (e.g., along the bottom edge of the representations of the categories). In some embodiments, the representations of the categories and the representations of the subcategories are arranged along the same axis (e.g., the representations of categories and the representations of subcategories are scrollable in the same dimension, such as being horizontally scrollable). In some embodiments, the representations of subcategories of a respective category are contained within the boundaries of the representation of the respective category (e.g., the representations of the subcategories do not extend horizontally past the horizontal boundaries of the representation of the category to which the subcategories belong). In some embodiments, the representations of subcategories of a respective category extend past the boundary of the respective category (e.g., the representations of the subcategories extend horizontally past the horizontal boundaries of the representation of the category to which the subcategories belong). The above-described manner of displaying the representations of subcategories overlaid on the representations of categories provides an efficient way of indicating the category with which each subcategory is associated, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

FIGS. 11A-11D illustrate examples of how an electronic device scrolls representations of categories and subcategories in a coordinated manner in accordance with some embodiments.

FIG. 11A illustrates electronic device 101 displaying, via a display generation component 120, a three-dimensional environment 1124 on a user interface. It should be appreciated, however, that implementing one or more of the techniques disclosed herein with reference to FIGS. 11A-11D in a user interface other than a three-dimensional environment is possible and does not depart from the scope of the disclosure. As described above with reference to FIGS. 1-6, the electronic device 101 optionally includes a display generation component 120 (e.g., a touch screen) and a plurality of image sensors 314. The image sensors 314 optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user). As shown in FIG. 11A, the user interface further includes a navigation bar 1106. In some embodiments, navigation bar 1106 behaves similarly to the control elements described above with reference to FIGS. 9A-10K.

FIG. 11A illustrates the electronic device 101 displaying a user interface in three-dimensional environment 1124. The user interface includes a representation 1104a of category A, a representation 1104b of category B, representations 1108a-1108c of subcategories of category A 1104a, and representation 1110a of a subcategory of category B 1104b. As shown in FIG. 11A, the representations 1108a-c and 1110a of subcategories are displayed at least partially overlaid on the representations 1104a-b of categories. In some embodiments, the categories are categories of content, applications, settings, and the like and are selectable to present user interfaces related to the content, applications, settings, etc. of the selected category or subcategory. For example, in a photo browsing application, the categories correspond to years and include photos taken in the respective years and the subcategories correspond to photo albums, each photo album associated with one or more years (e.g., corresponding to the categories). In this example, in response to detecting selection of one of the representations 1104a or 1104b of the years (e.g., categories), the electronic device 101 displays photos and/or representations of alums (e.g., subcategories) in the selected year (e.g., category). As another example, in response to detecting selection of one of the representations 1108a-c or 1110a of albums (e.g., categories), the electronic device 101 displays the photos in the album (e.g., subcategory). In some embodiments, the electronic device 101 detects selection by detecting a predetermined gesture (e.g., the pinch gesture) with the user's hand while the gaze of the user is on a respective selectable element. In some embodiments, the representations 1104a and 1104b of the categories and/or the representations 1108a-c and 1110a of subcategories are card user interface elements that are two-dimensional and scrollable.

In some embodiments, the representations 1104a and 1104b of categories and representations 1108a-c and 1110a of subcategories are horizontally scrollable to reveal additional categories and/or subcategories not illustrated in FIG. 11A based at least in part on a gaze of the user of device 101. For example, in some embodiments, the electronic device 101 detects the gaze 1102a of the user directed to the representation 1104a of category A (or the representation 1104b of category B) while detecting the user moving their hand 1112 while performing a predetermined gesture. In some embodiments, the predetermined gesture includes touching a thumb to another finger (e.g., index, middle, ring, little finger) on the same hand as the thumb (e.g., a pinch gesture). In some embodiments, in response to detecting the movement of the hand 1112 while performing the gesture while the gaze 1102a of the user is directed to representation 1104a of category A, the electronic device 101 scrolls the representations 1104a and 1104b of the categories in accordance with the movement of the user's hand 1112. For example, in response to detecting the user moving their hand 1112 to the right, as shown in FIG. 11A, the electronic device 101 scrolls the representations 1104a and 1104b to the right. In some embodiments, the electronic device 101 ceases scrolling the representations 1104a and 1104b of the categories in response to movement of the user's hand in response to detecting the user ceasing to perform the predetermined gesture (e.g., moving the thumb and the finger apart from each other).

In some embodiments, while scrolling the representations 1104a and 1104b of categories in response to the input described above, the electronic device 101 scrolls the representations 1108a-c and 1110a of subcategories in accordance with the scrolling of the representations 1104a-b of the categories. In some embodiments, the rate at which the representations 1108a-c and 1110a of subcategories scroll is proportional to the rate at which the representations 1104a-b of categories scroll and the direction with which the representations 1108a-c and 1110a of subcategories scroll is the same as the direction in which the representations 1104a-b of categories scroll. In some embodiments, the representations 1108a-c and 1110a of subcategories scroll at a faster rate than the representations 1104a-b of the categories. In some embodiments, the representations 1108a-c and 1110a of the subcategories scroll in accordance with the representations 1104a-b of categories currently displayed by electronic device 101. For example, once the representations 1104a-b of categories scroll to reveal a third category (not shown in FIG. 11A), the representations 1108a-c and 1110a of subcategories have also scrolled (e.g., at an appropriate rate) to reveal a representation of at least on subcategory of the third category. As another example, in response to scrolling the representations of categories 1104a-b so that the representation of category B 1104b is left-aligned in the user interface, the electronic device 101 would scroll the representations 1108a-c and 1110a so that the first subcategory of category B 1104b, subcategory B1 1110a, is also left-aligned in the user interface overlaid on the representation 1104b of category B.

Likewise, in some embodiments, the electronic device 101 detects the gaze 1102b of the user on representation 1108b of subcategory A2 while detecting movement of the user's hand 1112 while the user performs the predetermined gesture with their hand 1112. In some embodiments, in response to detecting the movement of the hand 1112 while the user performs the gesture and looks at representation 1108b (or another representation 1108a, 1108c, or 1110a of subcategories), the electronic device 101 scrolls the representations of subcategories 1108a-c and 1110a. In some embodiments, while scrolling the representations of subcategories 1108a-c and 1110a, the electronic device 101 forgoes scrolling the representations 1104a-b of categories. In some embodiments, the electronic device 101 scrolls the representations 1104a-b of categories at a rate proportional to and in the same direction as the scrolling of the representations 1108a-c and 1110a of subcategories. In some embodiments, the representations 1104a-b of the categories scroll at a slower rate than the representations 1108a-c and 1110a of the subcategories. In some embodiments, the representations 1104a-b of the categories scroll in accordance with the representations 1108a-c and 1110a of subcategories currently displayed by electronic device 101. For example, once the representations 1108a-c and 1110a of subcategories scroll to reveal a subcategory of a third category (not shown in FIG. 11A), the representations 1104a-b of categories have scrolled (e.g., at an appropriate rate) to reveal a representation of the third category.

Thus, FIG. 11A illustrates a user interface that includes representations 1104a-b of categories and representations 1108a-c and 1110a of subcategories that the electronic device 101 scrolls in a coordinated manner.

Figure 11B:
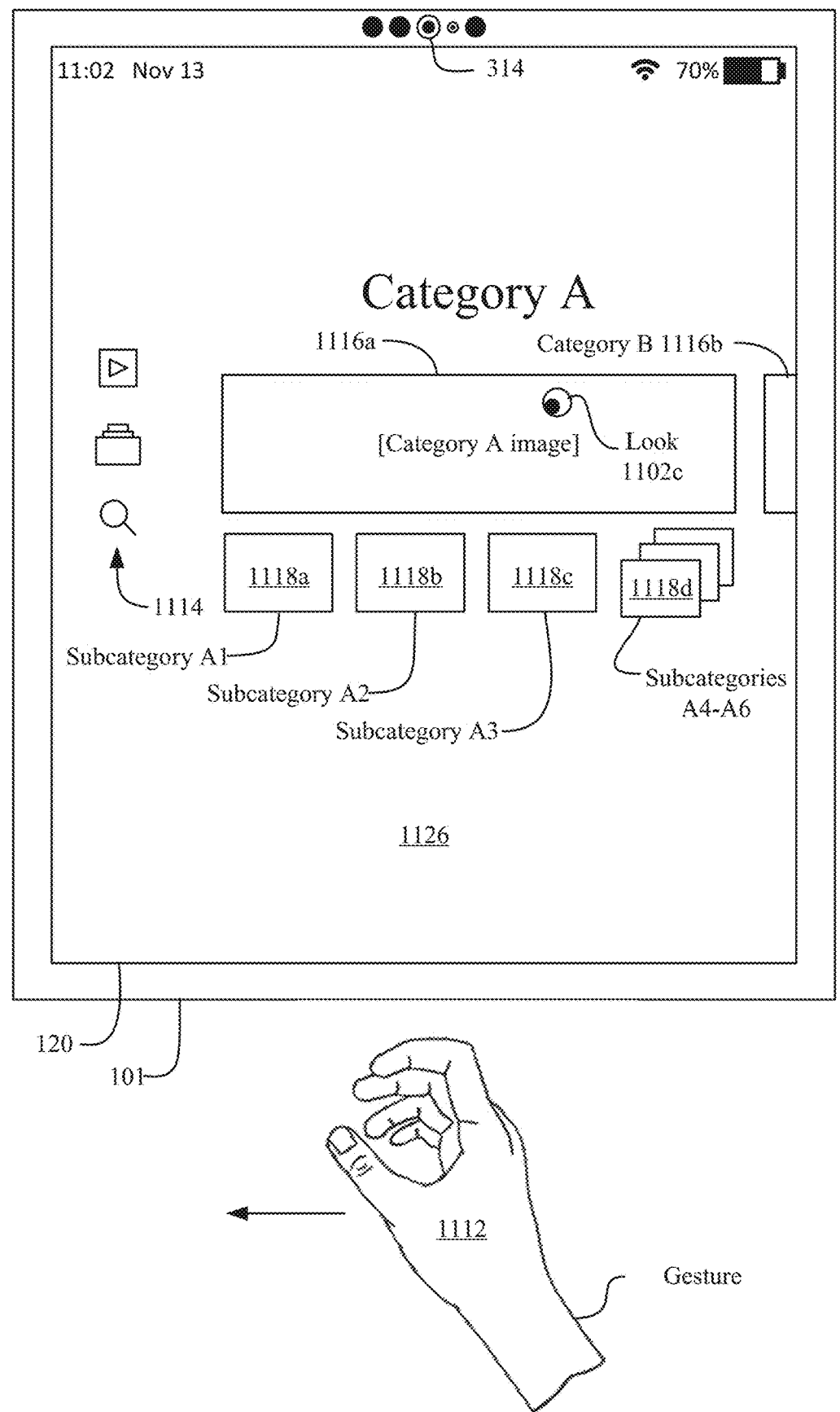

FIG. 11B illustrates the electronic device 101 displaying another three-dimensional environment 1126 including a user interface with representations 1116a and 1116b of categories and representations 1118a-d of subcategories of category A 1116a. It should be understood that it is possible for an electronic device 101 to implement one or more of the techniques described with reference to FIGS. 11B-11D in a two-dimensional user interface without departing from the scope of the disclosure. In some embodiments, the categories and subcategories are categories and subcategories of content, settings, applications, and the like. For example, the user interface illustrated in FIG. 11B is a video content browsing user interface including categories of series of episodic content (e.g., the series of episodic content are subcategories of the categories and include episodes of video content). Example categories include new content, popular content, recommendations based on the user's previous content consumption history, curated collections of content, and the like. In some embodiments, the representation 1116a of category A includes an image associated with category A without being associated with a particular subcategory of category A and is selectable to display a user interface associated with category A. In some embodiments, the representation 1116a of category A corresponds to one of the subcategories of category A (e.g., a subcategory not corresponding to representations 1118a-d) and is selectable to display a user interface associated with the subcategory of category A. Referring again to FIG. 11B, in some embodiments, the user interface further includes a navigation bar 1114 that behaves in a manner similar to the control elements described above with reference to FIGS. 9A-10K.

Figure 11C:
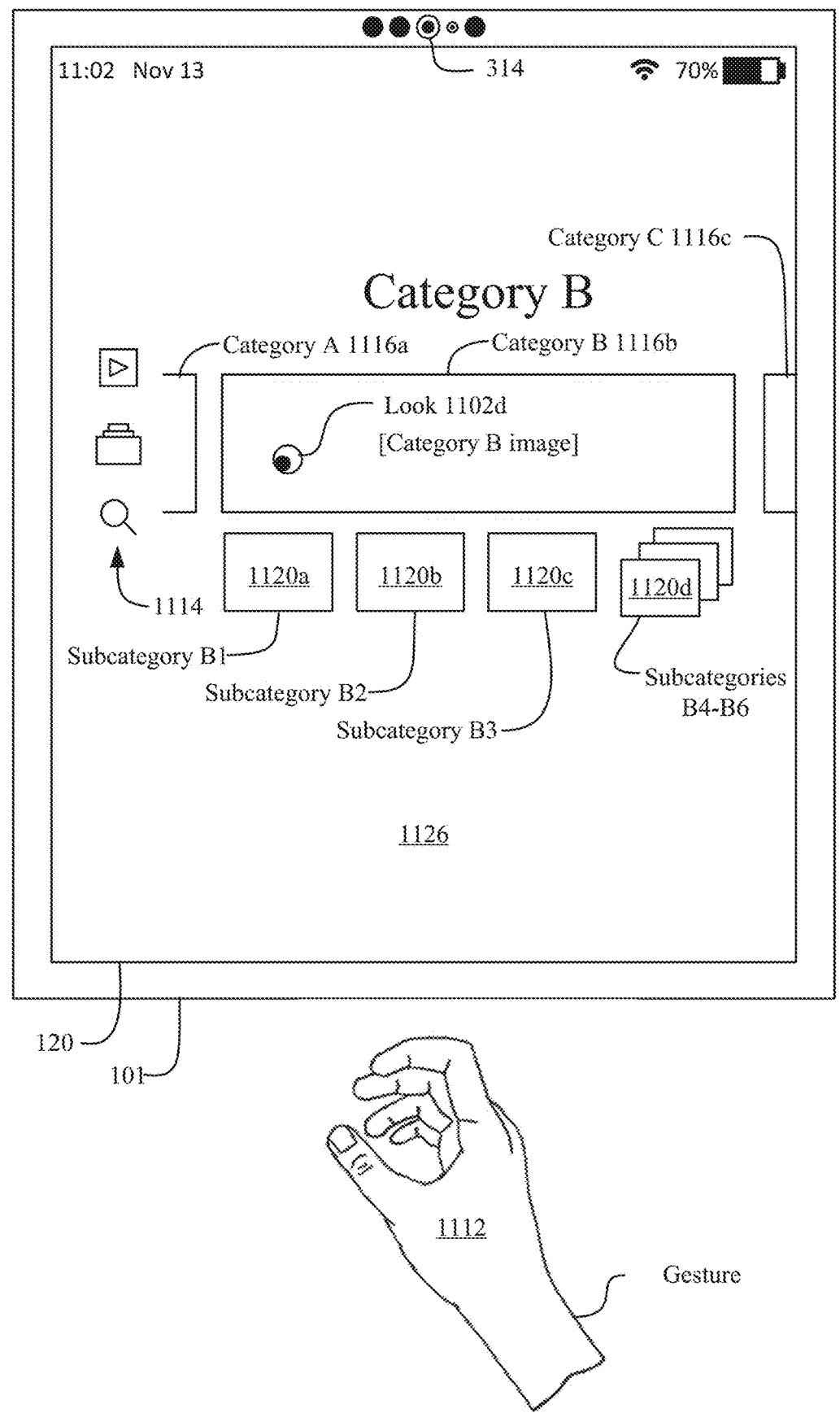

In FIG. 11B, the electronic device 101 detects the gaze 1102c of the user directed to the representation 1116a of category A and that the user moves their hand 1112 while performing a predetermined gesture. In some embodiments, the predetermined gesture includes touching a thumb to another finger (e.g., index, middle, ring, little finger) on the same hand as the thumb (e.g., a pinch gesture). In response to detecting the user's gaze 1102c on the representation 1116a of category A while the user moves their hand 1112 while maintaining the pinch gesture, the electronic device 101 scrolls the representations of categories to reveal the representation 1116b of category B, as shown in FIG. 11C. It should be understood that, in some embodiments, the representations 1118a-d of subcategories are scrollable in a similar manner. For example, the electronic device 101 scrolls the representations 1118a-d of subcategories in response to detecting the gaze of the user directed to one of the representations 1118a-d while detecting the user's hand 1112 moving while maintaining the pinch gesture. In some embodiments, the electronic device 101 scrolls the representations 1118a-d of subcategories without scrolling the representations 1116a-b of categories.

FIG. 11C illustrates the user interface in response to the input detected in FIG. 11B. As shown in FIG. 11C, the electronic device 101 has scrolled the representations 1116a-c of categories to reveal the full representation 1116b of category B and a portion of a representation 1116c of category C, and to display only a portion of the representation 1116a of category A. In response to scrolling the representations of categories to the representation 1116b of category B, the electronic device 101 ceases display of the representations 1118a-d of subcategories of category A illustrated in FIG. 11B, and displays representations 1120a-d of subcategories of category B. Thus, as shown in FIGS. 11B-11C, in some embodiments, in response to detecting scrolling of the representations 1116a-1116c of the categories, the electronic device 101 also scrolls the representations 1118a-d and 1120a-d of subcategories to display representations 11120a-d of subcategories corresponding to the representation 1116b of a category revealed by scrolling the categories.

As previously discussed, in some embodiments, representations 1116, 1118 and/or 1120 are selectable to initiate display of content related to the selected representation. For example, as shown in FIG. 11C, the electronic device 101 detects the gaze 1102d of the user on the representation 1116b of category B while detecting the user performing the pinch gesture with their hand 1112. In response to detecting the input, the electronic device 101 displays the user interface illustrated in FIG. 11D that is associated with category B. In some embodiments, the electronic device 101 displays the user interface illustrated in FIG. 11D in response to detecting the gaze 1102d of the user on representation 1116b for a predetermined threshold time (e.g., 0.2, 0.5, 1, 2, etc. seconds) without detecting the user performing the pinch gesture with their hand 1112. In some embodiments, in response to detecting selection of a representation of a different category (e.g., representation 1116a or 1116c), the electronic device 101 displays a user interface similar to the user interface illustrated in FIG. 11D that corresponds to the selected category.

Figure 11D:
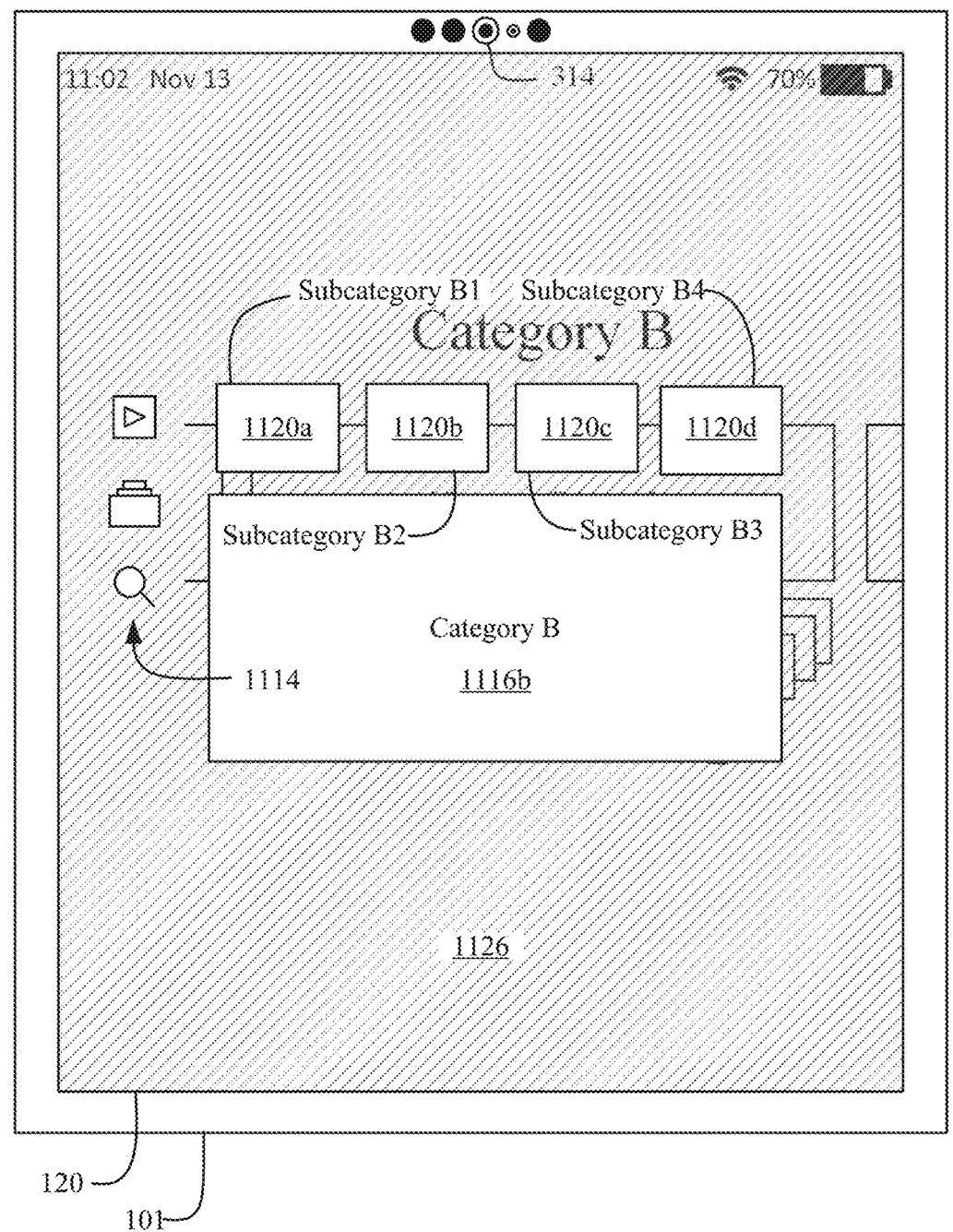
Figure 12A:
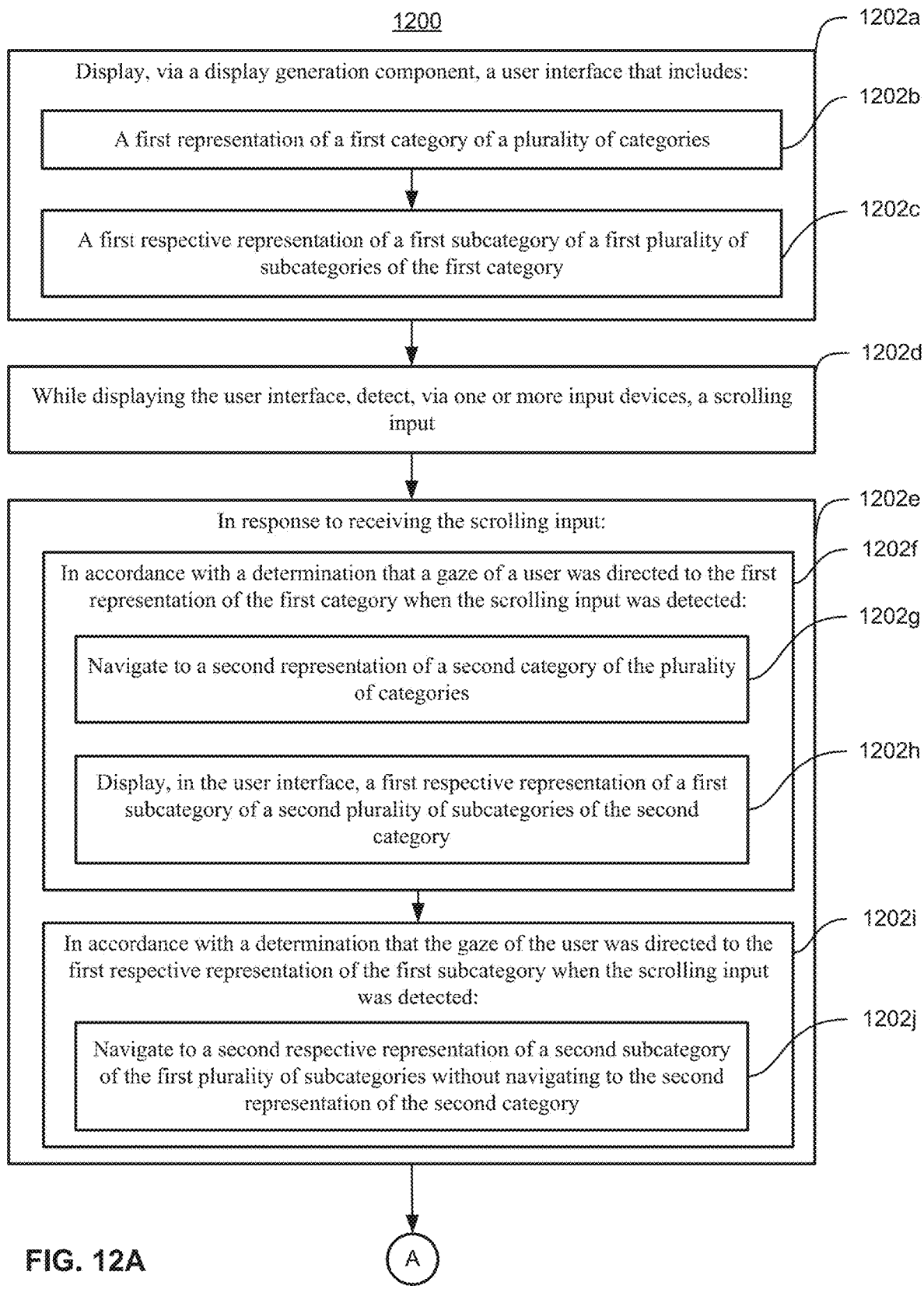
FIGS. 12A-12J is a flowchart illustrating a method of scrolling representations of categories and subcategories in a coordinated manner in accordance with some embodiments.
Figure 12B:
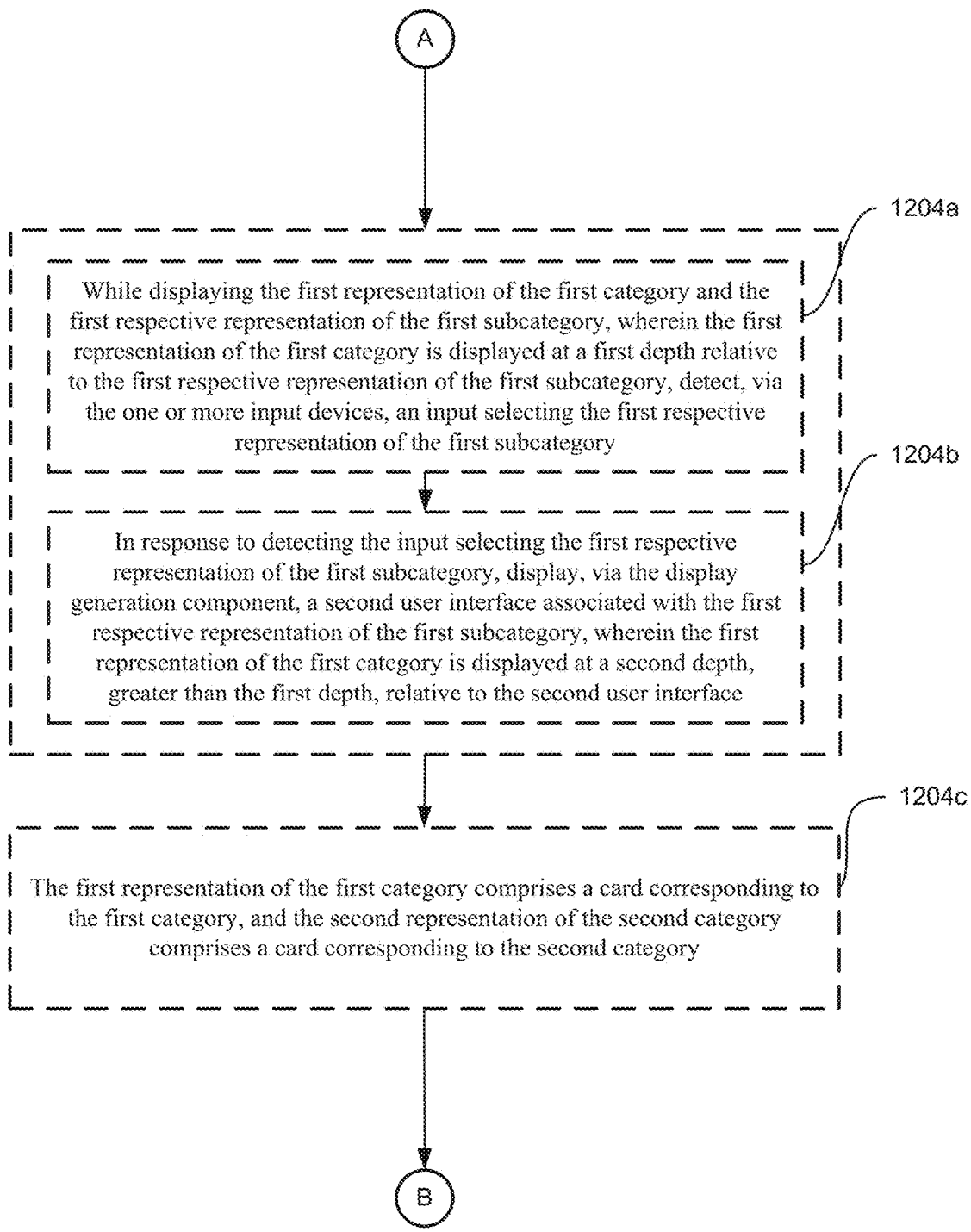
Figure 12C:
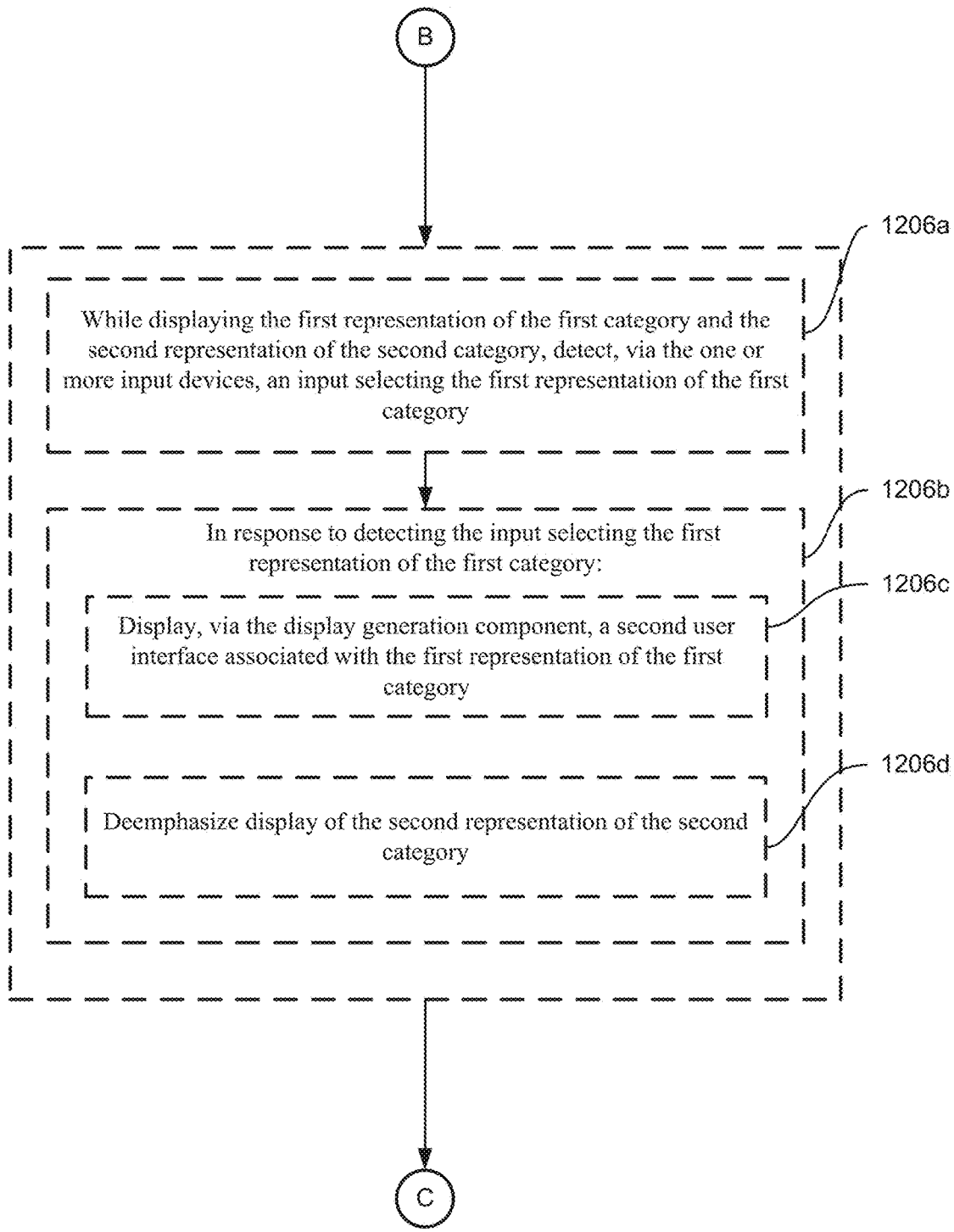
Figure 12D:
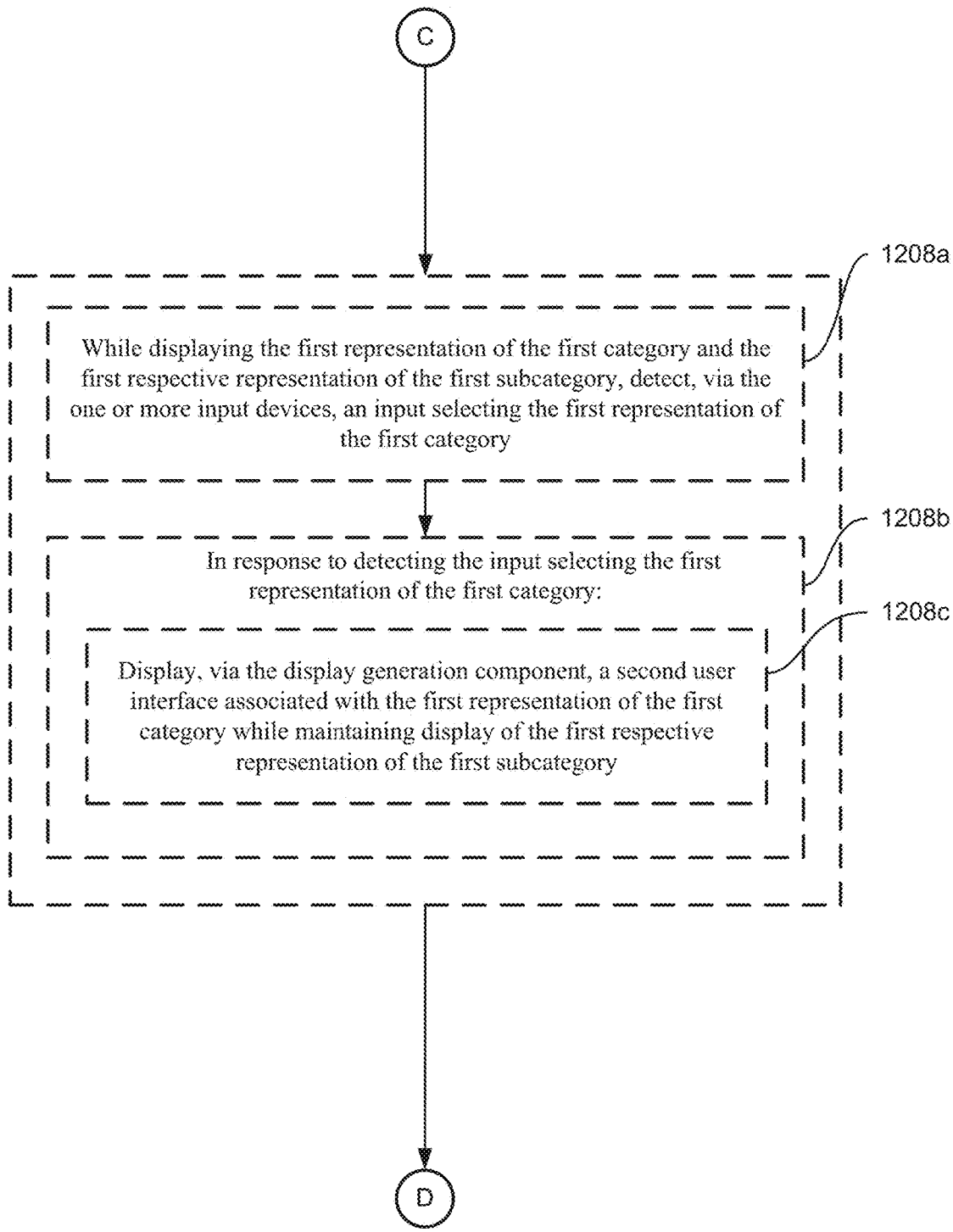
Figure 12E:
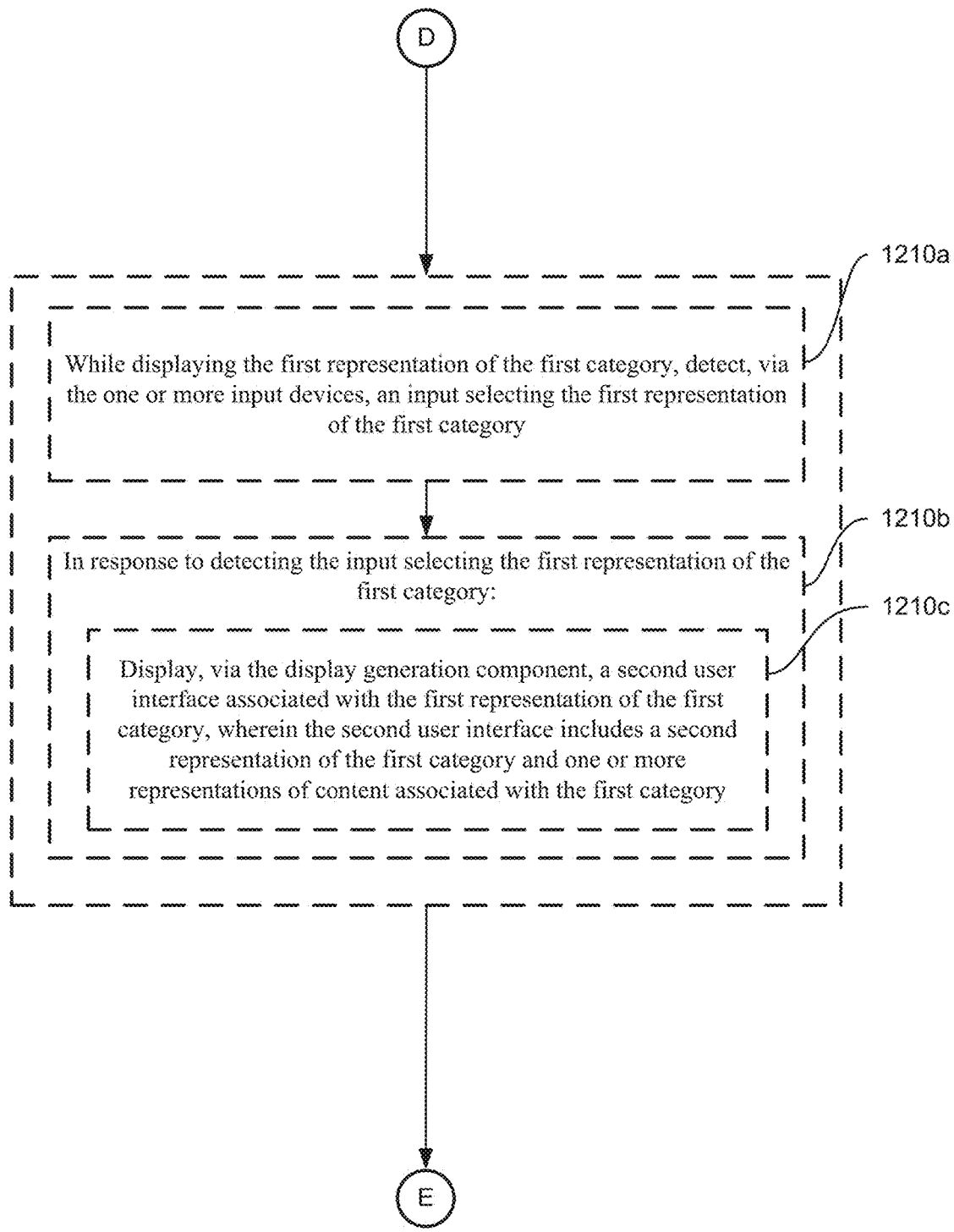
Figure 12F:
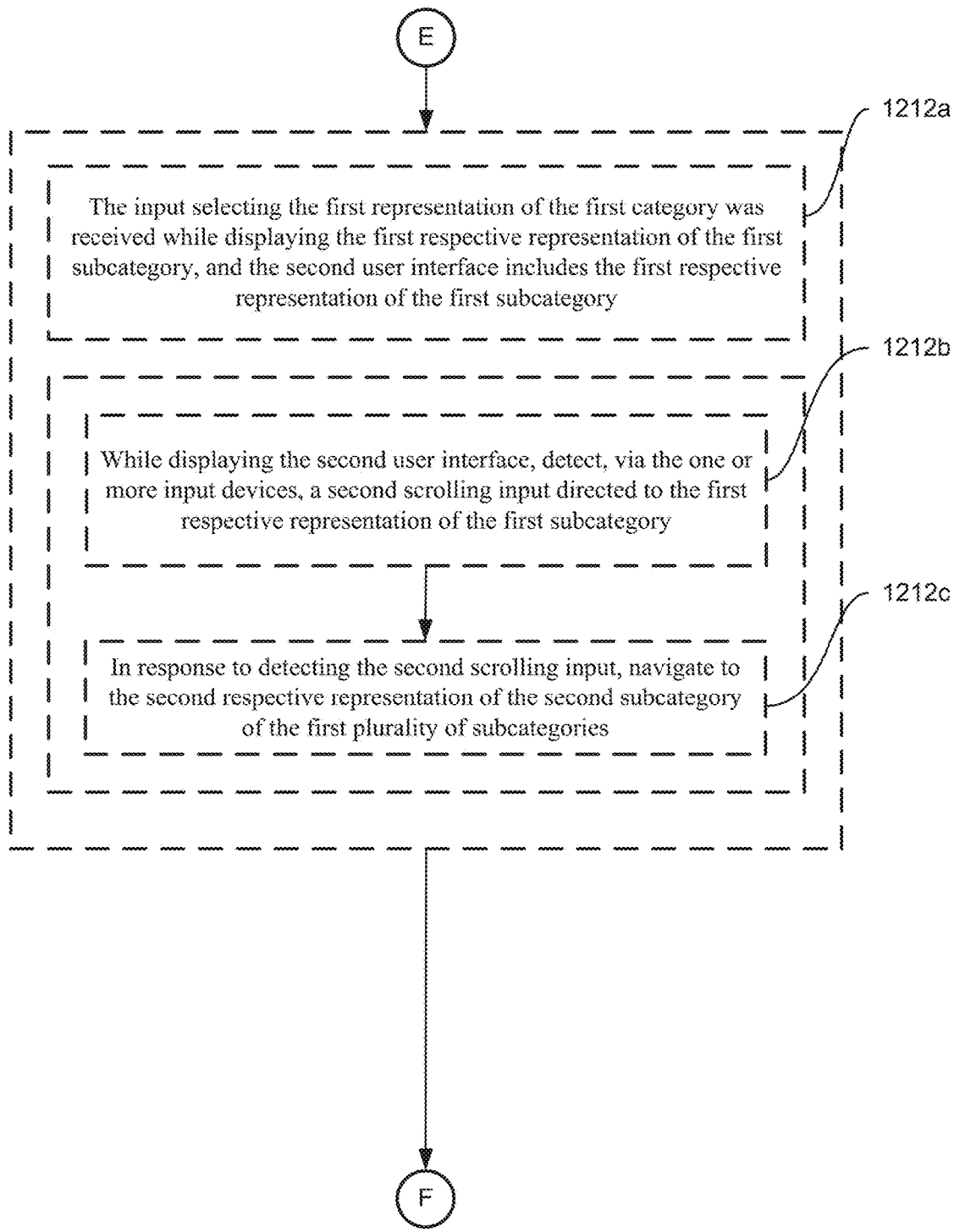
Figure 12G:
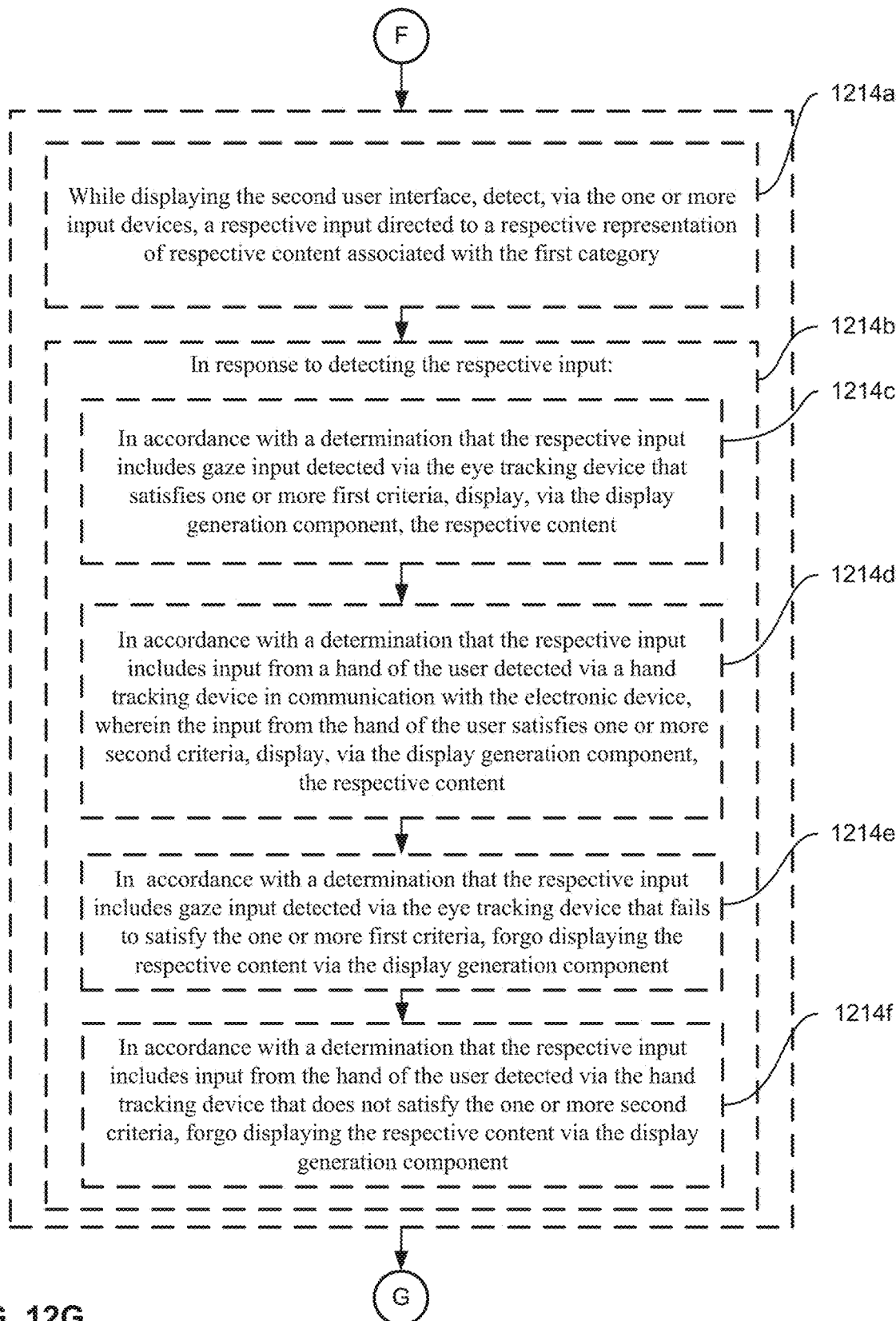
Figure 12H:
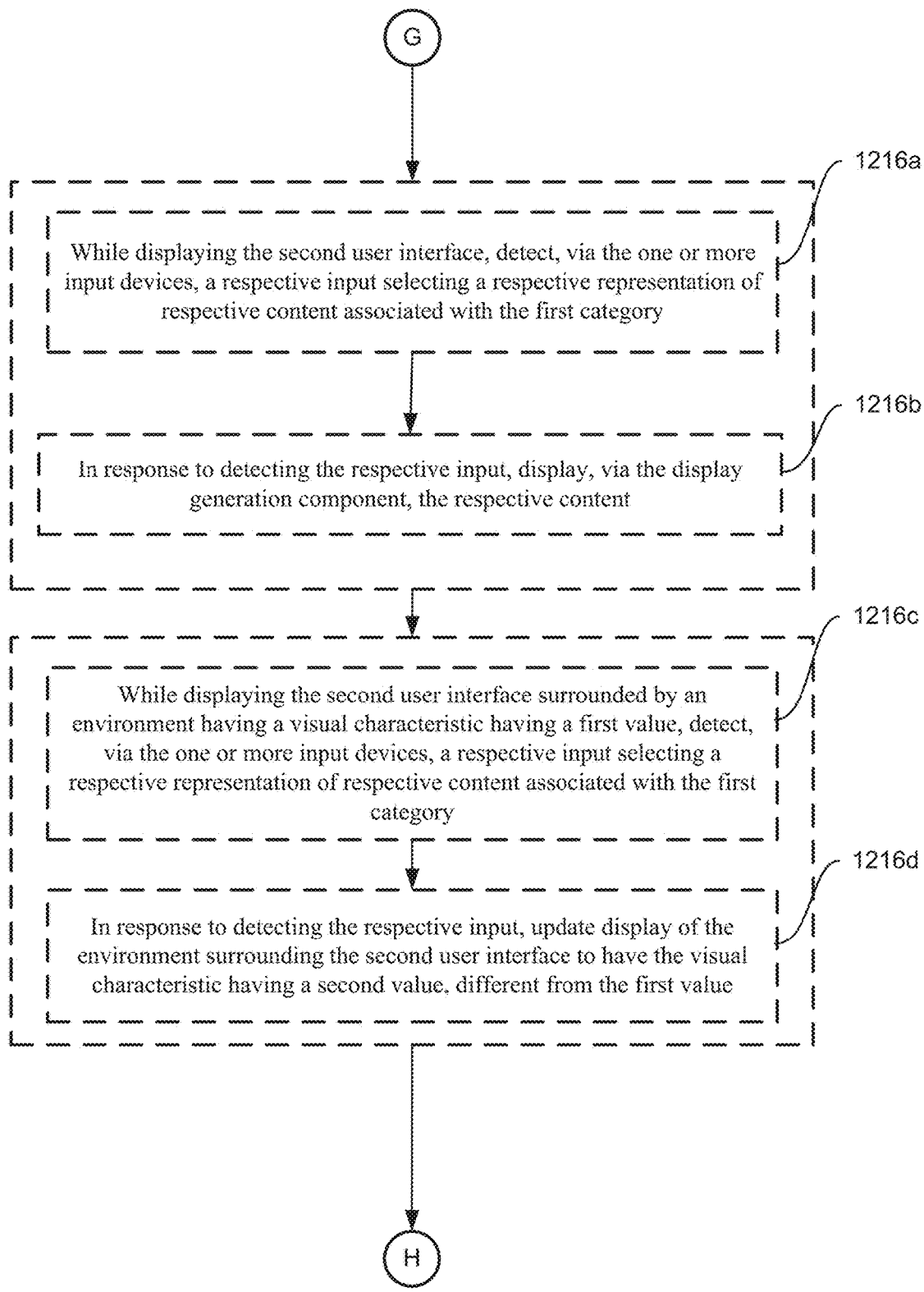
Figure 12I:
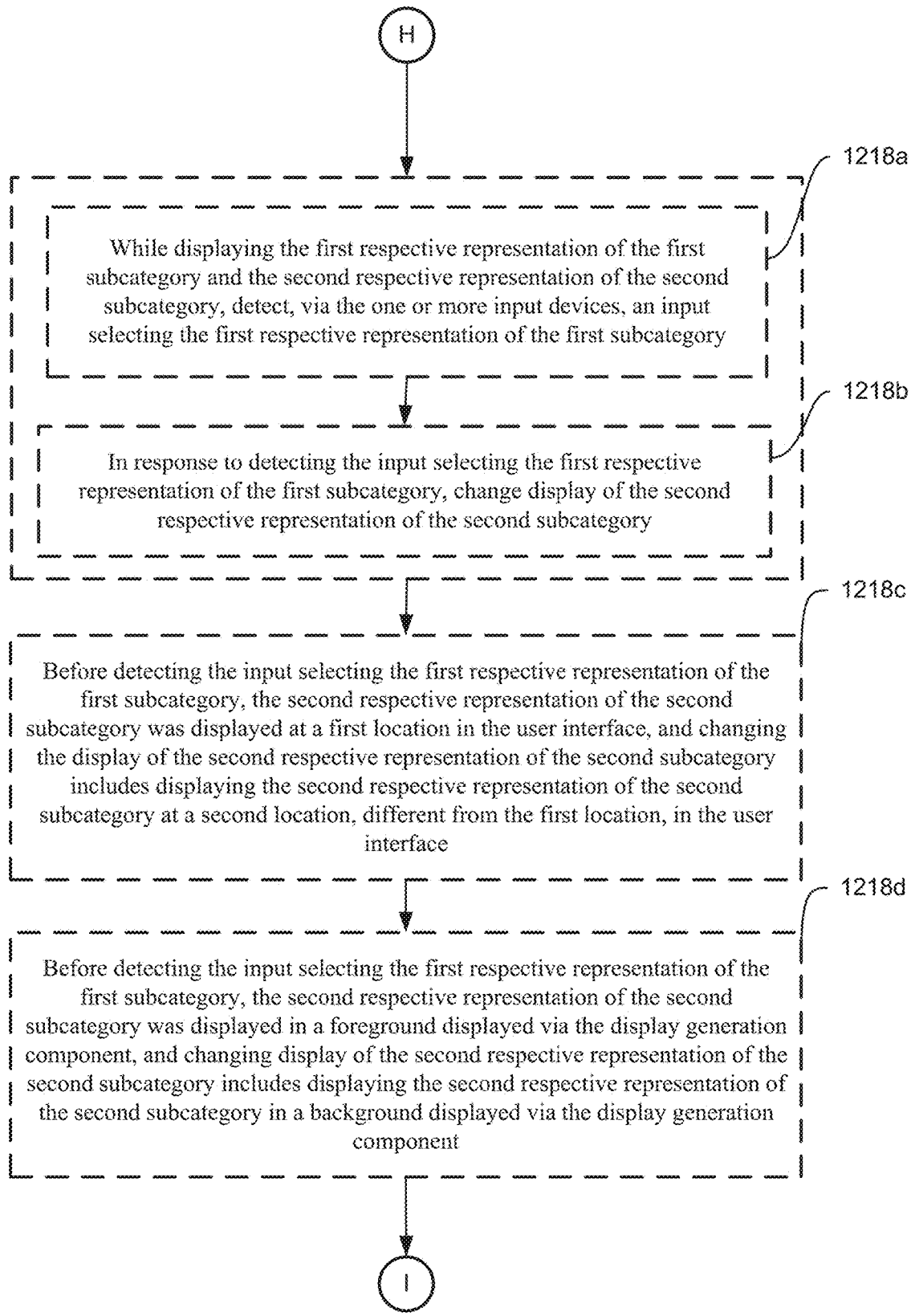
Figure 12J:
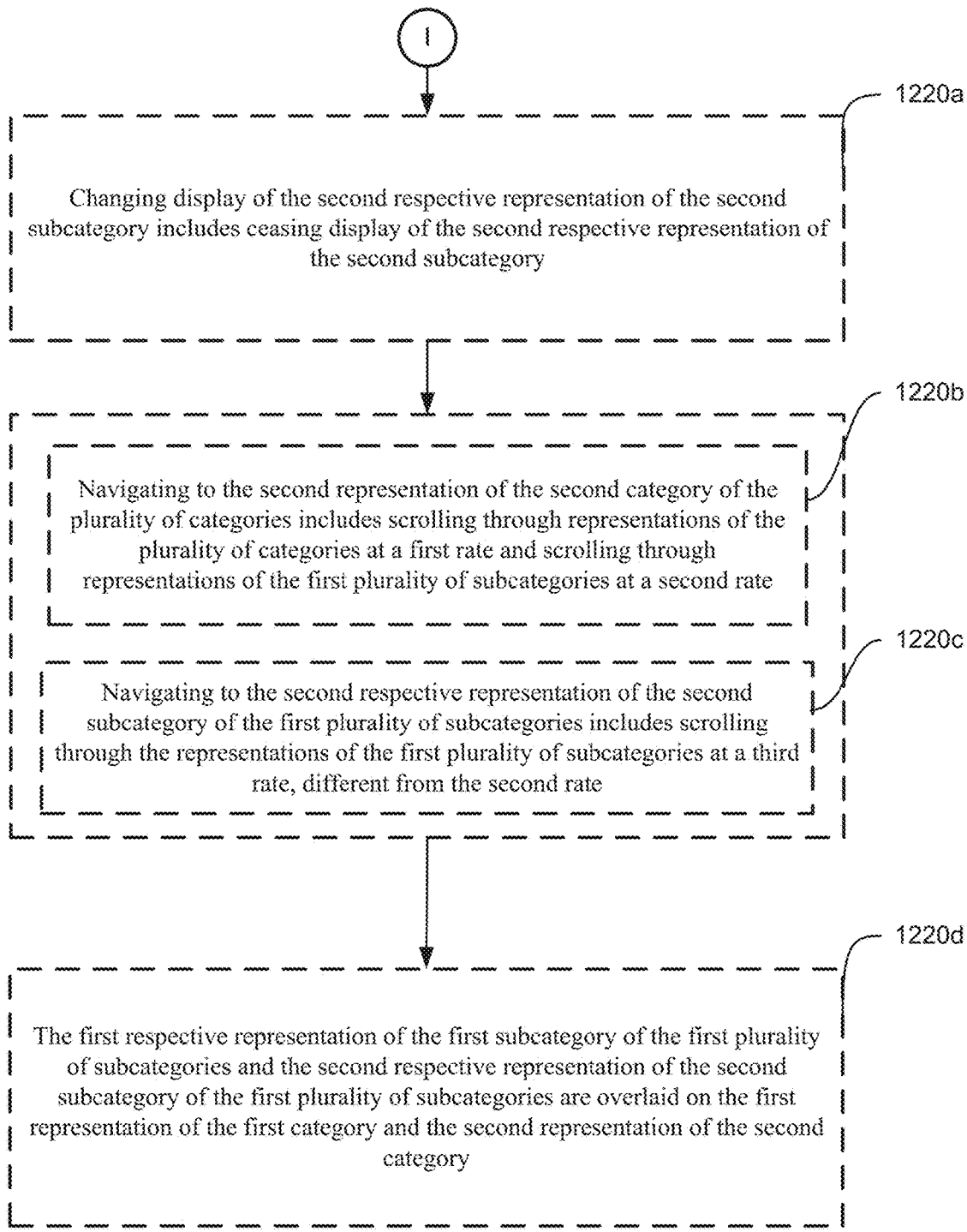

FIG. 11D illustrates a user interface associated with category B that is displayed in response to detecting selection of the input illustrated in FIG. 11C. In some embodiments, the user interface includes the representation 1116b of category B and representations 1120a-d of the subcategories of category B. In some embodiments, the representations 1120a-d of the subcategories of category B are horizontally scrollable in response to an input that includes detecting the user's gaze and detecting motion of the user's hand while performing a hand gesture (e.g., the pinch gesture), similar to as previously described. In some embodiments, the representations 1120b-d are displayed in the background of the user interface illustrated in FIG. 11D in the way the user interface of FIG. 11C is in the background in FIG. 11D. In some embodiments, the electronic device 101 does not display the representations of the subcategories 1120a-d in the user interface illustrated in FIG. 11D.

As described above, in some embodiments, the representation 1116b of category B is a representation of the category that is not associated with a particular subcategory of category B. In some embodiments, representation 1116b includes content (e.g., video content), an image (e.g., photos, videos), or a user interface. In some embodiments, the representation 1116b of category B 1116b is a representation of one of the subcategories of category B. For example, in a video content browsing application, the representation 1116b of category B is associated with a series of episodic content (e.g., one of the subcategories) in category B.

As shown in FIG. 11D, the electronic device 101 displays the user interface associated with category B overlaid on the user interface illustrated in FIG. 11C. In FIG. 11D, the user interface illustrated in FIG. 11C is blurred and/or darkened. In some embodiments, the contents of the user interface in FIG. 11C (e.g., including representation 1116a of category A and representation 1116b of category B) is visually separated from the representation 1116b of category B and the representations 1120a-d of the subcategories of category B in the z direction (e.g., in the direction towards the viewpoint shown via display generation component 120). For example, when transitioning from displaying the user interface in FIG. 11C to the user interface in FIG. 11D, the electronic device 101 moves the contents of the user interface in FIG. 11C away from the viewpoint of the user in the three-dimensional environment 1126 and/or moves the representation 1116b of category B and the representations 1120a-d of the subcategories of category B towards the viewpoint of the user in the three-dimensional environment 1126. In some embodiments, the viewpoint of the user in the three-dimensional environment 1126 is a location and orientation associated with the user of electronic device 101 in the three-dimensional environment 1126. The electronic device 101 optionally displays the three-dimensional environment 1126 from of the viewpoint of the user.

As described above, in some embodiments, the representation 1116b of category B is associated with content (e.g., video content, audio content). In some embodiments, in response to detecting selection of an option included in representation 1116b (or in response to detecting selection of representation 1116b itself), the electronic device 101 plays the content associated with the option (or with representation 1116b itself), such as displaying the content via display generation component 120. In some embodiments, the electronic device 101 detects selection based on gaze and/or a hand gesture as described above with reference to FIGS. 7A-8F. In some embodiments, while presenting video content in response to selection of an option included in representation 1116b or selection of representation 1116b itself, the electronic device 101 increases the blurring and darkening of portions of three-dimensional environment 1126 other than the content and/or introduces an atmospheric lighting effect, such as a spotlight on the content, similar to the techniques described above with reference to FIG. 7C.

In some embodiments, the electronic device 101 displays a user interface similar to the user interface illustrated in FIG. 11D that is associated with a respective subcategory of a category in response to detecting selection (e.g., via gaze or hand gesture) of a representation of a subcategory. For example, in response to detecting selection of representation 1120a of subcategory B1 in FIG. 11C or 11D, the electronic device 101 displays a user interface similar to the user interface illustrated in FIG. 11D. In some embodiments, the user interface includes a representation of subcategory B1 in place of the representation 1116b of category B in FIG. 11D. In some embodiments, the representation of subcategory B1 in the user interface associated with subcategory B1 includes selectable options that, when selected, cause the electronic device 101 to initiate playback of content associated with subcategory B1 (or the representation of subcategory B1 is selectable to play the content) in a manner similar to the manner described above. In some embodiments, the user interface associated with subcategory B1 includes representations 1120b-d of the other subcategories in category B. In some embodiments, the representations 1120b-d are displayed at the locations illustrated in FIG. 11D. In some embodiments, the representations 1120b-d are displayed in the background of the user interface illustrated in FIG. 11D in the way the user interface of FIG. 11C is in the background in FIG. 11D. In some embodiments, the electronic device 101 does not display the representations of the other subcategories of category B in the user interface associated with subcategory B1.

Thus, as described above with reference to FIGS. 11A-11D, in some embodiments, the electronic device 101 displays representations of categories and subcategories. The electronic device 101 scrolls the representations of categories and subcategories in a coordinated manner in some embodiments. The electronic device updates display of representations of the categories and subcategories while displaying user interfaces associated with the respective categories and subcategories in some embodiments.

FIGS. 12A-12J is a flowchart illustrating a method of scrolling representations of categories and subcategories in a coordinated manner in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, such as in FIG. 11A, method 1200 is performed at an electronic device (e.g., 101) in communication with a display generation component 120 and one or more input devices including an eye tracking device (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc.

In some embodiments, such as in FIG. 11A, the electronic device (e.g., 101) displays (1202a), via the display generation component, a user interface that includes a first representation (e.g., 1104a) of a first category of a plurality of categories (1202b). In some embodiments, the representations of categories are optionally associated with a plurality of objects (e.g., files, applications, etc.) that fit into or are included in (e.g., are part of) the respective categories. For example, a plurality of photos taken in 2019 are included in a 2019 category. In some embodiments, the objects included in each category are included in subcategories of the category. For example, a plurality of collections of photos taken in 2019 are subcategories of the 2019 category, and optionally can include photos belonging to their respective subcategories and the 2019 category. In some embodiments, in response to detecting selection of a representation of a category, the electronic device displays representations of subcategories within the category and/or representations of the objects included in the category. In some embodiments, the user interface enables the user to browse the categories to navigate a collection of content. In some embodiments, the user interface is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.).

In some embodiments, such as in FIG. 11A, the electronic device (e.g., 101) displays (1202a), via the display generation component, a user interface that includes, a first respective representation (e.g., 1108a) of a first subcategory of a first plurality of subcategories of the first category (1202c). In some embodiments, the first subcategory is optionally associated with a plurality of objects (e.g., files, applications, etc.) belonging to the first category that fit into or are included in (e.g., are a part of) the first subcategory. For example, a plurality of photos included in a photo album from a vacation taken in 2019 fit into the vacation album subcategory and the 2019 category. In some embodiments, in response to detecting selection of the representation of the first subcategory, the electronic device displays the representations of the objects included in the subcategory. In some embodiments, the user interface enables the user to browse the subcategories to navigate a collection of objects.

In some embodiments, such as in FIG. 11A, while displaying the user interface, the electronic device (e.g., 101) detects (1202d), via the one or more input devices, a scrolling input. In some embodiments, detecting the scrolling input optionally includes detecting, via the eye tracking device, that the gaze of the user is on a region of the user interface associated with scrolling. In some embodiments, detecting the scrolling input includes detecting, via the eye tracking device, the gaze of the user on a scrollable user interface element and detecting, via the hand tracking device (e.g., one or more cameras, depth sensors, proximity sensors, and/or touch sensors (e.g., a touch screen or trackpad)), that the user performs a gesture associated with scrolling (e.g., tapping or pinching the thumb and a finger (e.g., index, middle, ring, or little finger) together and moving the hand in a direction in which the user interface is scrollable). In some embodiments, the representations of the subcategories are displayed overlaid on or proximate to the representation of the category to which the subcategories belong.

In some embodiments, in response to receiving the scrolling input (1202e), in accordance with a determination that a gaze of a user was directed to the first representation of the first category when the scrolling input was detected (1202f), the electronic device (e.g., 101) navigates to a second representation of a second category of the plurality of categories. In some embodiments, the electronic device ceases displaying the representation of the first category and initiates display of the representation of the second category. In some embodiments, before receiving the scrolling input, the electronic device displays the representation of the first category at a respective position in the user interface corresponding to a current navigation position and displays at least a portion of the representation of the second category. In some embodiments, in response to receiving the scrolling input, the electronic device updates the user interface to include the representation of the second category in the respective position in the user interface corresponding to the current navigation position, and moves the representation of the first category to a position in the user interface corresponding to the prior navigation position.

In some embodiments, in response to receiving the scrolling input (1202e) in FIG. 11A, in accordance with a determination that a gaze (e.g., 1102a) of a user was directed to the first representation (e.g., 1104a) of the first category when the scrolling input was detected (1202f), the electronic device (e.g., 101) displays (1202h), in the user interface, a first respective representation (e.g., 1110a) of a first subcategory of a second plurality of subcategories of the second category. In some embodiments, the electronic device ceases displaying the representations of subcategories of the first category. In some embodiments, before receiving the scrolling input, the electronic device displays the representation of the subcategory of the first category in a respective position in the user interface corresponding to a current navigation position of the user interface, and displays at least a portion of the representation of the subcategory of the second category of the first category. In some embodiments, in response to the scrolling input, the electronic device updates the user interface to include the representations of the subcategories of the second category in the respective portion of the user interface corresponding to the current navigation position of the user interface. In some embodiments, in response to receiving the scrolling input and in accordance with a determination that the gaze of the user was directed to the first representation of the first category when the scrolling input was received, the electronic device navigates to a representation of a second category and displays a representation (or representations) of a subcategory (or subcategories) of the second category. For example, in response to detecting the scrolling input and the gaze of the user on a representation of a category of content items while displaying the representation of the category of content items and representations of series of episodic content included in the first category (e.g., representations of subcategories of the first category), the electronic device updates the user interface to include a representation of a second category of content items and representations of series of episodic content included in the second category of content items (e.g., representations of subcategories of the second category).

In some embodiments, in response to receiving the scrolling input (1202e) in FIG. 11A, in accordance with a determination that the gaze (e.g., 1102b) of the user was directed to the first respective representation (e.g., 1108b) of the first subcategory when the scrolling input was detected (1202i), the electronic device (e.g., 101) navigates (1202j) to a second respective representation (e.g., 1108c) of a second subcategory of the first plurality of subcategories without navigating to the second representation (e.g., 1104b) of the second category. In some embodiments, the electronic device continues to display the representation of the first category. In some embodiments, the electronic device scrolls the representations of subcategories of the first category, including updating the positions of the representations of the first and second subcategories of the first category. In some embodiments, scrolling the representations of the subcategories includes initiating display of one or more representations of subcategories (e.g., the representation of the second subcategory) that were not displayed prior to receiving the scrolling input and ceasing display of one or more representations of subcategories (e.g., the representation of the first subcategory). In some embodiments, in response to detecting the gaze of the user on the representation of the subcategory of the first category while receiving the scrolling input, the electronic device scrolls the representations of the subcategories. For example, while displaying a user interface including a representation of a first category of content items and representations of series of episodic content (e.g., representations of subcategories of the category of content items) included in the first category of content, the electronic device detects a scrolling input and the gaze of the user on a representation of one of the series of episodic content included in the first category and, in response to the scrolling input, the electronic device scrolls the representations of the series of episodic content (e.g., without scrolling through the displayed categories). In some embodiments, the electronic device scrolls the representations of categories, including displaying a representation of a subcategory of a second category in response to detecting the gaze of the user on the representation of the first category while the scrolling input was received, and scrolls the representations of the first subcategory without displaying the representation of the subcategory of the second category in response to detecting the gaze of the user on the representation of the subcategory of the first category while the scrolling input is received.

The above-described manner of navigating through categories or subcategories based on user gaze provides an efficient way of viewing the subcategories of the categories while navigating through categories and navigating subcategories of a category without navigating the categories, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11C, while displaying the first representation (e.g., 1116b) of the first category and the first respective representation (e.g., 1120a) of the first subcategory, wherein the first representation (e.g., 1116b) of the first category is displayed at a first depth relative to the first respective representation of the first subcategory, the electronic device (e.g., 101) detects (1204a), via the one or more input devices, an input selecting the first respective representation (e.g., 1120a) of the first subcategory. In some embodiments the depth of the first representation of the first category is a depth relative to the viewpoint of the user in the three-dimensional environment. In some embodiments, detecting selection of the first respective representation of the first subcategory includes concurrently detecting, via an eye tracking device, that the gaze of the user is directed towards the first respective representation of the first subcategory and detecting, via a hand tracking device (e.g., one or more cameras, depth sensors, proximity sensors, touch sensors (e.g., trackpad, touch screen)) the user performing a gesture with their hand (e.g., touching their thumb to one of the other fingers (e.g., index finger, middle finger, ring finger, little finger) on the hand of the thumb). In some embodiments, detecting selection of the first respective representation of the first subcategory includes detecting, via the eye tracking device, that the user's gaze is directed to the first respective representation for a predetermined time threshold (e.g., 0.1, 0.2, 0.3, 0.4, 0.5, 1, etc. seconds). In some embodiments, a representation of a category (e.g., the representation of the first category) is selected instead. In some embodiments, in response to detecting the input selecting the first respective representation (e.g., 1120a) of the first subcategory, the electronic device (e.g., 101) displays (1204b), via the display generation component, a second user interface associated with the first respective representation of the first subcategory similar to the user interface in FIG. 11D, wherein the first representation of the first category is displayed at a second depth, greater than the first depth, relative to the second user interface. In some embodiments, the second depth is further from the viewpoint of the user than the first depth (e.g., the electronic device updates the depth of the first respective representation of the first category to be further from the viewpoint of the user). In some embodiments, the electronic device displays the second user interface at a depth that is closer to the user than the depth with which the first respective representation of the first subcategory was displayed. In some embodiments, the depth of the second user interface is the same as the depth of the first respective representation of the first subcategory relative to the viewpoint of the user. In some embodiments, if a representation of the category had been selected instead, the remaining representation(s) of categories would be displayed similarly at a further depth from the viewpoint of the user than the user interface displayed in response to the selection of the representation of the category.

The above-described manner of displaying the first representation of the first category at the second depth while displaying the second user interface provides an efficient way of reducing the visual clutter while displaying the second user interface and reducing cognitive burden on the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11A, the first representation (e.g., 1104a) of the first category comprises a card (e.g., a two dimensional user interface object) corresponding to the first category, and the second representation (e.g., 1108b) of the second category comprises a card corresponding to the second category (1204c). In some embodiments, the cards are two dimensional user interface objects displayed within a respective user interface. In some embodiments, the cards are square or rectangle-shaped or another shape. In some embodiments, the cards move in response to a request to scroll the representations of the categories. In some embodiments, the subcategories are also represented by cards and the category cards and subcategory cards are scrollable in the same dimension (e.g., horizontally, vertically, diagonally). In some embodiments, the cards include text and/or images corresponding to the respective category to which the card corresponds.

The above-described manner of displaying the representations of the categories as cards provides an efficient way of representing the categories within a user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11C, while displaying the first representation (e.g., 1116b) of the first category and the second representation (e.g., 1116c) of the second category, the electronic device (e.g., 101) detects (1206a), via the one or more input devices, an input selecting the first representation (e.g., 1116b) of the first category. In some embodiments, detecting selection of the first representation of the first category includes concurrently detecting, via an eye tracking device, that the gaze of the user is directed towards the first representation of the first category and detecting, via a hand tracking device (e.g., one or more cameras, depth sensors, proximity sensors, touch sensors (e.g., trackpad, touch screen)) the user performing a gesture with their hand (e.g., touching their thumb to one of the other fingers (e.g., index finger, middle finger, ring finger, little finger) on the hand of the thumb). In some embodiments, detecting selection of the first representation of the first category includes detecting, via the eye tracking device, that the user's gaze is directed to the first representation of the first category for a predetermined time threshold (e.g., 0.1, 0.2, 0.3, 0.4, 0.5, 1, etc. seconds). In some embodiments, in response to detecting the input selecting the first representation (e.g., 1116b) of the first category (1206b) in FIG. 11C, the electronic device (e.g., 101) displays (1206*c*), via the display generation component, a second user interface associated with the first representation of the first category, such as in FIG. 11D (e.g., a user interface including content, options, representations of subcategories, etc. belonging to the first category). In some embodiments, in response to detecting the input selecting the first representation (e.g., 1116*b*) of the first category (1206*b*), such as in FIG. 11C, the electronic device (e.g., 101) deemphasizes display of the second representation (e.g., 1116*c*) of the second category, such as in FIG. 11D. In some embodiments, the second user interface is overlaid on a modified version of the user interface that includes the representations of the first category, second category, and first subcategory. In some embodiments, modifying the user interface includes displaying the user interface with increased blur or translucency, decreased size or contrast, increased depth from the user (e.g., more depth than the depth of the second user interface from the user), and/or different colors.

The above-described manner of displaying the second user interface and deemphasizing display of the second representation of the second category in response to detecting the input selecting the first representation of the first category provides an efficient way of continuing to display the representation of the second category and reducing visual clutter and reducing cognitive burden on the user while displaying the second user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11C, while displaying the first representation (e.g., 1116*b*) of the first category and the first respective representation (e.g., 1120*b*) of the first subcategory, the electronic device (e.g., 101) detects (1208*a*), via the one or more input devices, an input selecting the first representation (e.g., 1116*b*) of the first category. In some embodiments, detecting selection of the first representation of the first category includes concurrently detecting, via an eye tracking device, that the gaze of the user is directed towards the first representation of the first category and detecting, via a hand tracking device (e.g., one or more cameras, depth sensors, proximity sensors, touch sensors (e.g., trackpad, touch screen)) the user performing a gesture with their hand (e.g., touching their thumb to one of the other fingers (e.g., index finger, middle finger, ring finger, little finger) on the hand of the thumb). In some embodiments, detecting selection of the first representation of the first category includes detecting, via the gaze tracking device, that the gaze of the user is directed to the first representation for the predetermined threshold of time (e.g., 0.1, 0.2, 0.3, 0.4, 0.5, 1, etc. seconds). In some embodiments, in response to detecting the input selecting the first representation (e.g., 1116*b*) of the first category (1208*b*), such as in FIG. 11C, the electronic device (e.g., 101) displays (1208*c*), via the display generation component, a second user interface (e.g., a user interface including content, options, representations of subcategories, etc. belonging to the first category) associated with the first representation (e.g., 1116*b*) of the first category while maintaining display of the first respective representation (e.g., 1120*b*) of the first subcategory, such as in FIG. 11D. In some embodiments, the second user interface includes content and/or options related to the first category, and/or representations of subcategories in the first category. In some embodiments, the location of the first respective representation of the first subcategory remains the same when the electronic device navigates to the second user interface. In some embodiments, the location of the first respective representation of the first subcategory changes when the electronic device navigates to the second user interface. In some embodiments, prior to detecting the selection input, the electronic device displays a plurality of representations of subcategories including the first subcategory and, after detecting the selection input, the electronic device continues to display the plurality of representations of subcategories.

The above-described manner of maintaining display of the first respective representation of the first subcategory while displaying the second user interface in response to the input selecting the first representation of the first category provides an efficient way of concurrently navigating to a user interface related to the first category and presenting one or more representations of subcategories related to the category, which simplifies the interaction between the user and the electronic device and enhances the operability of the electronic device and makes the user-device interface more efficient (e.g., by reducing the inputs needed to navigate to a subcategory of the first category while displaying the second user interface), which additionally reduces power usage and improves battery life of the electronic device by enabling the user to use the electronic device more quickly and efficiently, while reducing errors in usage.

In some embodiments, such as in FIG. 11C, while displaying the first representation (e.g., 1116*b*) of the first category, the electronic device (e.g., 101) detects (1210*a*), via the one or more input devices, an input selecting the first representation (e.g., 1116*b*) of the first category. In some embodiments, detecting selection of the first representation of the first category includes concurrently detecting, via an eye tracking device, that the gaze of the user is directed towards the first representation of the first category and detecting, via a hand tracking device (e.g., one or more cameras, depth sensors, proximity sensors, touch sensors (e.g., trackpad, touch screen)) the user performing a gesture with their hand (e.g., touching their thumb to one of the other fingers (e.g., index finger, middle finger, ring finger, little finger) on the hand of the thumb). In some embodiments, detecting selection of the first representation of the first category includes detecting, via the gaze tracking device, that the gaze of the user is directed to the first representation for the predetermined threshold of time (e.g., 0.1, 0.2, 0.3, 0.4, 0.5, 1, etc. seconds). In some embodiments, in response to detecting the input selecting the first representation (e.g., 1116*b*) of the first category (1210*b*), such as in FIG. 11C, the electronic device (e.g., 101) displays (1210*c*), via the display generation component, a second user interface (e.g., a user interface including content, options, representations of subcategories, etc. belonging to the first category) associated with the first representation (e.g., 1116*b*) of the first category, wherein the second user interface includes a second representation (e.g., 1116*b*) of the first category and one or more representations of content associated with the first category. In some embodiments, the second representation of the first category is the same as the first representation of the first category. In some embodiments, the second representation of the first category is different (e.g., in size, content, position, etc.) from the first representation of the first category. In some embodiments, the representations of content are selectable or interactable to display (e.g., play) the content corresponding to the representations.

The above-described manner of displaying the representations of content associated with the first category in the second user interface in response to the input selecting the first representation of the first category provides an efficient way of browsing and selecting content items in the first category, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIGS. 11C-11D, the input selecting the first representation (e.g., 1116b) of the first category was received while displaying the first respective representation (e.g., 1120b) of the first subcategory, and the second user interface includes the first respective representation (e.g., 1120b) of the first subcategory (1212a). In some embodiments, the second user interface includes representations of other subcategories of the first category. In some embodiments, the electronic device updates the position of the first respective representation of the first subcategory when the electronic device displays the second user interface. In some embodiments, the position of the first respective representation of the first subcategory is the same in the user interface displayed before the second user interface and in the second user interface. In some embodiments, while displaying the second user interface illustrated in FIG. 11D, the electronic device (e.g., 101) detects (1212b), via the one or more input devices, a second scrolling input directed to the first respective representation (e.g., 1120b) of the first subcategory. In some embodiments, detecting the second scrolling input includes detecting, via the eye tracking device, the gaze of the user on the first respective representation of the first subcategory and detecting, via the hand tracking device (e.g., one or more cameras, depth sensors, proximity sensors, and/or touch sensors (e.g., a touch screen or trackpad)), that the user performs a gesture associated with scrolling (e.g., tapping or pinching the thumb and a finger (e.g., index, middle, ring, or little finger) together and moving the hand in a direction in which the user interface is scrollable). In some embodiments, in response to detecting the second scrolling input, the electronic device (e.g., 101) navigates (1212c) to the second respective representation of the second subcategory of the first plurality of subcategories. In some embodiments, the second scrolling input reveals the second respective representation of the second subcategory of the first plurality of subcategories. In some embodiments, the second scrolling input reveals representations of subcategories in addition to the second subcategory and the first subcategory. For example, the electronic device concurrently displays a plurality (e.g., 2, 3, 4, 5, 6, etc.) of representations of subcategories at a time when the second user interface was displayed (e.g., the representation of the first subcategory and the representation of the second subcategory) and scrolling the subcategories causes the electronic device to cease display of one or more subcategories and initiate display of one or more other subcategories. In some embodiments, the scrolling input moves the input focus from the first respective representation of the first subcategory to the second respective representation of the second subcategory.

The above-described manner of scrolling the subcategories in the second user interface provides an efficient way of browsing the subcategories of the first category in the user interface related to the first category, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In the some embodiments, while displaying the second user interface, such as in FIG. 11D, the electronic device (e.g., 101) detects (1214a), via the one or more input devices (e.g., an eye tracking device and/or hand tracking device), a respective input directed to a respective representation of respective content associated with the first category. In some embodiments, in response to detecting the respective input (1214b), in accordance with a determination that the respective input includes gaze input detected via the eye tracking device that satisfies one or more first criteria (e.g., the gaze is held on the respective representation for a predetermined time threshold (e.g., 0.1, 0.2, 0.3, 0.4, 0.5, 1, etc. seconds), the electronic device (e.g., 101) displays (1214c), via the display generation component, the respective content (e.g., in some embodiments, the content is played within the representation of the content associated with the first category (e.g., in-place)). In some embodiments, the content is played in a user interface object other than the representation of the content (e.g., in a new window, new user interface, etc. In some embodiments, in response to detecting the respective input (1214b), in accordance with a determination that the respective input includes input from a hand of the user detected via a hand tracking device (e.g., one or more cameras, depth sensors, proximity sensors, touch sensors (e.g., trackpad, touch screen)) in communication with the electronic device, wherein the input from the hand of the user satisfies one or more second criteria (e.g., the user performs a predetermined gesture with their hand(s)), the electronic device (e.g., 101) displays (1214d), via the display generation component, the respective content. In some embodiments, the predetermined gesture is the user touching their thumb to another finger (e.g., index finger, middle finger, ring finger, pinkie finger) on the hand of the thumb. In some embodiments, the one or more second criteria include a criterion that is satisfied when the electronic device detects, via the eye tracking device, that the user is looking at the respective representation while performing the gesture. In some embodiments, the content item is played in response to detecting, via the gaze tracking device, that the gaze of the user is directed to the respective representation of the respective content for the predetermined threshold of time (e.g., 0.1, 0.2, 0.3, 0.4, 0.5, 1, etc. seconds). In some embodiments, in response to detecting the user looking at the respective representation for a predetermined time threshold or detecting the user performing a hand gesture while looking at the respective representation, the electronic device plays the respective content. In some embodiments, the electronic device plays the respective content in the second user interface. In some embodiments, the electronic device plays the respective content in a third user interface overlaid on the second user interface. In some embodiments, the electronic device plays the respective content in a third user interface and ceases display of the second user interface. In some embodiments, in response to detecting the respective input (1214b), in accordance with a determination that the respective input includes gaze input detected via the eye tracking device that fails to satisfy the one or more first criteria, the electronic device (e.g., 101) forgoes (1214e) displaying the respective content via the display generation component. (e.g., the gaze on the respective representation is held for less than the threshold time (e.g., 0.1, 0.2, 0.3, 0.4, 0.5, 1, etc. seconds) or the gaze of the user is directed to a user interface element other than the respective representation). In some embodiments, in response to detecting an input including a gaze directed to another user interface element for the predetermined time threshold, the electronic device performs an action other than displaying the respective content, the action associated with the other user interface element, in response to the input. In some embodiments, in response to detecting the respective input (1214*b*), in accordance with a determination that the respective input includes input from the hand of the user detected via the hand tracking device that does not satisfy the one or more second criteria, the electronic device (e.g., 101) forgoes displaying the respective content via the display generation component (1214*f*) (e.g., the hand does not perform the predetermined gesture, the gaze of the user is not directed to the respective representation while the gesture is detected). In some embodiments, in response to the input that does not satisfy the one or more second criteria, the electronic device performs an action other than displaying the respective content that is associated with the input.

The above-described manner of playing the respective content in response to an input detected via the eye tracking device and/or hand tracking device provides an efficient way of accepting more than one type of input for playing content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the second user interface, such as in FIG. 11D, the electronic device (e.g., 101) detects (1216*a*), via the one or more input devices, a respective input selecting a respective representation of respective content associated with the first category. In some embodiments, detecting selection of the respective representation of the respective content associated with the first category includes concurrently detecting, via an eye tracking device, that the gaze of the user is directed towards the respective representation of the respective content associated with the first category and detecting, via a hand tracking device (e.g., one or more cameras, depth sensors, proximity sensors, touch sensors (e.g., trackpad, touch screen)) the user performing a gesture with their hand (e.g., touching their thumb to one of the other fingers (e.g., index finger, middle finger, ring finger, little finger) on the hand of the thumb). In some embodiments, detecting selection of the respective representation of the respective content associated with the first category includes detecting, via the eye tracking device, that the user's gaze is directed to the respective representation of the respective content associated with the first category for a predetermined time threshold (e.g., 0.1, 0.2, 0.3, 0.4, 0.5, 1, etc. seconds). In some embodiments, in response to detecting the respective input, the electronic device (e.g., 101) displays (1216*b*), via the display generation component, the respective content. In some embodiments, the electronic device plays the respective content in the second user interface. In some embodiments, the electronic device plays the respective content in a third user interface overlaid on the second user interface. In some embodiments, the electronic device plays the respective content in a third user interface and ceases display of the second user interface.

The above-described manner of playing the respective content in response to selection of the respective representation of the respective content provides an efficient way of playing content while browsing the content related to the first category, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11D, while displaying the second user interface surrounded by an environment having a visual characteristic (e.g., brightness, color, contrast, number and prominence of virtual objects other than the second user interface, translucency, virtual lighting effects) having a first value, the electronic device (e.g., 101) detects (1216*c*), via the one or more input devices, a respective input selecting a respective representation of respective content associated with the first category. In some embodiments, detecting selection of the respective representation of the respective content associated with the first category includes concurrently detecting, via an eye tracking device, that the gaze of the user is directed towards the respective representation of the respective content associated with the first category and detecting, via a hand tracking device (e.g., one or more cameras, depth sensors, proximity sensors, touch sensors (e.g., trackpad, touch screen)) the user performing a gesture with their hand (e.g., touching their thumb to one of the other fingers (e.g., index finger, middle finger, ring finger, little finger) on the hand of the thumb). In some embodiments, detecting selection of the respective representation of the respective content associated with the first category includes detecting, via the eye tracking device, that the user's gaze is directed to the respective representation of the respective content associated with the first category for a predetermined time threshold (e.g., 0.1, 0.2, 0.3, 0.4, 0.5, 1, etc. seconds). In some embodiments, in response to detecting the respective input, the electronic device (e.g., 101) updates (1216*d*) display of the environment surrounding the second user interface in FIG. 11D to have the visual characteristic having a second value, different from the first value. In some embodiments, the second user interface is displayed in an environment with a first lighting effect (e.g., brightness, contrast, color tone) prior to detecting selection of the respective representation of respective content associated with the first category and, in response to the selection input, the electronic device updates the environment to have a second lighting effect that is darker, lower contrast, and/or a different tone than the first lighting effect and plays the content.

The above-described manner of updating the visual characteristic of the environment in response to the selection input provides an efficient way of reducing the visual clutter with which the content is displayed (e.g., without an additional input to do so) and reduces cognitive burden on the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first respective representation (e.g., 1116*b*) of the first subcategory and the second respective representation (e.g., 1120*b*) of the second subcategory, such as in FIG. 11C, the electronic device (e.g., 101) detects (1218*a*), via the one or more input devices, an input selecting the first respective representation (e.g., 1120a) of the first subcategory. In some embodiments, detecting selection of the first respective representation of the first subcategory includes concurrently detecting, via an eye tracking device, that the gaze of the user is directed towards the first respective representation of the first subcategory and detecting, via a hand tracking device (e.g., one or more cameras, depth sensors, proximity sensors, touch sensors (e.g., trackpad, touch screen)) the user performing a gesture with their hand (e.g., touching their thumb to one of the other fingers (e.g., index finger, middle finger, ring finger, little finger) on the hand of the thumb). In some embodiments, detecting selection of the first respective representation of the first subcategory includes detecting, via the eye tracking device, that the user's gaze is directed to the first respective representation of the first subcategory for a predetermined time threshold (e.g., 0.1, 0.2, 0.3, 0.4, 0.5, 1, etc. seconds). In some embodiments, in response to detecting the input selecting the first respective representation (e.g., 1120a) of the first subcategory, the electronic device (e.g., 101) changes (1218b) display (e.g., size, location, visual characteristic (e.g., color, contrast, translucency)) of the second respective representation of the second subcategory. In some embodiments, in response to detecting selection of the first respective representation of the first subcategory, the electronic device displays a third user interface including content related to the first subcategory and displays the representation of the second subcategory in a location that is different from the location at which the representation of the second subcategory was displayed prior to detecting selection of the representation of the first subcategory. The above-described manner of changing the display of the second respective representation of the second category in response to selection of the first respective representation of the first subcategory provides an efficient way of viewing and/or selecting the other subcategories after selecting the first subcategory, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, before detecting the input selecting the first respective representation (e.g., 1120a) of the first subcategory in FIG. 11C, the second respective representation (e.g., 1120b) of the second subcategory was displayed at a first location in the user interface, and changing the display of the second respective representation (e.g., 1120b) of the second subcategory includes displaying the second respective representation (e.g., 1120b) of the second subcategory at a second location, different from the first location, in the user interface (1218c). In some embodiments, the updated position of the representation of the second subcategory is a different depth relative to the viewpoint of the user. In some embodiments, the updated position of the representation of the second subcategory is a different location at the same respective depth relative to the viewpoint of the user.

The above-described manner of changing the position of the representation of the second subcategory in the user interface in response to detecting selection of the first subcategory provides an efficient way of viewing and/or selecting the other subcategories after selecting the first subcategory, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, before detecting the input selecting the first respective representation (e.g., 1120a) of the first subcategory in FIG. 11C, the second respective representation (e.g., 1120b) of the second subcategory was displayed in a foreground displayed via the display generation component, and changing display of the second respective representation (e.g., 1120b) of the second subcategory includes displaying the second respective representation (e.g., 1120b) of the second subcategory in a background displayed via the display generation component (1218d). In some embodiments, the foreground of the user interface is a first depth from the viewpoint of the user and the background of the user interface is a second, further depth from the viewpoint of the user. In some embodiments, the foreground is overlaid on the background. In some embodiments, the foreground is overlaid on the background and the foreground and background are displayed at the same depth relative to the viewpoint of the user. For example, a content browsing user interface includes a plurality of representations of series of episodic content (e.g., subcategories) within a respective category in the foreground of the user interface. In this example, in response to detecting selection of the first respective representation of the first series of episodic content, the electronic device displays a user interface associated with the first series of episodic content in the foreground and continues displaying the representations of the other series of episodic content in the category in the background of the user interface.

The above-described manner of displaying the representation of the second subcategory in the background in response to detecting the input selecting the first subcategory provides an efficient way of viewing and/or selecting the other subcategories after selecting the first subcategory which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, changing display of the second respective representation (e.g., 1120b) of the second subcategory includes ceasing display of the second respective representation (e.g., 1120b) of the second subcategory (1220a). In some embodiments, in response to detecting selection of the representation of the first subcategory, the electronic device displays a user interface (e.g., including content) related to the first subcategory. For example, a content browsing user interface includes a plurality of representations of series of episodic content (e.g., subcategories) within a respective category. In this example, in response to detecting selection of the first respective representation of the first series of episodic content, the electronic device displays a user interface associated with the first series of episodic content and ceases displaying the representations of the other series of episodic content in the category.

The above-described manner of ceasing display of the second subcategory in response to detecting selection of the first subcategory provides an efficient way of reducing visual clutter and reducing the user's cognitive burden while viewing the user interface related to the first subcategory, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, navigating to the second representation (e.g., 1116b) of the second category of the plurality of categories includes scrolling through representations (e.g., 1116ac) of the plurality of categories at a first rate and scrolling through representations (e.g., 1118ad) and (e.g., 1120ad) of the first plurality of subcategories at a second rate (1220b), such as in FIGS. 11B-11C. In some embodiments, the representations of categories scroll at a rate in proportion to a characteristic of the scrolling input (e.g., a speed of the scrolling input, a magnitude of movement of the scrolling input) and the representations of subcategories scroll in accordance with the rate at which the representations of categories scroll. For example, in response to scrolling the representations of categories to move by a first amount, the electronic device scrolls the representations of subcategories at a first speed to reveal a first set of subcategories associated with a respective one of the categories and in response to scrolling the representations of categories to move by a second amount, the electronic device scrolls the representations of subcategories at a second rate to reveal a second set of the subcategories associated with the respective one of the categories. For example, in a photo browsing application that includes representations of albums (e.g., subcategories) and years (e.g., categories), the electronic device detects an input to scroll the representations of years and, in response to the input, scrolls the representations of the years in accordance with the scrolling input and scrolls the representations of albums in accordance with the rate at which the years scroll. For example, if the electronic device scrolls to a first year, the electronic device scrolls the albums to reveal albums from the first year and if the electronic device scrolls to a second year, the electronic device scrolls the albums to reveal albums from the second year. In some embodiments, navigating to the second respective representation (e.g., 1120b) of the second subcategory of the first plurality of subcategories in FIG. 11C includes scrolling through the representations of the first plurality of subcategories (e.g., 1120b) at a third rate, different from the second rate (1220c). In some embodiments, in response to detecting an input to scroll the representations of subcategories, the electronic device scrolls the representations of subcategories at a rate in proportion to a characteristic of the scrolling input (e.g., a speed of the scrolling input, a magnitude of movement of the scrolling input). In some embodiments, the representations of categories scroll at a rate related to the rate at which the representations of subcategories are scrolled. In some embodiments, the electronic device does not scroll the representations of categories in response to the input to scroll the representations of subcategories. For example, in a photo browsing application that includes representations of albums (e.g., subcategories) and years (e.g., categories), the electronic device detects an input to scroll the representations of albums and, in response to the input, scrolls the representations of the albums in accordance with the scrolling input and scrolls the representations of years in accordance with the rate at which the albums scroll. For example, if the electronic device scrolls to one or more albums associated with a first year, the electronic device scrolls the years to reveal a representation of the first year and if the electronic device scrolls to one or more albums associated with a second year, the electronic device scrolls the years to reveal a representation of the second year.

The above-described manner of scrolling the subcategories while scrolling the categories provides an efficient way of browsing the subcategories while browsing the categories, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11A, the first respective representation (e.g., 1108a) of the first subcategory of the first plurality of subcategories and the second respective representation (e.g., 1108b) of the second subcategory of the first plurality of subcategories are overlaid on the first representation (e.g., 1104a) of the first category and the second representation of the second category (1220d). In some embodiments, all of the representations of all of the subcategories are overlaid on all of the representations of all of the categories. In some embodiments, the representations of the subcategories are overlaid on the representation of the category to which each subcategory belongs (e.g., representations of subcategories of the first category are overlaid on the representation of the first category and representations of subcategories of the second category are overlaid on the representation of the second category). In some embodiments, the subcategories are overlaid on the categories at locations independent from which the category to which the subcategories belong (e.g., representations of subcategories of the first category are overlaid on the representations of the first category and the second category and/or representations of the subcategories of the second category are overlaid on the representations of the first category and the second category). For example, in a photo browsing application, the categories are years that each include photos and albums from a respective year and the subcategories are albums (e.g., each album is associated with a respective year). As another example, in a video content browsing application, the categories are collections of content items (e.g., including a plurality of series of episodic content) and the subcategories are series of episodic content. In some embodiments, the representations of subcategories are overlaid on a respective portion of each of the representations of the categories (e.g., along the bottom edge of the representations of the categories). In some embodiments, the representations of the categories and the representations of the subcategories are arranged along the same axis (e.g., the representations of categories and the representations of subcategories are scrollable in the same dimension, such as being horizontally scrollable). In some embodiments, the representations of subcategories of a respective category are contained within the boundaries of the representation of the respective category (e.g., the representations of the subcategories do not extend horizontally past the horizontal boundaries of the representation of the category to which the subcategories belong). In some embodiments, the representations of subcategories of a respective category extend past the boundary of the respective category (e.g., the representations of the subcategories extend horizontally past the horizontal boundaries of the representation of the category to which the subcategories belong).

The above-described manner of displaying the subcategories overlaid on the categories provides an efficient way of concurrently displaying the categories and subcategories, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

Figure 13A:
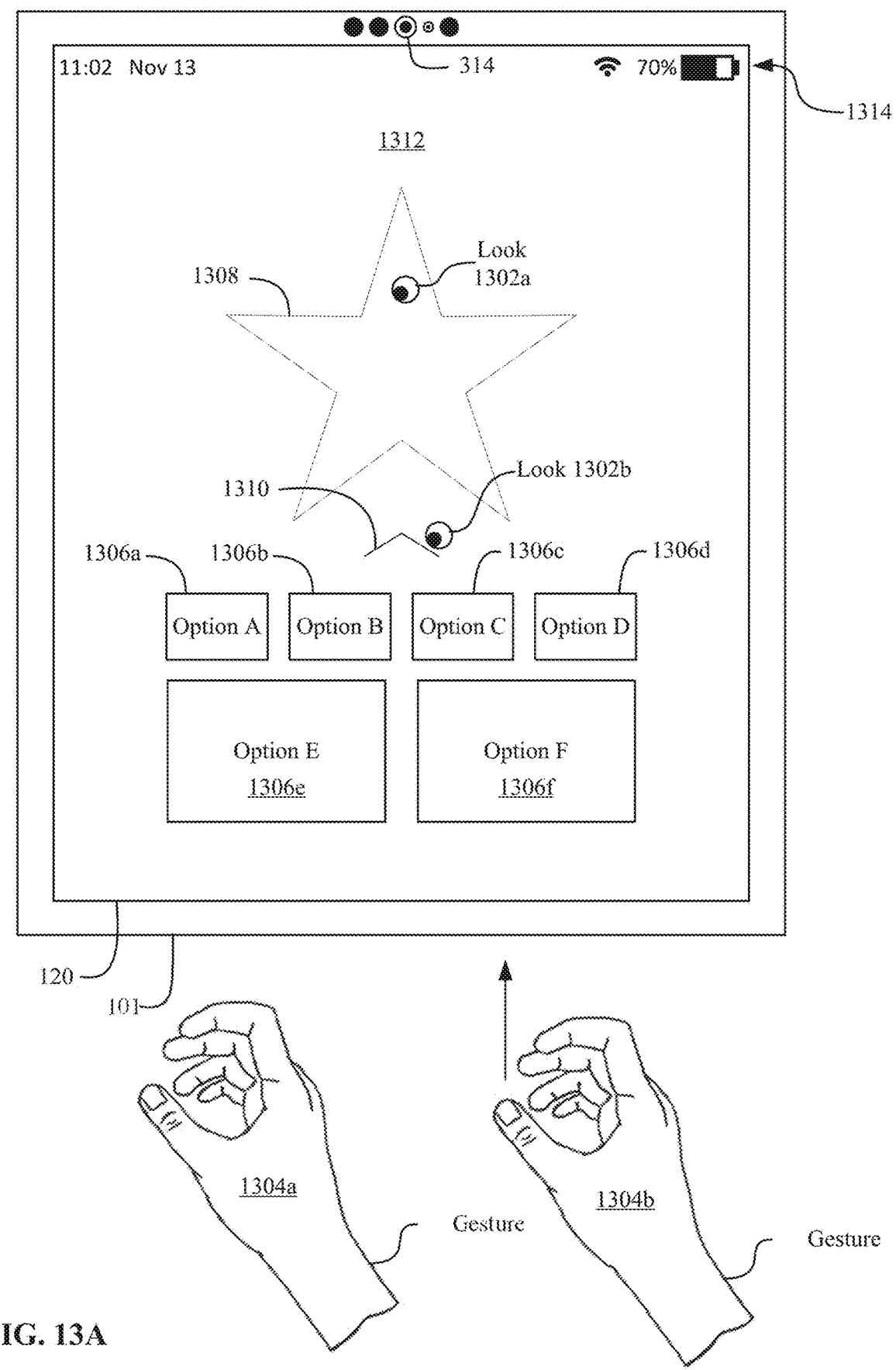
FIGS. 13A-13D illustrate examples of how an electronic device navigates back from user interfaces having different levels of immersion in different ways in accordance with some embodiments.
Figure 13B:
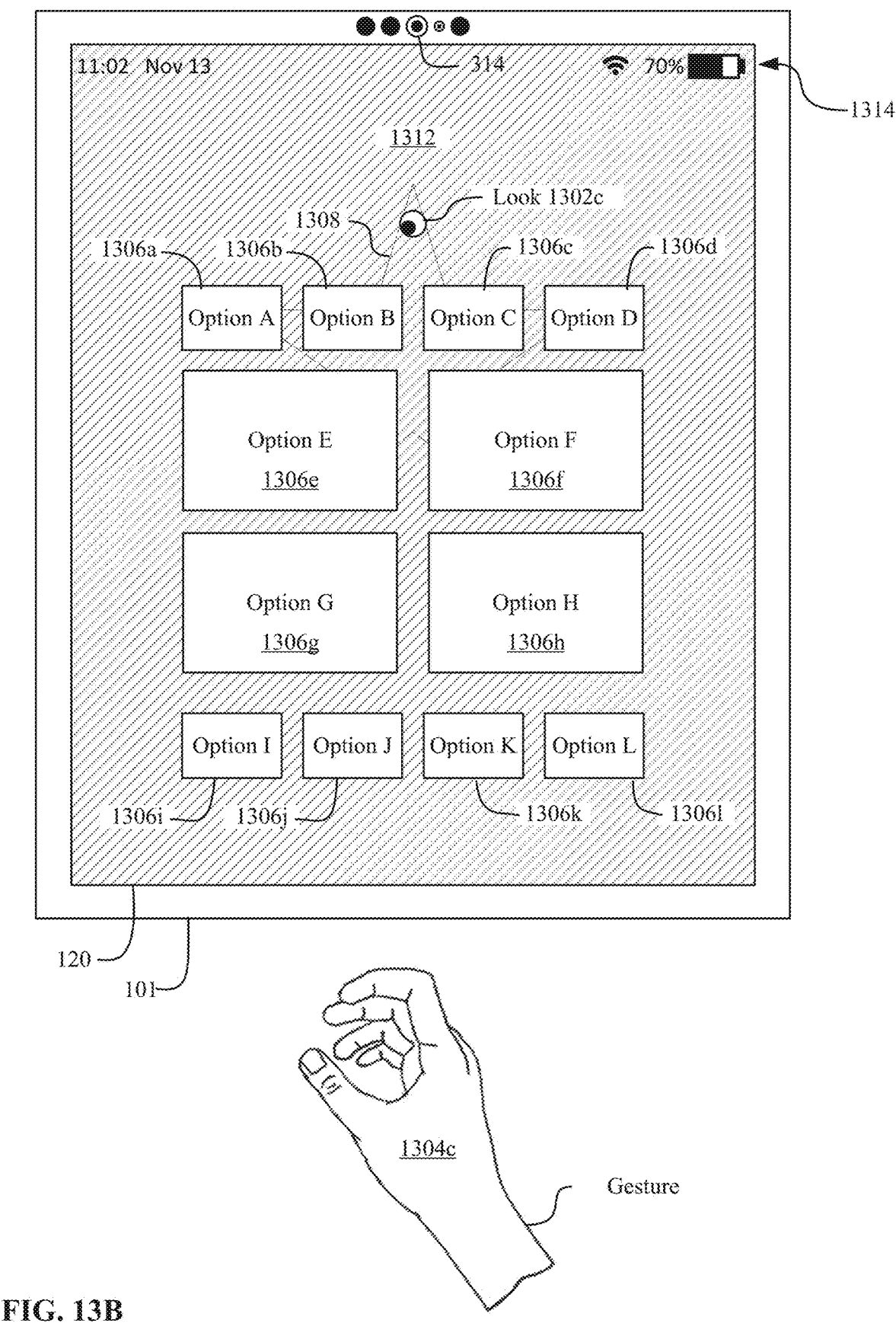
Figure 13C:
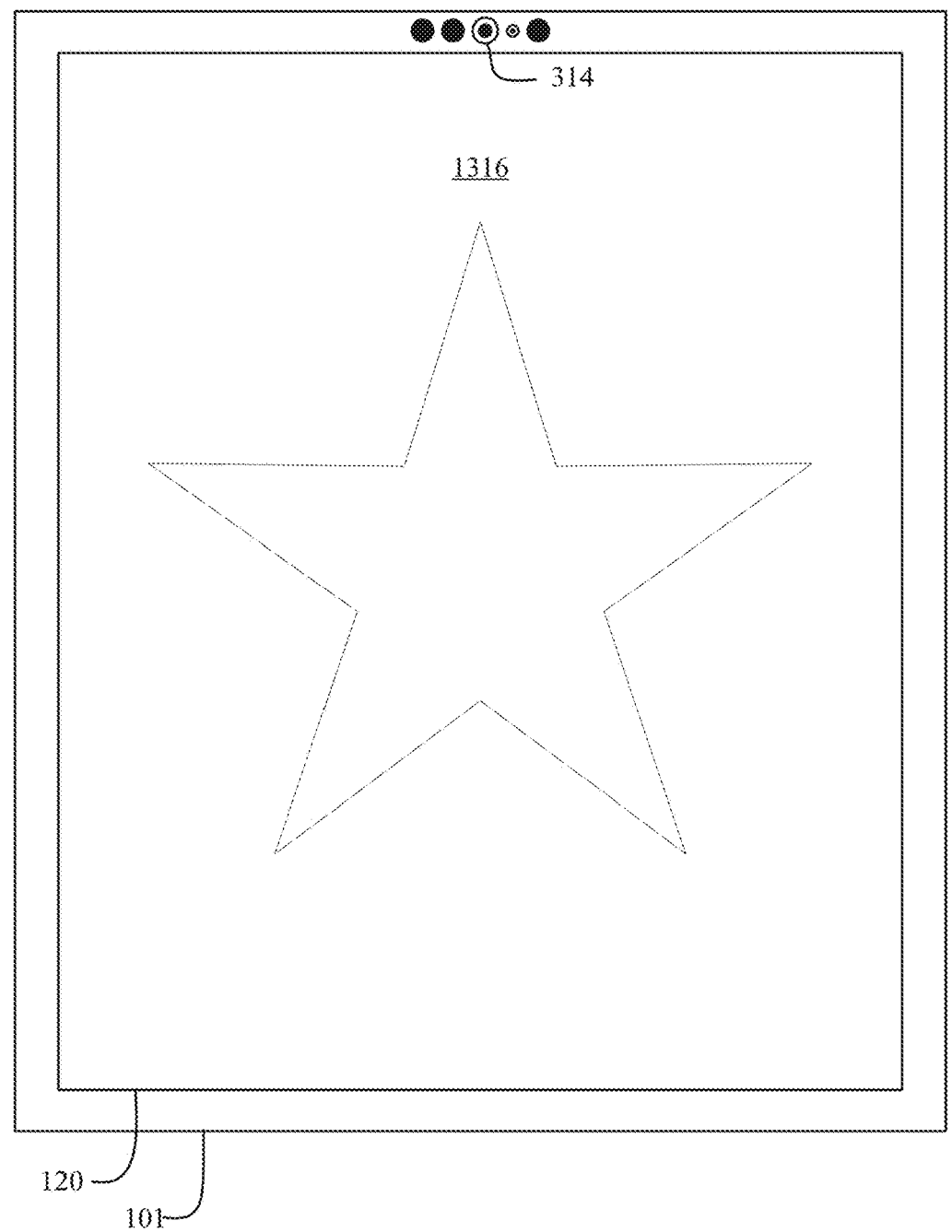

FIGS. 13A-13C illustrate examples of how an electronic device navigates back from user interfaces displayed with different levels of immersion in different ways in accordance with some embodiments.

In some embodiments, a level of immersion at which a user interface is displayed, as will be referenced below, includes an associated degree to which the electronic device displays background content (e.g., content other than the respective user interface) around/behind a respective user interface, optionally including the number of items of background content displayed and the visual characteristics (e.g., colors, contrast, opacity) with which the background content is displayed. In some embodiments, the background content is included in a background over which the respective user interface is displayed. In some embodiments, the background content includes additional user interfaces (e.g., user interfaces generated by the device corresponding to applications other than the application of the respective user interface, system user interfaces), virtual objects (e.g., files, representations of other users, etc. generated by the device) not associated with or included in the respective user interface, and real objects (e.g., pass-through objects representing real objects in the physical environment of the electronic device that are displayed by the device such that they are visible via the display generation component). In some embodiments, at a first (e.g., low) level of immersion, the background, virtual and/or real objects are displayed in an unobscured manner. For example, a respective user interface with a low level of immersion is displayed concurrently with the background content, which is displayed with full brightness, color, and/or translucency. In some embodiments, at a second (e.g., higher) level of immersion, the background, virtual and/or real objects are displayed in an obscured manner (e.g., dimmed, blurred, removed from display, etc.). For example, a respective user interface with a high level of immersion is displayed without concurrently displaying the background content (e.g., in a full screen or fully immersive mode). As another example, a user interface displayed with a medium level of immersion is displayed concurrently with darkened, blurred, or otherwise de-emphasized background content. In some embodiments, the visual characteristics of the background objects varies among the background objects. For example, at a particular immersion level, one or more first background objects are visually de-emphasized (e.g., dimmed, blurred, displayed with increased transparency) more than one or more second background objects and one or more third background objects cease to be displayed. In some embodiments, a level of immersion includes an associated degree to which the electronic device displays content other than the respective user interface, including additional user interfaces (e.g., user interfaces corresponding to applications other than the application of the respective user interface, system user interfaces), virtual objects (e.g., files, representations of other users) not associated with or included in the respective user interface, and real objects (e.g., pass-through objects representing real objects in the physical environment of the electronic device). For example, a respective user interface with a low level of immersion is displayed concurrently with representations of real objects and user interfaces of applications other than the application associated with the respective user interface, whereas a respective user interface with a high level of immersion is displayed without concurrently displaying any other objects or user interfaces (e.g., in a full screen or fully immersive mode).

FIG. 13A illustrates electronic device 101 displaying, via a display generation component 120, a three-dimensional environment 1312 on a user interface. As described above with reference to FIGS. 1-6, the electronic device 101 optionally includes a display generation component 120 (e.g., a touch screen) and a plurality of image sensors 314. The image sensors 314 optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

In FIG. 13A, the electronic device 101 displays a user interface in a three-dimensional environment 1312. In some embodiments, the user interface is displayed in a two-dimensional environment instead. The user interface includes an object 1308 associated with immersive content, a plurality of options 1306a-1306f (e.g., in a menu), a selectable option 1310 that, when selected, causes the electronic device 101 to display selectable options in addition to options 1306a-1306f, and a header region 1314 including indications of statuses of the electronic device 101 (e.g., time, date, network connection, battery life). In some embodiments, the user interface is a content user interface and, in response to detecting selection of one of options 1306a-1306f or user interface element 1308, the electronic device 101 displays an item of content associated with the selected element or option. For example, the user interface is a user interface of a wellness application and the content includes guided meditations, workout videos, and other video and/or audio content. In some embodiments, the ways in which electronic device 101 transitions from displaying the user interface illustrated in FIG. 13A to displaying content associated with element 1308 and/or options 1306a-1306f are similar to one or more techniques described above with reference to FIGS. 7A-8F.

As shown in FIG. 13A, the electronic device 101 detects the user's gaze 1302a directed to user interface element 1308. In some embodiments, in response to detecting the user's gaze 1302a directed to user interface element 1308 for a predetermined time threshold (e.g., 0.1, 0.2, 0.5, 1, 5, 10, etc. seconds) without detecting additional input (e.g., provided by the user's hand 1304a or 1304b), the electronic device 101 displays the user interface described below with reference to FIGS. 13C-13D. It should be understood that hands 1304a and 1304b in FIG. 13A illustrate alternate gestures performed by the same hand, and do not exist simultaneously. In some embodiments, the electronic device 101 transitions from the user interface in FIG. 13A to the user interface in FIGS. 13C-13D in response to gaze input only by displaying an animation of the user interface of FIG. 13A fading as the user interface in FIG. 13C-13D emerges. In some embodiments, if the electronic device 101 detects the user performing a predetermined gesture with their hand

Figure 13D:
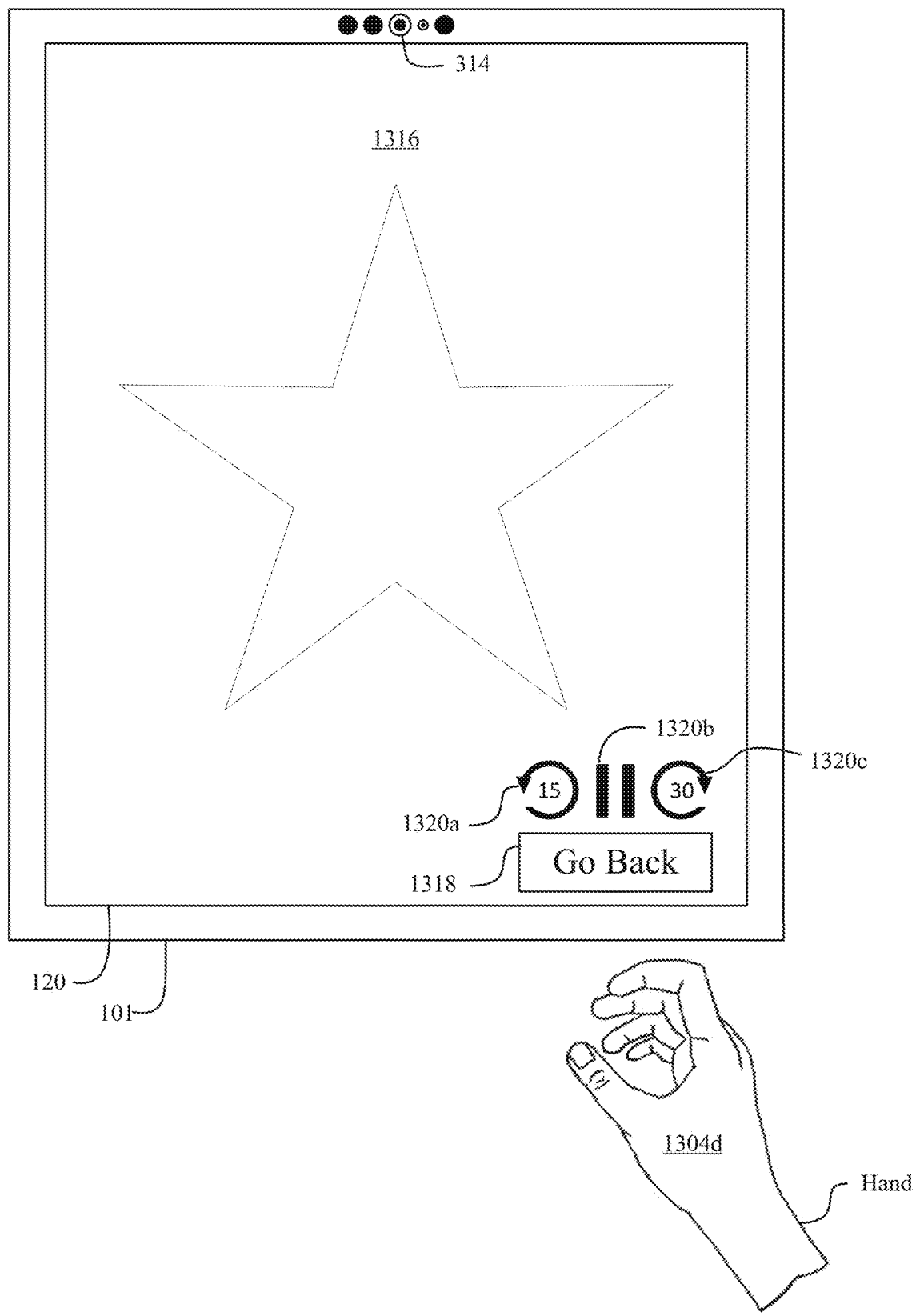
Figure 14A:
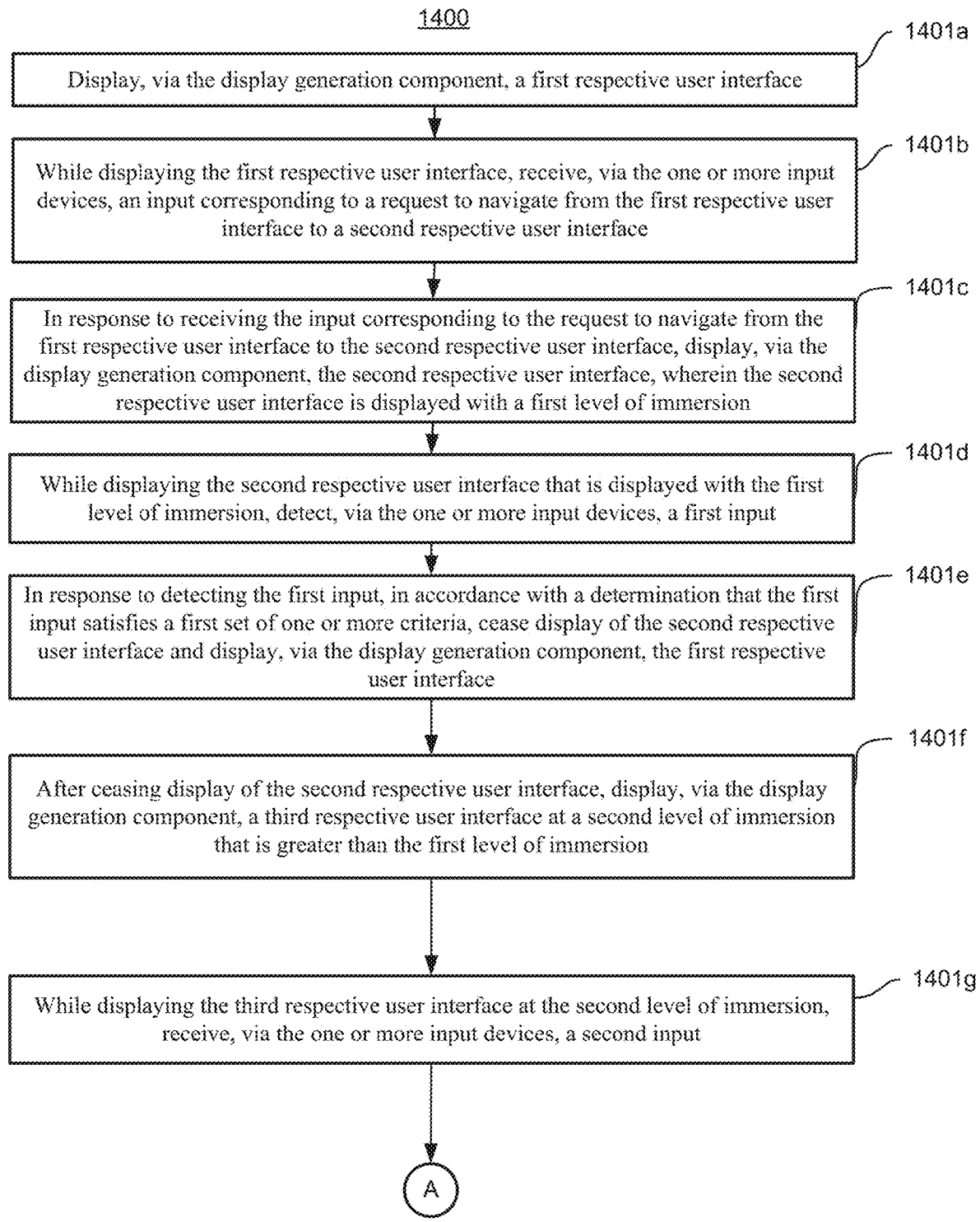
FIGS. 14A-14M is a flowchart illustrating a method of navigating back from user interfaces having different levels of immersion in different ways in accordance with some embodiments.
Figure 14B:
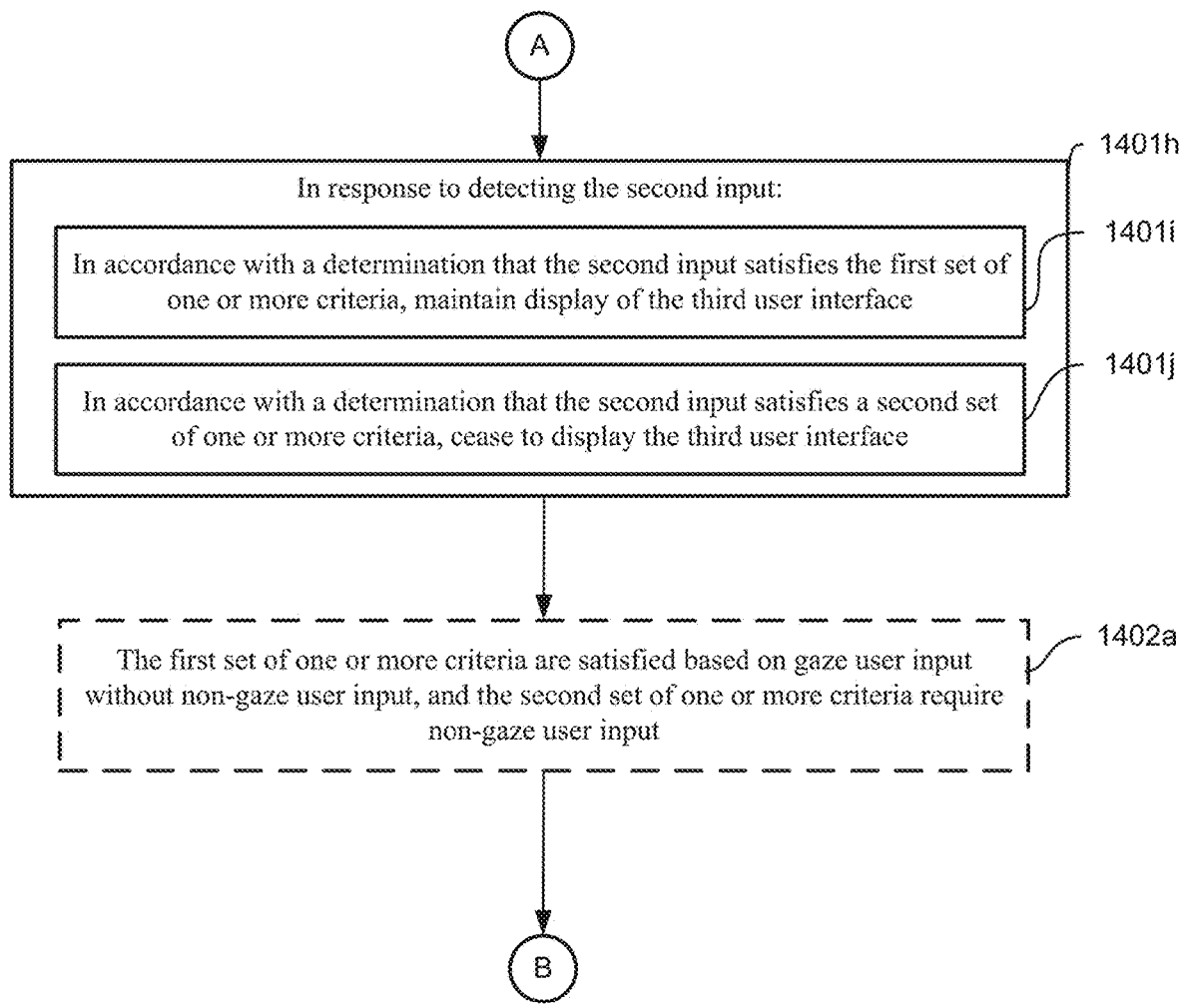
Figure 14C:
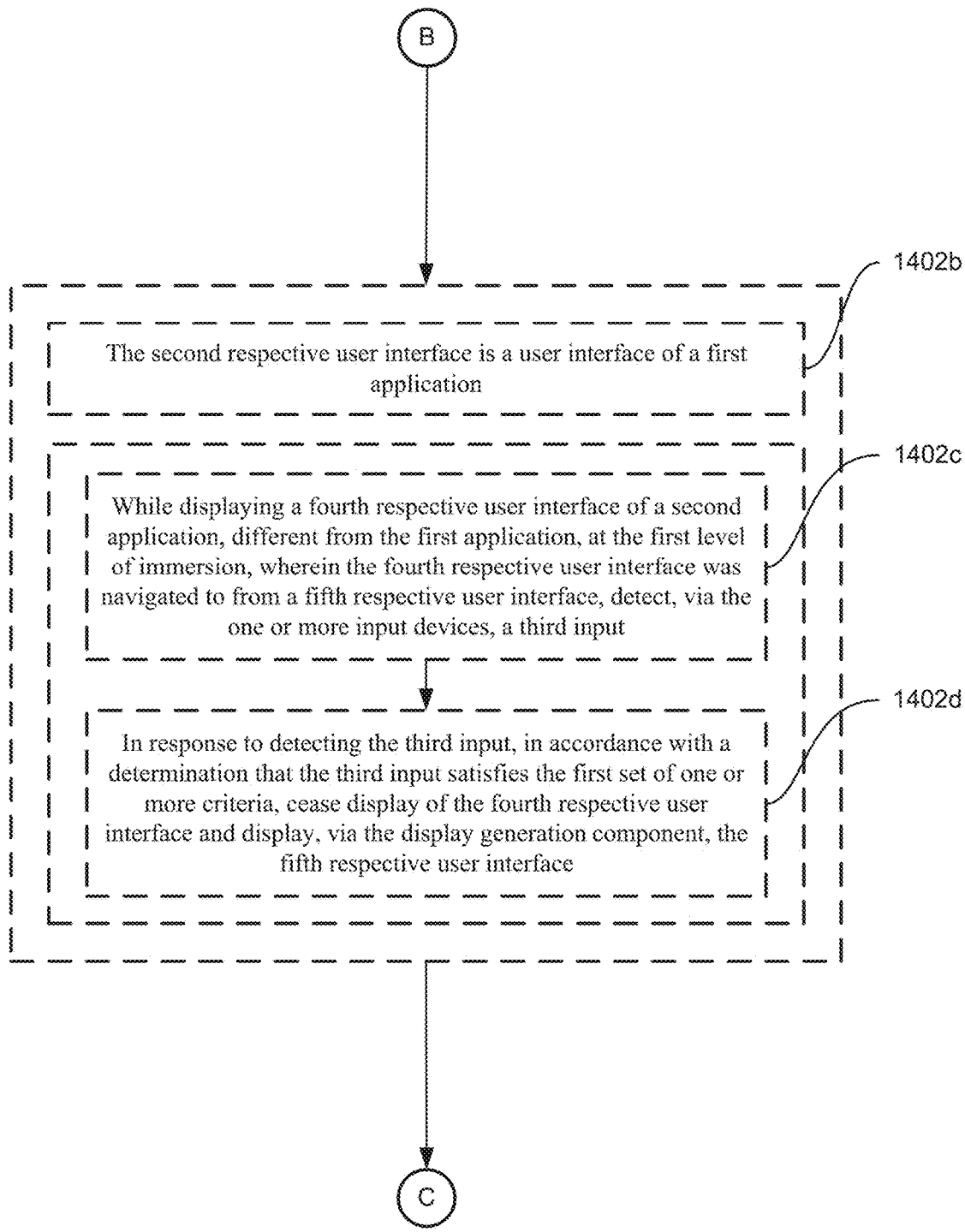
Figure 14D:
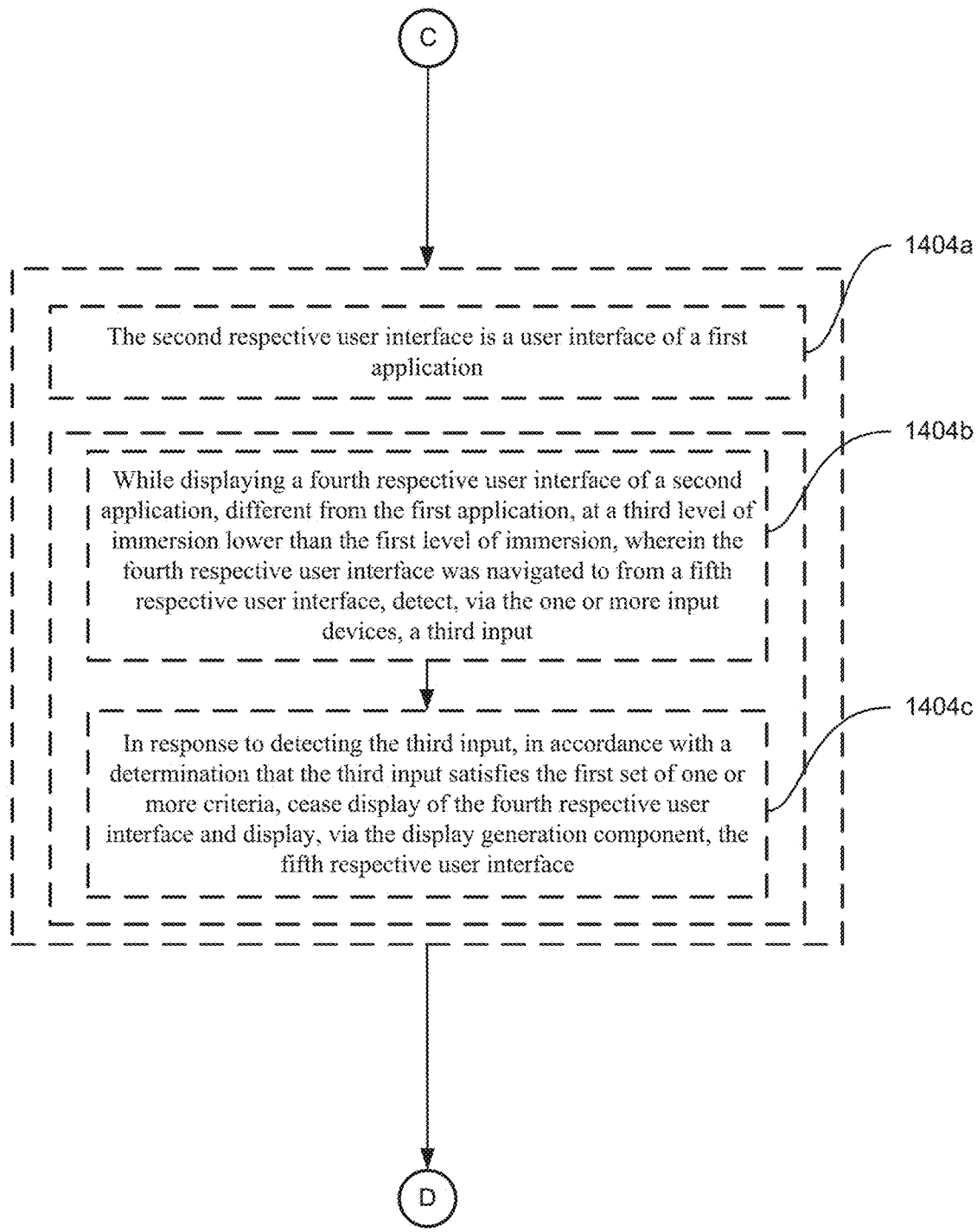
Figure 14E:
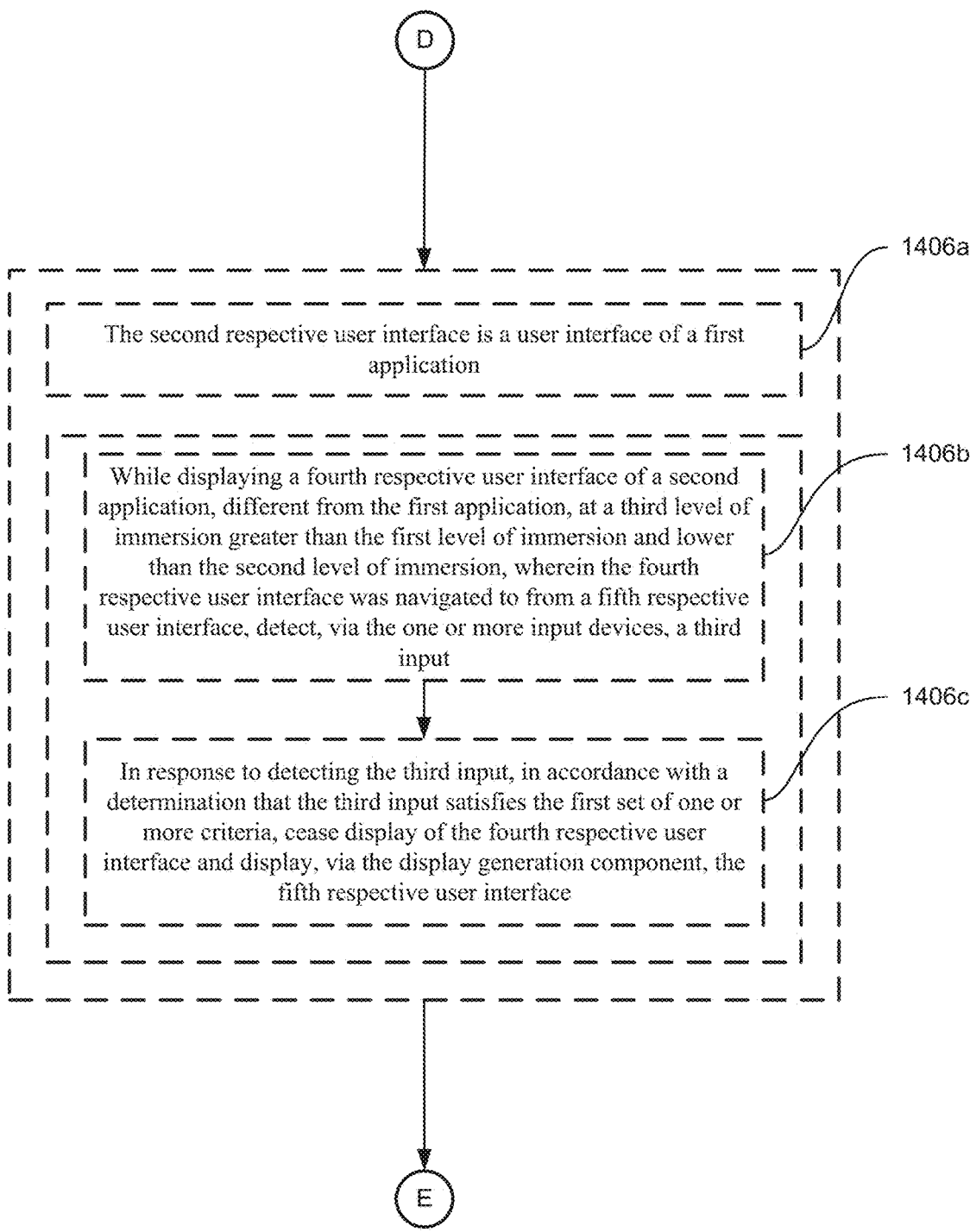
Figure 14F:
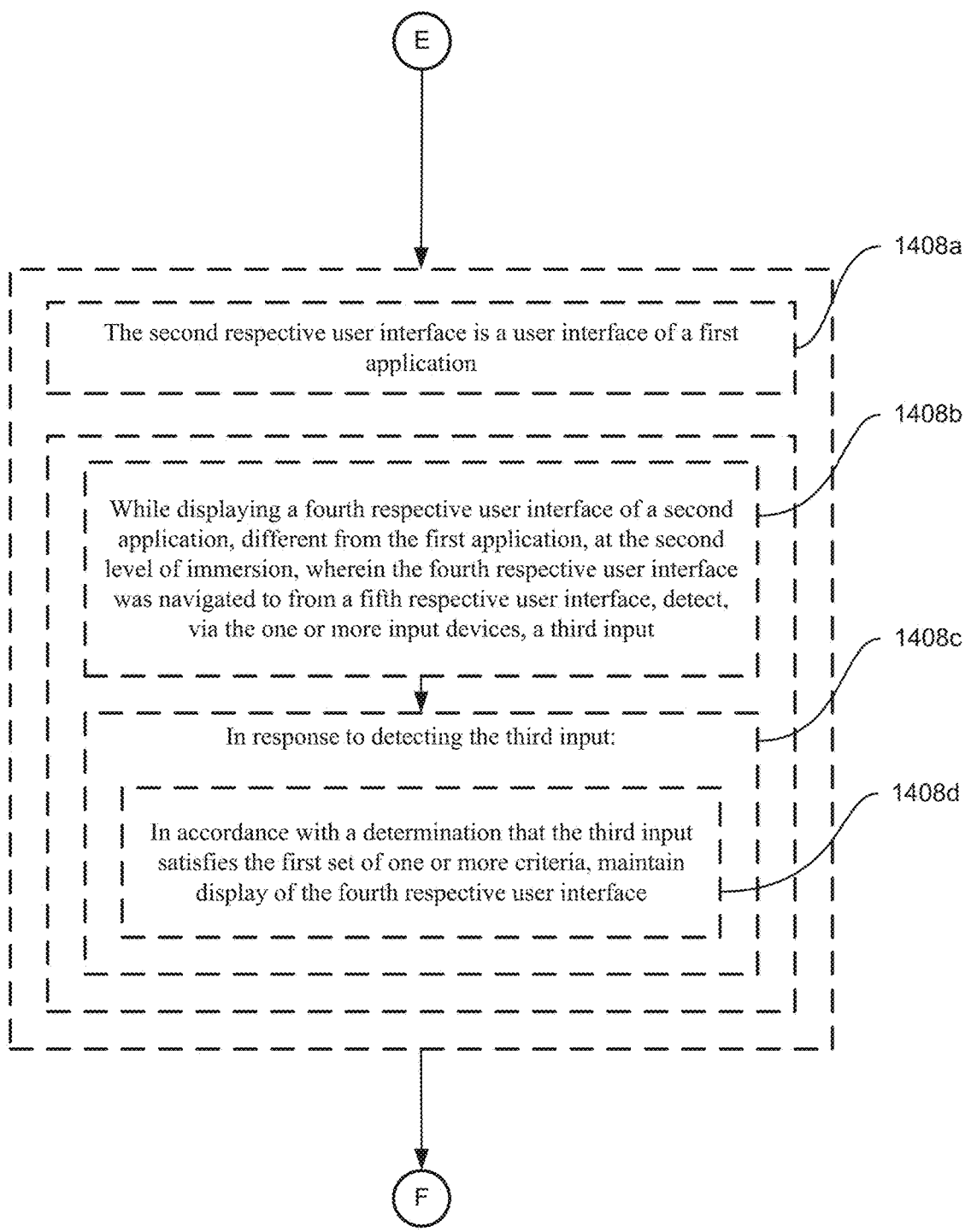
Figure 14G:
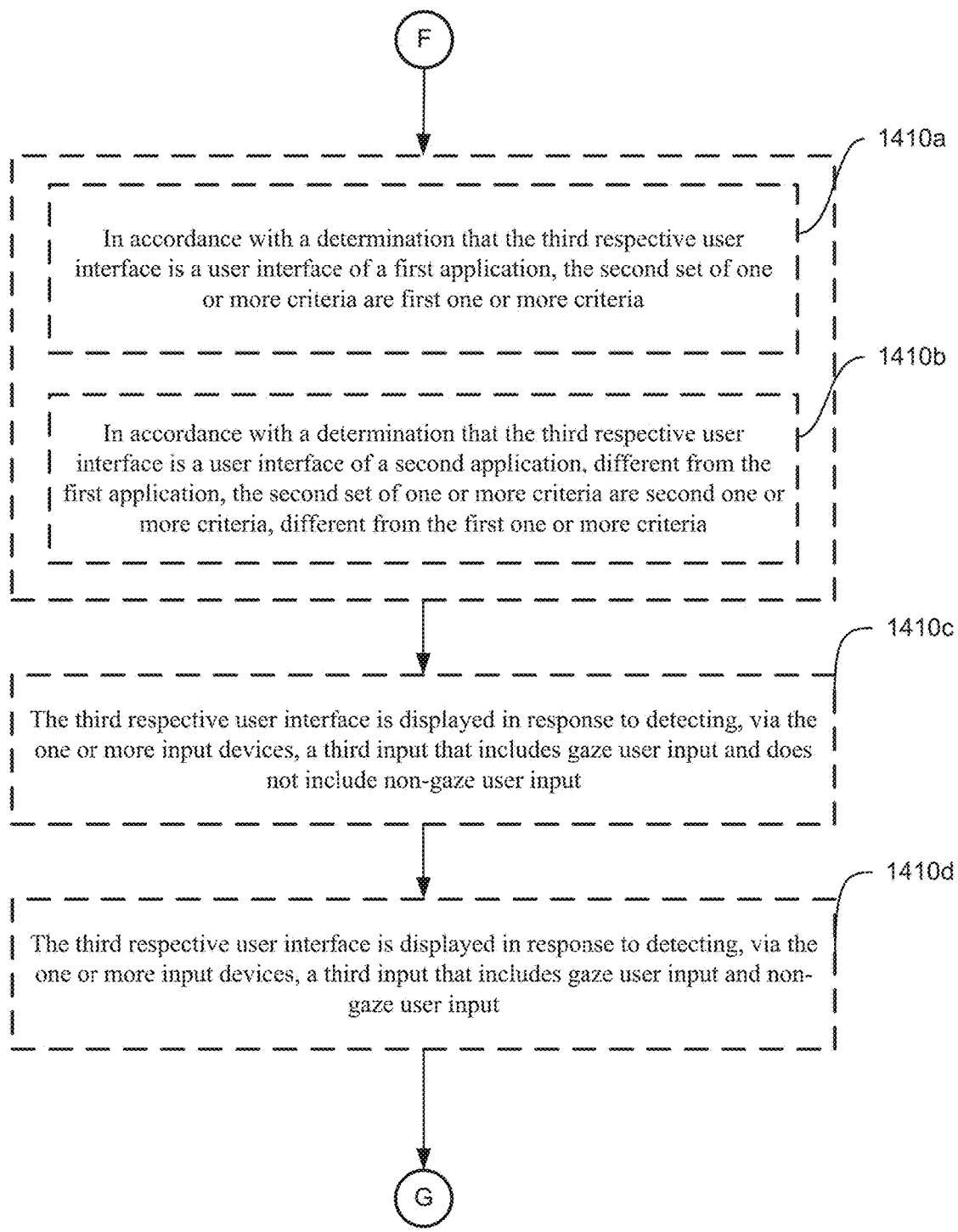
Figure 14H:
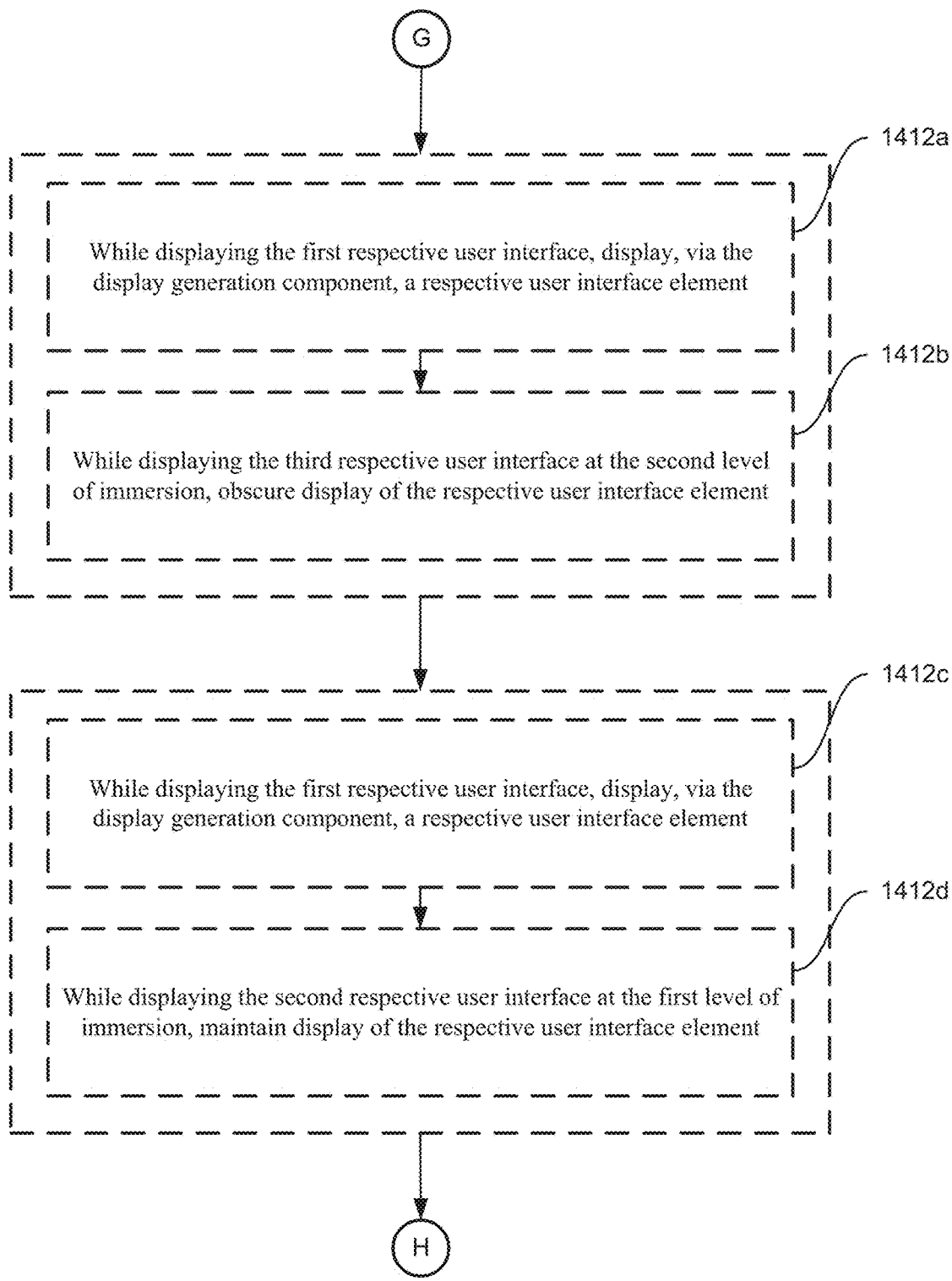
Figure 14I:
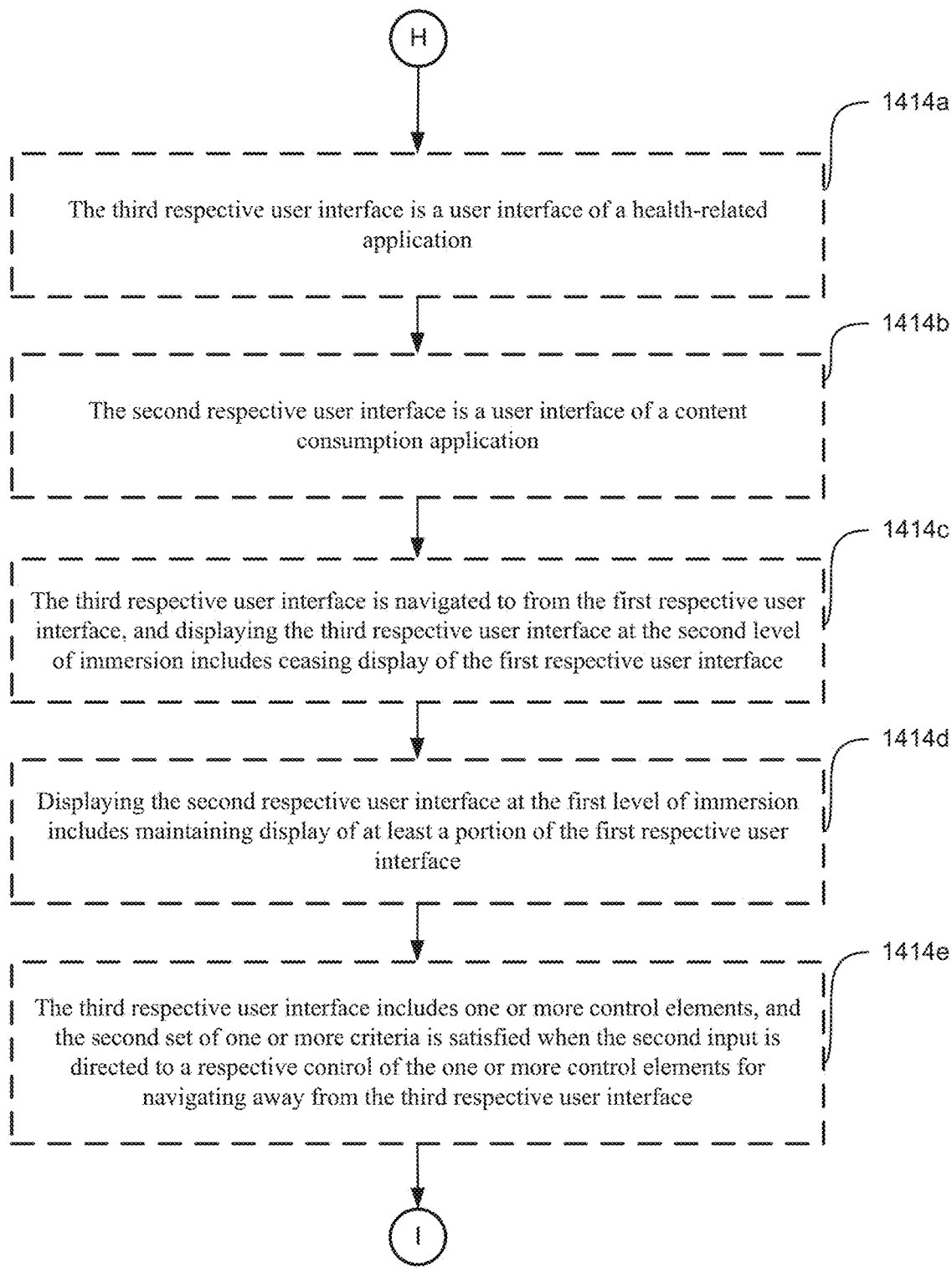
Figure 14J:
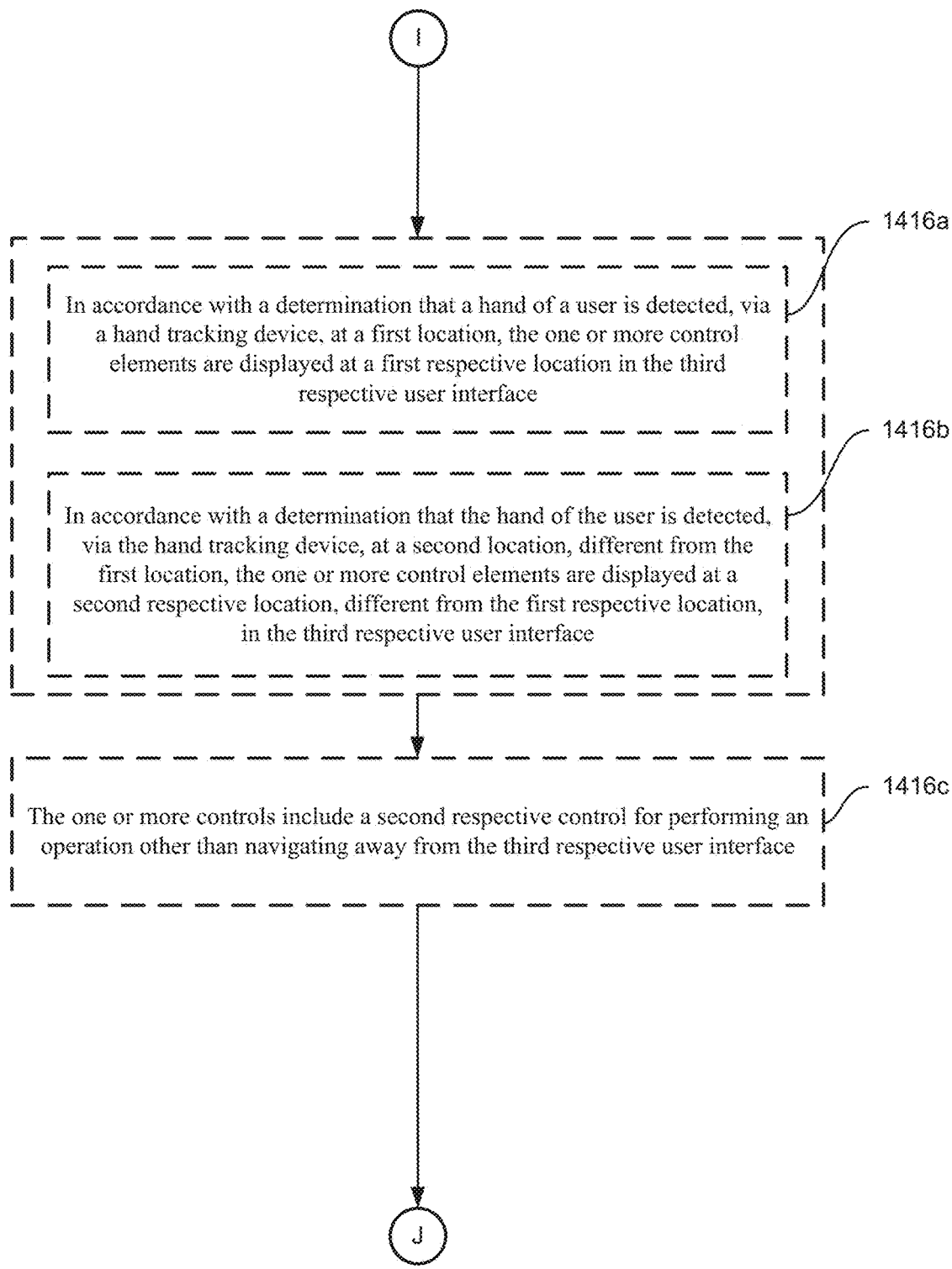
Figure 14K:
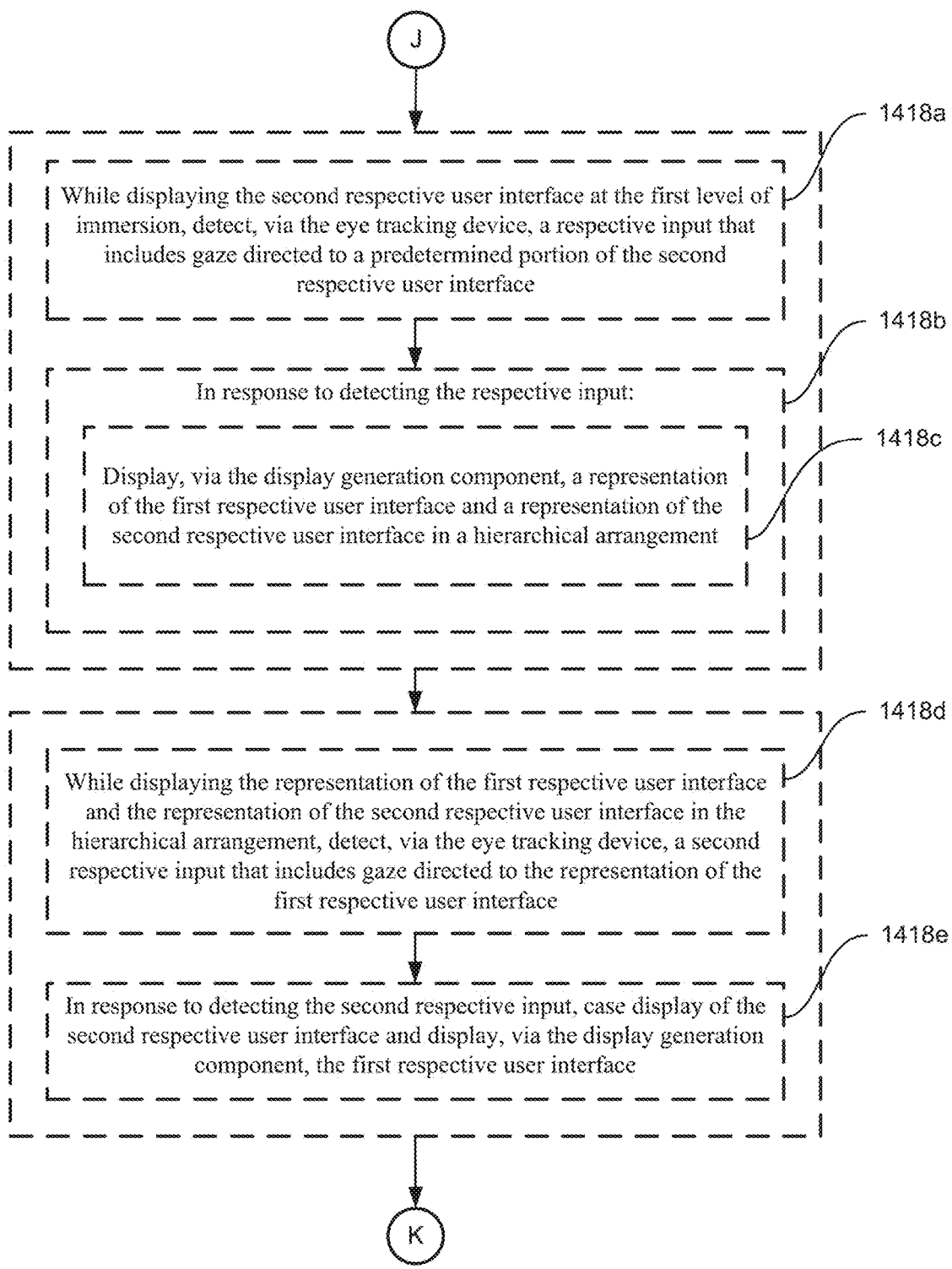
Figure 14L:
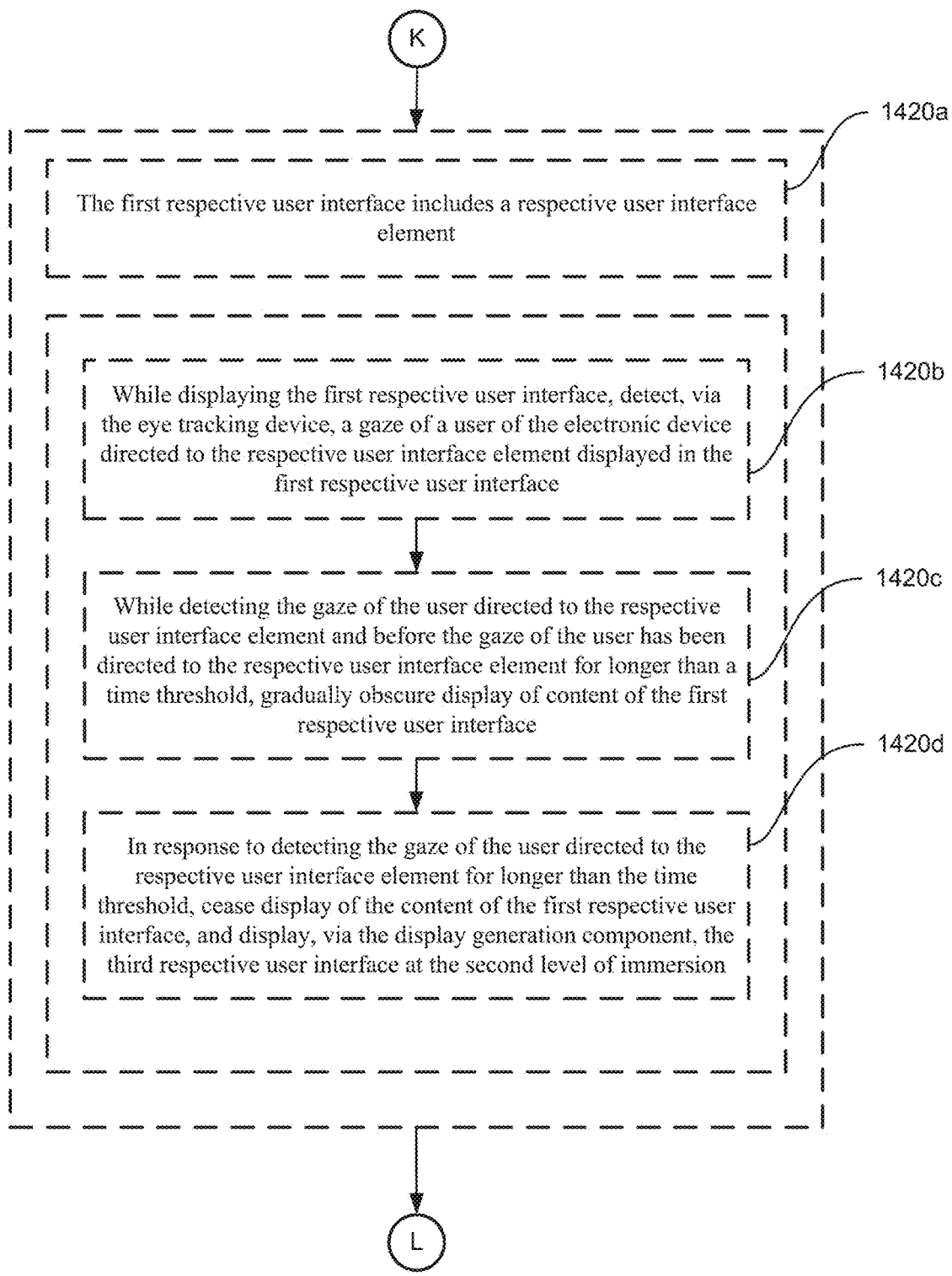
Figure 14M:
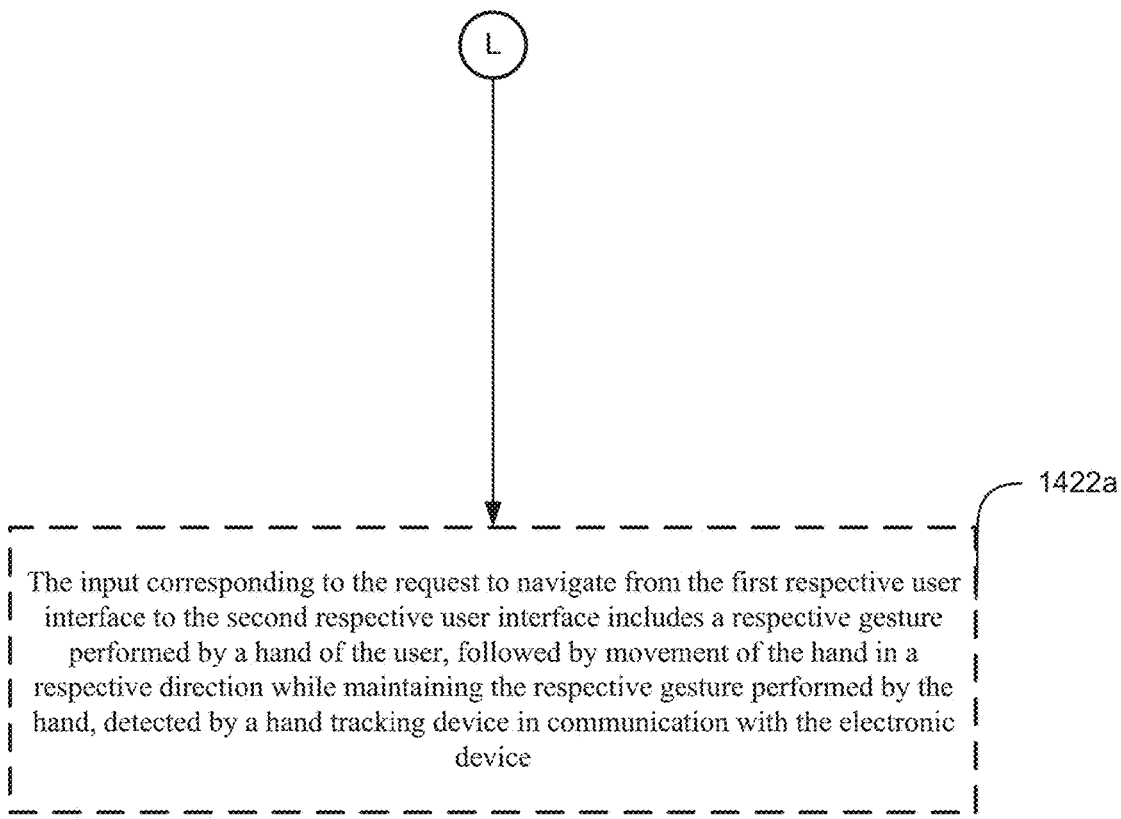

1304*a* while the gaze 1302*a* of the user is directed to the user interface element 1308 for less than the threshold time, the electronic device 101 displays the user interface in FIGS. 13C-13D (e.g., in less than the threshold time). In some embodiments, the gesture includes the user touching a thumb to another finger (e.g., index, middle, ring, little finger) on the same hand as the thumb (e.g., a pinch gesture). Thus, in some embodiments, the electronic device 101 displays the user interface associated with user interface element 1308 according to one or more of the techniques described above with reference to FIGS. 7A-8F.

FIG. 13A also illustrates the electronic device 101 detecting the gaze 1302*b* of the user on option 1310. It should be understood that indications 1302*a* and 1302*b* of the user's gaze in FIG. 13A illustrate alternative locations at which the user's gaze is directed and do not exist simultaneously. In some embodiments, in response to detecting the gaze 1302*b* of the user on option 1310 while detecting the user move their hand 1304*b* (e.g., upward) while maintaining the pinch gesture, the electronic device 101 displays the user interface illustrated in FIG. 13B. In some embodiments, the electronic device 101 displays the user interface illustrated in FIG. 13B in response to detecting the gaze 1302*b* of the user on the option 1310 for the threshold time and/or in response to detecting the user perform the pinch gesture (without the movement of the hand 1304*b*) while the gaze 1302*b* of the user is directed to the option 1310.

As will be described below, the user interface in FIG. 13B is displayed with a lower level of immersion than the user interface illustrated in FIGS. 13C-13D. Thus, in some embodiments, there are differences in the ways in which these user interfaces are displayed and differences in the ways in which the electronic device 101 navigates back to the user interface illustrated in FIG. 13A from these user interfaces. These differences will be described below with reference to FIGS. 13B-13D. Although FIGS. 13B-13D include interactions with user interfaces of a single application, it should be understood that the characteristics and features of various levels of immersion on the electronic device 101 apply to user interfaces of a plurality of applications accessible to the electronic device 101, including navigating between user interfaces with different levels of immersion that are associated with different applications and/or with the operating system of device 101.

FIG. 13B illustrates a user interface displayed by the electronic device 101 in response to the input illustrated in FIG. 13A directed towards option 1310. The user interface includes options 1306*a*-1306*f* that were displayed in the user interface illustrated in FIG. 13A, and additional options 1306*g*-1306*l*. As shown in FIG. 13B, options 1306*a*-*f* are moved upward from the locations at which they were displaying in the user interface of FIG. 13A. In some embodiments, options 1306*a*-1306*l* are associated with items of content and, in response to detecting selection of one of the options 1306*a*-1306*l*, the electronic device 101 initiates playback of an item of content (e.g., audio content, video content) associated with the selected option (e.g., displays the item of content via display generation component). The user interface also includes the header region 1314 due to the level of immersion of the user interface in FIG. 13B, as described below. The user interface illustrated in FIG. 13B is overlaid on a portion of the user interface illustrated in FIG. 13A (e.g., including user interface element 1308). In some embodiments, the elements of the previous user interface are displayed in a blurred/darkened manner and/or the separated from options 1306*a*-1306*l* in the z-direction. For example, the electronic device 101 displays element 1308 at a distance further from the user's viewpoint in the three-dimensional environment 1312 in FIG. 13B than in FIG. 13A and/or displays options 1306*a*-13061 at a distance closer to the user's viewpoint in the three-dimensional environment 1312 in FIG. 13B than the distance with which the user interface was displayed from the user's viewpoint in the three-dimensional environment 1312 in FIG. 13A. In some embodiments, the viewpoint of the user in the three-dimensional environment 1312 is a location and orientation associated with the user of electronic device 101 in the three-dimensional environment 1312. The electronic device 101 optionally displays the three-dimensional environment 1312 from of the viewpoint of the user.

As described above, the user interface illustrated in FIG. 13B has a lower level of immersion than the user interface that will be described with reference to FIGS. 13C-13D. In some embodiments, the user interface illustrated in FIG. 13B has a level of immersion that is higher than the level of immersion of the user interface illustrated in FIG. 13A because options 1306*a*-13061 in FIG. 13B are displayed on a blurred and/or darkened background, whereas the background of the user interface illustrated in FIG. 13A is not blurred and/or darkened. In some embodiments, the user interface illustrated in FIG. 13B has a level of immersion that is lower than the level of immersion of the user interface illustrated in FIG. 13A because options 1306*a*-13061 in FIG. 13B are overlaid on a previous user interface, whereas the user interface in FIG. 13A is not displayed on a background at all. In some embodiments, the level of immersion of the user interface in FIG. 13B is low enough that the electronic device 101 continues to display the header region 1314, which includes status indicator of the electronic device 101 that are not unique to the user interface illustrated in FIG. 13B (e.g., the header region 1314 is an operating system object).

In some embodiments, navigation back to the user interface illustrated in FIG. 13A from the user interface illustrated in FIG. 13B is possible using gaze. For example, in FIG. 13B, the electronic device 101 detects the gaze of the user 1302*c* on element 1308 displayed in the background of options 1306*a*-1. In some embodiments, in response to detecting the gaze 1302*c* of the user on element 1308 (or any other portion of the previous user interface in the background in FIG. 13B) for at least a threshold time (e.g., 0.1, 0.2, 0.5, 1, etc. seconds) without detecting an additional input (e.g., from hand 1304*c*), the electronic device 101 navigates back to the user interface illustrated in FIG. 13A. In some embodiments, in response to detecting the user perform a predetermined gesture with their hand 1304*c* while detecting the gaze 1302*c* of the user on element 1308 (or any other portion of the previous user interface) for any duration of time (e.g., less than the threshold time), the electronic device 101 navigates back to the user interface illustrated in FIG. 13A. In some embodiments, the predetermined gesture is touching a thumb to another finger (e.g., index, middle, ring, little finger) on the same hand as the thumb (e.g., a pinch gesture).

In some embodiments, in response to detecting the gaze 1302*c* of the user on element 1308 for the predetermined time, before navigating back to the user interface illustrated in FIG. 13B, the electronic device 101 displays portions of the navigation history of the electronic device 101. For example, the electronic device 101 displays the user interface illustrated in FIG. 13B overlaid on a portion of the user interface illustrated in FIG. 13A, which is in turn overlaid on a portion of a user interface from which the electronic device

101 navigated to the user interface in FIG. 13A, and so on. In some embodiments, while displaying the portions of user interfaces corresponding to the navigation history of the electronic device 101, in response to detecting the gaze of the user on a portion of a respective user interface for the predetermined threshold time, the electronic device 101 navigates to the respective user interface. For example, in response to detecting the user's gaze on the portion of the user interface illustrated in FIG. 13A for the predetermined threshold time, the electronic device 101 navigates back to the user interface illustrated in FIG. 13A. As another example, in response to detecting the user's gaze on the portion of the user interface from which the electronic device navigated to the user interface illustrated in FIG. 13A for the predetermined threshold time, the electronic device 101 navigates back to the user interface from which the electronic device 101 navigated to the user interface illustrated in FIG. 13A.

Thus, in some embodiments, the electronic device 101 navigates back from the user interface illustrated in FIG. 13B in response to a gaze input without requiring detection of an additional (e.g., non-gaze) input. In some embodiments, the electronic device 101 navigates back from other user interfaces (e.g., of other applications) with the same level of immersion or a lower level of immersion than the user interface illustrated in FIG. 13B in the same or in a similar manner. In some embodiments, the electronic device 101 navigates back from other user interfaces (e.g., of other applications) with a level of immersion between the level of immersion of the user interface illustrated in FIG. 13B and the level of immersion of the user interface illustrated in FIGS. 13C-13D in the same or in a similar manner.

FIG. 13C illustrates a user interface 1316 displayed in response to the input directed to element 1308 described above with reference to FIG. 13A. In some embodiments, the user interface 1316 includes video content and/or audio content. For example, the user interface 1316 includes a guided meditation with an ambient animation (e.g., a rhythmic animation guiding the user's breath). As shown in FIG. 13C, the user interface 1316 does not include any portions of the user interface illustrated in FIG. 13A or the header region 1314 illustrated in FIG. 13A-13B. In some embodiments, the level of immersion of user interface 1316 is higher than the level of immersion of the user interfaces illustrated in FIGS. 13A-13B because it does not include portions of other user interfaces or operating system objects (e.g., header region 1314) or portions of the physical environment of the device 101. Because user interface 1316 does not include portions of the previous user interface illustrated in FIG. 13A, the electronic device 101 is unable to navigate back to the user interface illustrated in FIG. 13A in response to detecting the user's gaze on a portion of the user interface illustrated in FIG. 13A for the predetermined time threshold (e.g., without detecting an additional input), as was the case in FIG. 13B. Instead, navigating backwards from a user interface such as the one illustrated in FIG. 13C is accomplished using one or more controls displayed in the user interface, as will be described with reference to FIG. 13D.

FIG. 13D illustrates the user interface 1316 with the addition of a plurality of selectable options 1318 and 1320*a-c*. In some embodiments, the options 1318 and 1320*a-c* are displayed in response to detecting the hand 1304*d* of the user in a predetermined position (e.g., raised from the user's sides) and/or at a predetermined relative position with respective to device 101 (e.g., raised to be adjacent to or positioned within the field of view of one or more cameras of device 101 that capture the physical environment of device 101). In some embodiments, the electronic device 101 displays the options 1320*a-c* and 1318 at a location in the user interface 1316 corresponding to the location of the user's hand 1304*d*. As shown in FIG. 13D, the hand 1304*d* of the user is towards lower right region of display generation component 120 (e.g., a lower right region of the field of view of one or more cameras of device 101 that capture the physical environment of device 101), so the options 1318 and 1320*a-c* are displayed in the lower right region of the display generation component 120. As another example, if the user's hand were proximate to a different region of the display generation component 120, such as being proximate to the upper left region of the display generation component 120 (e.g., a upper left region of the field of view of one or more cameras of device 101 that capture the physical environment of device 101), the electronic device 101 would displays options 1318 and 1320*a-c* in the other region (e.g., the upper left region) of display generation component 120. In some embodiments, if the user were to move their hand 1304*d*, the electronic device 101 would update the location of options 1318 and 1320*a-c* to follow the movement of the hand. In some embodiments, rather than displaying the user interface 1316 via a touch screen, the electronic device 101 displays the user interface 1316 using a head-mounted display and, in response to the user raising their hand 1304*d*, the electronic device 101 displays, via the head-mounted display, the options 1318 and 1320*a-c* overlaid on a representation of the user's hand 1304*d*. In some embodiments, the representation of the user's hand 1304*d* is a photorealistic representation of the hand 1304*d* (e.g., pass-through video) or a view of the user's hand 1304*d* through a transparent portion of the display generation component (e.g., the head-mounted device).

Selectable options 1320*a-c* are optionally playback controls of the media content included in user interface 1316. For example, in response to detecting selection of option 1320*a*, the electronic device 101 moves the playback position of the content back 15 seconds. As another example, in response to detecting selection of option 1320*b*, the electronic device 101 pauses playback of the media content. As another example, in response to detecting selection of option 1320*c*, the electronic device 101 moves the playback position of the content forward 30 seconds. In response to detecting selection of option 1318, the electronic device 101 navigates back to the user interface illustrated in FIG. 13A. In some embodiments, the electronic device 101 detects selection of an option in response to detecting the user perform the pinch gesture (e.g., with their hand other than hand 1304*d*) while the gaze of the user is directed to a respective option 1318 or 1320*a-c*. In some embodiments, the electronic device 101 detects selection in response to detecting the user touching (e.g., with a finger on the hand other than hand 1304*d*) a region of the three-dimensional environment 1316 that corresponds to (e.g., within a threshold distance (e.g., 1, 2, 5, 10, etc. centimeters) of) one of the options 1318 or 1320*a-c*.

Thus, in some embodiments, the electronic device 101 navigates away from user interface 1316 in response to an input that includes input other than detecting the gaze of the user. In some embodiments, the electronic device 101 navigates back from another user interface (e.g., of another application) with the same level of immersion of user interface 1316 in a similar manner. In some embodiments, the electronic device 101 navigates back from another user interface (e.g., of another application) with the same level of immersion of user interface 1316 in a different manner. In some embodiments, the ways of navigating back from user interfaces with the level of immersion that is the same as user interface 1316 varies from application to application.

FIGS. 14A-14M is a flowchart illustrating a method of navigating back from user interfaces having different levels of immersion in different ways in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, such as in FIG. 13A, method 1400 is performed at an electronic device (e.g., 101) in communication with a display generation component 120 and one or more input devices including an eye tracking device (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc.

In some embodiments, such as in FIG. 13A, the electronic device (e.g., 101) displays (1401a), via the display generation component, a first respective user interface. In some embodiments, the first respective user interface is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.).

In some embodiments, such as in FIG. 13A, while displaying the first respective user interface, the electronic device (e.g., 101) receives (1401b), via the one or more input devices, an input corresponding to a request to navigate from the first respective user interface to a second respective user interface. In some embodiments, the request to navigate from the first respective user interface to the second respective user interface includes selection of a user interface element in the first respective user interface that is associated with the second respective user interface. In some embodiments, the electronic device navigates from the first respective user interface to the second respective user interface in accordance with one or more steps of method 800.

In some embodiments, in response to receiving the input corresponding to the request to navigate from the first respective user interface in FIG. 13A to the second respective user interface, the electronic device (e.g., 101) displays (1401c), via the display generation component, the second respective user interface, wherein the second respective user interface is displayed with a first level of immersion, such as in FIG. 13B. Thus, in some embodiments, the second respective user interface is optionally at a current level in a navigation hierarchy associated with the electronic device, and the first respective user interface is optionally at a previous level in the navigation hierarchy associated with the electronic device, such that an input to move backward in the navigational hierarchy optionally results in display of the first respective user interface. In some embodiments, a level of immersion includes an associated degree to which the electronic device displays background content (e.g., content other than the respective user interface) around/behind a respective user interface, optionally including the number of items of background content displayed and the visual characteristics (e.g., colors, contrast, opacity) with which the background content is displayed. In some embodiments, the background content is included in a background over which the respective user interface is displayed. In some embodiments, the background content includes additional user interfaces (e.g., user interfaces generated by the device corresponding to applications other than the application of the respective user interface, operating system user interfaces), virtual objects (e.g., files, representations of other users, etc. generated by the device) not associated with or included in the respective user interface, and real objects (e.g., pass-through objects representing real objects in the physical environment of the electronic device that are displayed by the device such that they are visible via the display generation component). In some embodiments, at a first (e.g., low) level of immersion, the background, virtual and/or real objects are displayed in an unobscured manner. For example, a respective user interface with a low level of immersion is displayed concurrently with the background content, which is displayed with full brightness, color, and/or translucency. In some embodiments, at a second (e.g., higher) level of immersion, the background, virtual and/or real objects are displayed in an obscured manner (e.g., dimmed, blurred, removed from display, etc.). For example, a respective user interface with a high level of immersion is displayed without concurrently displaying the background content (e.g., in a full screen or fully immersive mode). As another example, a user interface displayed with a medium level of immersion is displayed concurrently with darkened, blurred, or otherwise de-emphasized background content. In some embodiments, the visual characteristics of the background objects varies among the background objects. For example, at a particular immersion level, one or more first background objects are visually de-emphasized (e.g., dimmed, blurred, displayed with increased transparency) more than one or more second background objects and one or more third background objects cease to be displayed. In some embodiments, a level of immersion includes an associated degree to which the electronic device displays content other than the respective user interface, including additional user interfaces (e.g., user interfaces corresponding to applications other than the application of the respective user interface, operating system user interfaces), virtual objects (e.g., files, representations of other users) not associated with or included in the respective user interface, and real objects (e.g., pass-through objects representing real objects in the physical environment of the electronic device). For example, a respective user interface with a low level of immersion is displayed concurrently with representations of real objects and user interfaces of applications other than the application associated with the respective user interface, whereas a respective user interface with a high level of immersion is displayed without concurrently displaying any other objects or user interfaces (e.g., in a full screen or fully immersive mode).

In some embodiments, such as in FIG. 13B, while displaying the second respective user interface that is displayed with the first level of immersion, the electronic device (e.g., 101) detects (1401d), via the one or more input devices, a first input (e.g., a gaze input, a hand tracking input, a combination of a gaze and hand tracking input, etc.). In some embodiments, displaying the second respective user interface with the first level of immersion includes displaying the second respective user interface overlaid on the first respective user interface. In some embodiments, displaying the second respective user interface with the first level of immersion includes displaying the second respective user interface with one or more objects in the physical environment of the electronic device that have been passed through via the display generation component. In some embodiments, the first respective user interface and the second respective user interface are user interfaces of the same application. In some embodiments, the first respective user interface and the second respective user interface are user interfaces of different applications.

In some embodiments, in response to detecting the first input, in accordance with a determination that the first input satisfies a first set of one or more criteria, the electronic device (e.g., 101) ceases (1401e) display of the second respective user interface in FIG. 13B and the electronic device (e.g., 101) displays (1400e), via the display generation component, the first respective user interface in FIG. 13A. In some embodiments, the first input corresponds to a request to navigate back in the user interface from the second user interface to the first user interface from which the electronic device navigated to the second user interface, such as an input to move backwards in the navigation hierarchy associated with the electronic device. In some embodiments, detecting the input detected via the eye tracking device includes detecting, via the eye tracking device, the gaze of the user directed to a portion of the first respective user interface concurrently displayed with the second respective user interface. In some embodiments, in response to detecting, via the eye tracking device, the gaze of the user directed to the portion of the first respective user interface, the electronic device navigates back to the first respective user interface. Thus, in some embodiments, navigating backwards to the first respective user interface when the second respect user interface is displayed at the first level of immersion is possible with gaze input only, without requiring input detected via another input device (e.g., a hand tracking input). In some embodiments, the first set of one or more criteria further include a criterion that is satisfied when the gaze of the user is directed to a portion of the first user interface for a predetermined time threshold (e.g., 0.1, 0.2, 0.3, 0.4, 0.5, 0.75, 1 second). In some embodiments, the first set of one or more criteria are satisfied in response to detecting the user's gaze on the first respective user interface while detecting, via the hand tracking device (e.g., one or more cameras, depth sensors, proximity sensors, and/or touch sensors (e.g., trackpad, touch screen)), that the user performs a predetermined gesture (e.g., touching a thumb to a finger (e.g., index finger, ring finger, middle finger, little finger) on the same hand as the thumb).

In some embodiments, after ceasing display of the second respective user interface in FIG. 13B, the electronic device (e.g., 101) displays (1401f), via the display generation component, a third respective user interface at a second level of immersion that is greater than the first level of immersion, such as in FIGS. 13C-13D. In some embodiments, the third respective user interface is navigated to from the first respective user interface. In some embodiments, the second level of immersion does not include displaying any portion of the first respective user interface. For example, the second level of immersion is optionally a full-screen level of immersion where the electronic device displays, via the display generation component, the second respective user interface without displaying objects and user interfaces other than the second respective user interface (e.g., without displaying objects passed through via the display generation component from a physical environment of the electronic device). Thus, in some embodiments, the second level of immersion is higher than the first level of immersion.

In some embodiments, while displaying the third respective user interface at the second level of immersion, such as in FIG. 13D, the electronic device (e.g., 101) receives (1401g), via the one or more input devices, a second input (e.g., an input detected via the eye tracking device, the hand tracking device, or another input device in communication with the electronic device). In some embodiments, the second input is a request to cease display of the third respective user interface. In some embodiments, the second input is a request to navigate back to the first user interface from which the electronic device navigated to the third user interface.

In some embodiments, in response to detecting the second input (1401h), in accordance with a determination that the second input satisfies the first set of one or more criteria, the electronic device (e.g., 101) maintains display (1401i) of the third user interface in FIG. 13D (and optionally performing an operation within the third respective user interface in accordance with the second input). For example, in response to detecting the gaze of the user on a location in the third respective user interface at which the first respective user interface was previously displayed and in accordance with a determination that the gaze is held for the predetermined period of time associated with the first set of one or more criteria, the electronic device continues to display the third respective user interface instead of navigating to the first respective user interface because the level of immersion of the third respective user interface is the second level of immersion instead of the first level of immersion.

In some embodiments, in response to detecting the second input (1401j), in accordance with a determination that the second input satisfies a second set of one or more criteria, the electronic device (e.g., 101) ceases (1401j) to display the third user interface in FIG. 13D. In some embodiments, the second set of one or more criteria include a criterion that is satisfied only when the respective input includes input detected via an input device other than the eye tracking device. In some embodiments, in the second level of immersion, the second respective user interface includes a selectable option that, when selected, via an input device other than the eye tracking device (e.g., via a hand tracking input), causes the electronic device to navigate to the first respective user interface. For example, the electronic device detects, via the eye tracking device, that the user is looking at the selectable option while detecting, via the hand tracking device, the user performing a predetermined gesture (e.g., touching a thumb to a finger (e.g., index finger, middle finger, ring finger, little finger) on the same hand as the thumb)). In some embodiments, if the level of immersion of a respective user interface is a first respective level of immersion, the electronic device ceases display of the respective user interface (and optionally navigates back to the user interface from which the electronic device navigated to the respective user interface) in response to an input detected via the eye tracking device only and if the level of immersion of the respective user interface is a second respective level of immersion, the electronic device ceases display of the respective user interface (and optionally navigates back to the user interface from which the electronic device navigated to the respective user interface) in response to an input at least detected via an input device other than the eye tracking device (e.g., and optionally including input detected via the eye tracking device).

The above-described manner of ceasing to display the second respective user interface with the first level of immersion in response to an input detected via the eye tracking device only and ceasing to display the third respective user interface with the second level of immersion in response to an input detected via an input device other than the eye tracking device provides an efficient way of navigating from a user interface with the first level of immersion and a way of avoiding accidental navigation backwards while displaying a user interface with the second level of immersion, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first set of one or more criteria are satisfied based on gaze user input without non-gaze user input (e.g., do not require non-gaze user input), such as in FIG. 13B, and the second set of one or more criteria require non-gaze user input (1402a), such as in FIG. 13D. In some embodiments, non-gaze input includes input detected via a hand tracking device (e.g., one or more cameras, depth sensors, proximity sensors, touch sensors (e.g., touch screens, trackpads)) or another input device in communication with the electronic device. In some embodiments, the second set of one or more criteria include a criterion that is satisfied in response to detecting, via the hand tracking device, that the user performs a predetermined gesture (e.g., touching a thumb to another finger (e.g., index finger, middle finger, ring finger, little finger) on the same hand as the thumb) with their hand. In some embodiments, the second set of one or more criteria include a criterion that is satisfied in accordance with a determination that the user performs a head movement that satisfies one or more criteria (e.g., moving the head forward). In some embodiments, the second set of one or more criteria include a criterion that is satisfied in response to an interaction with a controller or other input device with physical buttons, switches, knobs, etc. In some embodiments, the first set of one or more criteria are not precluded from being satisfied when a non-gaze user input is detected.

The above-described manner of satisfying the first set of one or more criteria based on gaze only and satisfying the second set of one or more criteria based on gaze and a non-gaze input provides an efficient way of navigating based on gaze only in some situations and a way of preventing accidental navigation in other situations, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13B, the second respective user interface is a user interface of a first application (1402b). In some embodiments, the first respective user interface is also a user interface of the first application. In some embodiments, the first respective user interface is a user interface of an application other than the first application (e.g., a user interface of the operating system of the electronic device). In some embodiments, while displaying a fourth respective user interface of a second application, different from the first application, at the first level of immersion, wherein the fourth respective user interface was navigated to from a fifth respective user interface, the electronic device (e.g., 101) detects (1402c), via the one or more input devices, a third input. In some embodiments, the third input corresponds to a request to navigate back to the fifth respective user interface from the fourth respective user interface. In some embodiments, the fifth user interface is a user interface of the second application. In some embodiments, the fifth user interface is a user interface of an application other than the second application (e.g., a user interface of an operating system of the electronic device). In some embodiments, the electronic device navigates to the fourth user interface from the fifth user interface in accordance with one or more steps of method 800. In some embodiments, in response to detecting the third input, in accordance with a determination that the third input satisfies the first set of one or more criteria (e.g., criteria that are satisfied based on an input that is detected via the eye tracking device without detecting a non-gaze input with a different input device), the electronic device (e.g., 101) ceases (1402*d*) display of the fourth respective user interface and displaying, via the display generation component, the fifth respective user interface. For example, in response to detecting the user's gaze on a portion of the fifth respective use interface over which the fourth user interface is overlaid and in accordance with a determination that the gaze is held for a predetermined time threshold (e.g., 0.1, 0.2, 0.3, 0.4, 0.5, 0.75, 1 second), the electronic device ceases display of the fourth user interface and displays the fifth user interface. In some embodiments, in accordance with a determination that the fourth respective user interface is displayed with the second level of immersion, the electronic device forgoes navigating to the fifth user interface in response to the third input. Therefore, in some embodiments, the electronic device ceases display of one or more (e.g., any) user interfaces displayed with the first level of immersion in response to an input that satisfies the first set of one or more criteria irrespective of the application associated with the user interface displayed with the first level of immersion.

The above-described manner of ceasing display of a respective user interface displayed with the first level of immersion in response to an input that satisfies the first set of one or more criteria irrespective of the application associated with the respective application provides an efficient and consistent way of navigating user interfaces with gaze only, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13B, the second respective user interface is a user interface of a first application (1404a). In some embodiments, the first respective user interface is also a user interface of the first application. In some embodiments, the first respective user interface is a user interface of an application other than the first application. In some embodiments, while displaying a fourth respective user interface of a second application, different from the first application, at a third level of immersion lower than the first level of immersion, wherein the fourth respective user interface was navigated to from a fifth respective user interface (e.g., the fifth user interface is a user interface of the second application or a user interface of an application other than the second application), the electronic device (e.g., 101) detects (1404b), via the one or more input devices, a third input. In some embodiments, the third level of immersion includes display of more real objects in the physical environment of the electronic device than the first level of immersion (e.g., via pass-through video or by way of enabling the user to see the real objects through a transparent portion of the display generation component). In some embodiments, the third level of immersion includes less virtual lighting effects than the first level of immersion. In some embodiments, the third level of immersion includes less virtual scenery (e.g., virtual objects other than content, representations of applications, interactable elements, etc.) than the first level of immersion. In some embodiments, the third input corresponds to a request to cease displaying the fourth respective user interface and display the fifth respective user interface. In some embodiments, the electronic device navigates to the fourth user interface from the fifth user interface in accordance with one or more steps of method 800. In some embodiments, in response to detecting the third input, in accordance with a determination that the third input satisfies the first set of one or more criteria (e.g., criteria that are satisfied based on an input that is detected via the eye tracking device without detecting a non-gaze input with a different input device), the electronic device (e.g., 101) ceases (1404c) display of the fourth respective user interface and displaying, via the display generation component, the fifth respective user interface. For example, in response to detecting the user's gaze on a portion of the fifth respective use interface over which the fourth user interface is overlaid and in accordance with a determination that the gaze is held for a predetermined time threshold (e.g., 0.1, 0.2, 0.3, 0.4, 0.5, 0.75, 1 second), the electronic device ceases display of the fourth user interface and displays the fifth user interface. Therefore, in some embodiments, the electronic device ceases display of one or more (e.g., any) user interfaces displayed with a level of immersion that is lower or equal to the first level of immersion in response to an input that satisfies the first set of one or more criteria.

The above-described manner of ceasing display of a respective user interface displayed with a level of immersion less than or equal to the first level of immersion in response to an input that satisfies the first set of one or more criteria provides an efficient and consistent way of navigating user interfaces with gaze only, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13B, the second respective user interface is a user interface of a first application (1406a). In some embodiments, the first respective user interface is also a user interface of the first application. In some embodiments, the first respective user interface is a user interface of an application other than the first application (e.g., a user interface of the operating system of the electronic device). In some embodiments, while displaying a fourth respective user interface of a second application, different from the first application, at a third level of immersion greater than the first level of immersion and lower than the second level of immersion, wherein the fourth respective user interface was navigated to from a fifth respective user interface (e.g., the fifth user interface is a user interface of the second application or a user interface of an application other than the second application), the electronic device (e.g., 101) detects (1406b), via the one or more input devices, a third input. In some embodiments, the third level of immersion includes display of more real objects in the physical environment of the electronic device than the second level of immersion and fewer real objects in the physical environment of the electronic device than the first level of immersion (e.g., via pass-through video or by way of enabling the user to see the real objects through a transparent portion of the display generation component). In some embodiments, the third level of immersion includes more virtual lighting effects than the first level of immersion and less virtual lighting effects than the second level of immersion. In some embodiments, the third level of immersion includes less virtual scenery (e.g., virtual objects other than content, representations of applications, interactable elements, etc.) than the second level of immersion. In some embodiments, the third input corresponds to a request to cease displaying the fourth respective user interface and display the fifth respective user interface. In some embodiments, in response to detecting the third input, in accordance with a determination that the third input satisfies the first set of one or more criteria (e.g., criteria that are satisfied based on an input that is detected via the eye tracking device without detecting a non-gaze input with a different input device), the electronic device ceases (1406c) display of the fourth respective user interface and displaying, via the display generation component, the fifth respective user interface. For example, in response to detecting the user's gaze on a portion of the fifth respective use interface over which the fourth user interface is overlaid and in accordance with a determination that the gaze is held for a predetermined time threshold (e.g., 0.1, 0.2, 0.3, 0.4, 0.5, 0.75, 1 second), the electronic device ceases display of the fourth user interface and displays the fifth user interface. In some embodiments, the electronic device ceases display of one or more (e.g., any) user interfaces displayed with a level of immersion that is between the first and second levels of immersion in response to an input that satisfies the first set of one or more criteria. Therefore, in some embodiments, the electronic device ceases display of one or more (e.g., any) user interfaces displayed with a level of immersion that is less than the second level of immersion in response to an input that satisfies the first set of one or more criteria.

The above-described manner of ceasing display of a respective user interface displayed with a level of immersion less than or equal to the first level of immersion in response to an input that satisfies the first set of one or more criteria provides an efficient and consistent way of navigating user interfaces with gaze only, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13B, the second respective user interface is a user interface of a first application (1408a). In some embodiments, the electronic device navigates to the second respective user interface from another user interface of the first application. In some embodiments, the electronic device navigates to the second respective user interface from a user interface of an application other than the first application (e.g., a user interface of the operating system of the electronic device). In some embodiments, while displaying a fourth respective user interface of a second application, different from the first application, at the second level of immersion, wherein the fourth respective user interface was navigated to from a fifth respective user interface, the electronic device (e.g., 101) detects (1408b), via the one or more input devices, a third input. In some embodiments, the third input corresponds to a request to cease display of the fourth respective user interface and display the fifth respective user interface. In some embodiments, in response to detecting the third input (1408c), in accordance with a determination that the third input satisfies the first set of one or more criteria (e.g., without satisfying the second set of one or more criteria), the electronic device (e.g., 101) maintains (1408d) display of the fourth respective user interface (and optionally performing an operation within the fourth respective user interface in accordance with the second input). In some embodiments, the first set of one or more criteria include a criterion that is satisfied when the gaze of the user is directed to a region of the display generation component at which the fifth respective user interface was previously displayed for a predetermined time threshold (e.g., 0.1, 0.2, 0.3, 0.4, 0.5, 0.75, 1 second). In some embodiments, in accordance with a determination that the input satisfies the second set of one or more criteria (e.g., criteria that are satisfied in response to detecting an input via the eye tracking device and detecting an input via an input device other than the gaze tracking device (e.g., the hand tracking device)), the electronic device ceases displaying the fourth respective user interface and displays the fifth respective user interface.

The above-described manner of maintaining display of the fourth respective user interface disabled with the second level of immersion in response to the input that satisfies the first set of one or more criteria provides an efficient way of preventing unintentional navigation while viewing a user interface displayed with the second level of immersion which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with a determination that the third respective user interface in FIGS. 13C-13D is a user interface of a first application, the second set of one or more criteria are first one or more criteria (1410a). In some embodiments, the first one or more criteria include a criterion that is satisfied when an input is directed towards a respective user interface element displayed in the third user interface (e.g., the electronic device detects selection of the respective user interface element). In some embodiments, the first one or more criteria include criteria related to which input device other than the eye tracking device receives an input. In some embodiments, the first one or more criteria include criteria related to detecting, via the hand tracking device (e.g., one or more cameras, depth sensors, proximity sensors, touch sensors), performance of a respective hand gesture. In some embodiments, in accordance with a determination that the third respective user interface in FIGS. 13C-13D is a user interface of a second application, different from the first application, the second set of one or more criteria are second one or more criteria, different from the first one or more criteria (1410b). In some embodiments, the second one or more criteria include a criterion that is satisfied when an input is directed towards a respective user interface element displayed in the third user interface that is different from a respective user interface element associated with the first one or more criteria (e.g., the electronic device detects selection of the respective user interface element). In some embodiments, the second one or more criteria include criteria related to which input device other than the eye tracking device receives an input that is different from an input device other than the eye tracking device associated with the second one or more criteria. In some embodiments, the second one or more criteria include criteria related to detecting, via the hand tracking device (e.g., one or more cameras, depth sensors, proximity sensors, touch sensors), performance of a respective hand gesture that is different from a hand gesture associated with the first one or more criteria. In some embodiments, the types of criteria in the one or more first criteria and the one or more second criteria are different. For example, the one or more first criteria include criteria that are satisfied in response to the detecting the user looking at a respective user interface element while performing a first respective gesture and the second one or more criteria include criteria that are satisfied in response to detecting an input via a button or switch in communication with the electronic device.

The above-described manner of evaluating an input against different second sets of one or more criteria depending on the application of the user interface that is displayed provides an efficient way of ceasing display of a user interface in response to an input that does not perform a different function in the user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the third respective user interface in FIG. 13C is displayed in response to detecting, via the one or more input devices, a third input that includes gaze user input and does not include non-gaze user input (1410c). In some embodiments, detecting the gaze input includes detecting, via the eye tracking device, that the user's gaze is directed to a respective user interface element (e.g., a user interface element associated with the third respective user interface) for a predetermined threshold of time (e.g., 0.1, 0.2, 0.3, 0.4, 0.5, 1, etc. seconds). In some embodiments, in response to detecting the user's gaze on the respective user interface element, the electronic device expands the respective user interface element while the user's gaze is maintained and animates the expanding respective user interface element morphing into the third respective user interface.

The above-described manner of navigating to the third user respective user interface in response to an input that includes gaze input only provides an efficient way of navigating to the third user interface based on input received at one input device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the third respective user interface in FIG. 13C is displayed in response to detecting, via the one or more input devices, a third input that includes gaze user input and non-gaze user input (1410*d*). In some embodiments, detecting the third input includes detecting, via the eye tracking device, that the gaze of the user is directed to a respective user interface element (e.g., a user interface element associated with the third respective user interface) while detecting another input via another input device. For example, the other input detected via the other input device is a hand gesture (e.g., the user touching their thumb to a finger (e.g., index, middle, ring, little finger) on the same hand as the thumb) detected via a hand tracking device (e.g., one or more cameras, depth sensors, proximity sensors, touch sensors). In some embodiments, in response to detecting the gaze of the user on the respective user interface element, the electronic device begins displaying an animation of the respective user interface element expanding and, in response to the non-gaze user input, the electronic device skips the rest of the animation and displays the third respective user interface in less time than the time it would take for the animation to complete. In some embodiments, in response to the non-gaze input, the electronic device increases the speed of the animation to display the third respective user interface.

The above-described manner of displaying the third user interface in response to an input that includes gaze input and non-gaze input provides an efficient way of preventing accidental navigation to the third respective user interface which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first respective user interface, such as in FIG. 13A, the electronic device (e.g., 101) displays (1412*a*), via the display generation component, a respective user interface element (e.g., 1314) (e.g., an operating system user interface element, another user interface, an item of content, a virtual object, a real object (e.g., pass through video including a photorealistic representation of an object in the physical environment of the electronic device or allowing the user to view the real object in the physical environment of the electronic device through a transparent portion of the display generation component), etc.). In some embodiments, the respective user interface element is an element of the first application. In some embodiments, the respective user interface element is an element of a different application or of the operating system. In some embodiments, such as in FIG. 13C, while displaying the third respective user interface at the second level of immersion, the electronic device (e.g., 101) obscures (1412*b*) display of the respective user interface element. In some embodiments, the area of the display generation component at which the third user interface is displayed includes the area of the display generation component at which the respective user interface element had previously been displayed. In some embodiments, the electronic device does not display any other user interfaces or objects while displaying the third respective user interface. In some embodiments, obscuring display of the respective user interface element includes darkening the third respective user interface, moving the respective user interface element to the side of a display area of the display generation component, and/or displaying the third respective user interface at least partially overlaid on the respective user interface element.

The above-described manner of obscuring display of the respective user interface element while displaying the third respective user interface provides an efficient way of increasing the amount of content of the third respective user interface that is concurrently displayed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the first respective user interface, such as in FIG. 13A, the electronic device (e.g., 101) displays (1412*c*), via the display generation component, a respective user interface element (e.g., 1314) (e.g., an operating system user interface element, another user interface, an item of content, a virtual object, a real object (e.g., pass through video including a photorealistic representation of an object in the physical environment of the electronic device or allowing the user to view the real object in the physical environment of the electronic device through a transparent portion of the display generation component), etc.). In some embodiments, the respective user interface element is an element of the first application. In some embodiments, the respective user interface element is an element of a different application or of the operating system. In some embodiments, such as in FIG. 13B, while displaying the second respective user interface at the first level of immersion, the electronic device (e.g., 101) maintains (1412*d*) display of the respective user interface element (e.g., 1314). In some embodiments, the electronic device maintains display of the respective user interface element without updating the respective user interface element. In some embodiments, the electronic device updates (e.g., a size, position, visual characteristic (transparency, translucency, color)) the respective user interface element while displaying the second respective user interface. In some embodiments, the respective user interface element is blurred, translucent, and/or displayed with different colors (e.g., in black and white or greyscale) while visible in the background of the second respective user interface.

The above-described manner of maintaining display of the respective user interface element while displaying the second respective user interface provides an efficient way of enabling the user to view and/or navigate to the respective user interface element while the second respective user interface is displayed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIGS. 13C-13D, the third respective user interface is a user interface of a health-related application (1414a). In some embodiments, the health-related application includes mindfulness content, such as guided meditations. In some embodiments, the health-related application includes health data of the user, such as activity data, body measurements, health records, heart rate data, etc.

The above-described manner of displaying a user interface of a health-related application with the second level of immersion provides an efficient way of enabling the user to focus on the health-related application, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13B, the second respective user interface is a user interface of a content consumption application (1414b) (e.g., an application for presenting photo, video, music, or other content). In some embodiments, the content of the second respective user interface encompasses an entirety of the second respective user interface. In some embodiments, the content of the second respective user interface encompasses a portion of the second respective user interface.

The above-described manner of presenting a content consumption application with the second level of immersion provides an efficient way of enabling the user to interact with content while interacting with other objects displayed by the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the third respective user interface in FIGS. 13C-13D is navigated to from the first respective user interface, such as in FIG. 13A, and displaying the third respective user interface at the second level of immersion includes ceasing display of the first respective user interface (1414c). In some embodiments, the electronic device does not display any content, objects, or user interfaces other than the third respective user interface while displaying the third respective user interface. In some embodiments, the first respective user interface and the third respective user interface are user interfaces of the same application. In some embodiments, the first respective user interface and third respective user interface are user interfaces of different applications.

The above-described manner of ceasing display of the first respective user interface while displaying the third respective user interface provides an efficient way of displaying the third respective user interface with reduced visual clutter and reduces cognitive burden on the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13B, displaying the second respective user interface at the first level of immersion includes maintaining display of at least a portion (e.g., 1308) of the first respective user interface (1414d). In some embodiments, the second respective user interface is overlaid on a blurred and/or darkened version of the first respective user interface. In some embodiments, the electronic device displays a header region of the first respective user interface behind the second respective user interface. In some embodiments, the first set of one or more criteria include a criterion that is satisfied in accordance with a determination that the user looks at a portion of the first user interface that is visible while the second user interface is displayed for a threshold period of time (e.g., 0.1, 0.2, 0.3, 0.4, 0.5, 1, etc. seconds). In some embodiments, the electronic device navigates from the first respective user interface to the second respective user interface in accordance with one or more steps of method 800. In some embodiments, in response to detecting a gaze-based input on the portion of the first respective user interface only or in response to detecting a gaze-gazed input on the portion of the first respective user interface and a non-gaze input, the electronic device navigates back to the first respective user interface.

The above-described manner of maintaining display of at least a portion of the first respective user interface while displaying the second respective user interface provides an efficient way of navigating back to the first respective user interface based on gaze only, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13D, the third respective user interface includes one or more control elements (e.g., 1318), and the second set of one or more criteria is satisfied when the second input is directed to a respective control (e.g., 1318) of the one or more control elements for navigating away from the third respective user interface (1414e). In some embodiments, the one or more control elements are displayed in response to an input received while the one or more control elements are not yet displayed. For example, the electronic device displays the one or more control elements at a position corresponding to (e.g., overlaid on, proximate to, etc.) a hand of the user in response to detecting, via the hand tracking device (e.g., one or more cameras, depth sensors, proximity sensors, touch sensors (e.g., touch screen, trackpad), that the user raises their hand. In some embodiments, the second input includes detecting selection of one of the control elements associated with ceasing display of the third respective user interface. In some embodiments, detecting selection of a respective element includes detecting, via the eye tracking device, that the user's gaze is directed towards the respective user interface element while detecting, via the hand tracking device, that the user performs a predetermined gesture (e.g., touching the thumb to another finger (e.g., index, middle, ring, little finger) on the same hand as the thumb).

The above-described manner of ceasing to display the third respective user interface in response to an input directed to a respective control element provides an efficient way of avoiding inadvertently navigating away from the third respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13D, in accordance with a determination that a hand (e.g., 1304d) of a user is detected, via a hand tracking device (e.g., one or more cameras, depth sensors, proximity sensors, touch sensors (e.g., touch screen, trackpad)), at a first location, the one or more control elements (e.g., 1318) are displayed at a first respective location in the third respective user interface (1416a). In some embodiments, the first respective location is overlaid on a representation of the user's hand. In some embodiments, the first respective location is proximate to the user's hand. For example, if the user's hand is towards a right side of the display generation component, the electronic device displays the control elements on the right side of the display generation component. In some embodiments, in accordance with a determination that the hand (e.g., 1304d) of the user is detected, via the hand tracking device, at a second location, different from the first location in FIG. 13D, the one or more control elements (e.g., 1318) are displayed at a second respective location, different from the first respective location, in the third respective user interface (1416b). For example, if the user's hand is towards a left side of the display generation component, the electronic device displays the control elements on the left side of the display generation component. In some embodiments, in response to detecting movement of the hand of the user, the electronic device moves the one or more control elements in accordance with the movement of the hand of the user. For example, in response to detecting movement of the hand of the user to the left, the electronic device moves the one or more control elements to the left. In some embodiments, the electronic device displays, via the display generation component, a representation of the user's hand (or the user's hand is visible through a transparent portion of the display generation component) and displays the one or more control elements to appear as though they are displayed on the representation of the user's hand (or on the user's hand visible through the display generation component). For example, in response to detecting the user's palm facing the user, the electronic device displays the one or more control elements to appear in the palm of the user's hand.

The above-described manner of displaying the controls at a respective location based on the location of the user's hand provides an efficient way of displaying the controls at a location that is easily reached by the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13D, the one or more controls include a second respective control (e.g., 1320a) for performing an operation other than navigating away from the third respective user interface (1416c). For example, the third respective user interface includes video and/or audio content and the one or more controls include playback controls for controlling playback of the video and/or audio content (e.g., play/pause, fast forward, rewind).

The above-described manner of displaying the second respective control for performing an operation other than navigating away from the third respective user interface provides an efficient way of displaying multiple controls in the same region of the user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13B, while displaying the second respective user interface at the first level of immersion, the electronic device (e.g., 101) detects (1418a), via the eye tracking device, a respective input that includes gaze (e.g., 1302c) directed to a predetermined portion (e.g., 1308) of the second respective user interface (e.g., a region at the periphery of the second respective user interface, such as the header region along the top of the user interface). In some embodiments, the header region includes the name of the application associated with the third user interface. In some embodiments, in response to detecting the respective input (1418b), the electronic device (e.g., 101) displays (1418c), via the display generation component, a representation of the first respective user interface in FIG. 13A and a representation of the second respective user interface in FIG. 13B in a hierarchical arrangement. In some embodiments, the representation of the second respective user interface is displayed overlaid on the representation of the first respective user interface. In some embodiments, the electronic device further displays one or more additional representations of user interfaces from which the electronic device navigated to the first respective user interface. In some embodiments, the second respective user interface is displayed overlaid on the user interfaces that were previously displayed by the electronic device from which the electronic device navigated to the second respective user interface. In some embodiments, the content of the first respective user interface is hidden and the representation of the first respective user interface is a frame of the first respective user interface (e.g., similar to a frame with which the second respective user interface is displayed). In some embodiments, the electronic device did not display the representation of the first respective user interface (or other representations of other previous user interfaces) until detecting the respective input. In some embodiments, the electronic device displays the representation of the first respective user interface (and other representations of other previous user interfaces) prior to detecting the respective input and updates display of the representation(s) in response to the respective input. Updating display of the representations optionally includes one or more of updating a size, color, position, opacity, translucency, or other visual characteristic of the representations.

The above-described manner of displaying the representation of the first respective user interface and the representation of the second respective user interface in the hierarchical arrangement provides an efficient way of navigating between user interfaces which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the representation of the first respective user interface in FIG. 13A and the representation of the second respective user interface in FIG. 13B in the hierarchical arrangement, the electronic device (e.g., 101) detects (1418d), via the eye tracking device, a second respective input that includes gaze directed to the representation of the first respective user interface. In some embodiments, the gaze is detected for a predetermined threshold period of time (e.g., 0.1, 0.2, 0.3, 0.4, 0.5, 1, etc. seconds). In some embodiments, in response to detecting the second respective input (e.g., and in accordance with a determination that the gaze is held for a predetermined threshold period of time (e.g., 0.1, 0.2, 0.3, 0.4, 0.5, 1, etc. seconds)), the electronic device (e.g., 101) ceases (1418e) display of the second respective user interface and the electronic device (e.g., 101) displays (1418e), via the display generation component, the first respective user interface in FIG. 13A. In some embodiments, in accordance with a determination that the gaze of the user is directed to an additional representation of an additional user interface (e.g., for the predetermined period of time), the electronic device ceases display of the second respective user interface and displays the respective user interface. In some embodiments, prior to detecting the second respective input, the content of the first respective user interface is hidden and the representation of the first respective user interface is a frame of the second respective user interface (e.g., similar to a frame with which the second respective user interface is displayed) and, in response to detecting the second respective input, the electronic device displays the content of the first respective user interface (e.g., with or without the frame). In some embodiments, the electronic device navigates back to the first respective user interface in less time than the predetermined threshold period of time in response to detecting a non-gaze input with the user's gaze on the representation of the first respective user interface.

The above-described manner of navigating to the first respective user interface in response to detecting the user's gaze on the representation of the first user interface provides an efficient way of navigating between user interfaces which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 13A, the first respective user interface includes a respective user interface element (e.g., 1308) (1420a). In some embodiments, such as in FIG. 13A, while displaying the first respective user interface, the electronic device (e.g., 101) detects (1420b), via the eye tracking device, a gaze (e.g., 1302a) of a user of the electronic device directed to the respective user interface element (e.g., 1308) (e.g., a user interface element associated with the third respective user interface) displayed in the first respective user interface. In some embodiments, while detecting the gaze (e.g., 1302a) of the user directed to the respective user interface element (e.g., 1308) in FIG. 13A and before the gaze (e.g., 1302a) of the user has been directed to the respective user interface element for longer than a time threshold (e.g., 0.1, 0.2, 0.3, 0.4, 0.5, 1, etc. seconds), the electronic device (e.g., 101) gradually obscures (1420c) display of content of the first respective user interface (e.g., over time, as the user's gaze is held on the respective user interface element, etc.). In some embodiments, the electronic device gradually obscures display of the content of the first respective user interface based on movement or a gesture performed by the user (e.g., with their hand, with their head). In some embodiments, gradually obscuring display of the content of the first respective user interface includes animating the ceasing of display of the first respective user interface, such as by increasing the translucency of the first respective user interface, decreasing the brightness of the first respective user interface, reducing the size of the first respective user interface, displaying an animation of the first respective user interface moving out of the frame of the display generation component, blurring the first respective user interface, etc. In some embodiments, in response to detecting the gaze (e.g., 1302a) of the user directed to the respective user interface element (e.g., 1308) for longer than the time threshold (e.g., 0.1, 0.2, 0.3, 0.4, 0.5, 1, etc. seconds), such as in FIG. 13A, the electronic device (e.g., 101) ceases (1420d) display of the content of the first respective user interface, and the electronic device (e.g., 101) displays (1420d), via the display generation component, the third respective user interface at the second level of immersion, such as in FIG. 13C. In some embodiments, the electronic device gradually displays the third respective user interface in response to detecting continued gaze from the user directed to the respective user interface element. In some embodiments, the electronic device animates initiation of display of the third respective user interface, such as by decreasing the translucency of the third respective user interface, increasing the brightness of the third respective user interface, increasing the size of the third respective user interface, displaying an animation of the third respective user interface moving into the frame of the display generation component, etc. Thus, in some examples, the electronic device navigates from one user interface to another and increases the level of immersion in response to detecting a gaze input only.

The above-described manner of gradually obscuring the first respective user interface before displaying the third respective user interface provides an efficient way of indicating to the user that continuing to look at the respective user interface element will cause the electronic device to navigate away from the first respective user interface which avoids the user accidentally navigating away from the first respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIGS. 13A-13B, the input corresponding to the request to navigate from the first respective user interface in FIG. 13A to the second respective user interface in FIG. 13B includes a respective gesture performed by a hand (e.g., 1304b) of the user (e.g., the user touching their thumb to one of the other fingers (e.g., index, middle, ring, little finger) on the hand of the thumb), followed by movement of the hand (e.g., 1304b) in a respective direction while maintaining the respective gesture performed by the hand, detected by a hand tracking (e.g., one or more cameras, depth sensors, proximity sensors, touch sensors) device in communication with the electronic device (1422a). In some embodiments, the electronic device displays a respective user interface element associated with the second respective user interface at an edge of the first user interface and the respective direction is a direction away from the edge of the first user interface at which the respective user interface element is displayed. For example, the respective user interface element is displayed along the bottom of the first user interface and the respective direction is up to pull the second respective user interface up (e.g., to be displayed overlaid on the first respective user interface). In some embodiments, the electronic device navigates back to the first respective user interface in response to detecting a gaze input only (e.g., the user's gaze on the first respective user interface for the predetermined threshold (e.g., 0.1, 0.2, 0.3, 0.4, 0.5, 1, etc. seconds)) or in response to detecting a gaze input and a non-gaze input (e.g., a selection input detected via a hand tracking device) in accordance with one or more steps of method 800.

The above-described manner of navigating to the second respective user interface in response to the respective gesture provides an efficient way of avoiding accidentally navigating to the second respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, aspects/operations of methods 800, 1000, 1200, and 1400 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices including an eye tracking device:
displaying, via the display generation component, a first user interface that includes a respective user interface element associated with a second user interface;
while displaying the first user interface, detecting, via the eye tracking device, that a gaze of a user is directed to the respective user interface element; and
in response to detecting an input that includes the gaze of the user directed to the respective user interface element:
in accordance with a determination that the gaze of the user continues to be directed to the respective user interface element for longer than a time threshold, navigating to the second user interface; and
in accordance with a determination that a selection input is detected via the one or more input devices when the gaze of the user has been directed to the respective user interface element for shorter than the time threshold, navigating to the second user interface without waiting for the gaze to continue to be directed to the respective user interface element for longer than the time threshold.

2. The method of claim 1, wherein the selection input comprises a respective gesture performed by a hand of the user detected by a hand tracking device in communication with the electronic device.

3. The method of claim 1, wherein the respective user interface element is displayed at a first size, and navigating to the second user interface includes displaying the second user interface at a second size, larger than the first size.

4. The method of claim 1, wherein before detecting the input that includes the gaze of the user directed to the respective user interface element, the respective user interface element is displayed over a background with a visual characteristic having a first value, and navigating to the second user interface includes displaying the second user interface over the background with the visual characteristic having a second value, different from the first value.

5. The method of claim 1, wherein navigating to the second user interface includes displaying the second user interface with a lighting effect that affects one or more other representations displayed via the display generation component.

6. The method of claim 1, further comprising:
while the gaze of the user is directed to the respective user interface element and before the gaze of the user is directed to the respective user interface element for longer than the time threshold and before navigating to the second user interface, detecting, via the eye tracking device, that the gaze of the user is no longer directed to the respective user interface element; and
in response to detecting that the gaze of the user is no longer directed to the respective user interface element, forgoing navigating to the second user interface.

7. The method of claim 1, further comprising:
while the gaze of the user is directed to the respective user interface element and before the gaze of the user is directed to the respective user interface element for longer than the time threshold and before navigating to the second user interface, displaying, via the display generation component, a visual indication that continued gaze directed to the respective user interface element will cause navigation to the second user interface.

8. The method of claim 7, wherein the visual indication includes an animation of the respective user interface element expanding into the second user interface.

9. The method of claim 7, wherein displaying the visual indication includes initiating an animation of content in the second user interface.

10. The method of claim 7, wherein the first user interface includes a background over which the respective user interface element is displayed, and the visual indication includes obscuring display of the background.

11. The method of claim 1, wherein navigating to the second user interface includes changing a relative simulated depth between the first user interface and the second user interface.

12. The method of claim 1, wherein:
before detecting the input directed to the respective user interface element, the first user interface is displayed with a visual characteristic having a first value,
after navigating to the second user interface, the second user interface is displayed over the first user interface displayed with the visual characteristic having a second value, different from the first value,
the first user interface includes a second respective user interface element associated with a third user interface, the method further comprising:
while displaying the second user interface over the first user interface displayed with the visual characteristic having the second value, receiving, via the one or more input devices, an input for navigating from the second user interface to the third user interface; and
in response to receiving the input for navigating from the second user interface to the third user interface, while maintaining display of the first user interface with the visual characteristic having the second value, ceasing display of the second user interface over the first user interface, and displaying the third user interface over the first user interface.

13. The method of claim 1, further comprising:
in response to detecting that the gaze of the user is directed to the respective user interface element, initiating an animation corresponding to navigating to the second user interface; and
in response to detecting the input that includes the gaze of the user directed to the respective user interface element:
in accordance with the determination that the gaze of the user continues to be directed to the respective user interface element for longer than the time threshold, completing, over the time threshold, the animation corresponding to navigating to the second user interface and navigating to the second user interface; and
in accordance with the determination that the selection input is detected via the one or more input devices when the gaze of the user has been directed to the respective user interface element for shorter than the time threshold, navigating to the second user interface without completing, over the time threshold, the animation corresponding to navigating to the second user interface.

14. An electronic device, comprising:
one or more processors;
memory; and
one or more programs, wherein the one or more programs are stored in the memory and configured to be executed by the one or more processors, the one or more programs including instructions for:
displaying, via a display generation component, a first user interface that includes a respective user interface element associated with a second user interface;
while displaying the first user interface, detecting, via an eye tracking device, that a gaze of a user is directed to the respective user interface element; and
in response to detecting an input that includes the gaze of the user directed to the respective user interface element:
in accordance with a determination that the gaze of the user continues to be directed to the respective user interface element for longer than a time threshold, navigating to the second user interface; and
in accordance with a determination that a selection input is detected via one or more input devices when the gaze of the user has been directed to the respective user interface element for shorter than the time threshold, navigating to the second user interface without waiting for the gaze to continue to be directed to the respective user interface element for longer than the time threshold.

15. A non-transitory computer readable storage medium storing one or more programs, the one or more programs comprising instructions, which when executed by one or more processors of an electronic device, cause the electronic device to:
display, via a display generation component, a first user interface that includes a respective user interface element associated with a second user interface;
while displaying the first user interface, detect, via an eye tracking device, that a gaze of a user is directed to the respective user interface element; and
in response to detecting an input that includes the gaze of the user directed to the respective user interface element:
in accordance with a determination that the gaze of the user continues to be directed to the respective user interface element for longer than a time threshold, navigate to the second user interface; and
in accordance with a determination that a selection input is detected via one or more input devices when the gaze of the user has been directed to the respective user interface element for shorter than the time threshold, navigate to the second user interface without waiting for the gaze to continue to be directed to the respective user interface element for longer than the time threshold.

16. The electronic device of claim 14, wherein the selection input comprises a respective gesture performed by a hand of the user detected by a hand tracking device in communication with the electronic device.

17. The electronic device of claim 14, wherein the respective user interface element is displayed at a first size, and navigating to the second user interface includes displaying the second user interface at a second size, larger than the first size.

18. The electronic device of claim 14, wherein before detecting the input that includes the gaze of the user directed to the respective user interface element, the respective user interface element is displayed over a background with a visual characteristic having a first value, and navigating to the second user interface includes displaying the second user interface over the background with the visual characteristic having a second value, different from the first value.

19. The electronic device of claim 14, wherein navigating to the second user interface includes displaying the second user interface with a lighting effect that affects one or more other representations displayed via the display generation component.

20. The electronic device of claim 14, wherein the one or more programs further include instructions for:
while the gaze of the user is directed to the respective user interface element and before the gaze of the user is directed to the respective user interface element for longer than the time threshold and before navigating to the second user interface, detecting, via the eye tracking device, that the gaze of the user is no longer directed to the respective user interface element; and
in response to detecting that the gaze of the user is no longer directed to the respective user interface element, forgoing navigating to the second user interface.

21. The electronic device of claim 14, wherein the one or more programs further includes instructions for:
while the gaze of the user is directed to the respective user interface element and before the gaze of the user is directed to the respective user interface element for longer than the time threshold and before navigating to the second user interface, displaying, via the display generation component, a visual indication that continued gaze directed to the respective user interface element will cause navigation to the second user interface.

22. The electronic device of claim 21, wherein the visual indication includes an animation of the respective user interface element expanding into the second user interface.

23. The electronic device of claim 21, wherein displaying the visual indication includes initiating an animation of content in the second user interface.

24. The electronic device of claim 21, wherein the first user interface includes a background over which the respective user interface element is displayed, and the visual indication includes obscuring display of the background.

25. The electronic device of claim 14, wherein navigating to the second user interface includes changing a relative simulated depth between the first user interface and the second user interface.

26. The electronic device of claim 14, wherein:
before detecting the input directed to the respective user interface element, the first user interface is displayed with a visual characteristic having a first value,
after navigating to the second user interface, the second user interface is displayed over the first user interface displayed with the visual characteristic having a second value, different from the first value,
the first user interface includes a second respective user interface element associated with a third user interface, the one or more programs further including instructions for:
while displaying the second user interface over the first user interface displayed with the visual characteristic having the second value, receiving, via the one or more input devices, an input for navigating from the second user interface to the third user interface; and
in response to receiving the input for navigating from the second user interface to the third user interface, while maintaining display of the first user interface with the visual characteristic having the second value, ceasing display of the second user interface over the first user interface, and displaying the third user interface over the first user interface.

27. The electronic device of claim 14, wherein the one or more programs further include instructions for:
in response to detecting that the gaze of the user is directed to the respective user interface element, initiating an animation corresponding to navigating to the second user interface; and
in response to detecting the input that includes the gaze of the user directed to the respective user interface element:
in accordance with the determination that the gaze of the user continues to be directed to the respective user interface element for longer than the time threshold, completing, over the time threshold, the animation corresponding to navigating to the second user interface and navigating to the second user interface; and
in accordance with the determination that the selection input is detected via the one or more input devices when the gaze of the user has been directed to the respective user interface element for shorter than the time threshold, navigating to the second user interface without completing, over the time threshold, the animation corresponding to navigating to the second user interface.

28. The non-transitory computer readable storage medium of claim 15, wherein the selection input comprises a respective gesture performed by a hand of the user detected by a hand tracking device in communication with the electronic device.

29. The non-transitory computer readable storage medium of claim 15, wherein the respective user interface element is displayed at a first size, and navigating to the second user interface includes displaying the second user interface at a second size, larger than the first size.

30. The non-transitory computer readable storage medium of claim 15, wherein before detecting the input that includes the gaze of the user directed to the respective user interface element, the respective user interface element is displayed over a background with a visual characteristic having a first value, and navigating to the second user interface includes displaying the second user interface over the background with the visual characteristic having a second value, different from the first value.

31. The non-transitory computer readable storage medium of claim 15, wherein navigating to the second user interface includes displaying the second user interface with a lighting effect that affects one or more other representations displayed via the display generation component.

32. The non-transitory computer readable storage medium of claim 15, wherein the instructions further cause the electronic device to:
while the gaze of the user is directed to the respective user interface element and before the gaze of the user is directed to the respective user interface element for longer than the time threshold and before navigating to the second user interface, detect, via the eye tracking device, that the gaze of the user is no longer directed to the respective user interface element; and
in response to detecting that the gaze of the user is no longer directed to the respective user interface element, forgo navigating to the second user interface.

33. The non-transitory computer readable storage medium of claim 15, wherein the instructions further cause the electronic device to:
while the gaze of the user is directed to the respective user interface element and before the gaze of the user is directed to the respective user interface element for longer than the time threshold and before navigating to the second user interface, display, via the display generation component, a visual indication that continued gaze directed to the respective user interface element will cause navigation to the second user interface.

34. The non-transitory computer readable storage medium of claim 33, wherein the visual indication includes an animation of the respective user interface element expanding into the second user interface.

35. The non-transitory computer readable storage medium of claim 33, wherein displaying the visual indication includes initiating an animation of content in the second user interface.

36. The non-transitory computer readable storage medium of claim 33, wherein the first user interface includes a background over which the respective user interface element is displayed, and the visual indication includes obscuring display of the background.

37. The non-transitory computer readable storage medium of claim 15, wherein navigating to the second user interface includes changing a relative simulated depth between the first user interface and the second user interface.

38. The non-transitory computer readable storage medium of claim 15, wherein:
before detecting the input directed to the respective user interface element, the first user interface is displayed with a visual characteristic having a first value,
after navigating to the second user interface, the second user interface is displayed over the first user interface displayed with the visual characteristic having a second value, different from the first value,
the first user interface includes a second respective user interface element associated with a third user interface, wherein the instructions further cause the electronic device to:
while displaying the second user interface over the first user interface displayed with the visual characteristic having the second value, receive, via the one or more input devices, an input for navigating from the second user interface to the third user interface; and in response to receiving the input for navigating from the second user interface to the third user interface, while maintaining display of the first user interface with the visual characteristic having the second value, cease display of the second user interface over the first user interface, and displaying the third user interface over the first user interface.

39. The non-transitory computer readable storage medium of claim 15, wherein the instructions further cause the electronic device to:

in response to detecting that the gaze of the user is directed to the respective user interface element, initiate an animation corresponding to navigating to the second user interface; and in response to detecting the input that includes the gaze of the user directed to the respective user interface element:

in accordance with the determination that the gaze of the user continues to be directed to the respective user interface element for longer than the time threshold, complete, over the time threshold, the animation corresponding to navigating to the second user interface and navigating to the second user interface; and in accordance with the determination that the selection input is detected via the one or more input devices when the gaze of the user has been directed to the respective user interface element for shorter than the time threshold, navigate to the second user interface without completing, over the time threshold, the animation corresponding to navigating to the second user interface.

* * * * *